(12) United States Patent
Kidambi et al.

(10) Patent No.: US 12,553,853 B2
(45) Date of Patent: Feb. 17, 2026

(54) METHODS OF CHARACTERIZING TWO-DIMENSIONAL MATERIALS, DEVICES COMPRISING SAID MATERIALS AND METHODS OF MAKING AND USE THEREOF

(71) Applicant: Vanderbilt University, Nashville, TN (US)

(72) Inventors: Piran R. Kidambi, Nashville, TN (US); Nicole Moehring, Nashville, TN (US); Pavan Chaturvedi, Nashville, TN (US)

(73) Assignee: Vanderbilt University, Nashville, TN (US)

(*) Notice: Subject to any disclaimer, the term of this patent is extended or adjusted under 35 U.S.C. 154(b) by 329 days.

Patent file contains an affidavit/declaration under 37 CFR 1.130(b).

(21) Appl. No.: 18/138,362

(22) Filed: Apr. 24, 2023

(65) Prior Publication Data
US 2023/0341351 A1    Oct. 26, 2023

Related U.S. Application Data

(60) Provisional application No. 63/334,123, filed on Apr. 23, 2022.

(51) Int. Cl.
*G01N 27/333* (2006.01)
*G01N 27/20* (2006.01)

(52) U.S. Cl.
CPC ......... *G01N 27/3335* (2013.01); *G01N 27/20* (2013.01)

(58) Field of Classification Search
CPC .. G01N 27/20; G01N 27/333; G01N 27/3335; G01N 27/4146
See application file for complete search history.

(56) References Cited

FOREIGN PATENT DOCUMENTS

WO    2021/127324    6/2021

OTHER PUBLICATIONS

Achtyl, Jennifer L., et al. "Aqueous proton transfer across single-layer graphene." Nature communications 6.1 (2015): 6539.
(Continued)

*Primary Examiner* — Benjamin R Schmitt
(74) *Attorney, Agent, or Firm* — Meunier Carlin & Curfman LLC

(57) ABSTRACT

Disclosed herein are methods of characterizing two-dimensional materials, devices comprising said materials and methods of making and use thereof. For example, disclosed herein are methods for characterizing pore(s) and/or defect(s) in a two-dimensional (2D) material, comprising: performing electrically driven ionic transport measurements on a $K^+$-form membrane using a first liquid electrolyte comprising KCl to determine the $K^+$ conductance of the $K^+$-form membrane; subsequently converting the $K^+$-form membrane to a $H^+$-form membrane; and performing electrically driven ionic transport measurements on the $H^+$-form membrane using a second liquid electrolyte comprising HCl to determine the $H^+$ conductance of the $H^+$-form membrane; and analyzing the $K^+$ conductance of the $K^+$-form membrane and the $H^+$ conductance of the $H^+$-form membrane to determine a property of the two-dimensional material, wherein the property relates to a characteristic of the pore(s) and/or defect(s) in the two-dimensional material.

15 Claims, 56 Drawing Sheets

(56) References Cited

OTHER PUBLICATIONS

An, Yun, et al. "Stone-wales defects cause high proton permeability and isotope selectivity of single-layer graphene." Advanced Materials 32.37 (2020): 2002442.
Banhart, Florian, Jani Kotakoski, and Arkady V. Krasheninnikov. "Structural defects in graphene." ACS nano 5.1 (2011): 26-41.
Bentley, Cameron L., et al. "High-resolution ion-flux imaging of proton transport through graphenelnafion membranes." ACS nano 16.4 (2022): 5233-5245.
Berry, Vikas. "Impermeability of graphene and its applications." Carbon 62 (2013): 1-10.
Boutilier, Michael SH, et al. "Molecular sieving across centimeter-scale single-layer nanoporous graphene membranes." ACS nano 11.6 (2017): 5726-5736.
Boutilier MSHH et al. "Implications of Permeation through Intrinsic Defects in Graphene on the Design of Defect-Tolerant Membranes for Gas Separation." ACS Nano 2014, 8 (1), 841-849.
Bukola S et al. "A Charge-Transfer Resistance Model and Arrhenius Activation Analysis for Hydrogen Ion Transmission across Single-Layer Graphene." Electrochim. Acta 2019, 296, 1-7.
Bukola S et al. "Effects of Atomic-Layer-Deposition Alumina on Proton Transmission through Single-Layer Graphene in Electrochemical Hydrogen Pump Cells." ACS Appl. Energy Mater. 2020, 3 (2), 1364-1372.
Bukola S et al. "Graphene-Based Proton Transmission and Hydrogen Crossover Mitigation in Electrochemical Hydrogen Pump Cells." ECS Trans. 2019, 92 (8), 439-444.
Bukola S et al. "Selective Proton/Deuteron Transport through Nafion|Graphene|Nafion Sandwich Structures at High Current Density". J. Am. Chem. Soc. 2018, 140 (5), 1743-1752.
Bukola S et al. "Single-Layer Graphene as a Highly Selective Barrier for Vanadium Crossover with High Proton Selectivity." J. Energy Chem. 2021, 59, 419-430.
Bukola, Saheed, et al. "Single-layer graphene sandwiched between proton-exchange membranes for selective proton transmission." ACS applied nano materials 2.2 (2019): 964-974.
Bunch JS et al. Impermeable Atomic Membranes from Graphene Sheets. Nano Lett. 2008, 8 (8), 2458-2462.
Cantley, Lauren, et al. "Voltage gated inter-cation selective ion channels from graphene nanopores." Nanoscale 11.20 (2019): 9856-9861.
Casiraghi, C. "Doping dependence of the Raman peaks intensity of graphene close to the Dirac point." Physical Review B 80.23 (2009): 233407.
Chaitoglou S et al. Effect of Temperature on Graphene Grown by Chemical Vapor Deposition. J. Mater. Sci. 2017, 52 (13), 8348-8356.
Chaturvedi P et al. Deconstructing Proton Transport Through Atomically Thin Monolayer CVD Graphene Membranes. J. Mater. Chem. A 2022, DOI: 10.1039/D2TA01737G.
Chaturvedi P et al. Ionic Conductance through Graphene: Assessing Its Applicability as a Proton Selective Membrane. ACS Nano 2019, 13 (10), 12109-12119.
Chen Q et al. Graphene Enhances the Proton Selectivity of Porous Membrane in Vanadium Flow Batteries. Materials and Design 2017, 113, 149-156.
Cheng P et al. Facile Size-Selective Defect Sealing in Large-Area Atomically Thin Graphene Membranes for Sub-Nanometer Scale Separations. Nano Lett. 2020, 20 (8), 5951-5959.
Cheng P et al. Scalable Synthesis of Nanoporous Atomically Thin Graphene Membranes for Dialysis and Molecular Separations via Facile Isopropanol-Assisted Hot Lamination. Nanoscale 2021, 13 (5), 2825-2837.
Choubak S et al. No Graphene Etching in Purified Hydrogen. J. Phys. Chem. Lett. 2013, 4 (7), 1100-1103.
Dong J et al. Kinetics of Graphene and 2D Materials Growth. Adv. Mater. 2019, 31 (9), 1801583.

Duhee, Yoon et al. "Negative thermal expansion coefficient of graphene measured by Raman spectroscopy." Nano letters 11.8 (2011): 3227-3231.
Ferrari, Andrea C., and Denis M. Basko. "Raman spectroscopy as a versatile tool for studying the properties of graphene." Nature nanotechnology 8.4 (2013): 235-246.
Ferrari AC. Raman Spectroscopy of Graphene and Graphite: Disorder, Electron- Phonon Coupling, Doping and Nonadiabatic Effects. Solid State Commun. 2007, 143 (1-2), 47-57.
Garaj, Slaven, et al. "Graphene as a subnanometre trans-electrode membrane." Nature 467.7312 (2010): 190-193.
Geise GM et al. Sodium Chloride Diffusion in Sulfonated Polymers for Membrane Applications. J. Membr. Sci. 2013, 427, 186-196.
Geim, Andre K., and Irina V. Grigorieva. "Van der Waals heterostructures." Nature 499.7459 (2013): 419-425.
Gong, Cheng, et al. "Rapid selective etching of PMMA residues from transferred graphene by carbon dioxide." The Journal of Physical Chemistry C 117.44 (2013): 23000-23008.
Griffin E et al. Proton and Li-Ion Permeation through Graphene with Eight-Atom-Ring Defects. ACS Nano 2020, 14 (6), 7280-7286.
Guccini V et al. Highly Proton Conductive Membranes Based on Carboxylated Cellulose Nanofibres and Their Performance in Proton Exchange Membrane Fuel Cells. J. Mater. Chem. A 2019, 7(43), 25032-25039.
Holmes SM et al. 2D Crystals Significantly Enhance the Performance of a Working Fuel Cell. Adv. Energy Mater. 2017, 7 (5), 1601216.
Hsu WY et al. Ion Transport and Clustering in Nafion Perfluorinated Membranes. J. Membr. Sci. 1983, 13 (3), 307-326.
Hu S et al. Proton Transport through One-Atom-Thick Crystals. Nature 2014, 516(7530), 227-230.
Hu S et al. Transport of Hydrogen Isotopes through Interlayer Spacing in van Der Waals Crystals. Nat. Nanotechnol. 2018, 13 (6), 468-472.
Huang, Pinshane Y., et al. "Grains and grain boundaries in single-layer graphene atomic patchwork quilts." Nature 469.7330 (2011): 389-392.
Huang S et al. Single-Layer Graphene Membranes by Crack-Free Transfer for Gas Mixture Separation. Nature Comm 2018, 9 (1), 1-11.
Inaba M et al. Gas Crossover and Membrane Degradation in Polymer Electrolyte Fuel Cells. Electrochim. Acta 2006, 51 (26), 5746-5753.
Jacobberger RM et al. Graphene Growth Dynamics on Epitaxial Copper Thin Films. Chem. Mater. 2013, 25 (6), 871-877.
Jain, Tarun, et al. "Heterogeneous sub-continuum ionic transport in statistically isolated graphene nanopores." Nature nanotechnology 10.12 (2015): 1053-1057.
Jia C et al. "Direct Optical Characterization of Graphene Growth and Domains on Growth Substrates." Sci. Rep. 2012, 2 (1), 707.
Jiang R et al. "Investigation of Membrane Property and Fuel Cell Behavior with Sulfonated Poly(Ether Ether Ketone) Electrolyte: Temperature and Relative Humidity Effects". J. Power Sources 2005, 150 (1-2), 120-128.
Jung SH et al. "Super-Nernstian PH Sensor Graphene." Nano Lett. 2021, 21 (1), 34-42.
Junoh H et al. "Performance of Polymer Electrolyte Membrane for Direct Methanol Fuel Cell Application: Perspective on Morphological Structure." Membranes (Basel) 2020, 10 (3), 34.
Karnik, Rohit N. "Breakthrough for protons." Nature 516.7530 (2014): 173-174.
Kidambi PR et al. "A Scalable Route to Nanoporous Large-Area Atomically Thin Graphene Membranes by Roll-to-Roll Chemical Vapor Deposition and Polymer Support Casting." ACS Appl. Mater. Interfaces 2018, 10 (12), 10369-10378.
Kidambi, Piran R., et al. "Nanoporous atomically thin graphene membranes for desalting and dialysis applications." Advanced Materials 29.33 (2017): 1700277.
Kidambi, Piran R., et al. "Multifunctional oxides for integrated manufacturing of efficient graphene electrodes for organic electronics." Applied Physics Letters 106.6 (2015): 063304.

(56) References Cited

OTHER PUBLICATIONS

Kidambi PR et al. "Assessment and Control of the Impermeability of Graphene for Atomically Thin Membranes and Barriers." Nanoscale 2017, 9 (24), 8496-8507.
Kidambi PR et al. "Facile Fabrication of Large-Area Atomically Thin Membranes by Direct Synthesis of Graphene with Nanoscale Porosity." Adv. Mater. 2018, 30 (49), 1804977.
Kidambi PR et al. "Observing Graphene Grow: Catalyst-Graphene Interactions during Scalable Graphene Growth on Polycrystalline Copper." Nano Lett. 2013, 13 (10), 4769-4778.
Kidambi PR et al. "Selective Nanoscale Mass Transport across Atomically Thin Single Crystalline Graphene Membranes." Adv. Mater. 2017, 29(19), 1605896.
Kidambi PR et al. "Subatomic Species Transport through Atomically Thin Membranes: Present and Future Applications." Science 2021, 374 (6568), eabd7687.
Kidambi PR et al. "The Parameter Space of Graphene Chemical Vapor Deposition on Polycrystalline Cu." J. Phys. Chem. C 2012, 116 (42), 22492-22501.
Kim H et al. Activation Energy Paths for Graphene Nucleation and Growth on Cu. ACS Nano 2012, 6 (4), 3614-3623.
Kim S et al. "Pore-Size-Tuned Graphene Oxide Frameworks as Ion-Selective and Protective Layers on Hydrocarbon Membranes for Vanadium Redox-Flow Batteries." Nano Lett. 2018, 18 (6), 3962-3968.
Klose C et al. "All-Hydrocarbon MEA for PEM Water Electrolysis Combining Low Hydrogen Crossover and High Efficiency." Adv. Energy Mater. 2020, 10 (14), 1903995.
Kobayashi T et al. "Production of a 100-m-Long High-Quality Graphene Transparent Conductive Film by Roll-to-Roll Chemical Vapor Deposition and Transfer Process." Appl. Phys. Lett. 2013, 102(2), 023112.
Koenig SP et al. S "elective Molecular Sieving through Porous Graphene". Nature Nanotechnol 2012, 7 (11), 728-732.
Koenig SP et al. "Ultrastrong Adhesion of Graphene Membranes." Nat. Nanotechnol. 2011, 6 (9), 543-546.
Kratzer, Markus, et al. "Effects of polymethylmethacrylate-transfer residues on the growth of organic semiconductor molecules on chemical vapor deposited graphene." Applied Physics Letters 106. 10 (2015): 103101.
Kusoglu, Ahmet, and Adam Z. Weber. "New insights into perfluorinated sulfonic-acid ionomers." Chemical reviews 117.3 (2017): 987-1104.
Kwon, Sung-Joo, et al. "Extremely stable graphene electrodes doped with macromolecular acid." Nature communications 9.1 (2018): 2037.
Leenaerts, O., B. Partoens, and F. M. Peeters. "Graphene: A perfect nanoballoon." Applied Physics Letters 93.19 (2008): 193107.
Lehmani A et al. Ion Transport in Nafion. 117 Membrane. J. Electroanal. Chem. 1997, 428 (1-2), 81-89.
Li X et al. "Large-Area Graphene Single Crystals Grown by Low-Pressure Chemical Vapor Deposition of Methane on Copper." J. Am. Chem. Soc. 2011, 133 (9), 2816-2819.
Liang, Xuelei, et al. "Toward clean and crackless transfer of graphene." ACS nano 5.11 (2011): 9144-9153.
Lin, Li, et al. "Towards super-clean graphene." Nature communications 10.1 (2019): 1912.
Lin, Yung-Chang, et al. "Graphene annealing: how clean can it be?." Nano letters 12.1 (2012): 414-419.
Liu, Jiaman, et al. "Sandwiching h-BN monolayer films between sulfonated poly (ether ether ketone) and nafion for proton exchange membranes with improved ion selectivity." ACS nano 13.2 (2019): 2094-2102.
Liu, Yangqiao, et al. "Stable Nafion-functionalized graphene dispersions for transparent conducting films." Nanotechnology 20.46 (2009): 465605.
Lozada-Hidalgo M et al. "Giant Photoeffect in Proton Transport through Graphene Membranes." Nat. Nanotechnol. 2018, 13 (4), 300-303.
Lozada-Hidalgo M et al. "Scalable and Efficient Separation of Hydrogen Isotopes Using Graphene-Based Electrochemical Pumping." Nature Comm 2017, 8 (1), 15215.
Lozada-Hidalgo M et al. "Sieving Hydrogen Isotopes through Two-Dimensional Crystals." Science 2016, 351 (6268), 68-70.
Ma T et al. "Edge-Controlled Growth and Kinetics of Single-Crystal Graphene Domains by Chemical Vapor Deposition." Proc. Natl. Acad. Sci. U. S. A. 2013, 110 (51), 20386-20391.
Mi B. "Scaling up Nanoporous Graphene Membranes." Science 2019, 364 (6445), 1033-1034.
Miao, Meng, et al. "First principles study of the permeability of graphene to hydrogen atoms." Physical Chemistry Chemical Physics 15.38 (2013): 16132-16137.
Mogg L et al. "Perfect Proton Selectivity in Ion Transport through Two- Dimensional Crystals." Nat. Commun. 2019, 10 (1), 4243.
Mouterde T et al. "Molecular Streaming and Its Voltage Control in Ångström-Scale Channels." Nature 2019, 567(7746), 87-90.
O'Hern SC et al. "Selective Ionic Transport through Tunable Subnanometer Pores in Single-Layer Graphene Membranes." Nano Lett. 2014, 14 (3), 1234-1241.
O'hern SC et al. "Selective Molecular Transport through Intrinsic Defects in a Single Layer of CVD Graphene." ACS Nano 2012, 6 (11), 10130-10138.
Perconte, David, et al. "Tunable Klein-like tunnelling of high-temperature superconducting pairs into graphene." Nature Physics 14.1 (2018): 25-29.
Petrone, Nicholas, et al. "Chemical vapor deposition-derived graphene with electrical performance of exfoliated graphene." Nano letters 12.6 (2012): 2751-2756.
Prozorovska L et al. "State-of-the-Art and Future Prospects for Atomically Thin Membranes from 2D Materials". Adv. Mater. 2018, 30 (52), 1801179.
Qi H et al. "Fabrication of Sub-Nanometer Pores on Graphene Membrane for Ion Selective Transport." Nanoscale 2018, 10 (11), 5350-5357.
Raaijmakers, Michiel JT, and Nieck E. Benes. "Current trends in interfacial polymerization chemistry." Progress in polymer science 63 (2016): 86-142.
Robertson, Alex W., and Jamie H. Warner. "Atomic resolution imaging of graphene by transmission electron microscopy." Nanoscale 5.10 (2013): 4079-4093.
Rollings, Ryan C., Aaron T. Kuan, and Jene A. Golovchenko. "Ion selectivity of graphene nanopores." Nature communications 7.1 (2016): 11408.
Sanders, Simon, et al. "Engineering high charge transfer n-doping of graphene electrodes and its application to organic electronics." Nanoscale 7.30 (2015): 13135-13142.
Satyapal S. DOE Hydrogen and Fuel Cell Perspectives and Overview of the International Partnership for Hydrogen and Fuel Cells in the Economy (IPHE); Presented at Global America Business Institute (GABI) Virtual Workshop, Jul. 1, 2020U.S. Department of Energy Hydrogen and Fuel Cells Program, 2020.
Sayadi P et al. Study of Hydrogen Crossover and Proton Conductivity of Self- Humidifying Nanocomposite Proton Exchange Membrane Based on Sulfonated Poly(Ether Ether Ketone). Energy 2016, 94, 292-303.
Schneider, Caroline A., Wayne S. Rasband, and Kevin W. Eliceiri. "NIH Image to ImageJ: 25 years of image analysis." Nature methods 9.7 (2012): 671-675.
Schoemaker M et al. Evaluation of Hydrogen Crossover through Fuel Cell Membranes. Fuel Cells 2014, 14 (3), 412-415.
Seel, Max, and Ravindra Pandey. "Proton and hydrogen transport through two-dimensional monolayers." 2D Materials 3.2 (2016): 025004.
Shreiner RH et al. Standard Reference Materials: Primary Standards and Standard Reference Materials for Electrolytic Conductivity; NIST Special Publication 260-142, 2004 Ed.; National Institute of Standards and Technology: Gaithersburg, MD, 2004.
Slade S et al. Ionic Conductivity of an Extruded Nafion 1100 EW Series of Membranes. J. Electrochem. Soc. 2002, 149 (12), A1556.
Suk ME et al. Ion Transport in Sub-5-Nm Graphene Nanopores. J. Chem. Phys. 2014, 140 (8), 084707.

(56) References Cited

OTHER PUBLICATIONS

Sun PZ et al. Limits on Gas Impermeability of Graphene. Nature 2020, 579 (7798), 229-232.
Surwade, Sumedh P., et al. "Water desalination using nanoporous single-layer graphene." Nature nanotechnology 10.5 (2015): 459-464.
Tempelman CHL et al. Membranes for All Vanadium Redox Flow Batteries. J. Energy Storage 2020, 32, 101754.
Tesfaye, Meron, et al. "Thermal transitions in perfluorosulfonated ionomer thin-films." ACS macro letters 7.10 (2018): 1237-1242.
Toh CT et al. Synthesis and Properties of Free-Standing Monolayer Amorphous Carbon. Nature 2020, 577 (7789), 199-203.
Tsetseris, Leon, and S. T. Pantelides. "Graphene: An impermeable or selectively permeable membrane for atomic species?." Carbon 67 (2014): 58-63.
Ugeda MM et al. Point Defects on Graphene on Metals. Phys. Rev. Lett. 2011, 107 (11), 116803.
Ullah S et al. Graphene Transfer Methods: A Review. Nano Research 2021, 14 (11), 3756-3772.
Vanysek P. Ionic Conductivity And Diffusion at Infinite Dilution. In CRC Handbook of Chemistry and Physics; CRC Press: Boca Raton, FL, 2000; vol. 83, pp. 76-78.
Villalobos LF et al. Bottom-up Synthesis of Graphene Films Hosting Atom-Thick Molecular-Sieving Apertures. Proc. Natl. Acad. Sci. U.S.A. 2021, 118 (37), e2022201118.
Vlassiouk, Ivan, et al. "Large scale atmospheric pressure chemical vapor deposition of graphene." Carbon 54 (2013): 58-67.
Vlassiouk I et al. Graphene Nucleation Density on Copper: Fundamental Role of Background Pressure. J. Phys. Chem. C 2013, 117 (37), 18919-18926.
Vlassiouk I et al. Role of Hydrogen in Chemical Vapor Deposition Growth of Large Single-Crystal Graphene. ACS Nano 2011, 5 (7), 6069-6076.
Vlassiouk IV et al. Evolutionary Selection Growth of Two-Dimensional Materials on Polycrystalline Substrates. Nat. Mater. 2018, 17 (4), 318-322.
Walker, Michael I., et al. "Measuring the proton selectivity of graphene membranes." Applied Physics Letters 107.21 (2015): 213104.
Walker MI et al. Extrinsic Cation Selectivity of 2D Membranes. ACS Nano 2017, 11 (2), 1340-1346.
Wang L et al. Fundamental Transport Mechanisms, Fabrication and Potential Applications of Nanoporous Atomically Thin Membranes. Nat. Nanotechnol. 2017, 12 (6), 509-522.
Wang L et al. Single-Layer Graphene Membranes Withstand Ultrahigh Applied Pressure. Nano Lett. 2017, 17 (5), 3081-3088.
Wang, Ruizhi, et al. "Catalyst interface engineering for improved 2D film lift-off and transfer." ACS Applied Materials & Interfaces 8.48 (2016): 33072-33082.
Wang R et al. Controlling Fuel Crossover and Hydration in Ultra-Thin Proton Exchange Membrane-Based Fuel Cells Using Pt-Nanosheet Catalysts. J. Mater. Chem. A 2014, 2 (39), 16416-16423.
Wang Y et al. Materials, Technological Status, and Fundamentals of PEM Fuel Cells e A Review. Mater. Today 2020, 32, 178-203.
Wood, Joshua D., et al. "Annealing free, clean graphene transfer using alternative polymer scaffolds." Nanotechnology 26.5 (2015): 055302.
Wu T et al. Fast Growth of Inch-Sized Single-Crystalline Graphene from a Controlled Single Nucleus on Cu—Ni Alloys. Nat. Mater. 2016, 15 (1), 43-47.
Xie, Wenjing, et al. "Clean graphene surface through high temperature annealing." Carbon 94 (2015): 740-748.
Xu X et al. Ultrafast Epitaxial Growth of Metre-Sized Single-Crystal Graphene on Industrial Cu Foil. Science Bulletin 2017, 62 (15), 1074-1080.
Yan XH et al. A Monolayer Graphene-Nafion Sandwich Membrane for Direct Methanol Fuel Cells. J. Power Sources 2016, 311, 188-194.
Yeager HL et al. Transport Properties of Nafion. Membranes in Concentrated Solution Environments. J. Electrochem. Soc. 1982, 129 (1), 85-89.
Ying Z et al. Influence of Stacking on the Aqueous Proton Penetration Behaviour across Two-Dimensional Graphtetrayne. Nanoscale 2021, 13 (11), 5757-5764.
Yoon SI et al. AA'-Stacked Trilayer Hexagonal Boron Nitride Membrane for Proton Exchange Membrane Fuel Cells. ACS Nano 2018, 12 (11), 10764-10771.
Zakertabrizi M et al. Hydrous Proton Transfer through Graphene Interlayer: An Extraordinary Mechanism under Magnifier. Adv. Mater. Technol. 2021, 6 (10), 2001049.
Zeng Z et al. Biomimetic N-Doped Graphene Membrane for Proton Exchange Membranes. Nano Lett. 2021, 21 (10), 4314.
Zhang Y et al. Anisotropic Hydrogen Etching of Chemical Vapor Deposited Graphene. ACS Nano 2012, 6 (1), 126-132.
Zhang Z et al. Atomistic Processes in the Early Stages of Thin-Film Growth. Science 1997, 276 (5311), 377-383.
Zhao J et al. Etching Gas-Sieving Nanopores in Single-Layer Graphene with an Angstrom Precision for High-Performance Gas Mixture Separation. Sci. Adv. 2019, 5 (1), No. eaav1851.
Zhao T et al. Ultrafast Growth of Nanocrystalline Graphene Films by Quenching and Grain-Size-Dependent Strength and Bandgap Opening. Nat. Commun. 2019, 10 (1), 4854.

N212|Graphene(Gr)|N212 sandwich membrane $2 \times R_S$: Solution resistance
$R_{N212}$: Nafion resistance
$R_{Gr}$: Graphene (Gr) resistance $$R_{N212|Gr|N212+Solution} = 2 \times R_{N212} + 2 \times R_S + R_{Gr}$$

METHODS OF CHARACTERIZING TWO-DIMENSIONAL MATERIALS, DEVICES COMPRISING SAID MATERIALS AND METHODS OF MAKING AND USE THEREOF

CROSS-REFERENCE TO RELATED APPLICATIONS

This application claims the benefit of priority to U.S. Provisional Application No. 63/334,123 filed Apr. 23, 2022, which is hereby incorporated herein by reference in its entirety.

STATEMENT OF GOVERNMENT SUPPORT

This invention was made with government support under grant no. 1944134 awarded by the National Science Foundation, grant number DESC0022237 awarded by the U.S. Department of Energy, and grant number DESC0022915 awarded by the U.S. Department of Energy. The government has certain rights in the invention.

BACKGROUND

Two-dimensional materials are of interest in a variety of fields and applications. Methods of systematically assessing properties of two-dimensional materials using a common framework are needed. The compositions, devices, and methods described herein address this and other needs.

SUMMARY

In accordance with the purposes of the disclosed compositions, devices, and methods, as embodied and broadly described herein, the disclosed subject matter relates to methods of characterizing two-dimensional materials, devices comprising said materials and methods of making and use thereof.

Disclosed herein are methods for characterizing pore(s) and/or defect(s) in a two-dimensional (2D) material. In some examples, the methods comprise: performing electrically driven ionic transport measurements (e.g., via chronoamperometry) on a $K^+$-form membrane using a first liquid electrolyte comprising KCl to determine the $K^+$ conductance of the $K^+$-form membrane; wherein the $K^+$-form membrane comprises a two-dimensional material sandwiched between a first ionomer and a second ionomer, wherein the first ionomer and the second ionomer are each in a $K^+$-form. In some examples, the methods further comprise, after performing the electrically driven ionic transport measurements (e.g., via chronoamperometry) on the $K^+$-form membrane, converting the $K^+$-form membrane to a H-form membrane, the $H^+$-form membrane comprising the two-dimensional material sandwiched between the first ionomer and the second ionomer, wherein the first ionomer and the second ionomer are each in a $H^+$-form. In some examples, the methods further comprise subsequently performing electrically driven ionic transport measurements (e.g., via chronoamperometry) on the $H^+$-form membrane using a second liquid electrolyte comprising HCl to determine the $H^+$ conductance of the $H^+$-form membrane. In some examples, the methods further comprise analyzing the $K^+$ conductance of the $K^+$-form membrane and the $H^+$ conductance of the $H^+$-form membrane to determine a property of the two-dimensional material, wherein the property relates to a characteristic of the pore(s) and/or defect(s) in the two-dimensional material.

For example, analyzing the $K^+$ conductance of the $K^+$-form membrane can comprise determining the $K^+$ conductance of the two-dimensional material, and the $K^+$ conductance of the two-dimensional material is from 0.01 mS $cm^{-2}$ to $2 \times 10^4$ mS $cm^{-2}$ (e.g., 20 S $cm^{-2}$).

In some examples, analyzing the $H^+$ conductance of the $H^+$-form membrane comprises determining the $H^+$ conductance of the two-dimensional material, and the $H^+$ conductance of the two-dimensional material is from 1 mS $cm^{-2}$ to $5 \times 10^5$ mS $cm^{-2}$ (e.g., 500 S $cm^{-2}$).

In some examples, analyzing the $K^+$ conductance of the $K^+$-form membrane and the $H^+$ conductance of the $H^+$-form membrane comprises determining the $H^+/K^+$ selectivity of the two-dimensional material, and the $H^+/K^+$ selectivity of the two-dimensional material is from 1 to 1000.

In some examples, after performing the electrically driven ionic transport measurements (e.g., via chronoamperometry) on the $H^+$-form membrane using the second liquid electrolyte, the method further comprises performing $H_2$ crossover measurements on the $H^+$-form membrane to determine the $H_2$ crossover current density of the $H^+$-form membrane. In some examples, the methods further comprise analyzing the $H_2$ crossover current density of the H-form membrane to determine the $H_2$ crossover current density of the two-dimensional material, and wherein the $H_2$ crossover current density of the two-dimensional material is from $1 \times 10^{-6}$ mA $cm^{-2}$ to 1 mA $cm^{-2}$.

In some examples, the 2D material is supported by a substrate, such that the two-dimensional material and the substrate are sandwiched by the first ionomer and the second ionomer.

In some examples, the membrane comprises one or more layers of the two-dimensional material. In some examples, the membrane comprises two layers of the two-dimensional material stacked together.

In some examples, the two-dimensional material comprises graphene, hexagonal boron nitride (h-BN), a transition metal dichalcogenide, or a combination thereof. In some examples, the two-dimensional material comprises a semiconductor.

In some examples, the 2D material comprises a first set of pores and/or defects having a first characteristic dimension, and a second set of pores and/or defects having a second characteristic dimension, the second characteristic dimension being greater than the first characteristic dimension, and the method further comprises blocking the second set of pores and/or defects via interfacial polymerization before sandwiching the 2D material between the first and second ionomer.

In some examples, the first ionomer and/or the second ionomer each independently comprises a proton conducting polymer. In some examples, the first ionomer, the second ionomer, or a combination thereof comprise(s) a copolymer of tetrafluoroethylene and perfluoro-3,6-dioxa-4-methyl-7-octene-sulfonic acid (Nafion), poly(tetrafluoroethylene-co-2,2,4-trifluoro-5-trifluoromethoxy-1,3-dioxole) (Hyflon), polybenzimidazole (PBI), derivatives thereof, or combinations thereof.

In some examples, the method comprises characterizing the presence of pore(s) and/or defect(s), the concentration (e.g., density) of pore(s) and/or defect(s), the average characteristic dimension(s) of pore(s) and/or defect(s), or a combination thereof.

Also disclosed herein are devices comprising: a first layer comprising a first two-dimensional (2D) material; and a second layer comprising a second two-dimensional (2D) material; wherein the first layer is disposed on and in physical contact with the second layer. In some examples, the two-dimensional material comprises graphene, hexagonal boron nitride (h-BN), a transition metal dichalcogenide, or a combination thereof. In some examples, the device further comprises a first ionomer, wherein: the first ionomer is disposed on the first layer, such that the first layer is sandwiched between the first ionomer and the second layer; the first ionomer is disposed on the second layer, such that the second layer is sandwiched between the first layer and the first ionomer; or a combination thereof. In some examples, the device further comprises a second ionomer, the second ionomer being different than the first ionomer, wherein the first ionomer is disposed on the first layer, such that the first layer is sandwiched between the first ionomer and the second layer, and the second ionomer is disposed on the second layer, such that the second layer is sandwiched between the first layer and the second ionomer.

Also disclosed herein are methods of making a membrane, the methods comprising: dip coating a precursor membrane in an ionomer, thereby coating the precursor membrane in the ionomer to form the membrane, wherein the precursor membrane comprises a two-dimensional material.

Additional advantages of the disclosed devices and methods will be set forth in part in the description which follows, and in part will be obvious from the description. The advantages of the disclosed devices will be realized and attained by means of the elements and combinations particularly pointed out in the appended claims. It is to be understood that both the foregoing general description and the following detailed description are exemplary and explanatory only and are not restrictive of the disclosed devices and methods, as claimed.

The details of one or more embodiments of the invention are set forth in the accompanying drawings and the description below. Other features, objects, and advantages of the invention will be apparent from the description and drawings, and from the claims.

DESCRIPTION OF FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
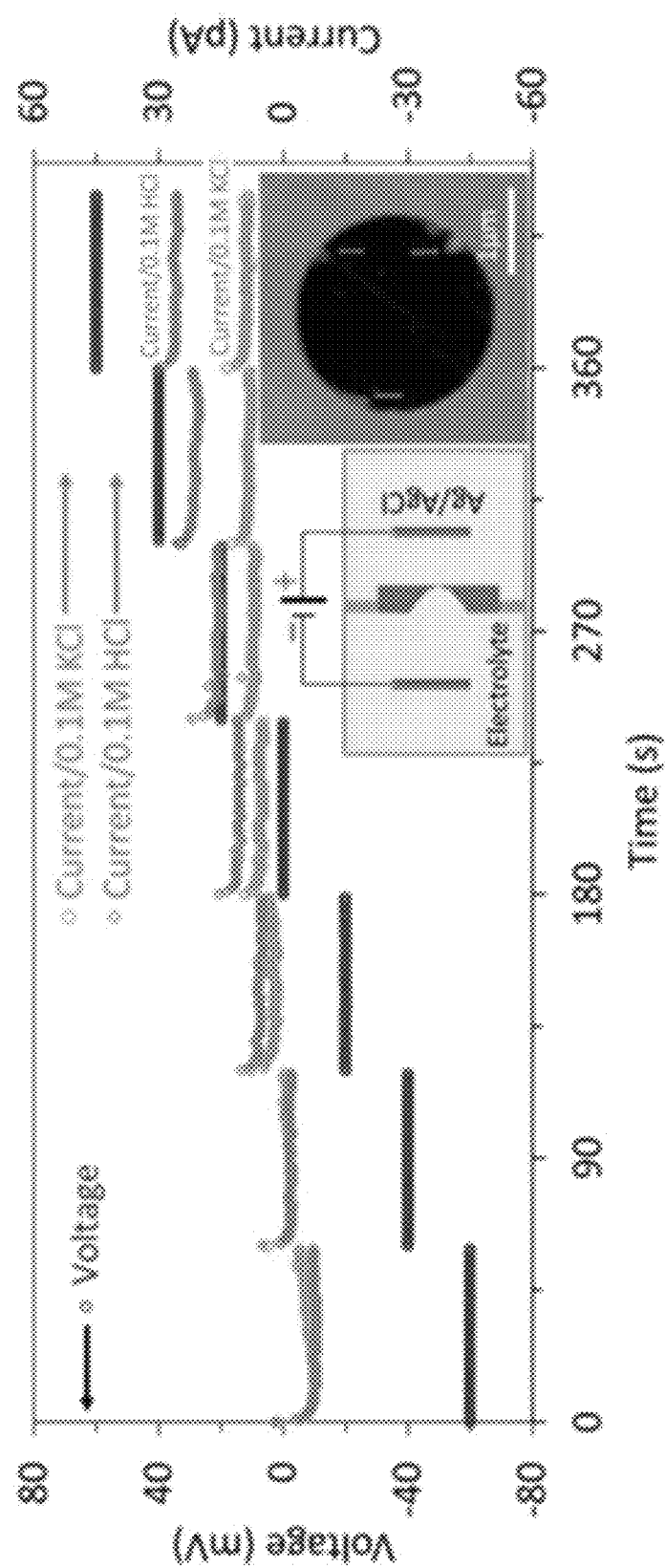
FIG. 1. Representative multi-step chronoamperometry current-voltage plots of current in 0.1 M HCl (green) and 0.1 M KCl (orange) and voltage (black). Insets show the schematic of the 2-point measurement set-up and SEM image of suspended monolayer graphene covering an aperture in the 200 nm $SiN_x$ coated Si wafer. Red arrows point to the polymer residues.

The compositions, devices, and methods described herein may be understood more readily by reference to the following detailed description of specific aspects of the disclosed subject matter and the Examples included therein.

Before the present compositions, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Methods of Characterizing Two-Dimensional Materials

Disclosed herein are methods of characterizing two-dimensional materials, devices comprising said materials and methods of making and use thereof.

For example, disclosed herein are methods for characterizing pore(s) and/or defect(s) in a two-dimensional (2D) material. In some examples, the methods can comprise performing measurements on a membrane, wherein the membrane comprises a two-dimensional material sandwiched between a first ionomer and a second ionomer.

In some examples, the membrane comprises one or more layers of the two-dimensional material. For example, the membrane can comprise two layers of the two-dimensional material stacked together.

The two-dimensional material can comprise any suitable material. Examples of two-dimensional materials are described, for example, by Giem et al., Nature, 2013, 499, 419-425, which is hereby incorporated herein by reference for its description of two-dimensional materials. The two-dimensional material can, for example, comprise graphene, hexagonal boron nitride (h-BN), a transition metal dichalcogenide, a covalent organic framework, a metal organic framework, micas, clays, or a combination thereof. In some examples, the two-dimensional material comprises graphene, hexagonal boron nitride (h-BN), a transition metal dichalcogenide, or a combination thereof. In some examples, the two-dimensional material comprises graphene, hexagonal boron nitride (h-BN), or a combination thereof. In some examples, the two-dimensional material comprises graphene. In some examples, the two-dimensional material comprises monolayer graphene.

In some examples, the two-dimensional material comprises a transition metal dichalcogenide. As used herein, a "transition metal dichalcogenide" refers to a compound comprising a transition metal and two chalcogen atoms. As used herein, a "transition metal" refers to any element from groups 3-12, such as Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg, and Ac. As used herein a "chalcogen" refers to any element from group 16, such as oxygen, sulfur, selenium, tellurium, and polonium. As such, transition metal chalcogenides can include transition metal oxides, transition metal sulfides, and transition metal selenides, among others. For example, the transition metal dichalcogenide can comprise $MoS_2$, $WS_2$, $MoSe_2$, $WSe_2$, $MoTe_2$, $WTe_2$, $ZrS_2$, $ZrSe_2$, $NbSe_2$, $NbS_2$, $TaS_2$, $TiS_2$, $NiSe_2$, $Bi_2Se_3$, or a combination thereof. In some examples, the transition metal dichalcogenide can comprise $MoS_2$, $WS_2$, $MoSe_2$, $WSe_2$, $MoTe_2$, $WTe_2$, or a combination thereof. In some examples, the transition metal dichalcogenide comprises $MoS_2$.

In some examples, the two-dimensional materials comprises a semiconductor.

The two-dimensional material can, for example, have an average thickness of 10 nanometers (nm) or less (e.g., 9.5 nm or less, 9 nm or less, 8.5 nm or less, 8 nm or less, 7.5 nm or less, 7 nm or less, 6.5 nm or less, 6 nm or less, 5.5 nm or less, 5 nm or less, 4.5 nm or less, 4 nm or less, 3.5 nm or less, 3 nm or less, 2.5 nm or less, 2.25 nm or less, 2 nm or less, 1.75 nm or less, 1.5 nm or less, 1.4 nm or less, 1.3 nm or less, 1.2 nm or less, 1.1 nm or less, 1 nm or less, 0.95 nm or less, 0.9 nm or less, 0.85 nm or less, 0.8 nm or less, 0.75 nm or less, 0.7 nm or less, 0.65 nm or less, 0.6 nm or less, 0.55 nm or less, 0.5 nm or less, 0.45 nm or less, 0.4 nm or less, or 0.35 nm or less). In some examples, the two-dimensional material can have an average thickness of 0.3 nm or more (e.g., 0.35 nm or more, 0.4 nm or more, 0.45 nm or more, 0.5 nm or more, 0.55 nm or more, 0.6 nm or more, 0.65 nm or more, 0.7 nm or more, 0.75 nm or more, 0.8 nm or more, 0.85 nm or more, 0.9 nm or more, 0.95 nm or more, 1 nm or more, 1.1 nm or more, 1.2 nm or more, 1.3 nm or more, 1.4 nm or more, 1.5 nm or more, 1.75 nm or more, 2 nm or more, 2.25 nm or more, 2.5 nm or more, 3 nm or more, 3.5 nm or more, 4 nm or more, 4.5 nm or more, 5 nm or more, 5.5 nm or more, 6 nm or more, 6.5 nm or more, 7 nm or more, 7.5 nm or more, 8 nm or more, 8.5 nm or more, or 9 nm or more). The average thickness of the two-dimensional material can range from any of the minimum values described above to any of the maximum values described above. For example, the two-dimensional material can have an average thickness of from 0.3 nm to 10 nm (e.g., from 0.3 nm to 5 nm, from 5 nm to 10 nm, from 0.3 to 2 nm, from 2 to 4 nm, from 4 to 6 nm, from 6 to 8 nm, from 8 to 10 nm, from 0.3 to 8 nm, from 0.3 to 6 nm, from 0.3 to 4 nm, or from 0.3 nm to 1 nm).

The two-dimensional material can have any suitable lateral dimension, for example the desired lateral dimension can be selected in view of the desired use of the membrane. In some examples, the two-dimensional material can have a lateral dimension of 1 micrometer (micron, µm) or more (e.g., 1.5 µm or more, 2 µm or more, 2.5 µm or more, 3 µm or more, 3.5 µm or more, 4 µm or more, 4.5 µm or more, 5 µm or more, 6 µm or more, 7 µm or more, 8 µm or more, 9 µm or more, 10 µm or more, 15 µm or more, 20 µm or more, 25 µm or more, 30 µm or more, 35 µm or more, 40 µm or more, 45 µm or more, 50 µm or more, 60 µm or more, 70 µm or more, 80 µm or more, 90 µm or more, 100 µm or more, 125 µm or more, 150 µm or more, 175 µm or more, 200 µm or more, 225 µm or more, 250 µm or more, 300 µm or more, 350 µm or more, 400 µm or more, 450 µm or more, 500 µm or more, 600 µm or more, 700 µm or more, 800 µm or more, 900 µm or more, 0.1 centimeters (cm) or more, 0.2 cm or more, 0.3 cm or more, 0.4 cm or more, 0.5 cm or more, 0.6 cm or more, 0.7 cm or more, 0.8 cm or more, 0.9 cm or more, 1 cm or more, 1.25 cm or more, 1.5 cm or more, 1.75 cm or more, 2 cm or more, 2.5 cm or more, 3 cm or more, 3.5 cm or more, 4 cm or more, 4.5 cm or more, 5 cm or more, 6 cm or more, 7 cm or more, 8 cm or more, 9 cm or more, 10 cm or more, 15 cm or more, 20 cm or more, 25 cm or more, 30 cm or more, 35 cm or more, 40 cm or more, 45 cm or more, 50 cm or more, 60 cm or more, 70 cm or more, 80 cm or more, 90 cm or more, 1 meter (m) or more, 1.1 m or more, 1.2 m or more, 1.3 m or more, 1.4 m or more, 1.5 m or more, 1.6 m or more, 1.7 m or more, 1.8 m or more, 1.9 m or more, 2 m or more, 2.25 m or more, 2.5 m or more, 2.75 m or more, 3 m or more, 3.25 m or more, 3.5 m or more, 4 m or more, 4.5 m or more, 5 m or more, 6 m or more, 7 m or more, 8 m or more, or 9 m or more). In some examples, the two-dimensional material can have a lateral dimension of 10 meters (m) or less (e.g., 9 m or less, 8 m or less, 7 m or less, 6 m or less, 5 m or less, 4.5 m or less, 4 m or less, 3.5 m or less, 3 m or less, 3.25 m or less, 3 m or less, 2.75 m or less, 2.5 m or less, 2.25 m or less, 2 m or less, 1.9 m or less, 1.8 m or less, 1.7 m or less, 1.6 m or less, 1.5 m or less, 1.4 m or less, 1.3 m or less, 1.2 m or less, 1.1 m or less, 1 m or less, 90 cm or less, 80 cm or less, 70 cm or less, 60 cm or less, 50 cm or less, 45 cm or less, 40 cm or less, 35 cm or less, 30 cm or less, 25 cm or less, 20 cm or less, 15 cm or less, 10 cm or less, 9 cm or less, 8 cm or less, 7 cm or less, 6 cm or less, 5 cm or less, 4.5 cm or less, 4 cm or less, 3.5 cm or less, 3 cm or less, 2.5 cm or less, 2 cm or less, 1.75 cm or less, 1.5 cm or less, 1.25 cm or less, 1 cm or less, 0.9 cm or less, 0.8 cm or less, 0.7 cm or less, 0.6 cm or less, 0.5 cm or less, 0.4 cm or less, 0.3 cm or less, 0.2 cm or less, 0.1 cm or less, 900 µm or less, 800 µm or less, 700 µm or less, 600 µm or less, 500 µm or less, 450 µm or less, 400 µm or less, 350 µm or less, 300 µm or less, 250 µm or less, 225 µm or less, 200 µm or less, 175 µm or less, 150 µm or less, 125 µm or less, 100 µm or less, 90 µm or less, 80 µm or less, 70 µm or less, 60 µm or less, 50 µm or less, 45 µm or less, 40 µm or less, 35 µm or less, 30 µm or less, 25 µm or less, 20 µm or less, 15 µm or less, 10 µm or less, 9 µm or less, 8 µm or less, 7 µm or less, 6 µm or less, 5 µm or less, 4.5 µm or less, 4 µm or less, 3.5 µm or less, 3 µm or less, 2.5 µm or less, or 2 µm or less). The lateral dimension of the two-dimensional material can range from any of the minimum values described above to any of the maximum values described above. For example, the two-dimensional material can have a lateral dimension of from 1 µm to 10 m (e.g., from 1 µm to 100 µm, from 100 µm to 1 cm, from 1 cm to 1 m, from 1 µm to 10 µm, from 10 µm to 100 µm, from 100 µm to 0.1 cm, from 0.1 cm to 1 cm, from 1 cm to 10 cm, from 10 cm to 1 m, from 1 m to 10 m, from 1 µm to 1 m, from 1 m to 10 m, from 1 cm to 10 m, from 1 µm to 5 m, from 1 cm to 5 m, from 1 µm to 50 cm, or from 1 µm to 10 cm).

The first ionomer and/or the second ionomer can each independently comprise any suitable ionomer. The first ionomer and the second ionomer can be the same or different. In some examples, the first ionomer and/or the second ionomer (when present) each independently comprises a proton conducting polymer. In some examples, the first ionomer, the second ionomer, or a combination thereof comprise(s) a polyether, a polysulfonate, a polysulfone, a poly(imidazole), a triazole, a benzimidazole, a polyester, a polycarbonate, a polymer derived from a pyridine monomer, a polyethylene, a fluoropolymer, derivatives thereof, or combinations thereof. In some examples, the first ionomer, the second ionomer, or a combination thereof comprise(s) a sulfonated fluoropolymer. In some examples, the first ionomer, the second ionomer, or a combination thereof comprise(s) a tetrafluoroethylene based polymer or a derivative thereof. In some examples, the first ionomer, the second ionomer, or a combination thereof comprise(s) a sulfonated tetrafluoroethylene based polymer. In some examples, the first ionomer, the second ionomer, or a combination thereof comprise(s) a poly(imidazole). In some examples, the first ionomer, the proton ionomer, or a combination thereof comprise(s) a copolymer of tetrafluoroethylene and perfluoro-3,6-dioxa-4-methyl-7-octene-sulfonic acid (Nafion), poly(tetrafluoroethylene-co-2,2,4-trifluoro-5-trifluoromethoxy-1,3-dioxole) (Hyflon), polybenzimidazole (PBI), derivatives thereof, or combinations thereof.

The methods for characterizing pore(s) and/or defect(s) in a two-dimensional (2D) material comprise performing electrically driven ionic transport measurements (e.g., via chronoamperometry) on a $K^+$-form membrane using a first liquid electrolyte comprising KCl to determine the $K^+$ conductance of the $K^+$-form membrane. The $K^+$-form membrane comprises the two-dimensional material sandwiched between the first ionomer and the second ionomer, wherein the first ionomer and the second ionomer are each in a $K^+$-form.

The methods further comprise, after performing the electrically driven ionic transport measurements (e.g., via chronoamperometry) on the $K^+$-form membrane, converting the $K^+$-form membrane to a $H^+$-form membrane, the $H^+$-form membrane comprising the two-dimensional material sandwiched between the first ionomer and the second ionomer, wherein the first ionomer and the second ionomer are each in a $H^+$-form; and performing electrically driven ionic transport measurements (e.g., via chronoamperometry) on the $H^+$-form membrane using a second liquid electrolyte comprising HCl to determine the $H^+$ conductance of the $H^+$-form membrane.

In some examples, the methods further comprise analyzing the $K^+$ conductance of the $K^+$-form membrane and the $H^+$ conductance of the $H^+$-form membrane to determine a property of the two-dimensional material, wherein the property relates to a characteristic of the pore(s) and/or defect(s) in the two-dimensional material.

In some examples, analyzing the $K^+$ conductance of the $K^+$-form membrane can comprise determining the $K^+$ conductance of the two-dimensional material. In some examples, the two-dimensional material can have a $K^+$ conductance of 0.01 mS cm$^{-2}$ or more (e.g., 0.05 mS cm$^{-2}$ or more, 0.1 mS cm$^{-2}$ or more, 0.5 mS cm$^{-2}$ or more, 1 mS cm$^{-2}$ or more, 5 mS cm$^{-2}$ or more, 10 mS cm$^{-2}$ or more, 50 mS cm$^{-2}$ or more, 100 mS cm$^{-2}$ or more, 500 mS cm$^{-2}$ or more, 1000 mS cm$^{-2}$ or more, or 5000 mS cm$^{-2}$ or more). In some examples, the two-dimensional material can have a $K^+$ conductance of $2\times10^4$ mS cm$^{-2}$ (e.g., 20 S cm$^{-2}$) or less (e.g., $1\times10^4$ mS cm$^{-2}$ or less, 5000 mS cm$^{-2}$ or less, 1000 mS cm$^{-2}$ or less, 500 mS cm$^{-2}$ or less, 100 mS cm$^{-2}$ or less, 50 mS cm$^{-2}$ or less, 10 mS cm$^{-2}$ or less, 5 mS cm$^{-2}$ or less, 1 mS cm$^{-2}$ or less, 0.5 mS cm$^{-2}$ or less, 0.1 mS cm$^{-2}$ or less, or 0.05 mS cm$^{-2}$ or less). The $K^+$ conductance of the two-dimensional material can range from any of the minimum values described above to any of the maximum values described above. For example, the two-dimensional material can have a $K^+$ conductance of from 0.01 mS cm$^{-2}$ to $2\times10^4$ mS cm$^{-2}$ (e.g., 20 S cm$^{-2}$) (e.g., from 0.01 to 1 mS cm$^{-2}$, from 1 to 100 mS cm$^2$, from 100 to $2\times10^4$ mS cm$^{-2}$, from 0.01 to 5000 mS cm$^{-2}$, from 0.01 to 1000 mS cm$^{-2}$, from 0.01 to 500 mS cm$^{-2}$, from 0.01 to 100 mS cm$^2$, from 0.01 to 50 mS cm$^2$, from 0.01 to 10 mS cm$^{-2}$, from 0.01 to 5 mS cm$^2$, from 0.01 to 1 mS cm$^{-2}$, from 0.01 to 0.5 mS cm$^2$, or from 0.01 to 0.1 mS cm$^{-2}$).

In some examples, analyzing the $H^+$ conductance of the $H^+$-form membrane can comprise determining the $H^+$ conductance of the two-dimensional material. In some examples, the two-dimensional material can have a $H^+$ conductance of 1 mS cm$^{-2}$ or more (e.g., 5 mS cm$^{-2}$ or more; 10 mS cm$^{-2}$ or more; 50 mS cm$^{-2}$ or more; 100 mS cm$^{-2}$ or more; 500 mS cm$^{-2}$ or more; 1000 mS cm$^{-2}$ or more; 5000 mS cm$^{-2}$ or more; 10,000 mS cm$^{-2}$ or more; 50,000 mS cm$^{-2}$ or more; or 100,000 mS cm$^{-2}$ or more). In some examples, the two-dimensional material can have a $H^+$ conductance of $5\times10^5$ mS cm$^{-2}$ (e.g., 500 S cm$^{-2}$) or less (e.g., 250,000 mS cm$^{-2}$ or less; 100,000 mS cm$^{-2}$ or less; 50,000 mS cm$^{-2}$ or less; 10,000 mS cm$^{-2}$ or less; 5000 mS cm$^{-2}$ or less; 1000 mS cm$^{-2}$ or less; 500 mS cm$^{-2}$ or less; 100 mS cm$^{-2}$ or less; 50 mS cm$^{-2}$ or less; 10 mS cm$^{-2}$ or less; or 5 mS cm$^{-2}$ or less). The $H^+$ conductance of the two-dimensional material can range from any of the minimum values described above to any of the maximum values described above. For example, the two-dimensional material can have a $H^+$ conductance of from 1 mS cm$^{-2}$ to $5\times10^5$ mS cm$^{-2}$ (e.g., 500 S cm$^{-2}$) (e.g., from 1 to 100 mS cm$^{-2}$; from 100 to 10,000 mS cm$^{-2}$; from 10,000 to 500,000 mS cm$^{-2}$; from 100 to 500,000 mS cm$^{-2}$; from 1000 to 500,000 mS cm$^{-2}$; from 5000 to 500,000 mS cm$^{-2}$; from 50,000 to 500,000 mS cm$^{-2}$; or from 100,000 to 500,000 mS cm 2).

In some examples, analyzing the $K^+$ conductance of the $K^+$-form membrane and the $H^+$ conductance of the $H^+$-form membrane comprises determining the $H^+/K^+$ selectivity of the two-dimensional material. In some examples, the two-dimensional material can have a $H^+/K^+$ selectivity of 1 or more (e.g., 2 or more, 3 or more, 4 or more, 5 or more, 10 or more, 15 or more, 20 or more, 25 or more, 30 or more, 35 or more, 40 or more, 45 or more, 50 or more, 60 or more, 70 or more, 80 or more, 90 or more, 100 or more, 125 or more, 150 or more, 175 or more, 200 or more, 225 or more, 250 or more, 300 or more, 350 or more, 400 or more, 450 or more, 500 or more, 600 or more, 700 or more, 800 or more, or 900 or more). In some examples, the two-dimensional material can have a $H^+/K^+$ selectivity of 1000 or less (e.g., 900 or less, 800 or less, 700 or less, 600 or less, 500 or less, 450 or less, 400 or less, 350 or less, 300 or less, 250 or less, 225 or less, 200 or less, 175 or less, 150 or less, 125 or less, 100 or less, 90 or less, 80 or less, 70 or less, 60 or less, 50 or less, 45 or less, 40 or less, 35 or less, 30 or less, 25 or less, 20 or less, 15 or less, 10 or less, or 5 or less). The $H^+/K^+$ selectivity of the two-dimensional material can range from any of the minimum values described above to any of the maximum values described above. For example, the two-dimensional material can have a $H^+/K^+$ selectivity of from 1 to 1000 (e.g., from 1 to 500, from 500 to 1000, from 1 to 200, from 200 to 400, from 400 to 600, from 600 to 800, from 800 to 1000, from 5 to 1000, from 10 to 1000, from 50 to 1000, from 100 to 1000, from 200 to 1000, from 300 to 1000, from 400 to 1000, from 600 to 1000, from 700 to 1000, or from 900 to 1000).

In some examples, after performing the electrically driven ionic transport measurements (e.g., via chronoamperometry) on the $H^+$-form membrane using the second liquid electrolyte, the methods can further comprise performing gas phase proton transport and/or $H_2$ crossover measurements on the $H^+$-form membrane to determine gas phase $H^+$ conductance and/or $H_2$ crossover current density of the $H^+$-form membrane. In some examples, the methods further comprise analyzing the $H^+$ conductance and/or $H_2$ crossover current density of the $H^+$-form membrane to determine the $H^+$ conductance and/or $H_2$ crossover current density of the two-dimensional material. In some examples, the two-dimensional material can have a $H_2$ crossover current density of $1 \times 10^{-6}$ mA cm$^{-2}$ or more (e.g., $5 \times 10^{-6}$ mA cm$^{-2}$ or more, $1 \times 10^{-5}$ mA cm$^{-2}$ or more, $5 \times 10^{-5}$ mA cm$^{-2}$ or more, $1 \times 10^{-4}$ mA cm$^{-2}$ or more, $5 \times 10^{-4}$ mA cm$^{-2}$ or more, $1 \times 10^{-3}$ mA cm$^{-2}$ or more, $5 \times 10^{-3}$ mA cm$^{-2}$ or more, $1 \times 10^{-2}$ mA cm$^{-2}$ or more, $5 \times 10^{-2}$ mA cm$^{-2}$ or more, $1 \times 10^{-1}$ mA cm$^{-2}$ or more, or $5 \times 10^{-1}$ mA cm$^{-2}$ or more). In some examples, the two-dimensional material can have a $H_2$ crossover current density of 1 mA cm$^{-2}$ or less (e.g., $5 \times 10^{-1}$ mA cm$^{-2}$ or less, $1 \times 10^{-1}$ mA cm$^{-2}$ or less, $5 \times 10^{-2}$ mA cm$^{-2}$ or less, $1 \times 10^{-2}$ mA cm$^{-2}$ or less, $5 \times 10^{-3}$ mA cm$^{-2}$ or less, $1 \times 10^{-3}$ mA cm$^{-2}$ or less, $5 \times 10^{-4}$ mA cm$^{-2}$ or less, $1 \times 10^{-4}$ mA cm$^{-2}$ or less, $5 \times 10^{-5}$ mA cm$^{-2}$ or less, $1 \times 10^{-5}$ mA cm$^{-2}$ or less, or $5 \times 10^{-6}$ mA cm$^{-2}$ or less). The $H_2$ crossover current density of the two-dimensional material can range from any of the minimum values described above to any of the maximum values described above. For example, the two-dimensional material can have a $H_2$ crossover current density of from $1 \times 10^{-6}$ mA cm$^{-2}$ to 1 mA cm$^{-2}$ (e.g., from $1 \times 10^{-6}$ to $5 \times 10^{-3}$ mA cm$^2$, from $5 \times 10^{-3}$ to 1 mA cm$^2$, from $1 \times 10^{-6}$ to $5 \times 10^{-1}$ mA cm$^2$, from $1 \times 10^{-6}$ to $1 \times 10^{-1}$ mA cm$^2$, from $1 \times 10^{-6}$ to $5 \times 10^{-2}$ mA cm$^2$, from $1 \times 10^{-6}$ to $1 \times 10^{-2}$ mA cm$^2$, from $1 \times 10^{-6}$ to $5 \times 10^{-3}$ mA cm$^2$, from $1 \times 10^{-6}$ to $1 \times 10^{-3}$ mA cm$^2$, from $1 \times 10^{-6}$ to $5 \times 10^{-4}$ mA cm$^{-2}$, from $1 \times 10^{-6}$ to $1 \times 10^{-4}$ mA cm$^2$, from $1 \times 10^{-6}$ to $5 \times 10^{-5}$ mA cm$^2$, from $1 \times 10^{-6}$ to $1 \times 10^{-5}$ mA cm$^{-2}$, or from $1 \times 10^{-6}$ to $5 \times 10^{-6}$ mA cm$^{-2}$).

In some examples, after performing the liquid and/or gas phase electrically driven ionic transport measurements (e.g., via chronoamperometry) on the $H^+$-form membrane, the methods can further comprise performing an etch test on the 2D material to further characterize the pore(s) and/or defect(s) in the two-dimensional material. The etch test can, for example, comprise a chemical and/or electrochemical etch test.

In some examples, the methods further comprise making the membrane.

In some examples, the two-dimensional material is freestanding. In some examples, the 2D material is supported by a substrate, such that the two-dimensional material and the substrate are sandwiched by the first ionomer and the second ionomer in the membrane. Examples of suitable substrates include, but are not limited to, polymers (e.g., porous polymers), glass fibers, glass, quartz, silicon, nitrides (e.g., silicon nitride), and combinations thereof. In some examples, the substrate comprises a polymer, such as polycarbonate. In some examples, the methods can further comprise disposing the 2D material on the substrate.

In some examples, making the membrane can comprise sandwiching the 2D material (and optionally the substrate, when present) between the first ionomer and the second ionomer.

The methods can comprise any suitable method, such as, for example, hot pressing, dip coating, casting, lamination, spin coating, pressing fibers, doctor blading, evaporation, blending, or other forms of coating. The methods can, for example, comprise hot pressing, dip coating, or a combination thereof.

In some examples, the methods further comprise making the 2D material. The 2D material can be made by any suitable method, such as those known in the art. In some examples, the two-dimensional material can be made using a chemical vapor deposition (CVD) process. In some examples, the method comprises making the two-dimensional material using a roll-to-roll method. In some examples, the characteristic of the pore(s) and/or defect(s) can be controlled by one or more parameters of the methods of making (e.g., kinetics, temperature, etc.).

In some examples, the 2D material comprises a first set of pores and/or defects having a first characteristic dimension, and a second set of pores and/or defects having a second characteristic dimension, the second characteristic dimension being greater than the first characteristic dimension. In some examples, the methods can further comprise substantially blocking the second set of pores and/or defects via interfacial polymerization, while the first population of pore(s) and/or defect(s) remain unblocked (e.g., size selective interfacial polymerization), before sandwiching the 2D material between the first and second ionomer. Suitable materials and methods for interfacial polymerization are known in the art, such as described in WO 2021/127324 and Raaijmakers et al. *Progress in Polymer Science,* 2016, 63, 86-142, each of which is incorporated herein for its description of interfacial polymerization.

In some examples, the methods further comprise converting the first and/or second ionomer(s) to the $K^+$-form before performing electrically driven ionic transport measurements (e.g., via chronoamperometry) on the $K^+$-form membrane.

In some examples, the methods can comprise characterizing the presence of pore(s) and/or defect(s), the concentration (e.g., density) of pore(s) and/or defect(s), the average characteristic dimension(s) of pore(s) and/or defect(s), the transport characteristics of the pore(s) and/or defect(s), or a combination thereof. In some examples, 90% or more (e.g., 91% or more, 92% or more, 93% or more, 94% or more, 95% or more, 96% or more, 97% or more, 98% or more, 99% or more) of the pore(s) and/or defect(s) have an average characteristic dimension of 0.66 nm or less (e.g., 0.6 nm or less, 0.5 nm or less, 0.4 nm or less, 0.3 nm or less, 0.2 nm or less, or nm or less). In some examples, the two-dimensional material is substantially free of pore(s) and/or defect(s) have an average characteristic dimension of 10 nm or more.

The term "characteristic dimension," as used herein refers to the largest straight line distance between two points in the plane of the two-dimensional material. "Average characteristic dimension" and "mean characteristic dimension" are used interchangeably herein, and generally refer to the statistical mean characteristic dimension of the pore(s) and/or defect(s) in a population of pore(s) and/or defect(s). For example, for a cylindrical set of pore(s) and/or defect(s), the average characteristic dimension can refer to the average diameter.

Devices

Also disclosed herein are devices, for example devices comprising any of the two-dimensional materials and/or membranes disclosed herein.

For example, also disclosed herein are devices comprising: a first layer comprising a first two-dimensional (2D) material; and a second layer comprising a second two-dimensional (2D) material; wherein the first layer is disposed on and in physical contact with the second layer.

The first two-dimensional material and the second two-dimensional material can each independently comprise any suitable material. The first two-dimensional material and the second two-dimensional material can be the same or different. Examples of two-dimensional materials are described, for example, by Giem et al., *Nature*, 2013, 499, 419-425, which is hereby incorporated herein by reference for its description of two-dimensional materials. The first two-dimensional material and/or the second two-dimensional material can, for example, comprise graphene, hexagonal boron nitride (h-BN), a transition metal dichalcogenide, a covalent organic framework, a metal organic framework, micas, clays, or a combination thereof. In some examples, the first two-dimensional material and/or the second two-dimensional material comprises graphene, hexagonal boron nitride (h-BN), a transition metal dichalcogenide, or a combination thereof. In some examples, the first two-dimensional material and/or the second two-dimensional material comprises graphene, hexagonal boron nitride (h-BN), or a combination thereof. In some examples, the first two-dimensional material and/or the second two-dimensional material comprises graphene. In some examples, the first two-dimensional material and/or the second two-dimensional material comprises monolayer graphene.

In some examples, the first two-dimensional material and/or the second two-dimensional material comprises a transition metal dichalcogenide. As used herein, a "transition metal dichalcogenide" refers to a compound comprising a transition metal and two chalcogen atoms. As used herein, a "transition metal" refers to any element from groups 3-12, such as Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg, and Ac. As used herein a "chalcogen" refers to any element from group 16, such as oxygen, sulfur, selenium, tellurium, and polonium. As such, transition metal chalcogenides can include transition metal oxides, transition metal sulfides, and transition metal selenides, among others. For example, the transition metal dichalcogenide can comprise $MoS_2$, $WS_2$, $MoSe_2$, $WSe_2$, $MoTe_2$, $WTe_2$, $ZrS_2$, $ZrSe_2$, $NbSe_2$, $NbS_2$, $TaS_2$, $TiS_2$, $NiSe_2$, $Bi_2Se_3$, or a combination thereof. In some examples, the transition metal dichalcogenide can comprise $MoS_2$, $WS_2$, $MoSe_2$, $WSe_2$, $MoTe_2$, $WTe_2$, or a combination thereof. In some examples, the transition metal dichalcogenide comprises $MoS_2$.

In some examples, the first two-dimensional material and/or the second two-dimensional material comprises a semiconductor.

The first two-dimensional material and/or the second two-dimensional material can, for example, each independently have an average thickness of 10 nanometers (nm) or less (e.g., 9.5 nm or less, 9 nm or less, 8.5 nm or less, 8 nm or less, 7.5 nm or less, 7 nm or less, 6.5 nm or less, 6 nm or less, 5.5 nm or less, 5 nm or less, 4.5 nm or less, 4 nm or less, 3.5 nm or less, 3 nm or less, 2.5 nm or less, 2.25 nm or less, 2 nm or less, 1.75 nm or less, 1.5 nm or less, 1.4 nm or less, 1.3 nm or less, 1.2 nm or less, 1.1 nm or less, 1 nm or less, 0.95 nm or less, 0.9 nm or less, 0.85 nm or less, 0.8 nm or less, 0.75 nm or less, 0.7 nm or less, 0.65 nm or less, 0.6 nm or less, 0.55 nm or less, 0.5 nm or less, 0.45 nm or less, 0.4 nm or less, or 0.35 nm or less). In some examples, the first two-dimensional material and/or the second two-dimensional material can each independently have an average thickness of 0.3 nm or more (e.g., 0.35 nm or more, 0.4 nm or more, 0.45 nm or more, 0.5 nm or more, 0.55 nm or more, 0.6 nm or more, 0.65 nm or more, 0.7 nm or more, 0.75 nm or more, 0.8 nm or more, 0.85 nm or more, 0.9 nm or more, 0.95 nm or more, 1 nm or more, 1.1 nm or more, 1.2 nm or more, 1.3 nm or more, 1.4 nm or more, 1.5 nm or more, 1.75 nm or more, 2 nm or more, 2.25 nm or more, 2.5 nm or more, 3 nm or more, 3.5 nm or more, 4 nm or more, 4.5 nm or more, 5 nm or more, 5.5 nm or more, 6 nm or more, 6.5 nm or more, 7 nm or more, 7.5 nm or more, 8 nm or more, 8.5 nm or more, or 9 nm or more). The average thickness of the first two-dimensional material and/or the second two-dimensional material can range from any of the minimum values described above to any of the maximum values described above. For example, the first two-dimensional material and/or the second two-dimensional material can each independently have an average thickness of from 0.3 nm to 10 nm (e.g., from 0.3 nm to 5 nm, from 5 nm to 10 nm, from 0.3 to 2 nm, from 2 to 4 nm, from 4 to 6 nm, from 6 to 8 nm, from 8 to 10 nm, from 0.3 to 8 nm, from 0.3 to 6 nm, from 0.3 to 4 nm, or from 0.3 nm to 1 nm).

The first two-dimensional material and/or the second two-dimensional material can each have any suitable lateral dimension, for example the desired lateral dimension can be selected in view of the desired use of the membrane. In some examples, the first two-dimensional material and/or the second two-dimensional material can each independently have a lateral dimension of 1 micrometer (micron, µm) or more (e.g., 1.5 µm or more, 2 µm or more, 2.5 µm or more, 3 µm or more, 3.5 µm or more, 4 µm or more, 4.5 µm or more, 5 µm or more, 6 µm or more, 7 µm or more, 8 µm or more, 9 µm or more, 10 µm or more, 15 µm or more, 20 µm or more, 25 µm or more, 30 µm or more, 35 µm or more, 40 µm or more, 45 µm or more, 50 µm or more, 60 µm or more, 70 µm or more, 80 µm or more, 90 µm or more, 100 µm or more, 125 µm or more, 150 µm or more, 175 µm or more, 200 µm or more, 225 µm or more, 250 µm or more, 300 µm or more, 350 µm or more, 400 µm or more, 450 µm or more, 500 µm or more, 600 µm or more, 700 µm or more, 800 µm or more, 900 µm or more, 0.1 centimeters (cm) or more, 0.2 cm or more, 0.3 cm or more, 0.4 cm or more, 0.5 cm or more, 0.6 cm or more, 0.7 cm or more, 0.8 cm or more, 0.9 cm or more, 1 cm or more, 1.25 cm or more, 1.5 cm or more, 1.75 cm or more, 2 cm or more, 2.5 cm or more, 3 cm or more, 3.5 cm or more, 4 cm or more, 4.5 cm or more, 5 cm or more, 6 cm or more, 7 cm or more, 8 cm or more, 9 cm or more, 10 cm or more, 15 cm or more, 20 cm or more, 25 cm or more, 30 cm or more, 35 cm or more, 40 cm or more, 45 cm or more, 50 cm or more, 60 cm or more, 70 cm or more, 80 cm or more, 90 cm or more, 1 meter (m) or more, 1.1 m or more, 1.2 m or more, 1.3 m or more, 1.4 m or more, 1.5 m or more, 1.6 m or more, 1.7 m or more, 1.8 m or more, 1.9 m or more, 2 m or more, 2.25 m or more, 2.5 m or more, 2.75 m or more, 3 m or more, 3.25 m or more, 3.5 m or more, 4 m or more, 4.5 m or more, 5 m or more, 6 m or more, 7 m or more, 8 m or more, or 9 m or more). In some examples, the first two-dimensional material and/or the second two-dimensional material can each independently have a lateral dimension of 10 meters (m) or less (e.g., 9 m or less, 8 m or less, 7 m or less, 6 m or less, 5 m or less, 4.5 m or less, 4 m or less, 3.5 m or less, 3 m or less, 3.25 m or less, 3 m or less, 2.75 m or less, 2.5 m or less, 2.25 m or less, 2 m or less, 1.9 m or less, 1.8 m or less, 1.7 m or less, 1.6 m or less, 1.5 m or less, 1.4 m or less, 1.3 m or less, 1.2 m or less, 1.1 m or less, 1 m or less, 90 cm or less, 80 cm or less, 70 cm or less, 60 cm or less, 50 cm or less, 45 cm or less, 40 cm or less, 35 cm or less, 30 cm or less, 25 cm or less, 20 cm or less, 15 cm or less, 10 cm or less, 9 cm or less, 8 cm or less, 7 cm or less, 6 cm or less, 5 cm or less, 4.5 cm or less, 4 cm or less, 3.5 cm or less, 3 cm or less, 2.5 cm or less, 2 cm or less, 1.75 cm or less, 1.5 cm or less, 1.25 cm or less, 1 cm or less, 0.9 cm or less, 0.8 cm or less, 0.7 cm or less, 0.6 cm or less, 0.5 cm or less, 0.4 cm or less, 0.3 cm or less, 0.2 cm or less, 0.1 cm or less, 900 µm or less, 800 µm or less, 700 µm or less, 600 µm or less, 500 µm or less, 450 µm or less, 400 µm or less, 350 µm or less, 300 µm or less, 250 µm or less, 225 µm or less, 200 µm or less, 175 µm or less, 150 µm or less, 125 µm or less, 100 µm or less, 90 µm or less, 80 µm or less, 70 µm or less, 60 µm or less, 50 µm or less, 45 µm or less, 40 µm or less, 35 µm or less, 30 µm or less, 25 µm or less, 20 µm or less, 15 µm or less, 10 µm or less, 9 µm or less, 8 µm or less, 7 µm or less, 6 µm or less, 5 µm or less, 4.5 µm or less, 4 µm or less, 3.5 µm or less, 3 µm or less, 2.5 µm or less, or 2 µm or less). The lateral dimension of the first two-dimensional material and/or the second two-dimensional material can range from any of the minimum values described above to any of the maximum values described above. For example, the first two-dimensional material and/or the second two-dimensional material can each independently have a lateral dimension of from 1 µm to 10 m (e.g., from 1 µm to 100 µm, from 100 µm to 1 cm, from 1 cm to 1 m, from 1 µm to 10 µm, from 10 µm to 100 µm, from 100 µm to 0.1 cm, from 0.1 cm to 1 cm, from 1 cm to 10 cm, from 10 cm to 1 m, from 1 m to 10 m, from 1 µm to 1 m, from 1 m to 10 m, from 1 cm to 10 m, from 1 µm to 5 m, from 1 cm to 5 m, from 1 µm to 50 cm, or from 1 µm to 10 cm).

In some examples, the device can further comprise a first ionomer. In some examples, the first ionomer can be disposed on the first layer, such that the first layer is sandwiched between the first ionomer and the second layer; the first ionomer can be disposed on the second layer, such that the second layer is sandwiched between the first layer and the first ionomer; or a combination thereof.

In some examples, the device can further comprise a second ionomer, the second ionomer being different than the first ionomer. For example, the first ionomer can be disposed on the first layer, such that the first layer is sandwiched between the first ionomer and the second layer, and the second ionomer can be disposed on the second layer, such that the second layer is sandwiched between the first layer and the second ionomer.

The first ionomer and/or the second ionomer can each independently comprise any suitable ionomer. The first ionomer and the second ionomer can be the same or different. In some examples, the first ionomer and/or the second ionomer (when present) each independently comprises a proton conducting polymer. In some examples, the first ionomer, the second ionomer, or a combination thereof comprise(s) a polyether, a polysulfonate, a polysulfone, a poly(imidazole), a triazole, a benzimidazole, a polyester, a polycarbonate, a polymer derived from a pyridine monomer, a polyethylene, a fluoropolymer, derivatives thereof, or combinations thereof. In some examples, the first ionomer, the second ionomer, or a combination thereof comprise(s) a sulfonated fluoropolymer. In some examples, the first ionomer, the second ionomer, or a combination thereof comprise(s) a tetrafluoroethylene based polymer or a derivative thereof. In some examples, the first ionomer, the second ionomer, or a combination thereof comprise(s) a sulfonated tetrafluoroethylene based polymer. In some examples, the first ionomer, the second ionomer, or a combination thereof comprise(s) a poly(imidazole). In some examples, the first ionomer, the proton ionomer, or a combination thereof comprise(s) a copolymer of tetrafluoroethylene and perfluoro-3,6-dioxa-4-methyl-7-octene-sulfonic acid (Nafion), poly(tetrafluoroethylene-co-2,2,4-trifluoro-5-trifluoromethoxy-1,3-dioxole) (Hyflon), polybenzimidazole (PBI), derivatives thereof, or combinations thereof.

In some examples, the device is free-standing. In some examples, the device is supported by a substrate. Examples of suitable substrates include, but are not limited to, polymers (e.g., porous polymers), glass fibers, glass, quartz, silicon, anodic alumina, a ceramic, a fabric, and combinations thereof. In some examples, the substrate comprises a polymer, such as polycarbonate.

Methods of Making

Also disclosed herein are methods of making any of the devices and/or membranes disclosed herein.

For example, also disclosed herein are methods of making a membrane, the method comprising: coating a precursor membrane in an ionomer, thereby coating the precursor membrane in the ionomer to form the membrane, wherein the precursor membrane comprises a two-dimensional material.

The methods can comprise any suitable method, such as, for example, hot pressing, dip coating, casting, lamination, spin coating, pressing fibers, doctor blading, evaporation, blending, or other forms of coating. In some examples, the methods comprise dip coating.

The two-dimensional material can comprise any suitable material. Examples of two-dimensional materials are described, for example, by Giem et al., *Nature,* 2013, 499, 419-425, which is hereby incorporated herein by reference for its description of two-dimensional materials. The two-dimensional material can, for example, comprise graphene, hexagonal boron nitride (h-BN), a transition metal dichalcogenide, a covalent organic framework, a metal organic framework, micas, clays, or a combination thereof. In some examples, the two-dimensional material comprises graphene, hexagonal boron nitride (h-BN), a transition metal dichalcogenide, or a combination thereof. In some examples, the two-dimensional material comprises graphene, hexagonal boron nitride (h-BN), or a combination thereof. In some examples, the two-dimensional material comprises graphene. In some examples, the two-dimensional material comprises monolayer graphene.

In some examples, the two-dimensional material comprises a transition metal dichalcogenide. As used herein, a "transition metal dichalcogenide" refers to a compound comprising a transition metal and two chalcogen atoms. As used herein, a "transition metal" refers to any element from groups 3-12, such as Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg, and Ac. As used herein a "chalcogen" refers to any element from group 16, such as oxygen, sulfur, selenium, tellurium, and polonium. As such, transition metal chalcogenides can include transition metal oxides, transition metal sulfides, and transition metal selenides, among others. For example, the transition metal dichalcogenide can comprise $MoS_2$, $WS_2$, $MoSe_2$, $WSe_2$, $MoTe_2$, $WTe_2$, $ZrS_2$, $ZrSe_2$, $NbSe_2$, $NbS_2$, $TaS_2$, $TiS_2$, $NiSe_2$, $Bi_2Se_3$, or a combination thereof. In some examples, the transition metal dichalcogenide can comprise $MoS_2$, $WS_2$, $MoSe_2$, $WSe_2$, $MoTe_2$, $WTe_2$, or a combination thereof. In some examples, the transition metal dichalcogenide comprises $MoS_2$.

In some examples, the two-dimensional materials comprises a semiconductor.

The two-dimensional material can, for example, have an average thickness of 10 nanometers (nm) or less (e.g., 9.5 nm or less, 9 nm or less, 8.5 nm or less, 8 nm or less, 7.5 nm or less, 7 nm or less, 6.5 nm or less, 6 nm or less, 5.5 nm or less, 5 nm or less, 4.5 nm or less, 4 nm or less, 3.5 nm or less, 3 nm or less, 2.5 nm or less, 2.25 nm or less, 2 nm or less, 1.75 nm or less, 1.5 nm or less, 1.4 nm or less, 1.3 nm or less, 1.2 nm or less, 1.1 nm or less, 1 nm or less, 0.95 nm or less, 0.9 nm or less, 0.85 nm or less, 0.8 nm or less, 0.75 nm or less, 0.7 nm or less, 0.65 nm or less, 0.6 nm or less, 0.55 nm or less, 0.5 nm or less, 0.45 nm or less, 0.4 nm or less, or 0.35 nm or less). In some examples, the two-dimensional material can have an average thickness of 0.3 nm or more (e.g., 0.35 nm or more, 0.4 nm or more, 0.45 nm or more, 0.5 nm or more, 0.55 nm or more, 0.6 nm or more, 0.65 nm or more, 0.7 nm or more, 0.75 nm or more, 0.8 nm or more, 0.85 nm or more, 0.9 nm or more, 0.95 nm or more, 1 nm or more, 1.1 nm or more, 1.2 nm or more, 1.3 nm or more, 1.4 nm or more, 1.5 nm or more, 1.75 nm or more, 2 nm or more, 2.25 nm or more, 2.5 nm or more, 3 nm or more, 3.5 nm or more, 4 nm or more, 4.5 nm or more, 5 nm or more, 5.5 nm or more, 6 nm or more, 6.5 nm or more, 7 nm or more, 7.5 nm or more, 8 nm or more, 8.5 nm or more, or 9 nm or more). The average thickness of the two-dimensional material can range from any of the minimum values described above to any of the maximum values described above. For example, the two-dimensional material can have an average thickness of from 0.3 nm to 10 nm (e.g., from 0.3 nm to 5 nm, from 5 nm to 10 nm, from 0.3 to 2 nm, from 2 to 4 nm, from 4 to 6 nm, from 6 to 8 nm, from 8 to 10 nm, from 0.3 to 8 nm, from 0.3 to 6 nm, from 0.3 to 4 nm, or from 0.3 nm to 1 nm).

The two-dimensional material can have any suitable lateral dimension, for example the desired lateral dimension can be selected in view of the desired use of the membrane. In some examples, the two-dimensional material can have a lateral dimension of 1 micrometer (micron, $\mu m$) or more (e.g., 1.5 $\mu m$ or more, 2 $\mu m$ or more, 2.5 $\mu m$ or more, 3 $\mu m$ or more, 3.5 $\mu m$ or more, 4 $\mu m$ or more, 4.5 $\mu m$ or more, 5 $\mu m$ or more, 6 $\mu m$ or more, 7 $\mu m$ or more, 8 $\mu m$ or more, 9 $\mu m$ or more, 10 $\mu m$ or more, 15 $\mu m$ or more, 20 $\mu m$ or more, 25 $\mu m$ or more, 30 $\mu m$ or more, 35 $\mu m$ or more, 40 $\mu m$ or more, 45 $\mu m$ or more, 50 $\mu m$ or more, 60 $\mu m$ or more, 70 $\mu m$ or more, 80 $\mu m$ or more, 90 $\mu m$ or more, 100 $\mu m$ or more, 125 $\mu m$ or more, 150 $\mu m$ or more, 175 $\mu m$ or more, 200 $\mu m$ or more, 225 $\mu m$ or more, 250 $\mu m$ or more, 300 $\mu m$ or more, 350 $\mu m$ or more, 400 $\mu m$ or more, 450 $\mu m$ or more, 500 $\mu m$ or more, 600 $\mu m$ or more, 700 $\mu m$ or more, 800 $\mu m$ or more, 900 $\mu m$ or more, 0.1 centimeters (cm) or more, 0.2 cm or more, 0.3 cm or more, 0.4 cm or more, 0.5 cm or more, 0.6 cm or more, 0.7 cm or more, 0.8 cm or more, 0.9 cm or more, 1 cm or more, 1.25 cm or more, 1.5 cm or more, 1.75 cm or more, 2 cm or more, 2.5 cm or more, 3 cm or more, 3.5 cm or more, 4 cm or more, 4.5 cm or more, 5 cm or more, 6 cm or more, 7 cm or more, 8 cm or more, 9 cm or more, 10 cm or more, 15 cm or more, 20 cm or more, 25 cm or more, 30 cm or more, 35 cm or more, 40 cm or more, 45 cm or more, 50 cm or more, 60 cm or more, 70 cm or more, 80 cm or more, 90 cm or more, 1 meter (m) or more, 1.1 m or more, 1.2 m or more, 1.3 m or more, 1.4 m or more, 1.5 m or more, 1.6 m or more, 1.7 m or more, 1.8 m or more, 1.9 m or more, 2 m or more, 2.25 m or more, 2.5 m or more, 2.75 m or more, 3 m or more, 3.25 m or more, 3.5 m or more, 4 m or more, 4.5 m or more, 5 m or more, 6 m or more, 7 m or more, 8 m or more, or 9 m or more). In some examples, the two-dimensional material can have a lateral dimension of 10 meters (m) or less (e.g., 9 m or less, 8 m or less, 7 m or less, 6 m or less, 5 m or less, 4.5 m or less, 4 m or less, 3.5 m or less, 3 m or less, 3.25 m or less, 3 m or less, 2.75 m or less, 2.5 m or less, 2.25 m or less, 2 m or less, 1.9 m or less, 1.8 m or less, 1.7 m or less, 1.6 m or less, 1.5 m or less, 1.4 m or less, 1.3 m or less, 1.2 m or less, 1.1 m or less, 1 m or less, 90 cm or less, 80 cm or less, 70 cm or less, 60 cm or less, 50 cm or less, 45 cm or less, 40 cm or less, 35 cm or less, 30 cm or less, 25 cm or less, 20 cm or less, 15 cm or less, 10 cm or less, 9 cm or less, 8 cm or less, 7 cm or less, 6 cm or less, 5 cm or less, 4.5 cm or less, 4 cm or less, 3.5 cm or less, 3 cm or less, 2.5 cm or less, 2 cm or less, 1.75 cm or less, 1.5 cm or less, 1.25 cm or less, 1 cm or less, 0.9 cm or less, 0.8 cm or less, 0.7 cm or less, 0.6 cm or less, 0.5 cm or less, 0.4 cm or less, 0.3 cm or less, 0.2 cm or less, 0.1 cm or less, 900 $\mu m$ or less, 800 $\mu m$ or less, 700 $\mu m$ or less, 600 $\mu m$ or less, 500 $\mu m$ or less, 450 $\mu m$ or less, 400 $\mu m$ or less, 350 $\mu m$ or less, 300 $\mu m$ or less, 250 $\mu m$ or less, 225 $\mu m$ or less, 200 $\mu m$ or less, 175 $\mu m$ or less, 150 $\mu m$ or less, 125 $\mu m$ or less, 100 $\mu m$ or less, 90 $\mu m$ or less, 80 $\mu m$ or less, 70 $\mu m$ or less, 60 $\mu m$ or less, 50 $\mu m$ or less, 45 $\mu m$ or less, 40 $\mu m$ or less, 35 $\mu m$ or less, 30 $\mu m$ or less, 25 $\mu m$ or less, 20 $\mu m$ or less, 15 $\mu m$ or less, 10 $\mu m$ or less, 9 $\mu m$ or less, 8 $\mu m$ or less, 7 $\mu m$ or less, 6 $\mu m$ or less, 5 $\mu m$ or less, 4.5 $\mu m$ or less, 4 $\mu m$ or less, 3.5 $\mu m$ or less, 3 $\mu m$ or less, 2.5 $\mu m$ or less, or 2 $\mu m$ or less). The lateral dimension of the two-dimensional material can range from any of the minimum values described above to any of the maximum values described above. For example, the two-dimensional material can have a lateral dimension of from 1 $\mu m$ to 10 m (e.g., from 1 $\mu m$ to 100 $\mu m$, from 100 $\mu m$ to 1 cm, from 1 cm to 1 m, from 1 $\mu m$ to 10 $\mu m$, from 10 $\mu m$ to 100 $\mu m$, from 100 $\mu m$ to 0.1 cm, from 0.1 cm to 1 cm, from 1 cm to 10 cm, from 10 cm to 1 m, from 1 m to 10 m, from 1 $\mu m$ to 1 m, from 1 m to 10 m, from 1 cm to 10 m, from 1 $\mu m$ to 5 m, from 1 cm to 5 m, from 1 $\mu m$ to 50 cm, or from 1 $\mu m$ to 10 cm).

The ionomer can comprise any suitable ionomer. In some examples, the ionomer comprises a proton conducting polymer. In some examples, the ionomer comprises a polyether, a polysulfonate, a polysulfone, a poly(imidazole), a triazole, a benzimidazole, a polyester, a polycarbonate, a polymer derived from a pyridine monomer, a polyethylene, a fluoropolymer, derivatives thereof, or combinations thereof. In some examples, the ionomer comprises a sulfonated fluoropolymer. In some examples, the ionomer comprises a tetrafluoroethylene based polymer or a derivative thereof. In some examples, the ionomer comprises a sulfonated tetrafluoroethylene based polymer. In some examples, the ionomer comprises a poly(imidazole). In some examples, the ionomer comprises a copolymer of tetrafluoroethylene and perfluoro-3,6-dioxa-4-methyl-7-octene-sulfonic acid (Nafion), poly(tetrafluoroethylene-co-2,2,4-trifluoro-5-trifluoromethoxy-1,3-dioxole) (Hyflon), polybenzimidazole (PBI), derivatives thereof, or combinations thereof.

In some examples, the precursor membrane is free-standing. In some examples, the precursor membrane is supported by a substrate. Examples of suitable substrates include, but are not limited to, polymers (e.g., porous polymers), glass fibers, glass, quartz, silicon, anodic alumina, a ceramic, a fabric, and combinations thereof. In some examples, the substrate comprises a polymer, such as polycarbonate.

Methods of Use

Also disclosed herein are methods of use of any of the two-dimensional materials, membranes, and/or devices disclosed herein.

For example, the methods can comprise using the two-dimensional material, membrane, and/or device for energy conversion, energy storage, separation, or a combination thereof. In some examples, the methods can comprise using the two-dimensional material, membrane, and/or device as a proton transport membrane and/or a proton exchange membrane. In some examples, the methods can comprise using the two-dimensional material, membrane, and/or device in a separation, for example to separate a target substance from a non-target substance.

In some examples, the methods can comprise using the two-dimensional material, membrane, and/or device in an electronic device, an optical device, or a combination thereof.

In some examples, the methods can comprise using the two-dimensional material, membrane, and/or device in a fuel cell, an electrolytic cell, a proton exchange electrolyzer, or a battery, in a gas purification, in an energy conversion process, in environmental remediation, in isotope separation, in a membrane electrode application, or a combination thereof.

Also disclosed herein are articles of manufacture comprising any of the two-dimensional materials, membranes, and/or devices described herein.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1—Probing Angstrom-Scale Defects in Atomically Thin Conductors, Insulators, and Semiconductors Described herein are methods of characterizing Angstrom-scale defects in centimeter-scale atomically thin 2D materials.

KCl and HCl are used as probes on the same region of the 2D material sandwiched between an ionomer (Nafion or PBI or Hyflon or any ion conducting polymer) where the size of hydrated KCl is 6.6 Angstroms, while H+ is permeable through much smaller pores.

2D semiconductors (all transition metal chalcogenides) are impermeable to H+, so measuring K+ and H+ allows one to evaluate the quality of 2D crystals. Currently the only methods to characterize such defects are prohibitively expensive i.e. STEM and STM. The lack of characterization is important for these 2D semi-conductors to transition to industrial and commercial scale applications.

Defects influence semiconductor performance negatively. A goal is to get semiconductors with less defect density. But methods for accurately characterizing the defects are still needed.

Example 2—Probing Angstrom-Scale Defects in Atomically Thin Conductors, Insulators and Semi-Conductors The number of components in electronic circuits has doubled every two years since the 1960s—a trend known as Moore's law. Transistors have shrunk so that ever more can fit on a silicon chip. But now, silicon transistors are reaching their physical limit. Radically different types of materials and devices are needed to realize the potential of the next generation of computers. The problem is common to all transistors based on bulk (3D) semiconductors, including those made of germanium, indium gallium arsenide and indium phosphide. Electrons find it hard to travel through channels nanometers in thickness. Imperfections in the surfaces of the channels scatter charges, slowing their flow. But 2D materials could enable transistors to keep shrinking. These are crystalline sheets of atoms, one layer thick. Because they have only a limited 'vertical' dimension, and flat surfaces free from defects, electrons are less prone to scattering and charges can flow relatively freely through them. Promising materials include transition-metal dichalcogenides (such as tungsten diselenide and molybdenum disulfide, $MoS_2$). However, this research is still at an early stage. For these materials to meet industry needs in practical devices, three fundamental research challenges must be resolved:

1) Predicting properties accurately. First, materials that are suitable for 2D transistors need to be found/identified. There are more than 1,000 candidates, and their electronic properties vary wildly. It is quicker to predict electronic properties theoretically than to weed them out experimentally, but it is difficult to accurately derive the behavior of a material in this way. The energies of electrons depend on the specific nature and arrangement of atoms in the crystal lattice, and this is often more complicated in real materials than in idealized models. Interactions between electrons and atoms must be accounted for, and approximations add uncertainty. Further, experiments have found that electrons are not as mobile as expected within 2D sheets. This is due to electron scattering, but the processes involved are poorly understood. For example, how do vibrations of the lattice slow electrons? Adjacent layers of materials, such as the substrate and protective films, also have an influence, as do nearby charges and imperfections. Physicists need to consider all of these factors.

2) Growing and testing samples. Promising candidates need to be tested experimentally. It is important that the samples are of high quality and are large enough to incorporate into state-of-the-art transistors and simple benchmark circuits. Defects and grain boundaries affect charge flow. So researchers need to learn how to grow uniform sheets of 2D materials with perfectly aligned crystals. They also need to control the thickness of layers to adjust the electronic properties. There are two ways to make 2D sheets of crystals. The better option is to grow them by depositing atoms from vapors in a vacuum chamber. They can also be formed through exfoliation, by either peeling the layers off mechanically or shedding them in solution. Peeling results in fewer lattice defects than shedding, but the amounts produced are too small for practical devices. When forming crystals, the substrate affects their growth. 3D materials bond tightly to the underlying layer and follow its atomic geometries closely. By contrast, 2D materials are only loosely attached to the substrate, but are nevertheless influenced by it. For example, $MoS_2$ crystals grown on sapphire can follow two orientations (0 degrees and 60 degrees). Other materials form less directed grains with boundaries similar to the joints in a jigsaw. Some spots end up being more than one molecular layer thick.

2) 2D materials need to be made chemically and thermally stable. For example, phosphorene and indium selenide degrade in ambient air within hours. Adding a protective film, such as an oxide, can help to preserve the material, but this adds another interface to consider. Ultimately, transistors need to be reliably manufactured in large quantities. Today, the industry typically uses silicon substrates and silicon dioxide insulators, but these cannot be used for oriented growth, and their electrical quality can degrade at the high temperatures (600-1,000° C.) needed to deposit atoms from vapors. Thus, 2D materials would have to be grown on expensive silicon carbide or sapphire substrates, which can withstand such heat, and then transferred onto silicon substrates for integration into the device. Molecular beam epitaxy (spraying beams of atoms in a vacuum) is another method for growing 2D materials at lower temperatures (below 300° C.), but this is slow: samples might take days to grow. Yield and reproducibility must also be improved.

3) Assessing device performance. The performance of different 2D materials should be assessed within a common framework. Measurements reported in different settings, or even labs, might be inconsistent. The precise composition and structure of substrates, sandwiching layers, electronic contacts and fabrication processes all matter. And each type of device brings its own demands. For example, a transistor in a logic switch must turn on and off sharply, and an energy-efficient transistor must operate at low voltage. Academic and industrial researchers should collaborate to devise measurement standards, similar to those set for solar-cell efficiency assessments by the US National Renewable Energy Laboratory. These should stipulate, for example, the structure of the device, criteria for metal contacts and procedures for measurement.

The applications of graphene, the best-known 2D material, and methods for its mass production are being developed through the European Commission's €1-billion (US$1.1-billion) Graphene Flagship research program. But other 2D materials are still largely in the academic phase. 2D materials should play a larger part in electronics programs exploring materials for logic, memory and connections. It's too early to say whether 2D semiconductors will transform transistors. But they are one of the best candidates to extend Moore's law.

Example 3

2D materials can play an important role in enabling more than Moore technologies that could propel the next semiconductor revolution.

As devices features shrink to less than 5 nm and power consumption needs to be kept under control, 2D semiconductors in particular can play an important role in enabling these advances.

Scalable high quality synthesis of defect free single crystals is highly desirable for practical applications to improve device yields and instrumental to that is the ability to detect the existence of defects in the crystals.

However, current techniques such as STEM and STM to characterize 2D materials are only relevant for small scale nm scale while practical applications require centimeter scale and larger.

The pristine lattice of 2D semi-conductors e.g. $MoS_2$, $MoSe_2$, $MoTe_2$, $WS_2$, $WSe_2$, $WTe_2$ etc.

Here, a method to characterize defects in the Angstrom scale in 2D semiconductors over centimeter-scale areas is described.

The method involves sandwiching the 2D crystal (e.g., graphene or another 2D material, such as a 2D semiconductor) between an ionomer (e.g., Nafion). The method starts with the K+ ion form of the ionomer and then switches to H+ form. The K+ ions are 6.6 Angstrom so any defects larger than 6.6 Angstroms will show up. Defects smaller than 6.6 Angstroms will show up with H+. The pristine lattice of 2D semiconductors are impermeable to H+ but the graphene and h-BN lattice is permeable—so the method will work best on 2D semiconductors. This can provide a useful way to quantify the quality of 2D crystals. The method is non-destructive.

Example 4—Deconstructing Proton Transport Through Atomically Thin Monolayer CVD Graphene Membranes Abstract. Selective proton ($H^+$) permeation through the atomically thin lattice of graphene and other 2D materials offers new opportunities for energy conversion/storage and separations. Practical applications necessitate scalable synthesis via approaches such as chemical vapor deposition (CVD) that inevitably introduce sub-nanometer defects, grain boundaries and wrinkles, and understanding their influence on $H^+$ transport and selectivity for large-area membranes is imperative but remains elusive. Using electrically driven transport of $H^+$ and potassium ions ($K^+$), the influence of intrinsic sub-nanometer defects in monolayer CVD graphene is investigated herein across length-scales. At the micron scale, the areal $H^+$ conductance of CVD graphene (~4.5-6 mS cm$^{-2}$) is comparable to that of mechanically exfoliated graphene indicating similarly high crystalline quality within a domain, albeit with $K^+$ transport (~1.7 mS cm$^{-2}$). However, centimeter-scale Nafion|graphene|Nafion devices with several graphene domains show areal $H^+$ conductance of ~339 mS cm$^{-2}$ and $K^+$ conductance of ~23.8 mS cm$^{-2}$ (graphene conductance for $H^+$ is ~1735 mS cm$^{-2}$ and for $K^+$ it is ~47.6 mS cm$^{-2}$). Using a mathematical-transport-model and Nafion filled polycarbonate track etched supports, the observed orders of magnitude increase in $H^+$ conductance for centimeter-scale CVD graphene was systematically deconstructed. The mitigation of defects (>1.6 nm), wrinkles and tears via interfacial polymerization results in a conductance of ~1848 mS cm$^{-2}$ for $H^+$ and ~75.3 mS cm$^{-2}$ for $K^+$ ($H^+/K^+$ selectivity of ~24.5) via intrinsic sub-nanometer proton selective defects in CVD graphene. Atomically thin membranes with significantly higher ionic selectivity than state-of-the-art proton exchange membranes while maintaining comparable $H^+$ conductance are demonstrated. This work provides a framework to assess $H^+$ conductance and selectivity of large-area 2D membranes and highlights the role of intrinsic sub-nanometer proton selective defects for practical applications.

Introduction. Graphene, a monolayer of carbon atoms arranged in a hexagonal lattice, was initially considered to be impermeable to atoms, molecules, and ions (at room temperature) [1-6], based on (i) experiments demonstrating the impermeability to helium (He) gas [3], and (ii) theoretical studies predicting high energy barriers ($E_B$)>3 eV for H [4, 6, 7], O [6], and He atoms [2] and $E_B \geq 1.2$ eV for proton ($H^+$) permeation [4, 7]. However, Hu et al. measured an areal $H^+$ conductance of ~3 mS cm$^{-2}$ ($E_B$~0.78 eV) as well as no detectable transport of He gas through mechanically exfoliated monolayer graphene suspended over micron-sized apertures and suggested H⁺ permeation occurs via holes in the electron distribution in the 2D lattice [8]. While these observations cannot completely exclude the presence of defects smaller than He atoms in the graphene lattice (i.e., bond rotation/Stone-Wales defects, point defects, etc.) and/ or residual polymer/adventitious contaminants adsorbed on defects that could reduce $E_B$ for H⁺ transport [2, 9-12], selective proton transport through 2D materials nonetheless offers fundamentally new opportunities in energy conversion/storage applications as well as separations [1, 13-18].

Practical applications will however necessitate scalable synthesis of monolayer graphene via approaches such as chemical vapor deposition (CVD) that inevitably introduce defects (e.g., grain boundaries, intrinsic sub-nanometer (nm) defects, wrinkles, etc.) into the 2D lattice, and understanding their influence is imperative [19-27]. Defects can enhance the transport of protons as well as other species smaller than the defects while limiting transport of larger species via molecular sieving [12, 26, 28-32]. Indeed, significantly higher proton flux (>10⁶ times compared to that of the pristine lattice) has been calculated [33] to occur via 5757 ring [9, 11] defects commonly found along grain boundaries in CVD graphene [111], and high proton fluxes of ~1-2 S cm⁻² have been measured through micron-scale disordered graphene (nano-graphene and monolayer amorphous graphene) with 7 and 8 membered carbon rings within the lattice with no observable He leakage [30].

Further, liquid phase areal proton conductance values for CVD graphene from ~4 mS cm⁻² [29] to ~2.5×10³ mS cm⁻² (in 0.1 M HCl) [28] for micron-scale membranes and from ~1.67×10³ mS cm⁻² (0.1 M HCl) [34] to ~50×10³ mS cm-2 (1 M H₂SO₄) [35] for centimeter-scale membranes along with the transport of larger cations [36-39] such as K⁺, Na⁺, Li⁺, etc. have been observed and attributed to the presence of defects. Such defects in micron-scale monolayer CVD graphene membranes have also been shown to be cation selective [28, 29, 38]. Ionic selectivity (preferential transport of one species over another) in the case of small defects arises from steric hindrance, surface charge or electrostatic effects from defect edges including termination by O or other atoms, etc., while larger defects can be non-selective (allowing transport of desired and undesired species) and even a small number of such large defects can completely compromise the 2D membrane performance [19].

Although micron-scale suspended 2D material devices allow for probing defects within an individual graphene domain, and are extremely important for fundamental understanding [8, 28-30, 37, 38, 40-42], practical applications will require large-area graphene membranes where the collective behavior of an ensemble of intrinsic sub-nm defects as well as large defects and any tears from device fabrication will determine the overall performance (proton flux and membrane selectivity). In this context, recent studies have explored the use of Nafion [43] (state-of-the-art proton exchange membrane consisting of a per-fluorinated sulfonic acid ionomer) to support 2D materials forming centimeter-scale Nafion|2D material|Nafion or Nafion|2D material devices for applications in isotope separation [16, 17], fuel cells [13, 14], and vanadium redox flow batteries [15]. Here, the use of Nafion as a support enables the advancement of 2D materials as proton selective membranes for energy applications with improved efficiency by minimizing the crossover of undesired species. For example, Bukola et al. [34] reported an areal proton conductance of ~1.67 S cm⁻² (in 0.1 M HCl) and K⁺ areal conductance of ~10 mS cm⁻² (in 0.1 M KCl) using two distinct centimeter-scale Nafion|graphene|Nafion membranes (one for H⁺ and the other for K⁺). In a subsequent study also using two distinct centimeter-scale Nafion|graphene|Nafion membranes, an areal proton conductance of ~50 S cm⁻² (in 1 M H₂SO₄) and VO²⁺ conductance of ~5 mS cm⁻² (in 1 M VOSO₄) was reported [17]. However, the differences in graphene transfer yields/ graphene coverage across two distinct membranes (one for H⁺ and the other for K⁺/VO²⁺) prevent insights into the origin of enhanced proton transport through centimeter-scale CVD graphene membranes. A recent study by Bentley et al. probing Nafion|graphene membranes via scanning electrochemical cell microscopy (SECCM) in areas that are free from visible large tears and pinholes suggests proton transport occurs primarily via few localized defects in CVD graphene [44].

The 2-3 orders of magnitude differences between proton conductance values measured over micron-scale and centimeter-scale devices may also result from the differences in quality of CVD graphene used in the different studies and other experimental procedures [28, 29, 34, 35, 39] but the typical cation selective nature of defects in CVD graphene emerges as a common theme [28, 29, 38]. No reports exist on proton transport through small and large-scale devices for the same CVD graphene along with insights on the contribution from sub-nanometer scale defects (specifically for large-area membranes), and the research herein aims to bridge this gap in the literature to rationally advance the practical applications of 2D membranes.

Here, atomically thin monolayer CVD graphene membranes are systematically probed via ionic conductance measurements both at a small scale (micrometer size suspended membrane), i.e. within a graphene domain, and large scale (centimeter-scale Nafion|graphene|Nafion devices), i.e. across multiple domains. Proton conductance of ~4.5-6 mS cm⁻², similar to that of mechanically exfoliated graphene, is obtained for CVD graphene at the micron scale, indicating comparable crystalline quality, although transport of K⁺ (~1.7 mS cm⁻²) is also seen. For centimeter-scale graphene membranes, areal conductance values of ~47.6 mS cm⁻² for K⁺ and ~1735 mS cm⁻² for H⁺ were observed for CVD graphene in Nafion|graphene|Nafion sandwich devices, which could arise from intrinsic sub-nm defects (<0.66 nm), small defects (0.66-1.6 nm), larger defects (1.6-50 nm), and very large defects such as tears (>50 nm). The contributions from defects (≥1.6 nm) and wrinkles were deconvoluted by using Nafion filled well-defined porous polycarbonate track etched (PCTE) membrane supports to isolate large tears (>50 nm) as well as sealing defects via interfacial polymerization (IP) and the measured areal proton conductance was attributed to sub-nanometer-scale proton selective defects (~1848 mS cm⁻² (H⁺), ~75 mS cm⁻² (K⁺), H⁺/K⁺~24.5). Using a resistance based mathematical model, the presence of large-scale defects along wrinkles and/or tears in combination with sub-nm defects are explained to be responsible for the higher areal proton conductance (~1735 mS cm⁻² for graphene in the sandwich membrane and ~1848 mS cm⁻² for the PCTE membrane) in centimeter-scale membranes in comparison to those (~4.5-6 mS cm⁻²) in micron-scale membranes and atomically thin membranes with significantly higher ionic selectivity than state-of-the-art proton exchange membranes while maintaining comparable H⁺ conductance are demonstrated.

EXPERIMENTAL

Graphene Growth. Graphene was synthesized using atmospheric pressure chemical vapor deposition (APCVD) at the Center for Nanophase Materials and Sciences at Oak Ridge National Laboratory as detailed elsewhere [45-47]. Briefly, the as-received 75 μm-thick copper (Nimrod Copper) was electropolished in a $H_3PO_4$-based solution and washed with deionized water before being dried with $N_2$ gas and placed inside a 3 inch diameter quartz tube. To increase the domain size of the Cu crystal, electropolished Cu foil was annealed at 1065° C. for 30 min under a 500 sccm flow of 2.5% $H_2$/Ar. Graphene growth was achieved with addition of 0.1% $CH_4$ (as a carbon source)/Ar and ramping the flow to 20 sccm during 2 h growth duration.

Graphene transfer for micron-scale devices. Single aperture~2 μm chips in a free-standing silicon nitride membrane with a window size of ~40×40 μm$^2$ and thickness of ~200 nm on a ~300 μm thick silicon wafer were purchased from Silson Ltd., UK. 2 wt % poly(methyl methacrylate) (PMMA, procured from Acros Organics, M.W. 35 000) in anisole (99% procured from BeanTown Chemical) was spin coated at 1000 rpm for 60 s on CVD graphene on Cu foil and the stack was left overnight for drying. Next, the PMMA/graphene/Cu was soft baked at 60° C. for 10-15 minutes. Etching of graphene/Cu was performed in 0.2-0.3 M ammonium persulfate (APS, Acros Organics, ACS reagent grade, 98+%). After the complete etching of Cu, the floating PMMA/graphene was transferred to 2-3 water baths to remove the residual APS. Following the water wash, PMMA/graphene was scooped on the silicon nitride membrane. The resulting PMMA/graphene/SiN$_x$ was baked at 135° C. for 20 minutes to promote adhesion. Afterwards the PMMA was dissolved using acetone and then washed with isopropyl alcohol (IPA) to minimize the leftover PMMA residue.

Pre-treatment of the Nafion membrane and conversion to the K$^+$-form. The as-obtained Nafion (here Nafion™ 212, abbreviated as N212, procured from Fuel Cell Store, Chemours, Nafion™ 212, 50.8 μm thickness) already in proton (H$^+$) form was pretreated for 1 h in 0.1 M $H_2SO_4$ (Fisher ACS Plus 95.5% w/w), and in deionized (DI) water at 80° C., before soaking the pre-treated Nafion membranes in fresh 0.1 M HCl (Macron Fine Chemicals, 6.0 normal) for 24 hours to obtain the Nafion 212-H$^+$ form. The K$^+$-form Nafion was converted from the as-received H$^+$-form Nafion by exchanging the protons to potassium ions (K$^+$). For the K$^+$-form, Nafion membranes were soaked in 0.1 M KCl (99.6%, Fisher Chemical) and KCl solution was exchanged 2-3 times with fresh solution at regular intervals until the solution pH was similar to the pH of 0.1 M KCl, as reported earlier [17]. Following this, the Nafion membrane was heated at 80° C. in fresh 0.1 M KCl for 1 h before letting it soak in the solution for 48 hours for a complete conversion to the K$^+$-form [17]. The complete conversion to the K$^+$-form is necessary to minimize any possible contribution from protons.

Preparation of Nafion and graphene sandwich membranes. The sandwich Nafion 212 samples, i.e. Nafion 212||Nafion 212 (N212||N212) or Nafion 212|graphene|Nafion 212 (N212|Gr|N212), were prepared as described in previous reports with slight modification [17]. In brief, first graphene (Gr)/Cu was hot pressed (using a DABPRESS® 10 ton hand pump at ~825 psi) on the desired form of Nafion 212 and after etching of Cu, the second layer of Nafion 212 was hot-pressed on Nafion 212|graphene, completing the Nafion graphene sandwich membrane denoted as Nafion 212|graphene|Nafion 212 (N212|Gr|N212). PTFE-coated fiber glass fabric sheets (McMaster-Carr, thickness 0.01000) were used as a support for graphene/Cu during transfer onto Nafion to avoid direct contact with the metal surface of hot-press machine and a silicon rubber gasket was used for even pressing of the graphene/Cu on Nafion.

Ionic conductance measurements. Ionic conductance values were extracted from the current-voltage (I-V) curves which were obtained from the multi-step chronoamperometry measurements either in a two-electrode (for small scale) or 4-electrode (for large scale) configuration, as shown in FIG. 1-FIG. 3 and FIG. 4-FIG. 10. In the 4-electrode geometry, Pt wires (procured from Alfa Aesar, 0.25 mm diameter, 99.9%) work as counter and working electrodes while Ag/AgCl pellet electrodes (purchased from A-M Systems) work as reference and working-sense electrodes. Two-electrode measurements were performed using homemade Ag/AgCl electrodes. Here, prior to recording the current/voltage in steps of 10-20 mV (multi-step chronoamperometry) each for 30-60 s, a stable open circuit potential was acquired (usually 120-300 s). For the small-scale (suspended graphene membranes on micron scale apertures) measurements, wetting of the graphene membrane was achieved by filling both the reservoirs first with ethanol, followed by 50% ethanol and then slowly exchanging with pure water before filling them with the desired electrolyte solution [37]. All the solutions were double filtered and degassed prior to their use and the measurements were performed inside a Faraday cage. Large scale conductance measurements were also performed in a custom-made H-cell with an internal diameter of 9 mm. Here, precaution was taken to ensure there were no air bubbles inside the capillary.

Areal conductance, S=G/A, was obtained from the I-V curves where conductance G=I/V (slope of the linear portion of the I-V curves)=1/R, R being the resistance of the membrane, and A is the active area of the membrane (~0.68 cm$^2$). The resistance of individual elements such as Nafion sandwich and graphene was estimated based on a series resistance model. For example, resistance (estimated from I-V) for sandwich membrane Nafion 212|graphene|Nafion 212, $RN_{212|Gr|Nafion\ 212+solution}$, will have the contribution from solution resistance and thus the total resistance can be written as a sum of solution resistance (2×R$_S$), Nafion sandwich (N212||N212; two layers of Nafion 212) resistance (2×R$_{N212}$) and graphene resistance (R$_{Gr}$) (also shown in FIG. 5), i.e.

$$R_{N212|Gr|N212+solution} = 2 \times R_s + 2 \times R_{N212} + R_{Gr} \quad (1)$$

The individual element "graphene (Gr)" resistance can be estimated by rearranging Equation (1) as $$R_{Gr} = R_{N212|Gr|N212+solution} - (2 \times R_S + 2 \times R_{N212}) \quad (2)$$

Thus, the obtained graphene resistance (R$_{Gr}$) can be used to calculate the areal conductance of graphene, S$_{Gr}$, as $$S_{Gr} = \frac{G_{Gr}}{A} = \left(\frac{1}{R_{Gr}}\right) \times \frac{1}{A} \quad (3)$$

Table 1 summarizes details of samples and their nomenclature.

TABLE 1

Description of the samples, their conditions, and their nomenclature.

| Sample Name | Description |
|---|---|
| Solution | Open cell (no membrane present) with electrolyte solution of 0.1M KCl or 0.1M HCl |
| Nafion 212\|Nafion 212 + Solution (N212\|\|N212) + Solution (Control) | Nafion sandwich i.e. Nafion 212\|\|Nafion 212 (also referred as control) assembled in the cell with electrolyte solution of either 0.1M KCl or 0.1M HCl. Measurements performed in KCl are referred as Nafion 212-$K^+$ form and similarly for Nafion 212-$H^+$ form when HCl. |
| Nafion 212\|graphene\|Nafion 212 + Solution (N212\|Gr\|N212\|+ Solution) (Graphene Sandwich Membrane) | Nafion, graphene (Gr) sandwich i.e. Nafion 212\|graphene\|Nafion 212 assembled in the cell with electrolyte solution of either 0.1M KCl or 0.1M HCl |
| Nafion 212\|\|Nafion 212 (N212\|\|N212) | "N212\|\|N212 + Solution" after correcting for "Solution" e.g. $R_{N212\|\|N212} = (R_{N212\|\|N212+Solution}) - (R_{Solution})$, where the first term on the right side is experimentally measured resistance when the Nafion 212\|\|Nafion 212 is assembled in the cell and the second term is solution resistance, which is measured with no assembled membrane. |
| Nafion 212\|graphene\|Nafion 212 (N212\|Gr\|N212) | "N212\|Gr\|N212 + Solution" after correcting for "Solution" e.g. $R_{N212\|Gr\|N212} = (R_{N212\|Gr\|N212+Solution}) - (R_{Solution})$, where the first term on the right side is experimentally measured resistance when the Nafion 212\|graphene\|Nafion 212 is assembled in the cell and the second term is solution resistance, which is measured with no assembled membrane. |
| Gr | Refers to "only graphene" estimated values after corrections from solution as well as Nafion itself, as shown in equation (2); $R_{Gr} = R_{N212\|Gr\|N212+Solution} - (2 \times R_S + 2 \times R_{N212})$ |

Chemical and electro-chemical etch tests for defect analysis. For the defect analysis of graphene, chemical etch test was performed using 0.1 M $FeCl_3$ (purchased from EMD Millipore Corporation, >98.0% assay) solution in DI water for a time of 5 s before washing the graphene/Cu with plenty of DI water to completely wash off the residual $FeCl_3$ as reported elsewhere [19]. The electrochemical etch test was performed in a two-electrode geometry using 0.5 M $CUSO_4$ solution at an applied potential of 1 V for 1 s where graphene/Cu works as a working electrode and another copper piece as a counter and reference electrode.

Raman spectroscopy. Raman measurements were performed using a confocal Raman microscope (Thermo Scientific DXR) with a 532 nm wavelength laser and a 900 lines per mm grating. The collection parameters were an exposure of 5 s and averaging of 30 scans with a spot size of 1.1 μm (50× microscope). The laser power was kept at 8 mW. The spectrum resolution was 5.5-8.3 $cm^{-1}$ for the current experimental conditions.

Graphene transfer on polycarbonate track etched (PCTE) membranes. Graphene was transferred onto PCTE membranes using an isopropanol (IPA) assisted hot lamination procedure following previously reported protocols [24]. First, APCVD graphene on Cu foil was pre-etched in 0.2 MAPS solution for 2.5 hours to remove the graphene on the backside as well as reduce the thickness of the Cu foil, followed by floating on DI water (2 times for 10 min in each step) and drying in air. The polycarbonate track etched (PCTE, Sterlitech, ~9.4-10% porosity, 10 μm thick, hydrophobic, polyvinylpyrrolidone-free) substrate was washed in pure ethanol (Sigma Aldrich, 200 proof) and dried in air. A thin layer of IPA was introduced to the PCTE and graphene/Cu interface as the heat transfer medium. Following this, the stack of paper/PCTE/graphene/Cu/paper was sandwiched between two protective Teflon films and then laminated at 135° C. using a TruLam TL-320E roll-to-roll compatible laminator. Subsequently, the PCTE/graphene/Cu was gently made to float on APS solution to completely etch Cu. Finally, the PCTE/graphene stack was rinsed with DI water to remove the APS residue, followed by rinsing in ethanol and drying in air.

Interfacial polymerization (IP) process. Interfacial polymerization was carried out based on previous reports [24, 25]. In brief, PCTE/graphene was assembled in a Franz Cell (PermeGear, Inc.; inner diameter 15 mm) and an interfacial polymerization process was performed using octa-ammonium polyhedral oligomeric silsesquioxane (POSS, Hybrid Plastics, AM0285) in water (aqueous phase) and trimesoyl chloride (TMC, Alfa Aesar, 4422-95-1) in hexane (organic phase) for 1 hour.

Filling Nafion within PCTE supports. The PCTE pores were filled with Nafion by dipping into a solution of 2.5 wt % Nafion (total volume 1.5 mL; diluted from 5 wt % (D520, Fuel Cell Store) in IPA) for 25 minutes and subsequently drying under ambient conditions. This Nafion dip coating step was repeated once more with 5 wt % Nafion solution. After Nafion dip coating the thickness of PCTE membranes was 14±2 μm. The thickness was measured across the membrane at multiple points (4-5 points per sample) using a digital micrometer with an accuracy of ±1 μm. The $K^+$-form conversion was achieved by soaking the Nafion filled PCTE membranes in multiple 0.1 M KCl solutions over 48 hours.

Results and Discussion

Figure 2:
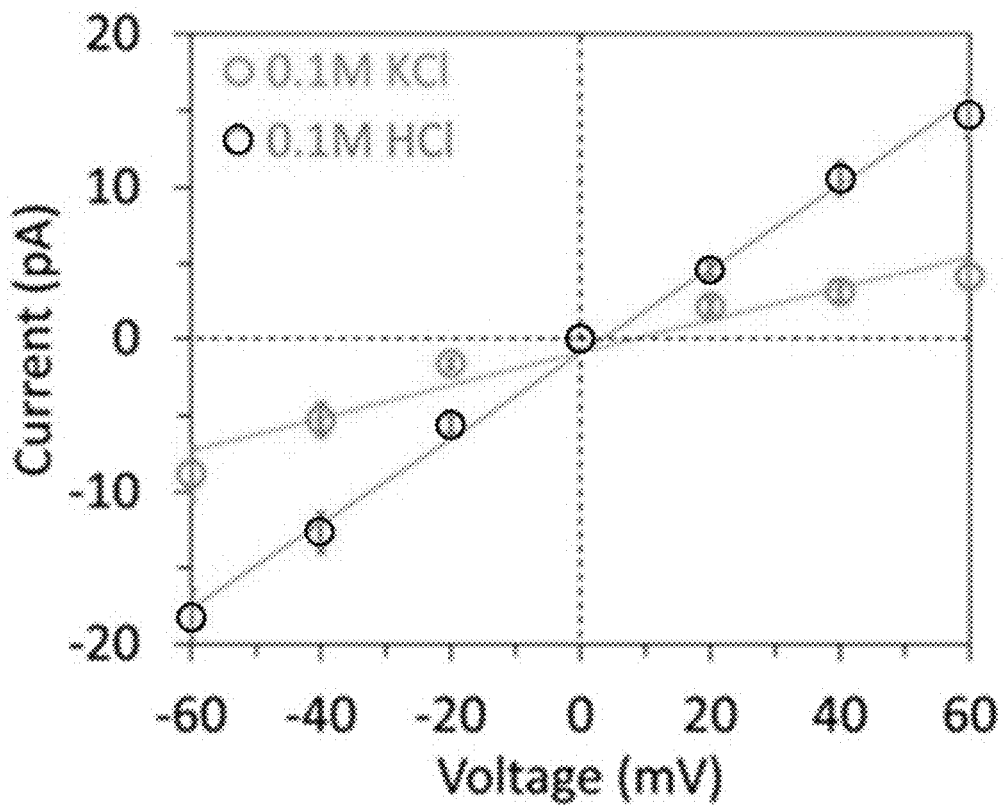
FIG. 2. Representative I-V curves (extracted from multi-chronoamperometry in A after correction for open circuit potential) for 0.1 M HCl (green) and 0.1 M KCl (orange) on the same graphene membrane for sample 1.
Figure 3:
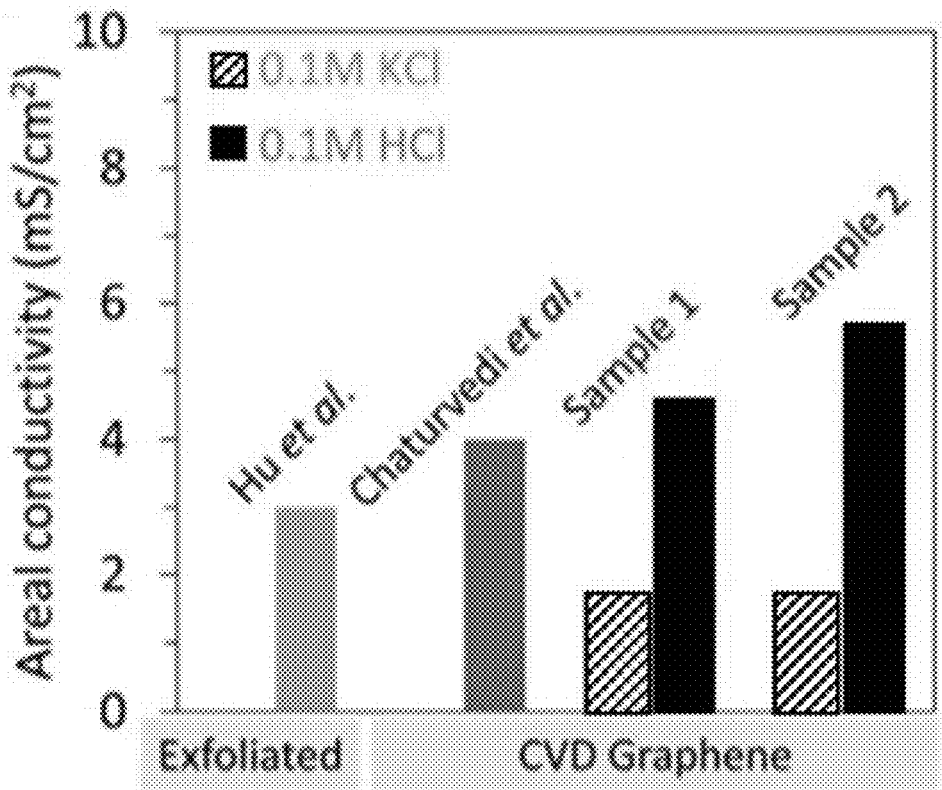
FIG. 3. Areal conductance for CVD graphene samples computed from (B) along with literature values for exfoliated graphene (Hu et al., ~3 mS $cm^{-2}$) measured using 0.1 M HCl and CVD graphene (Chaturvedi et al., ~4 mS $cm^{-2}$) measured using 0.1 M HCl+0.1 M KCl.

Micron-scale suspended graphene membranes. Ionic transport through micron-scale monolayer graphene membranes was investigated (FIG. 1-FIG. 3). Initially, proton ($H^+$) and potassium ion ($K^+$) transport through micron-scale suspended CVD graphene membranes is probed. Here, CVD graphene was suspended on a ~2 µm diameter aperture in a silicon nitride/Si wafer (see the Experimental section) and assembled into a custom-built cell equipped with inlet/outlet ports for the electrolyte and Ag/AgCl electrodes (see FIG. 1 inset for the cell schematic). The SEM image of the CVD graphene membrane (see inset in FIG. 1) shows a uniform contrast with some minor polymer residue (indicated by arrows) from transfer visible towards the edges of the membrane. Complete removal/elimination of residual polymer is nontrivial [48-54] and heating the transferred CVD graphene in $H_2$ or employing aggressive cleaning procedures were refrained from to avoid inadvertent introduction of defects into the graphene lattice that could influence transport measurements. FIG. 1 shows a representative multi-step chronoamperometry plot for a graphene membrane for different electrolytes and FIG. 2 shows current-voltage (I-V) curves extracted from FIG. 1 after open circuit potential (potential corresponding to zero current) correction. The linear portion of the I-V curve is used to calculate the conductance, G=I/V and corresponding area normalized conductance S=G/A, where A is the area of the suspended membrane (FIG. 3). The measured areal conductance values of ~4.5-6 mS $cm^{-2}$ for 0.1 M HCl are in agreement with the previously reported values for exfoliated [8, 40, 42] and CVD graphene [29] (FIG. 3), indicating comparable crystalline quality [55] of the CVD graphene over micron-scale areas (within a single graphene domain, typically ~100 µm for the CVD graphene [46, 47]). Interestingly, despite comparable $H^+$ conductance to exfoliated graphene, transport of $K^+$ (hydrated ion diameter~0.66 nm) of ~1.7 mS $cm^{-2}$ was also observed for the same graphene membrane at micron-scales [29, 38].

Figure 24:
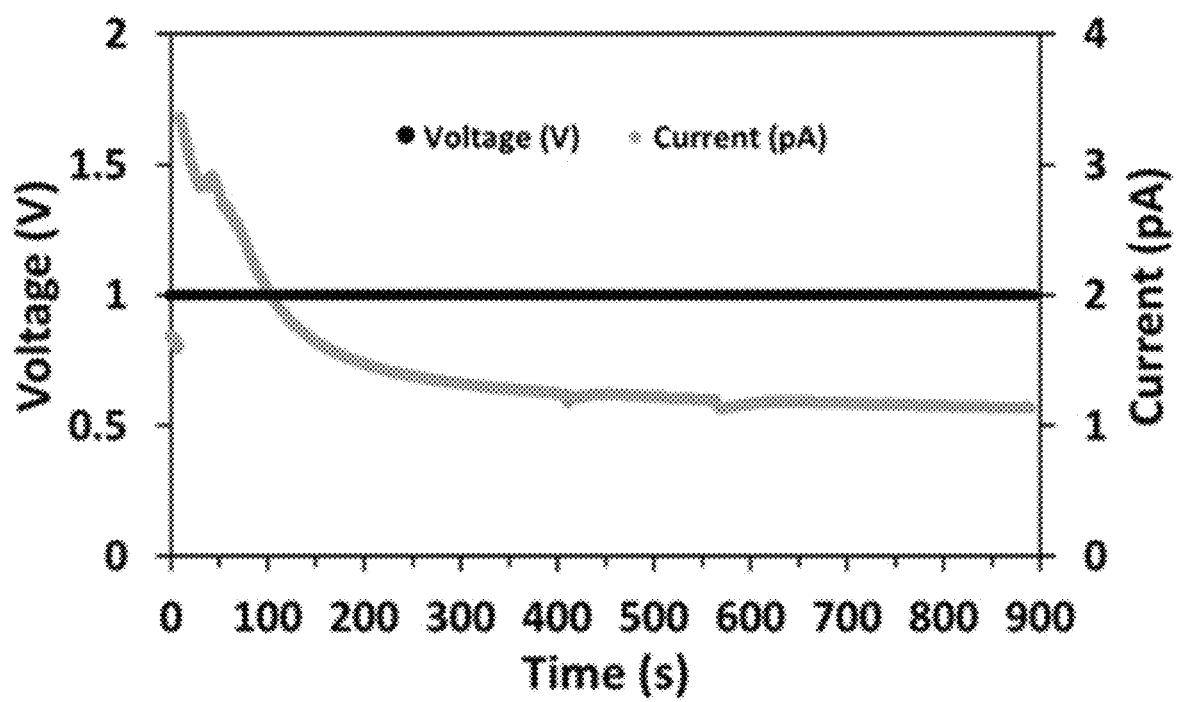
FIG. 24. Single step chronoamperometry measurement at 1 M HCl for a SiN$_x$/Si chip with no open aperture.

The measured conductance is significantly lower (at least 50×) than the diffusion limited current for a 2 µm open aperture (see the supporting information below for details). Further, a lower limit of current of ~1-3 pA at 1 V (FIG. 24) was measured for a closed chip, indicating that the measurements are well above the limit/threshold of the experimental set-up. Higher conductance values occasionally observed for some samples (not shown here) for both protons ($H^+$) and potassium ions ($K^+$) suggest the presence of large defects.

An estimation [56] of conductance made using $$G = \sigma \times \left(\frac{4t}{\pi \times d^2} + \frac{1}{d}\right)^{-1} \quad (4)$$

where t is the commonly used thickness of graphene in an electrolyte solution (~0.68 nm) [57], d is the defect diameter, and a is the conductivity of the solution, results in an equivalent single defect~0.3 nm in size (representing the measured conductance) for samples shown in FIG. 3. Here, it is acknowledged that the simplistic assumptions such as conductivity a inside a nanopore/defect is the same as bulk conductivity and the absence of surface charges on the pore/membrane can potentially lead to some minor deviations in the estimated defect size. Further, the nanopore/defect conductance can also change appreciably when the defect size is comparable to the ionic size of the permeating species due to a decrease in the concentration of ions inside the nanopore/defect and lower ionic mobility [56]. Higher $H^+$ conductance values could also arise due to the presence of large defects (that can allow $K^+$ transport) as well as multiple small defects (that may not allow $K^+$ transport).

The observed transport of $K^+$ ions for the CVD graphene (FIG. 3) even while the proton conductance values remain comparable to mechanically exfoliated graphene can be explained by (i) residual protons in 0.1 M KCl (the pH of 0.1 M KCl solution was ~5.3, but measurements using 0.001 M HCl showed a lower conductance of ~1.3 mS $cm^{-2}$), so this is excluded it as a possible explanation, (ii) the presence of defects or charges on the defect edges and (iii) any potential changes to the hydration shell around the $K^+$ ions that allow it to transport through defects <0.66 nm in size. Here, it is noted that Qi et al. [40] measured an areal proton conductance of ~12 mS $cm^{-2}$ and NaCl conductance of ~10 mS $cm^{-2}$ through the same mechanically exfoliated graphene membrane and ascribed it to defects as well as potential system leakages in comparison to the ~3 mS $cm^{-2}$ proton conductance reported by Hu et al. [8] for mechanically exfoliated graphene (where transport of other cations was not studied). Based on the measured proton conductance values, it was concluded that the quality of the CVD graphene over micro-scale areas (graphene domain size ~100 µm [46, 47] and potential absence of grain boundaries and associated defects, etc.) is comparable to that of mechanically exfoliated graphene for proton transport.

Figure 4:
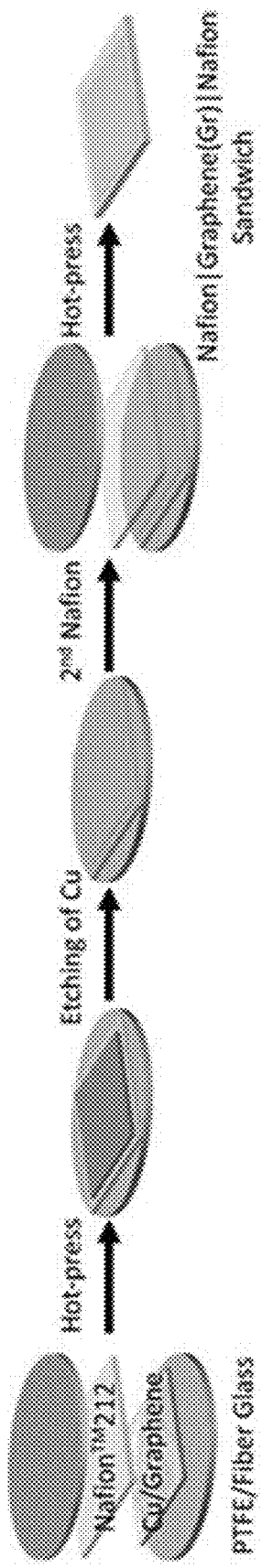
FIG. 4. Schematic of CVD graphene transfer to the Nafion (N212) support and fabrication of centimeter-scale graphene (Gr), Nafion (N212) sandwich membranes (N212|Gr|N212).
Figure 5:
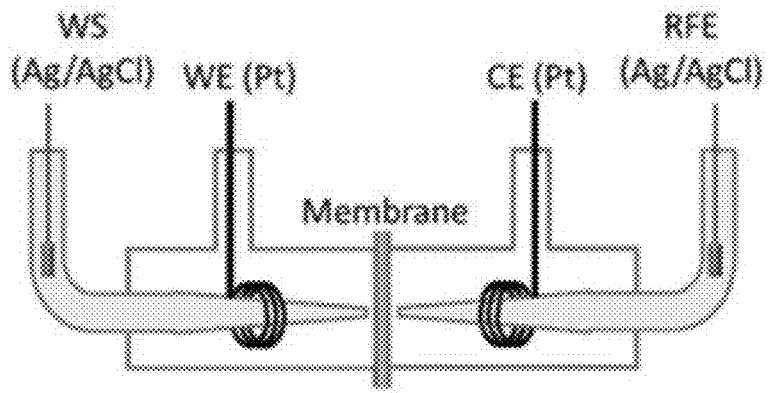
FIG. 5. Schematic of the 4-electrode measurement set-up and equivalent resistance model of the Nafion 212|graphene|Nafion 212 membrane.
Figure 5:

Centimeter-scale Nafion|graphene|Nafion sandwich membranes. Ionic transport through centimeter-scale monolayer graphene membranes was investigated (FIG. 4-FIG. 10). Proton transport over large areas (centimeter-scale) through the same CVD graphene was probed by sandwiching it between Nafion. Prior to CVD graphene transfer on Nafion (Nafion 212™ ~50 µm thick), the as-received Nafion (labelled as N212) was converted to either the protonated ($H^+$) form (labeled as N212-$H^+$) or potassium ion ($K^+$) form (labeled as N212-$K^+$) (see the Experimental section) [17]. CVD graphene (Gr) on copper foil was transferred to Nafion 212 via hot-pressing, as shown in FIG. 4 (also see the Experimental section) followed by etching of the Cu foil and finally another layer of Nafion was hot pressed on the graphene to give the centimeter-scale Nafion 212|graphene|Nafion 212 membranes (labelled as N212|Gr|N212).

Figure 6:
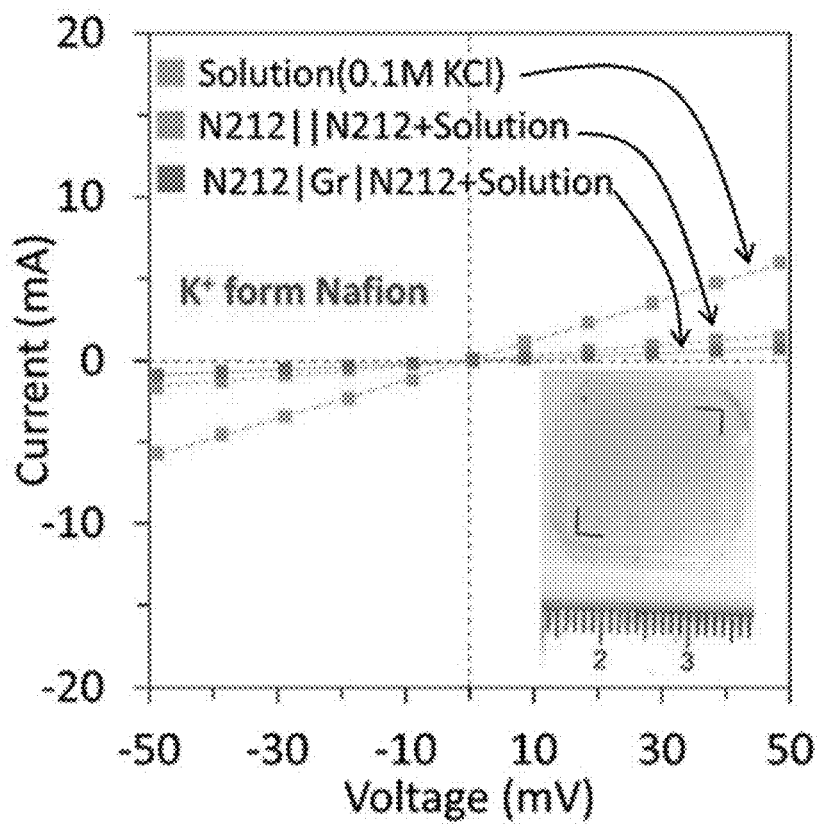
FIG. 6. Current-voltage (I-V) curves for sandwich membranes with graphene N212|Gr|N212 (purple) and N212||N212 (blue) after converting Nafion 212 to the $K^+$ form. The inset shows an optical image of the Nafion 212|graphene|Nafion 212 sandwich membrane with the dark square indicating graphene.
Figure 7:
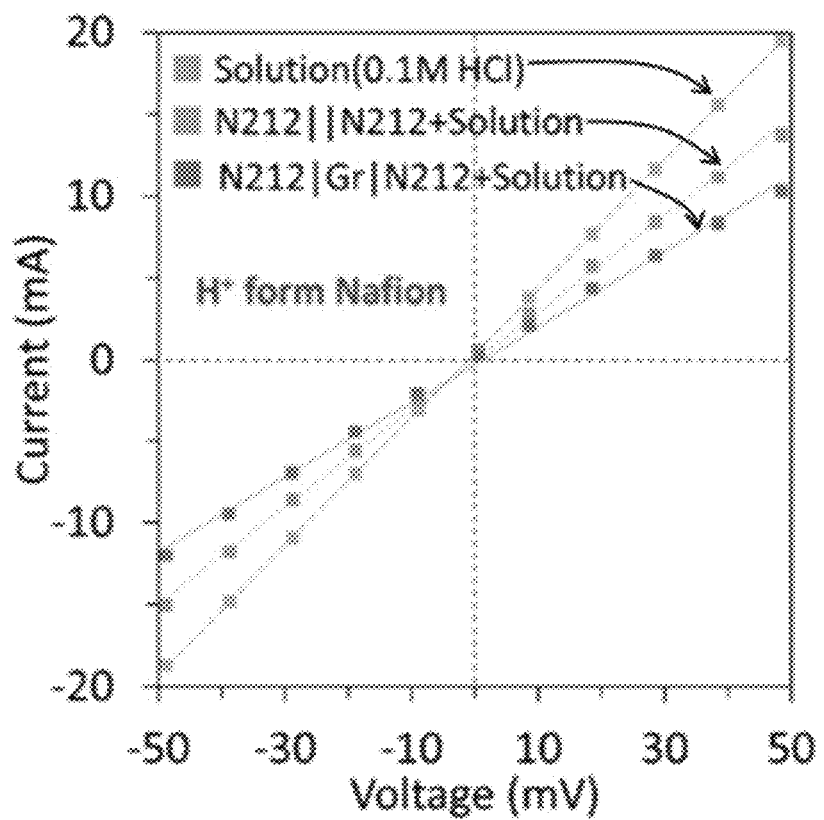
FIG. 7. Current-voltage (I-V) curves for sandwich membranes with graphene N212|Gr|N212 (purple) and N212||N212 (blue) after converting Nafion 212 to the $H^+$ form.
Figure 8:
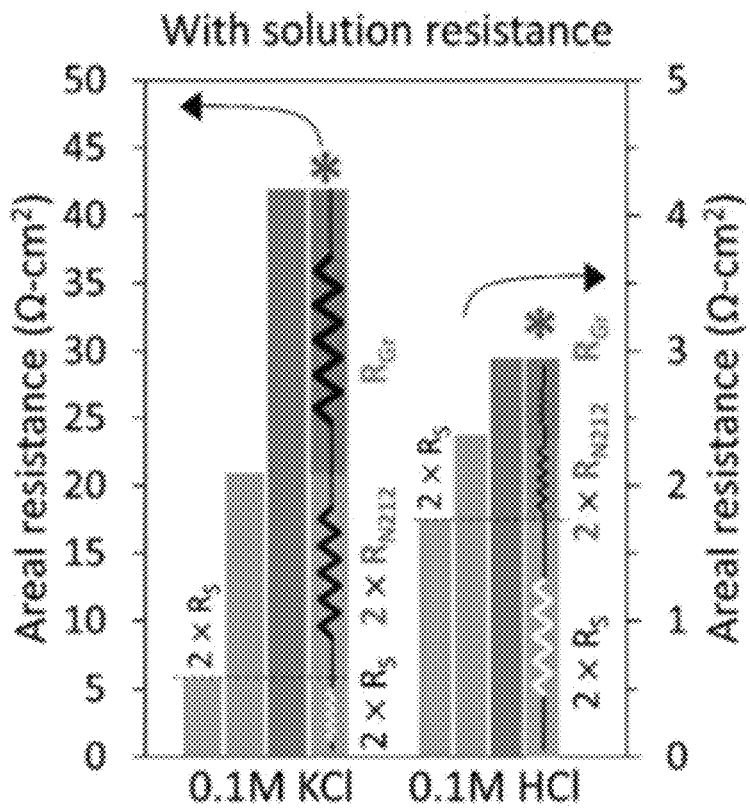
FIG. 8. Areal resistance of the solution (green), "N212||N212+solution" (blue) and with graphene "N212|Gr|N212+solution" (purple). The bar with the * is a guide for the eye and indicates resistance contributions from individual components in the Nafion 212|graphene|Nafion 212 sandwich membrane measurements i.e. solution resistance (green, $2 \times R_S$), resistance from Nafion N212||N212 (blue, $2 \times R_{N212}$) and resistance from graphene (purple, $R_{graphene}$).

The Nafion 212|graphene|Nafion 212 membrane was assembled into a custom-built H-cell (FIG. 5 and FIG. 25) for ionic conductance measurements performed in a 4-electrode configuration (see the Experimental section) to aid accurate measurements of solution and membrane resistance. FIG. 6 and FIG. 7 show I-V curves for open cell, Nafion 212||Nafion 212 and Nafion 212|graphene|Nafion 212 membranes in 0.1 M solution/electrolyte in $K^+$ and $H^+$ forms, respectively, via exchanges described earlier. The control membranes exhibit distinctly different areal ionic conductances of ~47 mS $cm^{-2}$ ($K^+$) and ~420 mS $cm^{-2}$ ($H^+$) due to the difference in transport rates for $H^+$ and $K^+$. The addition of graphene in between the Nafion 212, i.e. Nafion 212|graphene|Nafion 212 sandwich membrane, hinders the transport of both $K^+$ and $H^+$ ions as observed by the increase in the effective resistance or decrease in the measured ionic current (FIG. 6 and FIG. 7). The normalized areal resistance ($R_A$) for the membranes (FIG. 8) is obtained from the I-V curves by first taking the slope of the linear region to obtain conductance (G=I/V) and then taking the inverse of conductance G=1/R to obtain resistance (R) and finally multiplying the resistance by the active area (A) of the membrane (~0.68 $cm^2$), i.e. $R_A$=R×A. FIG. 8 shows the area normalized resistance for the solution ($K^+$~5.8 Ω$cm^2$, $H^+$~1.8 Ω$cm^2$), Nafion control ($K^+$~21.0 Ω$cm^2$, $H^+$~2.4 Ω$cm^2$), and Nafion 212|graphene|Nafion 212 sandwich membranes ($K^+$~42.0

Ωcm², H⁺~3.0 Ωcm²), for both K⁺ (in 0.1 M KCl) and H⁺ (in 0.1 M HCl) ions as well as individual contributions from each element in the equivalent electrical circuit towards the total Nafion 212|graphene|Nafion 212 membrane resistance indicated by * in FIG. 8.

Figure 9:
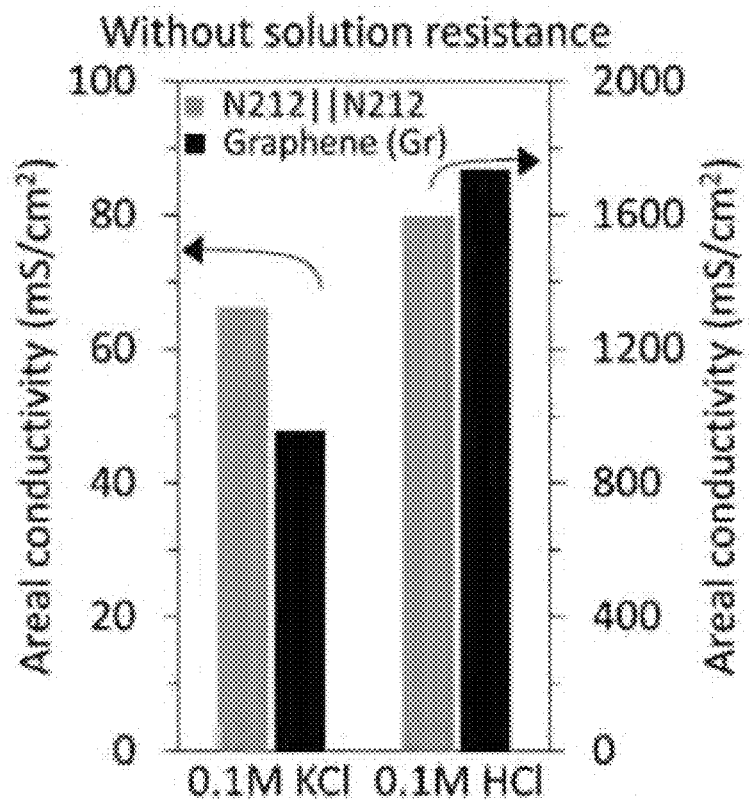
FIG. 9. Areal conductance values computed by taking the inverse of resistance values of graphene only ($R_G$, orange, graphene resistance after solution resistance subtraction) and Nafion sandwich only ($2 \times R_{N212}$, grey, after solution resistance subtraction) in FIG. 8.

The normalized areal conductance for the Nafion 212||Nafion 212 sandwich (after subtracting the contribution from solution resistance) and graphene (Gr) (after subtracting the contribution from the Nafion sandwich and solution resistance) is obtained from the inverse of the individual element areal resistance values (using the electrical model presented in FIG. 5) and is presented in FIG. 9 (also see Table 2). The Nafion 212||Nafion 212 and graphene (Gr) membranes show areal conductance of ~66 mS cm⁻² and 47.6 mS cm⁻², respectively, at 0.1 M KCl while the areal proton conductance values measured at 0.1 M HCl are ~1600 mS cm⁻² and ~1735 mS cm⁻², respectively. Selectivity, defined as the ratio of H⁺ to K⁺ conductance, is also presented in FIG. 10 and the addition of graphene increases the selectivity from 8.8 (control) to 14.2 (graphene sandwich membrane), signifying an improvement in proton selectivity after the addition of graphene arising from enhanced hindrance to K⁺ ions. Finally, a selectivity of ~36.4 was computed for monolayer CVD graphene (Gr) in comparison to ~24.1 for Nafion 212||Nafion 212 membranes (FIG. 10) after subtracting the contribution from the electrolyte (see Table 2).

TABLE 2

Resistance, areal resistance, and areal conductance values for centimeter-scale sandwich membranes.

| Samples | Resistance (Ω) | | Areal Resistance (Ω-cm²) | | Area Conductance (S/cm²) | |
|---|---|---|---|---|---|---|
| | 0.1M KCl | 0.1M HCl | 0.1M KCl | 0.1M HCl | 0.1M KCl | 0.1M HCl |
| Solution | 8.584 | 2.576 | 5.837 | 1.752 | 0.171 | 0.571 |
| Nafion 212||Nafion 212 + Solution | 30.838 | 3.497 | 20.970 | 2.378 | 0.048 | 0.421 |
| Nafion 212|graphene|Nafion 212 + Solution | 61.728 | 4.344 | 41.975 | 2.954 | 0.024 | 0.339 |
| graphene | 30.890 | 0.848 | 21.005 | 0.576 | 0.048 | 1.735 |

Gr denotes Graphene
The areal resistance and conductivity values were estimated using:
Areal resistance = Resistance × 0.68 cm²
Areal Conductance = 1/Areal Resistance
Resistance of Graphene (Gr) was calculated by subtracting (Nafion 212||Nafion 212 + Solution) from Nafion 212|graphene|Nafion 212.

Notably, the areal conductance changes substantially from micron-scale to centimeter-scale CVD graphene membranes for both H⁺ (~4.5-6 to ~1735 mS cm⁻²) and K+ (~2 to ~45 mS cm⁻²). The K⁺ and H⁺ measurements were specifically performed on the same membranes via facile exchange of cations in this study to conclusively exclude any variations from the graphene transfer yield or sample to sample variations from processing steps. It is further noted that the lower limit on the probed defect size is ~0.66 nm (the hydrated diameter of K⁺ ions). Proton conductance of ~1735 mS cm⁻², similar to the ~1667 mS cm⁻² reported by Bukola et al. [17] for centimeter scale CVD graphene (albeit significantly higher than that of micron-scale graphene membranes with proton conductance of ~4.5-6 mS cm⁻²), but distinctly different K⁺ conductance suggests possible differences in graphene quality with a complex nature of sub-nm defects, larger defects and coverage of graphene as well as other factors such as doping and strain on the graphene.

Figure 11:
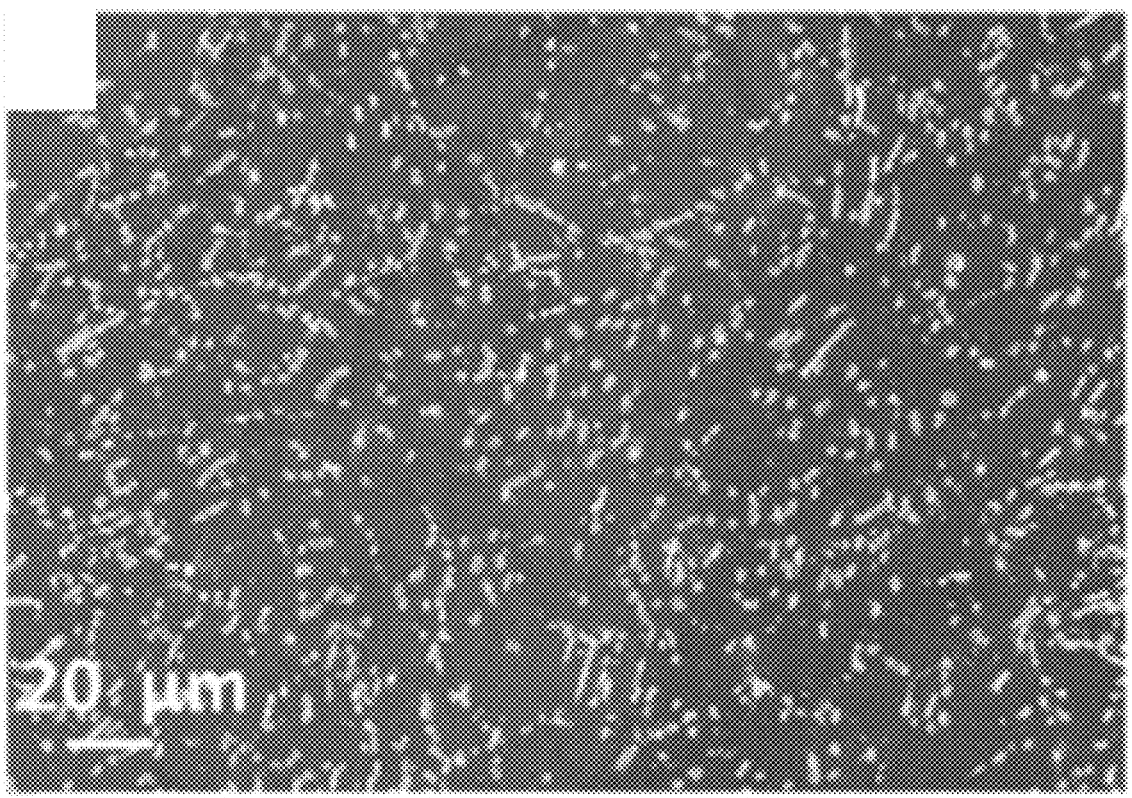
FIG. 11. SEM image of graphene on Cu foil after an acid-etch test with 0.1 M $FeCl_3$ for 5 s.
Figure 12:
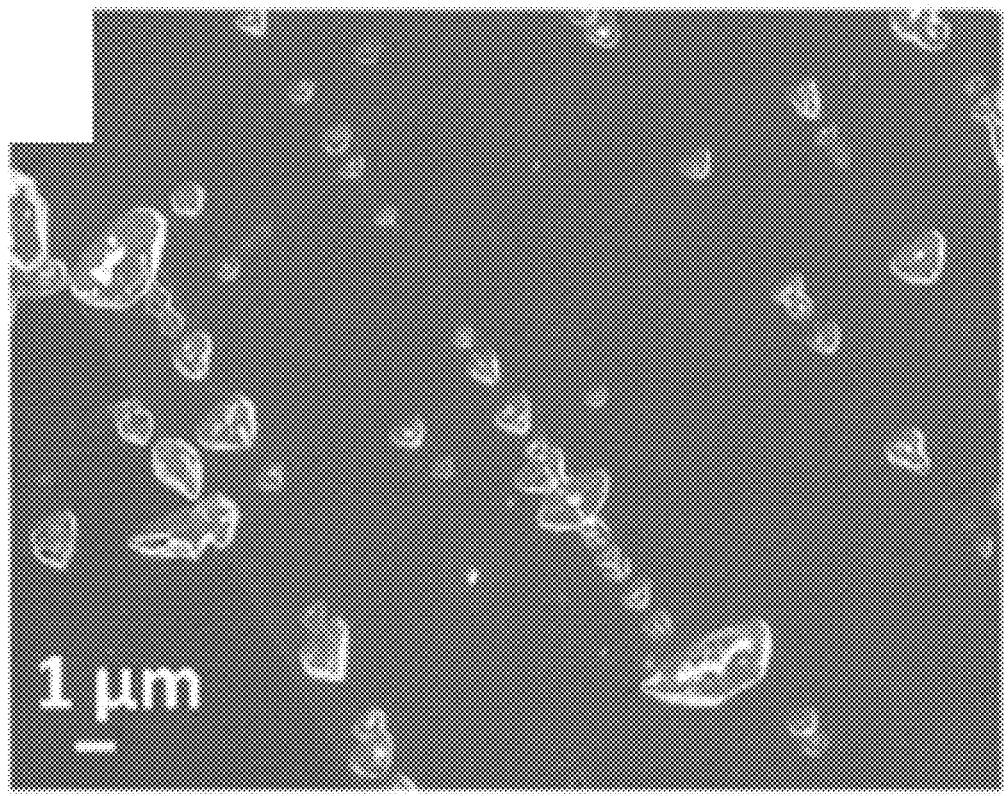
FIG. 12. SEM image of graphene on Cu foil after an electrochemical test. The electrochemical test shows smaller size etch pits and the etch pits appear to align with features consistent with wrinkles in the CVD graphene.
Figure 13:
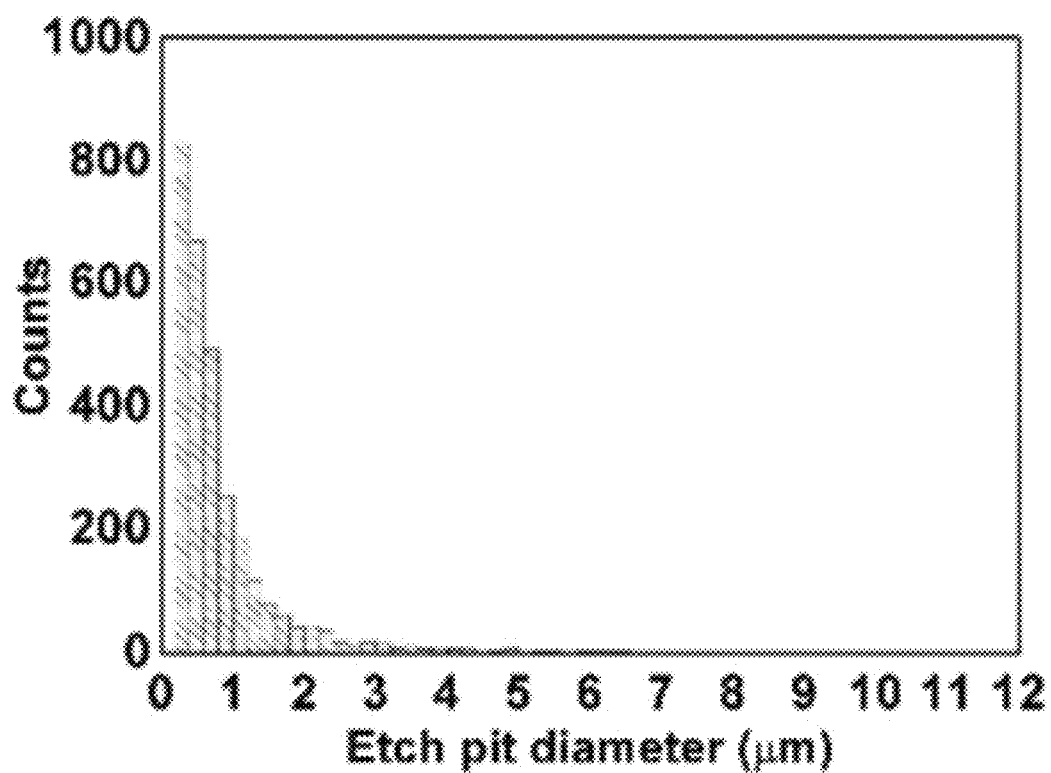
FIG. 13. Diameter distribution of etch pits extracted from FIG. 11 using ImageJ software.

Defect analysis of CVD graphene. Compared to micron-scale membranes, large scale transfers of graphene will have additional defects such as wrinkles and associated ~50 nm defects, domain boundaries patched by different carbon-membered rings (575 and 585 carbon rings), sub-nm defects such as single and multi-carbon vacancies and tears from the sample preparation/transfer processes [9, 19, 24, 25, 58]. These defects will contribute towards the measured ionic transport as well as the resulting selectivity. A facile approach for analyzing defects in CVD graphene on Cu over large areas utilizes etchants such as iron chloride (FeCl₃) or ammonium persulfate (APS) to etch copper underneath the defects [19]. An acid etch test using 0.1 M FeCl₃ for 5 s reveals the defects in CVD graphene as etch pits (FIG. 11 and FIG. 12) [59]. Assuming each etch pit corresponds to a single defect, an analysis (FIG. 27-FIG. 28) of the SEM image using ImageJ software provides a bimodal distribution of etch pits with an estimated defect density of ~7.1×10⁶ defects per cm² (FIG. 13). An increased defect density of ~8.6×10⁶ defects per cm² is estimated for the electrochemical etch test (which can probe defects smaller than the acid etch test) which is slightly higher than the defect density of ~7.1×10⁶ defects per cm² for the acid etch test [19]. The etch pits appear to line up along wrinkle-like features in the CVD graphene, consistent with the propensity of defect clustering along wrinkles reported in prior studies [19, 24].

Figure 14:
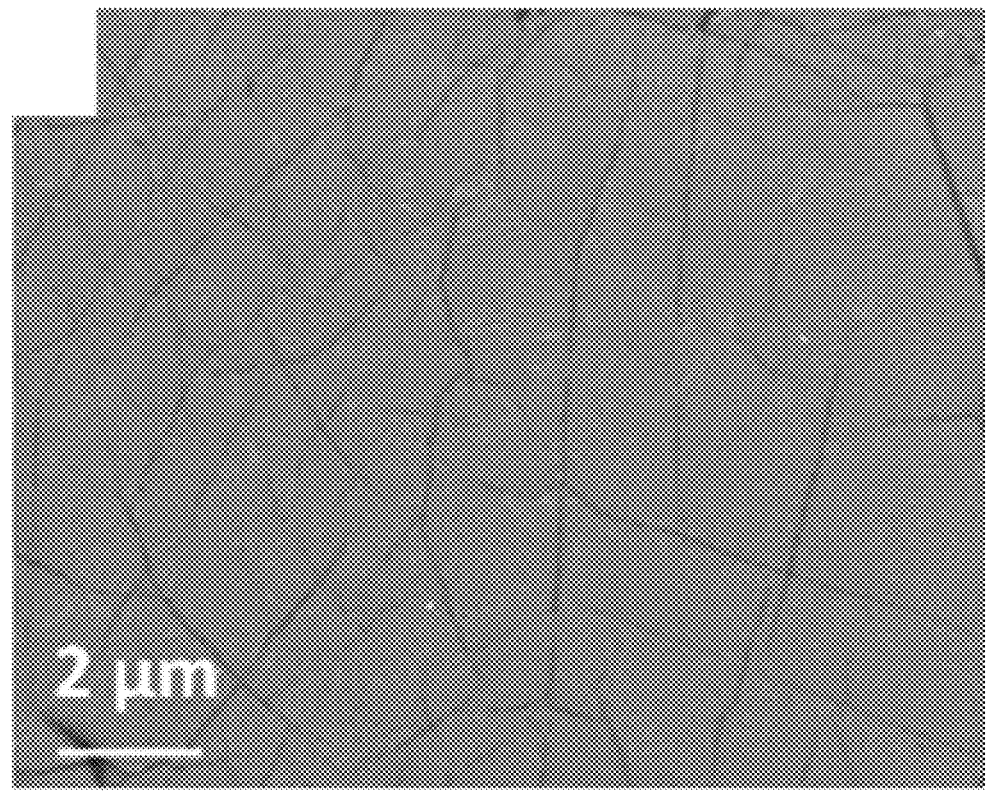
FIG. 14. SEM image of large-area graphene transferred onto the Nafion (N212) identified via the presence of wrinkles in the graphene.

SEM images of the large area CVD graphene transferred onto Nafion 212 (FIG. 14) do not show visible cracks or tears and show a uniform contrast without polymer charging, indicating successful high yield transfer. The presence of dark contrast features consistent with wrinkles cover ~1.66% of the total area and is in broad agreement with a wrinkle areal fraction of ~0.2-0.6% in the as-synthesized CVD graphene on Cu (assuming an upper bound on the width of wrinkles of ~50 nm). Prior studies suggested larger defects of ~4-50 nm show a preference to cluster along wrinkles which is also observed from the propensity of etch pits to cluster along wrinkles (FIG. 12) [24]. Wrinkles are also prone to tear/damage during the sandwich membrane preparation which will result in tears >50 nm in size. Further, the preparation of sandwich membranes via hot-pressing and subsequent hydration of the Nafion may introduce mechanical strain in the transferred CVD graphene due to the difference in thermal expansion coefficients of Nafion [60] (~9×10⁻⁴ K⁻¹) and graphene [61] (~8×10⁻⁶ K⁻¹) which could result in cracks/tears. However, no significant cracks or tears were observed in the CVD graphene transferred to Nafion from the SEM images (FIG. 14) and hence any influence from such secondary effects are considered to be minimal.

Figure 15:
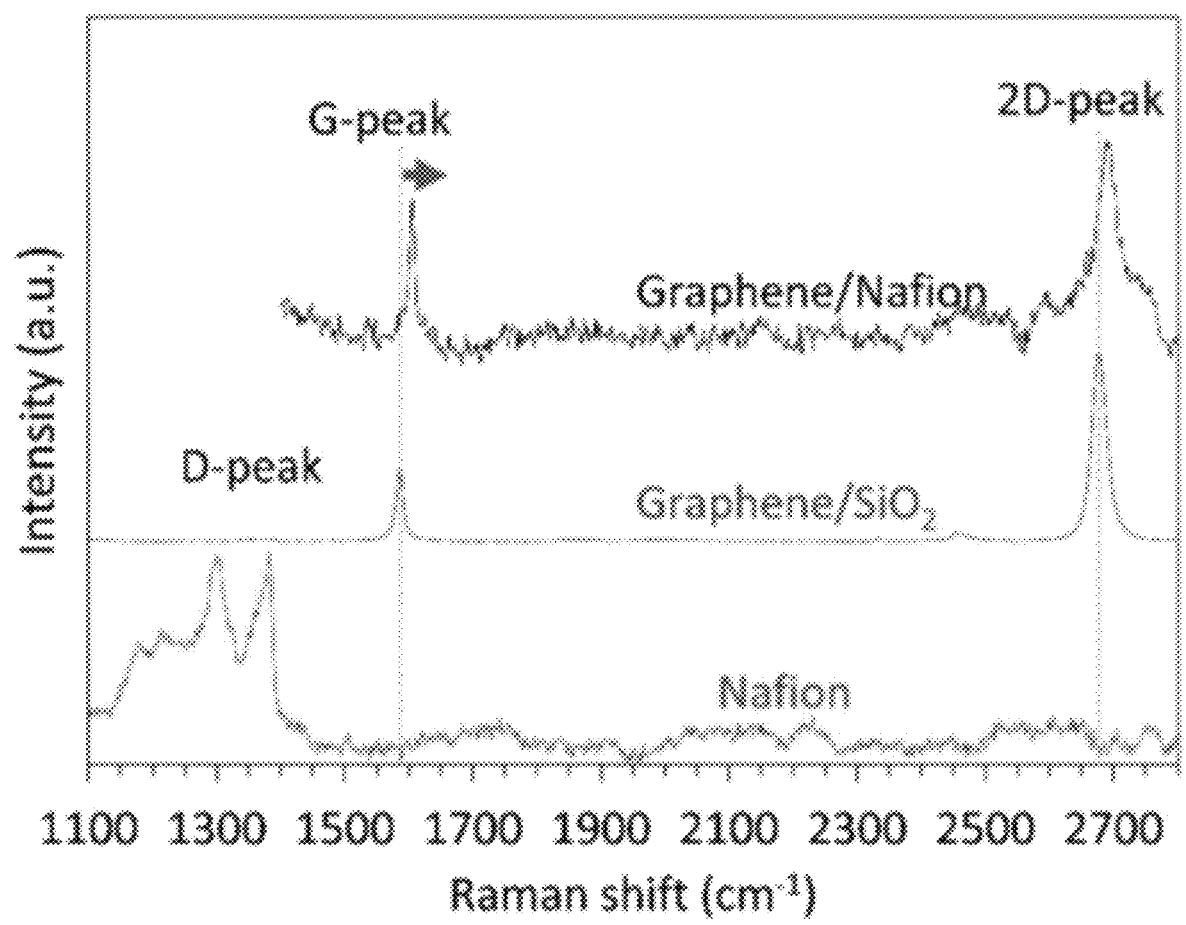
FIG. 15. Raman spectra for the graphene transferred on 300 nm $SiO_2$/Si wafer (blue) and Nafion 212 (black). The black vertical lines correspond to the characteristic 2D (~2700 $cm^{-1}$), G (~1600 $cm^{-1}$) and D (~1350 $cm^{-1}$) peaks in graphene. The overlap of Nafion peaks over the D peak region prevents collection of Raman spectra in those regions for graphene transferred onto Nafion.

Raman spectra of graphene transferred to Nafion 212 (in K⁺ form) and to a SiO₂/Si wafer shows the characteristic peaks (FIG. 15) at ~1350 cm⁻¹ (D), ~1590 cm⁻¹ (G) and ~2680 cm⁻¹ (2D). The ratio of intensity of the D to G peak, $I_D/I_G$~0.02, indicates high quality graphene [62] with negligible defects, and $I_{2D}/I_G$>1 with a 2D peak full-width half maximum (FWHM) of ~30 cm⁻¹ confirms transfer of monolayer graphene on SiO₂ [19, 22, 24-26, 54, 63-71]. Unfortunately, the overlap of the characteristic peaks of Nafion with the position of the D-peak hinders information from being obtained on defects in CVD graphene after transfer to Nafion via Raman spectroscopy (as shown in FIG. 15). Raman spectra of graphene on Nafion 212 (FIG. 15), however, indicate p-doping of graphene via a shift of the G peak towards higher wavenumbers by ~20 cm⁻¹, 2D peak shift by ~10 cm$^{-1}$, a change of ~10 cm$^{-1}$ in the FWHM of the G-peak, and a decrease in the intensity ratio of 2D to G, $I_{2D}/I_G$, from 2.67 to ~1.4 in comparison to graphene transferred on the SiO$_2$/Si substrate [72]. The p-type doping is attributed to charge transfer based doping from the sulfonic groups (SO$_3^-$) in Nafion [73, 74].

Polycarbonate track etched (PCTE) support for mitigating large tears/defects. The presence of even a small fraction of tears in centimeter-scale graphene membranes could allow for significant K$^+$ flux, and wrinkles typically have clusters of large non-selective defects present which could allow for K$^+$ flux as well. The presence of defects and tears in CVD graphene transferred to Nafion is also reported by Bentley et al., where they show enhanced proton conductance [44]. Here, the influence of wrinkles and tears were deconstructed by leveraging the well-defined porous polymer support such as polycarbonate track etched (PCTE with ~200 nm cylindrical straight channel pores) membranes to support graphene and interfacial polymerization (IP) was used to seal the large tears/defects (FIG. 16) [24-26]. Prior studies have shown negligible K$^+$ transport through PCTE+graphene+ interfacial polymerization membranes [24, 25]. It was calculated that a defect size of ~1.6 nm in the CVD graphene supported on a ~200 nm diameter PCTE support pore will exhibit transport characteristics similar to a completely open/uncovered ~200 nm pore (i.e. a single ~1.6 nm defect will manifest as a tear of ~200 nm diameter PCTE support pore) and exhibit selectivity as well as ionic conductance similar to bulk electrolyte (see the supporting information below for details).

The contribution of defects in ionic transport through centimeter-scale monolayer graphene membranes was investigated (FIG. 16-FIG. 21).

Figure 16:
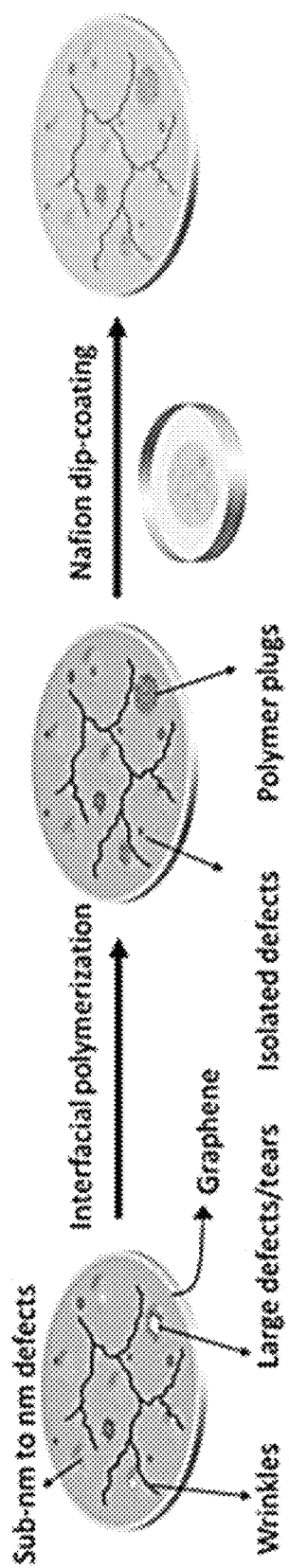
FIG. 16. Schematic showing centimeter-scale graphene transferred to polycarbonate track etched (PCTE) supports (~9.4-10% porosity, ~200 nm pores) to isolate wrinkles and large tears and minimize contributions to ionic transport from them. Subsequent interfacial polymerization (IP) allows for sealing of large defects (>0.5 nm) and tears in graphene. Finally, the PCTE+graphene+ interfacial polymerization membrane is dip coated in Nafion to facilitate a direct comparison with graphene sandwiched between Nafion 212 supports (see FIG. 4-FIG. 10).
Figure 17:
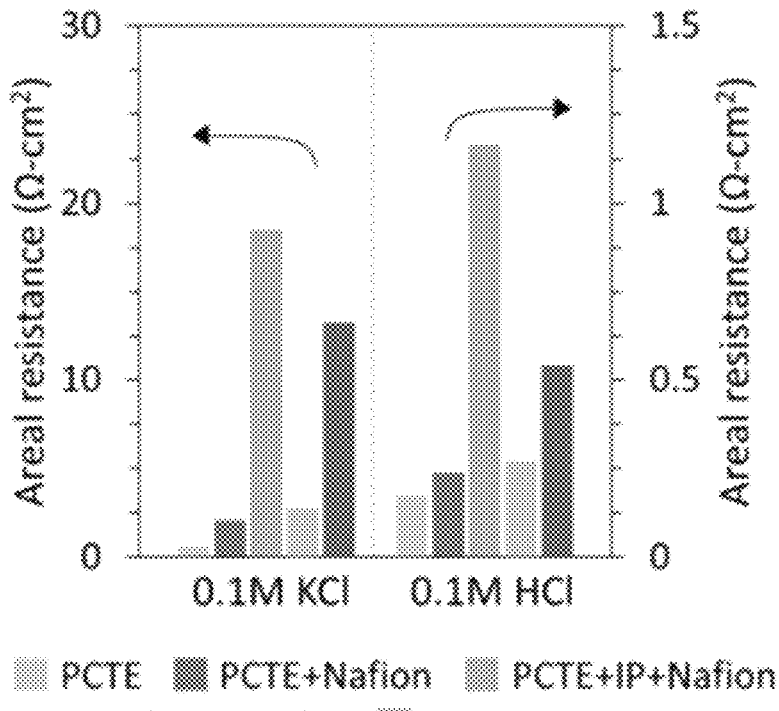
FIG. 17. Areal resistance (Ω cm$^2$) for (left to right at each section): PCTE supports (grey), PCTE with Nafion filled into the channels via dip coating (PCTE+Nafion), PCTE with graphene and subsequent Nafion filling of the PCTE channels (PCTE+Gr+Nafion), and PCTE with graphene subjected to interfacial polymerization (IP) and filled with Nafion (PCTE+Gr+ interfacial polymerization+Nafion). Note, unlike FIG. 9, the areal conductance values in FIG. 17 include contribution from the solution i.e. 0.1 M HCl and 0.1 M KCl for measurements of H$^+$ and K$^+$ transport, respectively, since the interfacial polymerization plugs formed with graphene could exhibit different transport characteristics than interfacial polymerization plugs formed within bare PCTE. The dip-coated Nafion is converted to the K$^+$ form or H$^+$ form prior to the corresponding measurements (see the Experimental section).

FIG. 16 shows a schematic of the isolation of tears and wrinkles via CVD graphene transfer to a PCTE support with ~10% porosity and subsequent sealing (via interfacial polymerization (IP)) as well as finally dip coating the CVD graphene (Gr)+PCTE+ interfacial polymerization membrane with Nafion (to facilitate an effective comparison with the Nafion|graphene|Nafion sandwich membranes). The variation from graphene coverage (despite typically high transfer yields >96%) limits effective controls since the amount of interfacial polymerization and the transport characteristics of the interfacial polymerization plugs may be different for each membrane, thereby preventing precise delimiting of the ionic resistance/conductance of individual elements (PCTE, CVD graphene and Nafion) similar to FIG. 8 and FIG. 9. Therefore, no correction for solution resistance or Nafion was performed for the PCTE measurements to estimate the resistance/conductance of CVD graphene "only". The areal resistance (FIG. 17 and Table 3) for Nafion filled PCTE (~0.24 Ωcm$^2$ for H$^+$ and ~2.1 Ωcm$^2$ for K$^+$) and Nafion filled PCTE+graphene (~0.27 Ωcm$^2$ for H$^+$ and ~2.8 Ωcm$^2$ for K$^+$) membranes shows a minor increase in the resistance for H$^+$ (~13%) and K$^+$ (~33%) ion transport with the addition of graphene on the PCTE membrane, suggesting contributions from defects >1.6 nm in size that overlap the PCTE support pores [24-26, 58]. To rule out the possibility of a small number of such larger defects and tears overwhelming ionic transport in comparison to the sub-nm defects, interfacial polymerization (IP) was used to selectively form polymer plugs and seal the large defects/tears and defects overlapping the PCTE pores (see the Experimental section) [25]. After sealing the defects (>1.6 nm) via interfacial polymerization (FIG. 17), the areal resistance for PCTE+graphene+ interfacial polymerization+Nafion increases to ~0.54 Ωcm$^2$ for H$^+$ and ~13.3 Ωcm$^2$ for K$^+$ in comparison to that of PCTE+graphene (~0.27 Ωcm$^2$ for H$^+$ and ~2.8 Ωcm$^2$ for K$^+$), which corresponds to a resistance increase of ~100% (H$^+$) and ~475% (K$^+$) after interfacial polymerization. Such a significant increase in the areal resistance for both H$^+$ and K$^+$ suggests effective sealing of larger defects as well as tears, mitigating their contribution towards the measured ionic transport.

TABLE 3

Resistance, areal resistance, and areal conductance values for PCTE membranes.

| Samples | Resistance (Ω) | | Areal Resistance (Ω-cm$^2$) | | Area Conductance (S/cm$^2$) | |
|---|---|---|---|---|---|---|
| | 0.1M KCl | 0.1M HCl | 0.1M KCl | 0.1M HCl | 0.1M KCl | 0.1M HCl |
| PCTE + Solution | 8.580 | 2.575 | 0.583 | 0.175 | 1.714 | 5.711 |
| PCTE + Nafion + Solution | 30.820 | 3.488 | 20.96 | 0.237 | 0.477 | 4.216 |
| PCTE + IP + Nafion + Solution | 272.319 | 17.120 | 18.518 | 1.164 | 0.054 | 0.859 |
| PCTE + Gr + Nafion + Solution | 41.246 | 3.971 | 2.805 | 0.270 | 0.357 | 3.704 |
| PCTE + Gr + IP + Nafion + Solution | 195.263 | 7.959 | 13.278 | 0.541 | 0.075 | 1.848 |

Figure 18:
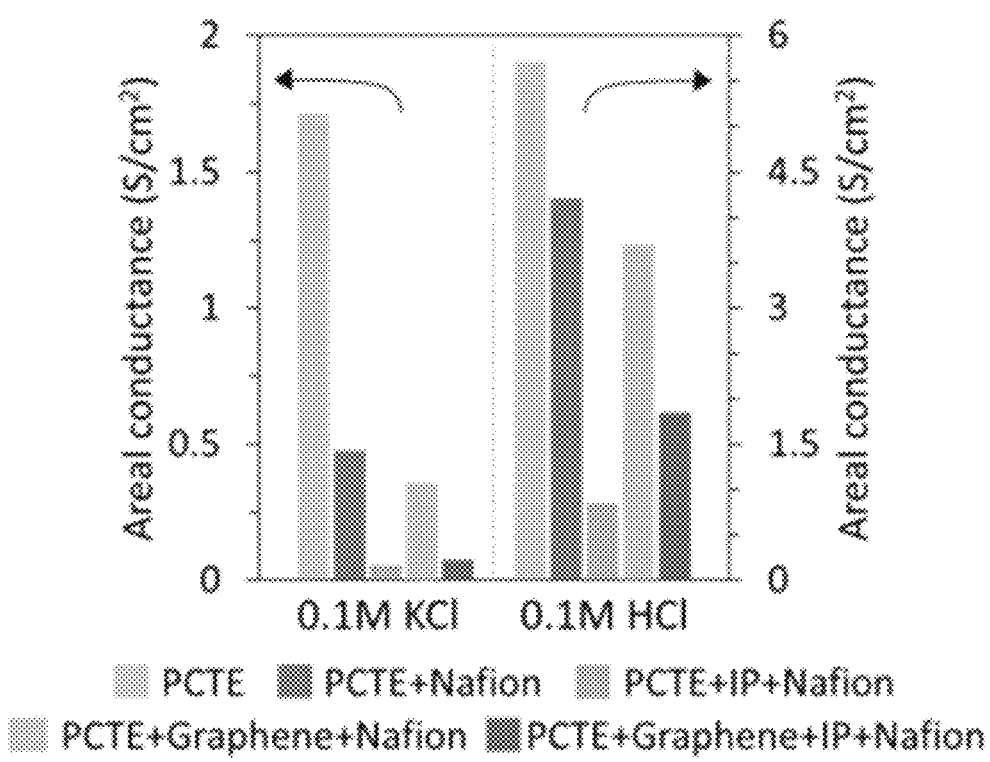
FIG. 18. Areal conductance (S cm$^{-2}$) for (left to right at each section): PCTE supports (grey), PCTE with Nafion filled into the channels via dip coating (PCTE+Nafion), PCTE with graphene and subsequent Nafion filling of the PCTE channels (PCTE+Gr+Nafion), and PCTE with graphene subjected to interfacial polymerization (IP) and filled with Nafion (PCTE+Gr+ interfacial polymerization+Nafion).
Figure 19:
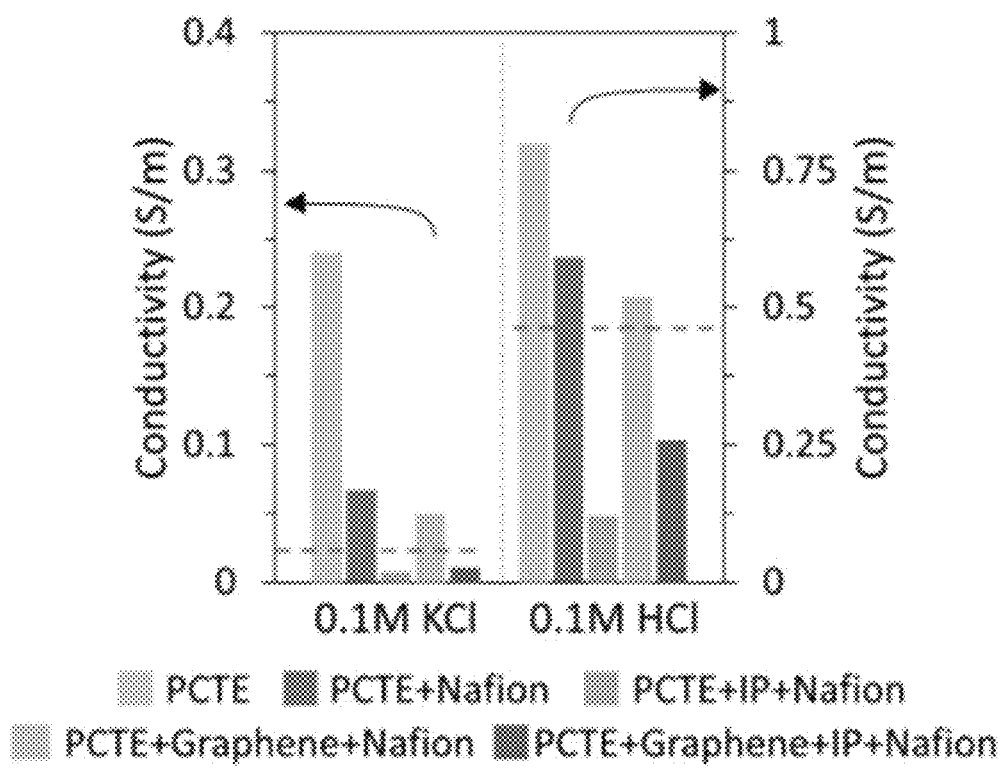
FIG. 19. Conductivity (S m$^{-1}$) for (left to right at each section): PCTE supports (grey), PCTE with Nafion filled into the channels via dip coating (PCTE+Nafion), PCTE with graphene and subsequent Nafion filling of the PCTE channels (PCTE+Gr+Nafion), and PCTE with graphene subjected to interfacial polymerization (IP) and filled with Nafion (PCTE+Gr+ interfacial polymerization+Nafion). The dotted purple lines show values on the Nafion 212 sandwich with graphene (N212|Gr|N212+solution) extracted from FIG. 8 for an effective comparison between graphene transferred to PCTE or Nafion 212 supports, respectively.
Figure 20:
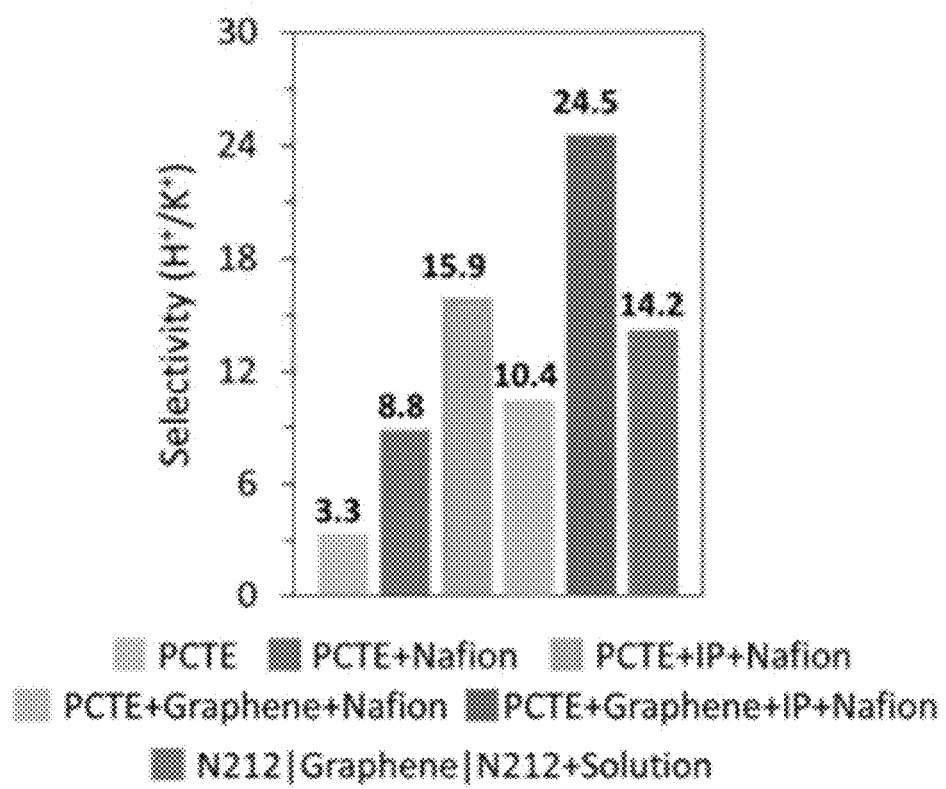
FIG. 20. H$^+$/K$^+$ selectivity for (left to right): PCTE supports (grey), PCTE with Nafion filled into the channels via dip coating (PCTE+Nafion), PCTE with graphene and subsequent Nafion filling of the PCTE channels (PCTE+Gr+Nafion), PCTE with graphene subjected to interfacial polymerization (IP) and filled with Nafion (PCTE+Gr+ interfacial polymerization+Nafion), and N212|Gr|N212+solution.
Figure 21:
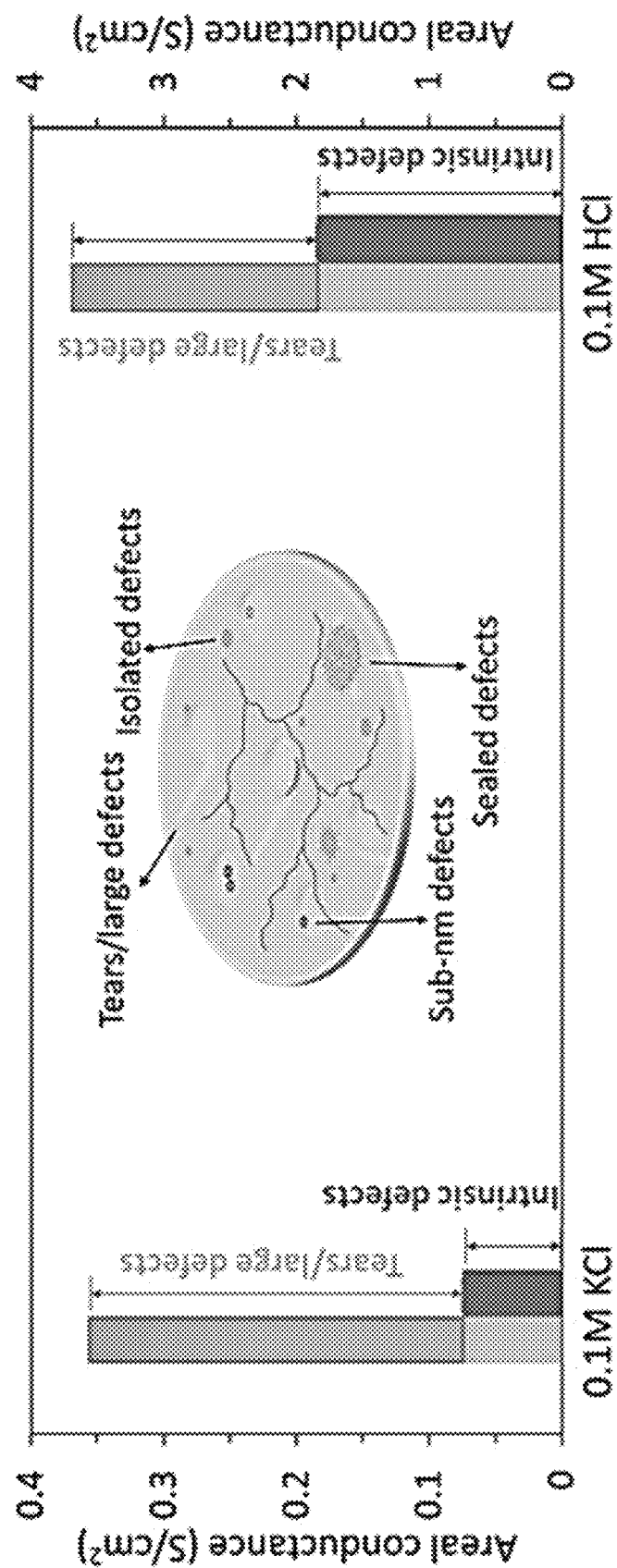
FIG. 21. Deconstruction of the contribution from intrinsic defects and large defects towards the overall conductance for PCTE+graphene+Nafion (yellow) and PCTE+graphene+ interfacial polymerization+Nafion (grey) using areal conductance values from FIG. 18 and schematic of defects within graphene transferred onto the PCTE support. Also see Table 3 for measured data values.
Figure 30:
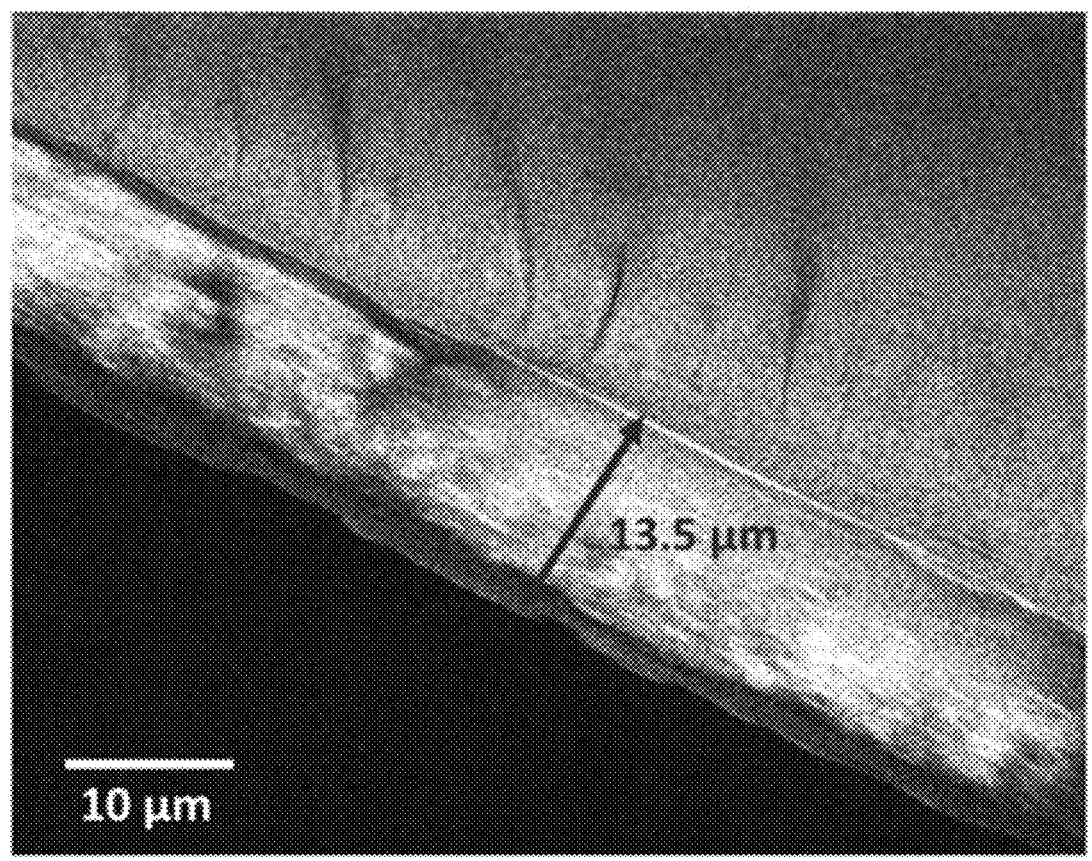
FIG. 30. Cross-sectional SEM image of a PCTE+ interfacial polymerization+Nafion membrane.

Area of the PCTE membrane is 0.068 cm$^2$;
IP = interfacial polymerization;
Gr = Graphene FIG. 18 shows the areal conductance values for different membranes obtained by taking the inverse of the areal resistance from FIG. 17. Although the areal conductance of PCTE+graphene+Nafion (~3703 mS cm$^{-2}$ for H$^+$ and ~356 mS cm$^{-2}$ for K$^+$) is significantly higher than that of the Nafion 212|graphene|Nafion 212 sandwich membrane (~339 mS cm$^{-2}$ for H$^+$ and ~24 mS cm$^{-2}$ for K$^+$), upon considering the differences in membrane thicknesses (see FIG. 30), the conductivity (S m$^{-1}$) values for both these membranes appear to be in good agreement (FIG. 19). The areal conductance of PCTE+graphene+ interfacial polymerization+Nafion membrane is ~1848 mS cm$^{-2}$ for H$^+$ and ~75 mS cm$^{-2}$ for K$^+$ which corresponds to a selectivity of 24.5 (FIG. 20). FIG. 21 compares the measured H$^+$ and K$^+$ areal conductance for the PCTE+graphene+Nafion (yellow) and PCTE+graphene+ interfacial polymerization+Nafion (grey) membranes to illustrate the efficacy of the interfacial polymerization process in isolating the contribution to conductance from larger defects and tears. The significantly higher selectivity of 24.5 for the PCTE+graphene+ interfacial polymerization+Nafion membrane compared to the 14.2 for the Nafion 212|graphene|Nafion 212 sandwich membranes suggests that large non-selective defects are effectively blocked by the interfacial polymerization, and the sub-nm proton selective defects (smaller than the interfacial polymerization plugs) govern the membrane selectivity. The thickness of the PCTE+graphene+ interfacial polymerization+Nafion membrane is ~14 µm and yet it shows a superior ionic selectivity of ~24.5 compared to ~100 µm thick Nafion 212||Nafion 212 with an ionic selectivity of ~8.8, while still maintaining comparable proton conductance.

Figure 22:
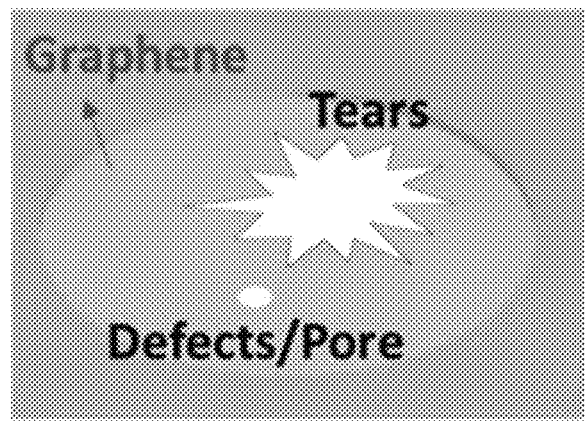
FIG. 22. Schematic and simplified resistance model with parallel conducting pathways through tears ($R_{tears}$) and defects ($R_{defects}$) in graphene with both large tears and defects/pore.
Figure 22:
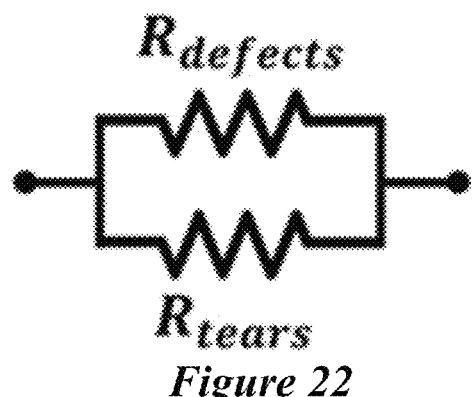
Figure 23:
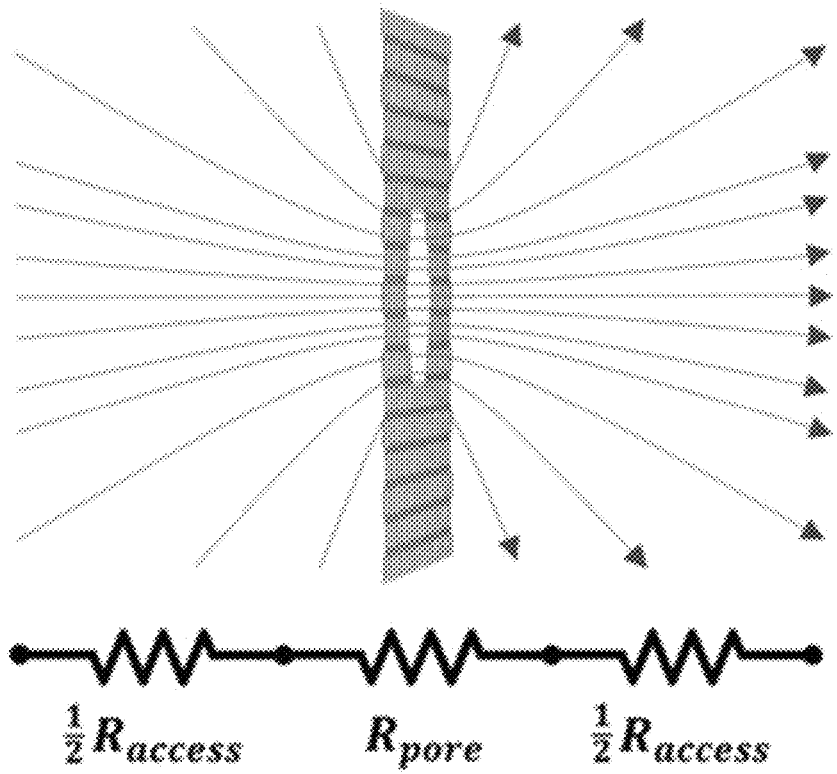
FIG. 23. Illustration of ion conduction through a graphene pore and corresponding resistance network accounting for access resistance ($R_{access}$) to reach and leave the hole on either side and the resistance to flow through the hole ($R_{pore}$).

Mathematical transport model. Since the measured H$^+$ conductance through centimeter-scale Nafion|graphene|Nafion as well as PCTE+graphene+ interfacial polymerization+Nafion (~1.74-1.84 S cm$^{-2}$) is significantly higher than the H$^+$ conductance of the graphene measured at the micron-scale (~4.5-6 mS cm$^{-2}$), transport of H$^+$ occurs through more pathways than just through the lattice to account for the measured graphene selectivity on the larger scale. To consider the influences of defects and tears in the large-area graphene a mathematical model was developed. While intrinsic defects are typically nanometer scale and form during graphene synthesis, larger defects up to ~50 nm commonly form along wrinkles in graphene [24, 58]. The possibility of conductance through both tears and defects were considered by adding their contributions in parallel (FIG. 22) and they were modeled using the simple graphene conductance model. In this model, there are two contributions to the resistance limiting ion flux through each graphene pore (FIG. 23) [56]. The first is the resistance to passing through the pore due to its low area compared to the bulk, $R_{pore}$. The second term is the resistance ions experience accessing the pore, $R_{access}$. This occurs because the graphene in between pores has low ion conductance, forcing ions to funnel toward the pores to pass through the membrane. However, when applying this conductance model to the Nafion 212|graphene|Nafion 212 membrane, it is important to note that because the graphene has Nafion directly on either side, the access resistance experienced by ions passing through the graphene occurs in the Nafion rather than in the bulk solution. The mobility and hence the effective conductance of $H^+$ and $K^+$ are both lower in Nafion. The ion conductivities in the Nafion are calculated by multiplying the Nafion||Nafion areal conductance by the membrane thickness, resulting in $\sigma_{H+}=1.6$ S m$^{-1}$ and $\sigma_{K+}=0.067$ S m$^{-1}$. These conductance values are used in the model calculations below. The total conductance (G) is calculated as $$\frac{G}{A} = \frac{G_{defects}}{A} + \frac{G_{tears}}{A} \tag{5}$$

where A is the total membrane area, $G_{defects}$ is the total conductance through the defects, and $G_{tears}$ is the total conductance through the tears. Although tears permit passage of both $H^+$ and $K^+$ ions, the Nafion surrounding the graphene raises the $H^+/K^+$ selectivity of tears to that of the Nafion. For simplicity, tears were approximated as holes covering a fraction, a, of the membrane area, all with the same diameter, $D_{tear}$. The tear conductance is then calculated as $$\frac{G_{tears}}{A} = \frac{a\sigma}{t + \frac{\pi}{4}D_{tear}} \tag{6}$$

The specific tear size distribution is not important in this modeling as different choices of $D_{tear}$ and a can provide the same tear conductance. The interest is only in the order of magnitude of parameters required to explain the measurements.

Selectivity above that of Nafion results from smaller intrinsic defects in graphene. Defects have a range of sizes that often resemble an exponential distribution [75], $$p(D) = \frac{1}{\overline{D}} e^{-D/\overline{D}} \tag{7}$$

where p(D) is the probability density that a defect has diameter D and the parameter $\overline{D}$ determines the width of the distribution. The areal density of defects larger than the etch test critical diameter were measured to be $n_{>D_c}=8.1 \times 10^6$ cm$^{-2}$, and this requirement was enforced on the pore size distribution by defining the overall defect areal density, n, such that $$n \int_{D_c}^{\infty} p(d)dD = n_{>D_c} \tag{8}$$

This critical diameter, $D_c$, is between 0.5 and 1.0 nm but is not exactly known. It is approximated as the hydrated diameter of $K^+$, noting that the precise value is not critical to the order of magnitude of model parameters required to match the measured conductances. Summing the conductance over all defects gives $$\frac{G_{defects}}{A} = \int_{D_{ion}}^{\infty} \frac{n\sigma}{\frac{4t}{\pi(D-D_{ion})^2} + \frac{1}{D-D_{ion}}} p(D)dD \tag{9}$$

where $D_{ion}$ is the ion diameter (taken as 0.66 nm for $K^+$ and 0 for $H^+$). Although deviations from this continuum resistance model are expected for nanometer-scale graphene pores [37, 75], these differences are much smaller than the orders of magnitude difference in conductance measured between micron- and centimeter-scale CVD graphene, and hence are neglected here. For sub-nm pores, precisely defining pore diameter is difficult, but in this model, it becomes the effective diameter providing the corresponding conductance from the continuum model.

Figure 10:
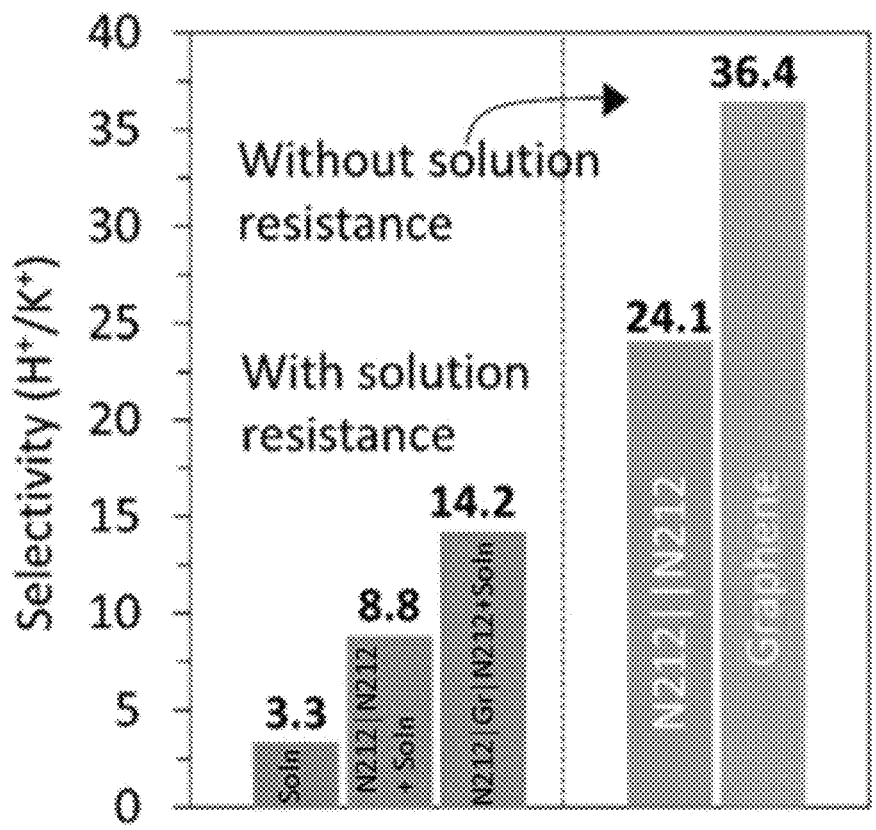
FIG. 10. Selectivity ($H^+/K^+$) computed by taking the inverse of the ratio of areal resistance for the solution (green), "N212||N212+solution" (blue) and "N212|Gr|N212+solution" (purple) in FIG. 8 as well as the ratio of areal conductance values for graphene (Gr, orange) and the Nafion sandwich (N212||N212, grey) without solution contribution in FIG. 9 for $H^+$ and $K^+$, respectively. Also see Table 2 for measured values. All the $H^+$ and $K^+$ measurements are performed in 0.1 M HCl and 0.1 M KCl, respectively.

Using a graphene thickness of t=0.68 nm [36], approximating tears as having diameter $D_{tear}=0.2$ µm with a=0.11% areal coverage, and choosing $\overline{D}=0.8$ Å results in an $H^+$ conductance of 1.7 S cm$^{-2}$ (which agrees well with the experimentally measured value of ~1.74 S cm$^{-2}$) and $H^+/K^+$ selectivity of 36.4, matching the measurements (FIG. 10). This result corresponds to a defect areal density of n=3.3× $10^{10}$ cm$^{-2}$, similar to prior reports of graphene intrinsic defect densities [58, 75]. Only $1.2 \times 10^9$ cm$^{-2}$ of these defects are larger than helium (0.26 nm), consistent with the high quality of CVD graphene on these membranes as confirmed by the etch test. Although these very small defects would be impermeable to water and helium, and therefore perhaps not even counted as defects in other membrane applications, these defects would be proton permeable. The conductance of the pristine graphene lattice cannot explain the measured conductance of large area graphene: proton conduction through small defects does contribute significantly to transport.

However, conductance through small defects cannot entirely explain the transport. If tears were excluded from the model (a=0), the density of defects larger than $D_c$ would need to be ~100 times higher than measured by the etch test to match the measured conductances. This supports the supposition that tears contribute significantly to the conductances measured through larger area graphene. It further indicates that the $H^+/K^+$ selectivity in large area graphene could be increased significantly by reducing conductance through tears. In the micron-scale experiments, it was possible to isolate tear-free areas of graphene. Furthermore, defects in the graphene are not evenly spaced, as suggested by the etch test (FIG. 12), instead having some clusters of higher defect density, e.g., along wrinkles. This makes it possible to suspend low defectivity micron-scale areas of graphene and measure conductance through the graphene lattice.

The same graphene pore and tear densities, pore and tear size distributions, and conductance model can also explain the PCTE+graphene+ interfacial polymerization+Nafion measurements. In this case, the Nafion is prepared in a different way, through a dip coating and curing process, resulting in a different thicknesses, conductivities, and H⁺/K⁺ selectivities of the Nafion. Rather than defining several parameters to account for each of these structural complications in the measurements in FIG. 17-FIG. 19, the PCTE+graphene+ interfacial polymerization+Nafion measurement is focused on, for which defects in the membrane and Nafion have been adequately sealed to provide selective ion transport. Since the graphene growth recipe was the same as for the Nafion 212|graphene|Nafion 212 membranes, the same pore size distribution (D), pore density (n), tear area fraction (a), and tear size ($D_{tear}$) as found for that membrane were assumed. The H⁺ conductivity ($\sigma_{H+}$) in the vicinity of the graphene is selected to match the measured PCTE+graphene+ interfacial polymerization+Nafion conductivity and $\sigma_{K+}$ is chosen such that $\sigma_{H+}/\sigma_{K+}$ matches the measured PCTE+ interfacial polymerization+Nafion selectivity of 15.9. For conductivities in the vicinity of the graphene of $\sigma_{H+}$=1.7 S m⁻¹ (similar to the value of 1.6 S m⁻¹ found for the Nafion 212|graphene|Nafion 212 membrane) and $\sigma_{K+}$=0.11 S m⁻¹, the conductance model predicts an overall PCTE+graphene+ interfacial polymerization+Nafion H⁺ areal conductance of 1.9 S cm⁻² (which agrees well with the experimentally measured value of ~1.85 S cm⁻²) and H⁺/K⁺ selectivity of 24.5, matching the measurements. The ability to explain both the Nafion 212|graphene|Nafion 212 and PCTE+graphene+ interfacial polymerization+Nafion measurements using the same graphene pore and tear densities and distributions serves as further validation for the conductance model and supports the conclusion that tears contribute significantly to conductances measured through centimeter-scale graphene.

Both tears and defects contribute appreciably to the measured conductance. With the low defect density of the CVD graphene, the measured conductances would not be as high without tears present. Similarly, ion selectivity above that of the bare Nafion would not be observed without sub-nanometer ion sieving (proton selective) defects in the graphene. Although a number of approximations have been made in this analysis, the modeling shows that tears over a small fraction of the graphene area are responsible for the orders of magnitude differences in ion conductance measured between micron- and centimeter-scale areas of CVD graphene.

Conclusions. In conclusion, proton transport through atomically thin monolayer CVD graphene was systematically studied at the micron (within a graphene domain) and centimeter (across multiple domains) scales. Larger defects (~1.6-50 nm) and tears (>50 nm) were found to contribute significantly towards the observed increase in areal proton conductance to ~1735 mS cm⁻² for the centimeter scale graphene membranes in comparison to the proton conductance of ~4.5-6 mS cm⁻² for micron scale graphene membranes. The corresponding increase in the areal conductance for K⁺ ions (the smallest ion with a hydrated diameter of ~0.66 nm) from ~1.7 mS cm⁻² (micron scale) to ~47.6 mS cm⁻² (centimeter scale) confirms the presence of defects for the centimeter scale CVD graphene transferred onto Nafion to form the graphene sandwich membrane. The contribution of larger defects and tears towards the proton conductance were deconvoluted by transferring graphene onto a well-defined porous PCTE support wherein tears and larger defects can be successfully isolated and sealed via interfacial polymerization (IP), thus minimizing their contribution. Atomically thin CVD graphene membranes supported on PCTE show areal proton conductance of ~3703 mS cm⁻² in comparison to an areal proton conductance of ~1848 mS cm⁻² for graphene on PCTE after sealing defects and tears via interfacial polymerization. A resistance-based transport model was developed that is able to explain the observed conductance for Nafion sandwich membranes as well as graphene on PCTE and an ~0.11% areal fraction of nonselective larger defects and tears as well as sub-nanometer scale proton selective intrinsic defects was estimated to be responsible for the measured H⁺ and K⁺ conductance values resulting in selectivity (ratio of H⁺/K⁺ conductance) of ~14.2 for centimeter scale Nafion 212|graphene|Nafion 212 membranes and ~24.5 for PCTE+graphene+ interfacial polymerization+Nafion membranes. It is emphasized that the thickness of the PCTE+graphene+ interfacial polymerization+Nafion membrane is ~14 μm and yet it shows a superior ionic selectivity of ~24.5 compared to ~100 μm thick Nafion 212||Nafion 212 with an ionic selectivity of ~8.8, while still maintaining comparable proton conductance. Finally, this work provides a new framework to test and evaluate H⁺ conductance and selectivity of atomically thin 2D materials and highlights the importance of intrinsic sub-nanometer defects in selective proton permeation through large-area atomically thin graphene membranes for transformative applications in energy conversion/storage and separations.

Supporting Information

Limiting current for small scale. Based on the diffusion of protons, the limiting current for a 2 μm diameter can be estimated as, $$I_{limiting} = 4nFDC_o r$$

where n is the charge on the species involved in the process, F is the Faraday constant ~96485.3 C/mol, D~9.31×10⁻⁹ m²/s is the diffusion constant for protons [76] in aqueous solution, $C_o$ is the bulk proton concentration (e.g. 0.1 M HCl) and r is the radius (1 μm) of exposed area to the solution. The resulting limiting current ~0.4×10⁻⁸ A is ~50× larger than measured values for small scale suspended graphene membranes, indicating CVD graphene limits proton transport.

Lower current limit of the small-scale set-up. A leakage current of ~1-3 pA was measured at an applied potential of 1 V for a $SiN_x$/Si chip with no aperture (FIG. 24), providing the lower limit of the set-up, indicating that the measured currents are above the leakage current of the set-up.

Figure 25:
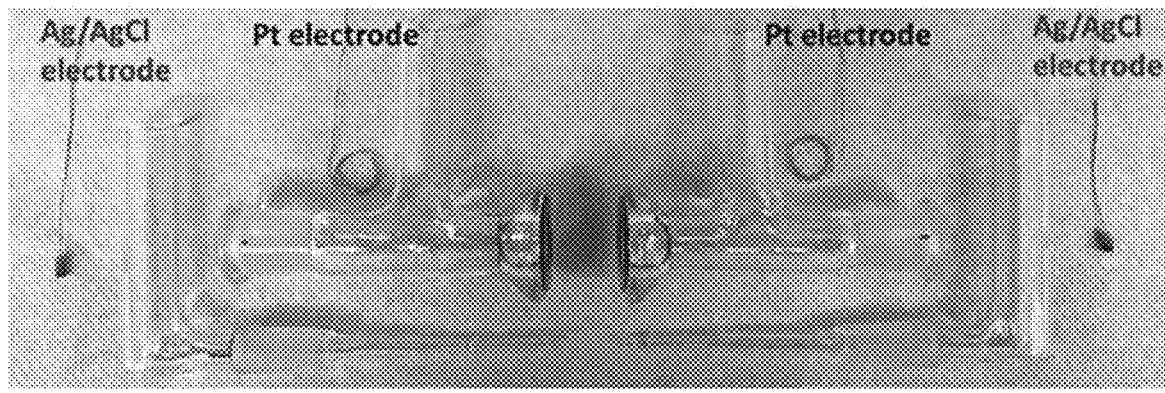
FIG. 25. Custom made H-cell with electrodes.
Figure 26:
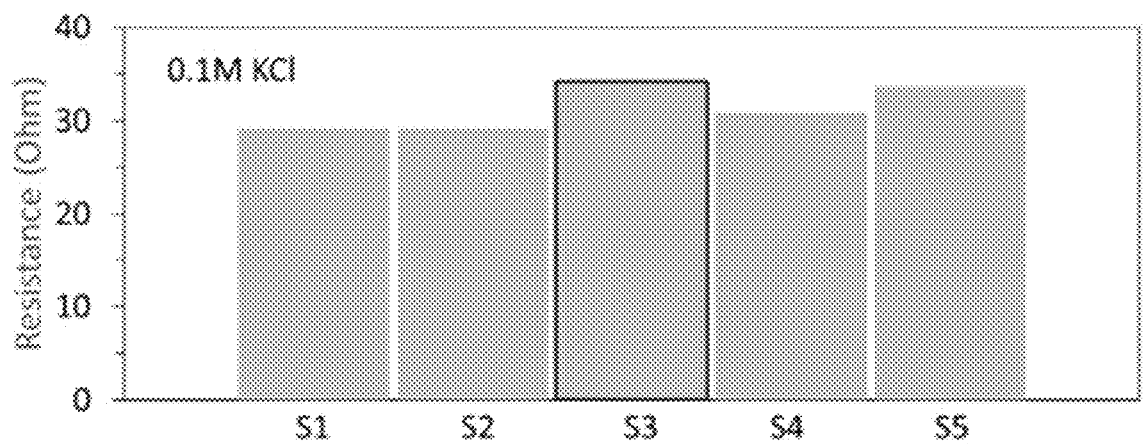
FIG. 26. Resistance of K$^+$ for different Nafion 212||Nafion 212 sandwich membranes in 0.1 M KCl. Sample #S3 was pretreated with sulfuric acid before converting it to K$^+$-form.

Nafion control membranes: Nafion 212||Nafion 212-K⁺ sandwich membrane measurements. FIG. 25 shows the custom-made H-cell cell used for the ionic conductivity measurements. Different control samples were tested for the ionic conductivity measurements as shown in FIG. 26. Samples S1 to S5 represent control Nafion 212||Nafion 212-K⁺ sandwich membranes prepared using Nafion, Nafion 212 converted into K⁺ form from their initial, as received H⁺ form. Nafion 212 (single ply) was converted to K⁺ form from their as received H⁺ form without any pretreatment as described in the main text except sample S3 which was pretreated by soaking in 0.1 M $H_2SO_4$ at 80° C. for 1 h, followed by washing in DI water at 80° C. for 1 h before being converted to K⁺ form via soaking in KCl solution.

Figure 27:
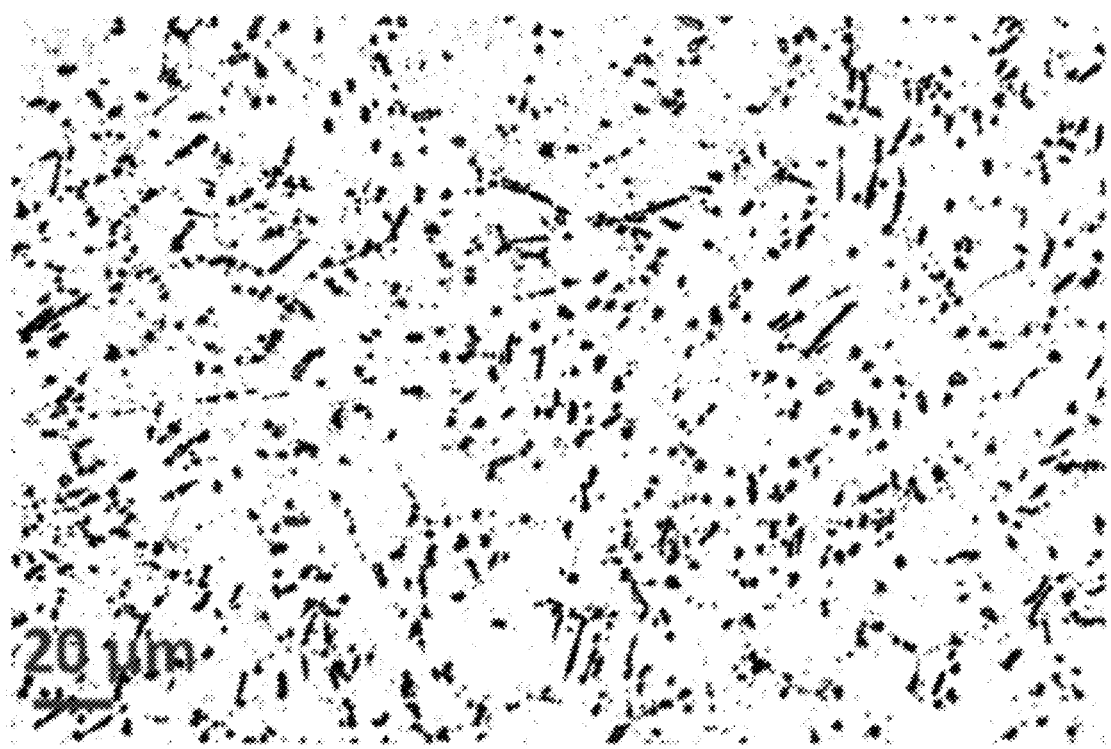
FIG. 27. ImageJ analysis of defect density using the SEM images of etch test (performed in 0.1 M FeCl$_3$ for 5 s) from FIG. 11.
Figure 28:
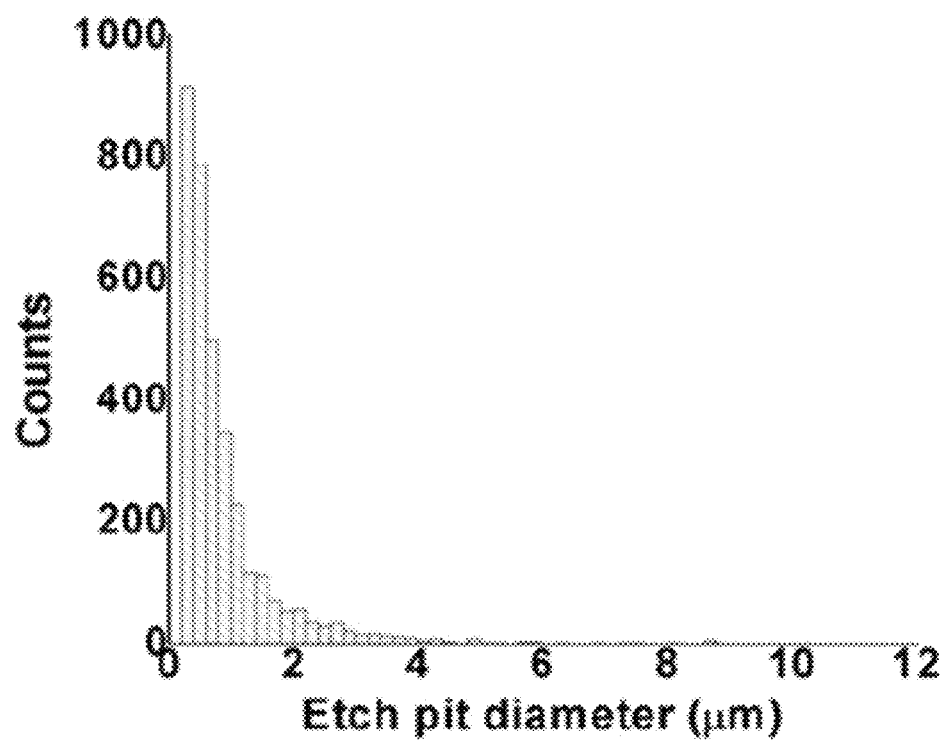
FIG. 28. Etch pit density distribution extracted from SEM images of graphene Cu after electrochemical etch test (1 V, 1 s in 0.5 M CuSO$_4$ solution) using ImageJ color thresholding method.

Etch test of Graphene on Cu foil (Graphene/Cu). FIG. 27-FIG. 28 presents the ImageJ analysis of the etch test for the graphene/Cu using 0.1 M $FeCl_3$ for 5 s. Total area of the analyzed figure is ~235.9×165.27 μm² and total count of etch pits are ~2790. Assuming each etch pit corresponds to a defect the number of defects/cm² is ~7.1×10⁶.

Figure 29:
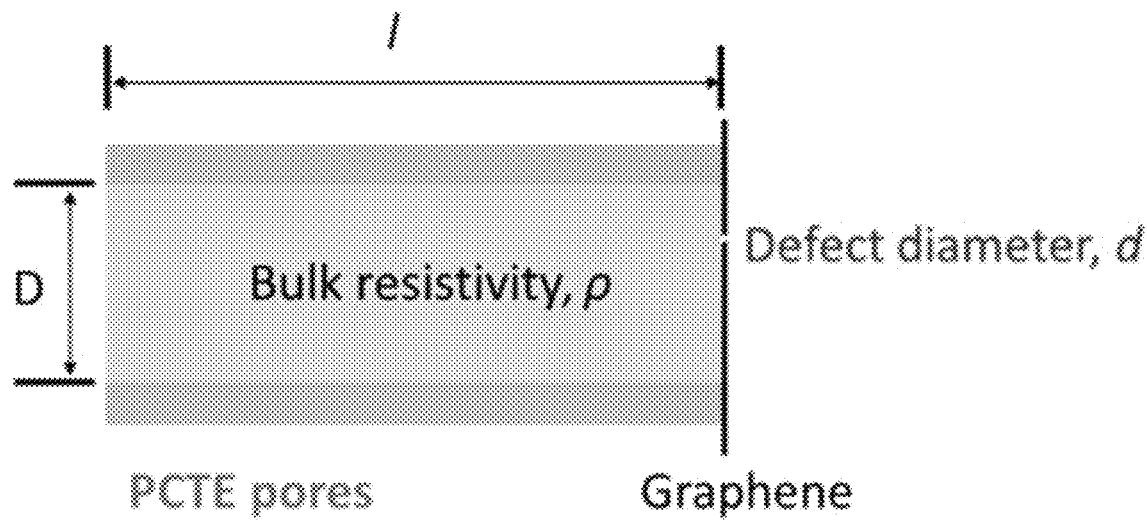
FIG. 29. Schematic of graphene suspended on a single PCTE support pore with a defect of diameter (d).

Estimation of an equivalent defect size with conductivity similar to that of an open PCTE support pore. The ~10% porosity of the PCTE support can be used to isolate larger defects and tears in the graphene. Consider a single 200 nm diameter pore of the PCTE with graphene suspended over it (FIG. 29). The presence of a defect in this supported graphene can result in increased ionic conductivity and decreased selectivity ($H^+/K^+$) compared to pristine graphene.

The size of a defect in graphene that equates the resistance of a single 200 nm PCTE pore was estimated by considering the access hall resistance. A defect size smaller than the estimation will provide significant resistance to ionic flow.

Assuming the pore resistivity to be same as bulk solution resistivity, the bulk resistance of a single PCTE pore, $R_{PCTE\ pore}$ can be written as $$R_{PCTE\ pore} = \left(\rho * \frac{l}{A}\right) \quad (10)$$

where, $\rho$, l and A are bulk resistivity of electrolyte, length of the pore and area of the pore, respectively.

Assuming the defect resistivity to be same as bulk solution resistivity, access Hall resistance from graphene with a defect (of diameter d) suspended on PCTE pore, $R_{Gr}$ can be written as, $$R_{Gr} = \left(\frac{\rho}{2*d}\right) \quad (11)$$

where, $\rho$ is defect pore resistivity and it is assumed to be same as the bulk electrolyte resistivity.

Using additional assumptions such as no presence of surface charge and ionic mobility inside defect being similar to bulk/PCTE pore for simplicity (note the presence of surface charge and distinctly different ionic mobility can lead to a significant deviations in the estimated defect diameter), Equation (10) and Equation (11) were equated, $$\rho \frac{l}{A} = \frac{\rho}{2*d} \quad (12)$$

Hence the equivalent defect diameter, d, is $$d = \frac{\pi * D^2}{8 * l} \quad (13)$$

Using the experimental conditions, l=10 µm (PCTE thickness or support pore length), support pore diameter D=200 nm results in an estimated equivalent defect diameter (d) ~1.6 nm.

Hence, a single defect of ~1.6 nm will show ionic transport characteristic similar to that of an open 200 nm diameter pore of PCTE.

Thickness of PCTE+ interfacial polymerization+Nafion Membrane. A digital micrometer was used to measure the thicknesses of PCTE membranes subjected to interfacial polymerization (IP) and dip coated in Nafion. The measured thickness was ~14±2 µm. Cross-sectional SEM images also thickness ~13.5 µm (see FIG. 30) in agreement with the measured thicknesses from micrometer experiments.

REFERENCES

1. P R Kidambi et al. *Science*, 2021, 374, 7687.
2. O Leenaerts et al. *Appl. Phys. Lett.*, 2008, 93, 193107.
3. J S Bunch et al. *Nano Lett.*, 2008, 8, 2458-2462.
4. M Miao et al. *Phys. Chem. Chem. Phys.*, 2013, 15, 16132.
5. V Berry, *Carbon*, 2013, 62, 1-10.
6. L Tsetseris et al. *Carbon*, 2014, 67, 58-63.
7. M Seel et al. *2D Mater.*, 2016, 3, 025004.
8. S Hu et al. *Nature*, 2014, 516, 227-230.
9. F Banhart et al. *ACS Nano*, 2011, 5, 26-41.
10. A W Robertson et al. *Nanoscale*, 2013, 5, 4079.
11. P Y Huang et al. *Nature*, 2011, 469, 389-392.
12. J L Achtyl et al. *Nat. Commun.*, 2015, 6, 6539.
13. S I Yoon et al. *ACS Nano*, 2018, 12, 10764-10771.
14. X H H Yan et al. *J. Power Sources*, 2016, 311, 188-194.
15. J Liu et al. *ACS Nano*, 2019, 13, 2094-2102.
16. M Lozada-Hidalgo et al. *Nat. Commun.*, 2017, 8, 15215.
17. S Bukola et al. *J. Am. Chem. Soc.*, 2018, 140, 1743-1752.
18. R N Karnik, *Nature*, 2014, 516, 173-174.
19. P R Kidambi et al. *Nanoscale*, 2017, 9, 8496-8507.
20. X Xu et al. *Sci. Bull.*, 2017, 62, 1074-1080.
21. T Kobayashi et al. *Appl. Phys. Lett.*, 2013, 102, 023112.
22. PR Kidambi et al. *ACS Appl. Mater. Interfaces*, 2018, 10, 10369-10378.
23. I V Vlassiouk et al. *Nat. Mater.*, 2018, 17, 318-322.
24. P Cheng et al. *Nanoscale*, 2021, 13, 2825-2837.
25. P Cheng et al. *Nano Lett.*, 2020, 20, 5951-5959.
26. P R Kidambi et al. *Adv. Mater.*, 2017, 29, 1700277.
27. P R Kidambi et al. *Adv. Mater.*, 2017, 29, 1605896.
28. M I Walker et al. *Appl. Phys. Lett.*, 2015, 107, 213104.
29. P Chaturvedi et al. *ACS Nano*, 2019, 13, 12109-12119.
30. E Griffin et al. *ACS Nano*, 2020, 14, 7280-7286.
31. L Wang et al. *Nat. Nanotechnol.*, 2017, 12, 509-522.
32. Z Zeng et al. *Nano Lett.*, 2021, 21, 4314-4319.
33. Y An et al. *Adv. Mater.*, 2020, 32, 2002442.
34. S Bukola et al. *ACS Appl. Nano Mater.*, 2019, 2, 964-974.
35. S Bukola et al. *J. Energy Chem.*, 2021, 59, 419-430.
36. S Garaj et al. *Nature*, 2010, 467, 190-193.
37. T Jain et al. *Nat. Nanotechnol.*, 2015, 10, 1053-1057.
38. M I Walker et al. *ACS Nano*, 2017, 11, 1340-1346.
39. S P Surwade et al. *Nat. Nanotechnol.*, 2015, 10, 459-464.
40. H Qi et al. *Nanoscale*, 2018, 10, 5350-5357.
41. L Cantley et al. *Nanoscale*, 2019, 11, 9856-9861.
42. L Mogg et al. *Nat. Commun.*, 2019, 10, 4243.
43. A Kusoglu et al. *Chem. Rev.*, 2017, 117, 987-1104.
44. C L Bentley et al. *ACS Nano*, 2022, 16(4), 5233-5245.
45. I Vlassiouk et al. *ACS Nano*, 2011, 5, 6069-6076.
46. I Vlassiouk et al. *Carbon*, 2013, 54, 58-67.
47. I Vlassiouk et al. *J. Phys. Chem. C*, 2013, 117, 18919-18926.
48. C Gong et al. *J. Phys. Chem. C*, 2013, 117, 23000-23008.
49. L Lin et al. *Nat. Commun.*, 2019, 10, 1-7.
50. Y C Lin et al. *Nano Lett.*, 2012, 12, 414-419.
51. J D Wood et al. *Nanotechnology*, 2015, 26, 055302.
52. W Xie et al. *Carbon*, 2015, 94, 740-748.
53. X Liang et al. *ACS Nano*, 2011, 5, 9144-9153.
54. M Kratzer et al. *Appl. Phys. Lett.*, 2015, 106, 103101.
55. N Petrone et al. *Nano Lett.*, 2012, 12, 2751-2756.
56. M E Suk et al. *J. Chem. Phys.*, 2014, 140, 1-7.
57. R C Rollings et al. *Nat. Commun.*, 2016, 7, 11408.
58. M S H Boutilier et al. *ACS Nano*, 2014, 8, 841-849.
59. C A Schneider et al. *Nat. Methods*, 2012, 9, 671-675.
60. M Tesfaye et al. *ACS Macro Lett.*, 2018, i, 1237-1242.
61. H C Duhee Yoon et al. *Nano Lett.*, 2011, 11, 3227-3231.
62. A C Ferrari et al. *Nat. Nanotechnol.*, 2013, 8, 235-246.
63. P R Kidambi et al. *Nano Lett.*, 2013, 13, 4769-4778.
64. P R Kidambi et al. *J. Phys. Chem. C*, 2012, 116, 22492-22501.
65. L Wang et al. *Nano Lett.*, 2017, 17, 3081-3088.

66. M S H Boutilier et al. *ACS Nano*, 2017, 11, 5726-5736.
67. P R Kidambi et al. *Adv. Mater.*, 2018, 1804977.
68. S Sanders et al. *Nanoscale*, 2015, 7, 13135-13142.
69. D Perconte et al. *Nat. Phys.*, 2017, 14, 25-29.
70. R Wang et al. *ACS Appl. Mater. Interfaces*, 2016, 8, 33072-33082.
71. P R Kidambi et al. *Appl. Phys. Lett.*, 2015, 106, 063304.
72. C Casiraghi, *Phys. Rev. B: Condens. Matter Mater. Phys.*, 2009, 80, 2-4.
73. Y Liu et al. *Nanotechnology*, 2009, 20, 465605.
74. S J Kwon et al. *Nat. Commun.*, 2018, 9, 1-9.
75. S C O'Hern et al. *ACS Nano*, 2012, 6, 10130-10138.
76. P Vanysek. Ionic Conductivity And Diffusion at Infinite Dilution. In *CRC Handbook of Chemistry and Physics*; CRC Press: Boca Raton, F L, 2000; Vol. 83, pp 76-78

Figure 31:
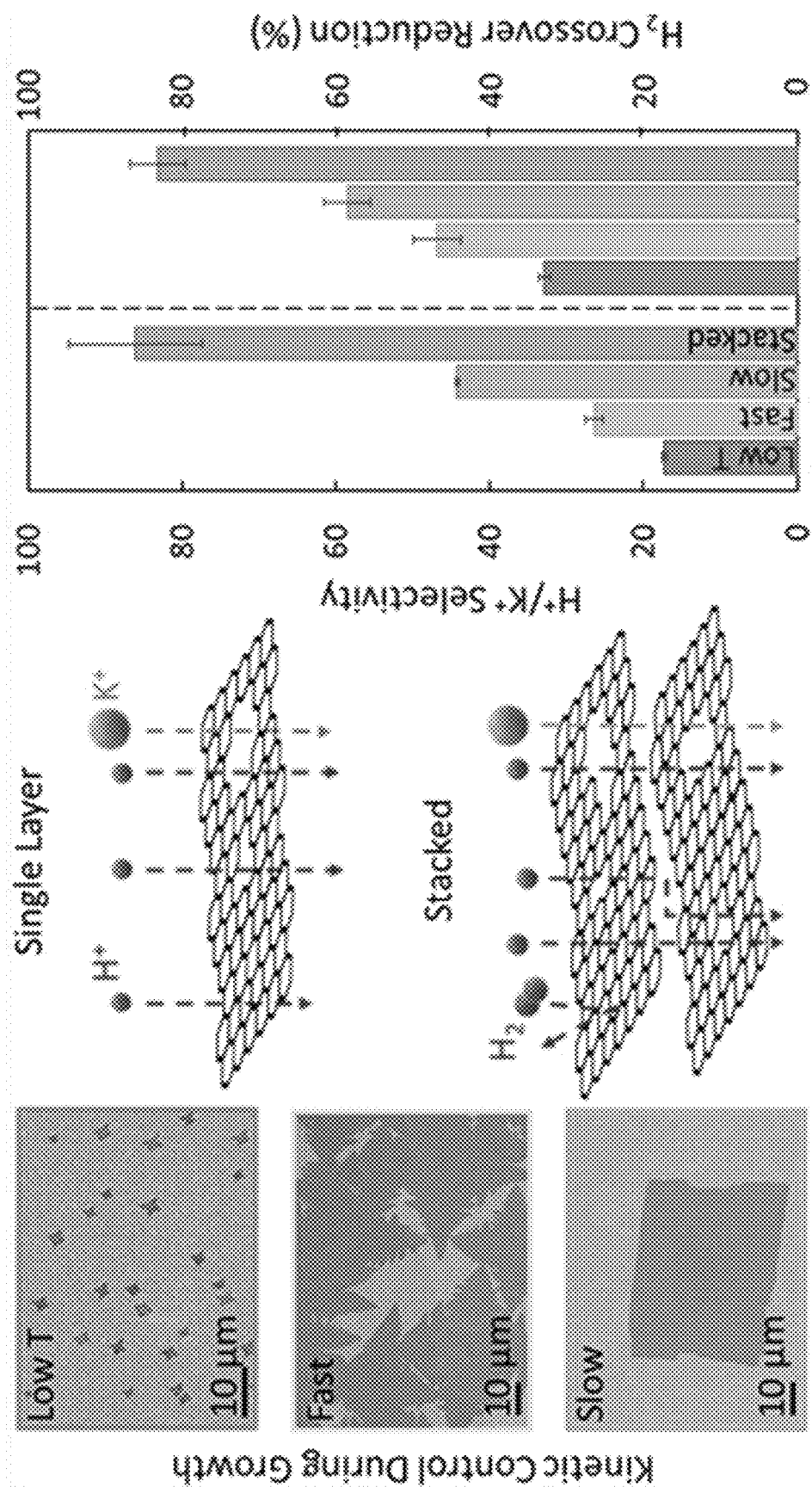
FIG. 31. Kinetic control of scalable chemical vapor deposition (CVD) can allow for direct formation of angstrom-scale proton-selective pores in monolayer graphene with significant hindrance to even small, hydrated ions (K$^+$ diameter~6.6 Å) and gas molecules (H$_2$ kinetic diameter~2.9 Å).

Example 5—Kinetic Control of Angstrom-Scale Porosity in 2D Lattices for Direct Scalable Synthesis of Atomically Thin Proton Exchange Membranes Abstract: Angstrom-scale pores introduced into atomically thin 2D materials offer transformative advances for proton exchange membranes in several energy applications. Here, it is shown that facile kinetic control of scalable chemical vapor deposition (CVD) can allow for direct formation of angstrom-scale proton-selective pores in monolayer graphene with significant hindrance to even small, hydrated ions ($K^+$ diameter~6.6 Å) and gas molecules ($H_2$ kinetic diameter~2.9 Å) (FIG. 31). Centimeter-scale Nafion|Graphene|Nafion membranes with proton conductance ~3.3-3.8 S $cm^{-2}$ (graphene ~12.7-24.6 S $cm^{-2}$) and $H^+/K^+$ selectivity ~6.2-44.2 with liquid electrolytes are demonstrated. The same membranes show proton conductance ~4.6-4.8 S $cm^{-2}$ (graphene ~39.9-57.5 S $cm^{-2}$) and extremely low $H_2$ crossover ~$1.7 \times 10^{-1}$–$2.2 \times 10^{-1}$ mA $cm^{-2}$ (~0.4 V, ~25° C.) with $H_2$ gas feed. These findings are rationalized via a resistance-based transport model and a stacking approach is introduced that leverages combinatorial effects of inter-defect distance and interlayer transport to allow for Nafion|Graphene|Graphene|Nafion membranes with $H^+/K^+$ selectivity ~86.1 (at 1 M) and record low $H_2$ crossover current density ~$2.5 \times 10^{-2}$ mA $cm^2$, up to ~90% lower than state-of-the-art ionomer Nafion membranes ~$2.7 \times 10^{-1}$ mA $cm^{-2}$ under identical conditions, while still maintaining proton conductance ~4.2 S $cm^{-2}$ (graphene stack ~20.8 S $cm^{-2}$) comparable to that for Nafion of ~5.2 S $cm^{-2}$. These experimental insights enable functional atomically thin high flux proton exchange membranes with minimal crossover.

Introduction. Selective and rapid transport of protons presents potential for transformative advances in several energy conversion/storage processes [1]. Proton exchange membranes (PEMs) in particular are expected to play a central role in enabling the hydrogen economy and climate change mitigation efforts by advancing applications such as fuel-cells [2, 3], redox-flow batteries [4], and energy-efficient separations, for environmentally sustainable advances toward decarbonized/clean transportation, electricity grid storage technologies, distributed and mobile auxiliary power generation, among others [1, 5]. Perfluorinated sulfonic-acid polymers, e.g., Nafion and sulfonated polyether ether ketone (SPEEK), currently represent the state-of-the-art conventional proton exchange membranes with proton conductance of ~1-20 S $cm^{-2}$ (depending on temperature and relative humidity) [2, 6-8], but suffer from persistent issues of crossover (leakage of undesired species/reactants) [9, 10], swelling, and softening at high relative humidity (>80%) [2, 3, 6]. The hydration requirements for proton conductance in conventional proton exchange membranes further constrains operating temperatures [2, 5, 6], limiting application potential and exacerbating efficiency losses over the application life-cycle [1, 5, 10].

Here, proton permeation through the atomically thin lattice of 2D materials [11-13] such as graphene (~3 mS $cm^{-2}$) and hexagonal boron nitride (h-BN, ~100 mS $cm^{-2}$) [11], presents potential for transformative advances in proton exchange membranes [1, 14-18]. The pristine graphene lattice represents an ideal proton exchange membrane with a unique combination of atomic thinness [1], proton permeation [11, 19-22], impermeability to small gases (e.g., He and larger molecules) [12, 23], high mechanical strength (breaking strength ~42 N $m^{-1}$; withstands ~100 bar of applied pressure difference) [1, 23, 24], and chemical stability [25, 26]. However, practical proton exchange membrane applications with 2D materials will typically require (i) proton conductance >1 S $cm^{-2}$ (significantly higher than pristine graphene ~3 mS $cm^{-2}$) [1, 11-13, 20, 21, 27]; as well as (ii) the development of scalable 2D material synthesis approaches (e.g., chemical vapor deposition (CVD)) [28-34]; and (iii) facile membrane fabrication processes [32, 34, 35], e.g., by leveraging conventional proton exchange membrane materials to support 2D materials and facilitate their device integration into applications [1, 14-18, 36-41].

The introduction of nanoscale vacancy defects into the atomically thin lattice of 2D materials via approaches such as ion bombardment [27, 42], plasma treatments [27, 43, 44], and oxidative etching [31, 43, 45-47] have been shown to significantly increase selective proton transport to ~0.01-4 S $cm^{-2}$ [27, 44], but the limited scalability of these methods, increased processing steps/costs, and challenges in achieving precise control over defect sizes in the sub-nanometer or angstrom scale hinders advances [1]. For example, Chaturvedi et al. [27] showed that defects created in the 2D lattice via ion bombardment ($Ga^+$ ion bombardment ~15 mS $cm^{-2}$, $He^+$ ion bombardment ~25 mS $cm^{-2}$), or plasma treatment ($H_2$ plasma ~40 mS $cm^{-2}$, $N_2$ plasma ~10 mS $cm^{-2}$) significantly increase proton conductance compared to as-synthesized CVD graphene ~4 mS $cm^{-2}$. Walker et al. [46] also reported an increase in proton conductance upon introduction of defects into the CVD graphene lattice via exposure to $O_3$ at 200° C. (current offset increased from ~0.03 to ~0.25 nA) while maintaining cation selectivity ~31-34 mV/log(M) (compared to an ideal membrane ~58 mV/log(M)). However, the selectivity decreased to ~14 mV/log(M) when larger defects ~1-6 nm were formed by further etching with $KMnO_4$ along with a 4× increase in membrane conductance [46]. While the presence of smaller defects can improve proton transport, large defects can compromise selectivity due to transport of undesired species [25, 26], i.e. hydrated ions with diameter ≥0.7 nm in redox flow batteries [4, 48] or atoms/molecules (e.g., $H_2$~2.9 Å and $O_2$~3.5 Å kinetic diameters) [9, 25].

In this context, scalable cost-effective synthesis of 2D materials via CVD [28-33, 49, 50] and related processes have typically focused on minimizing defects in the 2D lattice and/or minimizing grain boundaries by forming larger domains [1, 33, 51-53] to yield high-quality continuous monolayers for electronic applications. Some studies have explored the synthesis of nanoporous graphene for size-selective membrane applications by using lower CVD synthesis temperature [32, 34], pyrolyzing polymers/sugars on Ni substrate [54], quenched hot Pt foils in hydrocarbons [55] to form nanoporous graphene [22], synthesized monolayer amorphous carbon (MAC) via laser-assisted CVD [56], introduced N dopants into graphene [57]. Notably, Griffin et al. [22] measured enhanced proton transport through micron-scale membranes of nanoporous graphene ~2 S cm$^{-2}$ and monolayer amorphous carbon ~1 S cm$^{-2}$ with H$^+$/Li$^+$ selectivity ~10 for both, while Zeng et al. [57] measured proton conductance of ~1.4×10$^5$ S m$^{-2}$ (1 M HCl) for N-doped graphene (1 min N$_2$ plasma treatment of graphene) with H$^+$/Cl$^-$ selectivity ~40 and H$^+$/methanol selectivity ~1-2 orders of magnitude higher than Nafion. Bukola et al. [38, 39] reported proton conductance ~2-29 S cm$^{-2}$ for CVD graphene (without any additional defect formation steps) and negligible transport of other cations while measuring two distinct centimeter-scale Nafion|Graphene|Nafion sandwich devices, i.e. one for proton transport and another for cation transport. Taken together, the introduction of angstrom-scale proton-selective defects into the lattice of 2D materials can potentially enhance proton permeation but the presence of even a small number of larger defects in the 2D lattice can adversely compromise membrane selectivity and performance. Facile and scalable processes to directly synthesize precise angstrom-scale pores over large-areas in 2D materials particularly for proton exchange membrane applications remains elusive.

Here, it is demonstrated that the growth kinetics of graphene CVD can be leveraged to introduce angstrom-scale proton-selective pores in the graphene for scalable, direct, and facile synthesis of large-area atomically thin high flux proton exchange membranes. Initially, the facile kinetic control of scalable CVD process to introduce angstrom-scale pores in the graphene lattice for direct, bottom-up synthesis of proton exchange membranes is discussed, before proceeding to study transport characteristics of H$^+$ using liquid electrolytes as well as H$_2$ gas as the proton source. Conventional proton exchange membrane polymers are utilized as supports to facilitate device integration of 2D materials and H$^+$ selectivity is evaluated with respect to some of the smallest hydrated ions (K$^+$ and Cl$^-$ ~6.6 Å) as well as the smallest energy relevant gas molecules (H$_2$~2.9 Å), with the rationale of higher or, at the very least, comparable selectivity for other larger ionic/molecular/gaseous species [1, 25].

Results and Discussion

Figure 34:
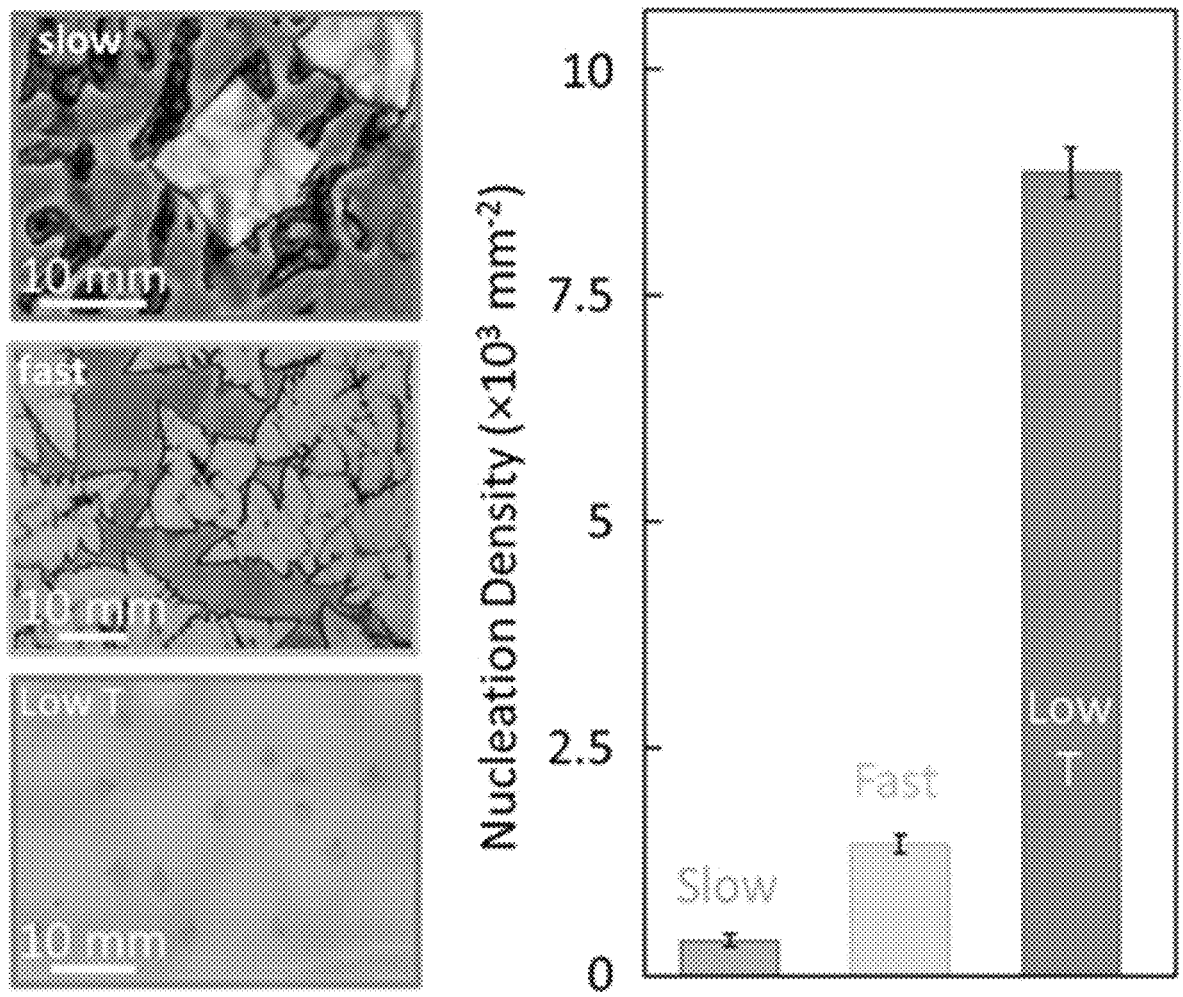
FIG. 34. Optical images of graphene domains on Cu after heating in air at 220° C. for ~15 min shows oxidation of Cu in regions not covered by graphene for slow (~2 min growth time), fast (~30 s growth time), and low T (~30 s growth time). The fast graphene shows oxidation in the center of the domain (darker contrast in optical images) extending into each of the 4 lobes while the slow growth does not. Nucleation density for slow (~2 min growth time), fast (~30 s growth time), and low T (~30 s growth time) growth is obtained by processing optical and SEM images (also see FIG. 76-FIG. 81, Table 4) of graphene domains on Cu foil. All error bars represent one standard deviation.

Kinetic Control of Graphene CVD for Introducing Angstrom-Scale Pores in the 2D Lattice. Initially, the kinetics of the CVD process, that is, nucleation followed by growth of nuclei, is leveraged to modulate the rate of monolayer graphene synthesis on polycrystalline Cu foils [24, 28, 30-34, 49, 50] and varying levels of defects are introduced (FIG. 32-FIG. 36). Specifically, the extremities of the kinetic regime of the graphene CVD process is probed to synthesize three distinct kinds of monolayer graphene (see Experimental Methods, FIG. 32 and FIG. 68-FIG. 70), namely, (i) slow growth—representing slower graphene growth kinetics achieved by using high H$_2$ gas flow into the CVD reactor which reduces the CH$_4$ partial pressure as well as etches defective clusters (carbon atoms attaching to the growing domain in configurations other than the perfect sp$^2$ bonded 2D lattice) attaching to the crystal edge during CVD, thereby slowing the growth rate and allowing for a lower density of defects in the synthesized graphene [58, 59]; (ii) fast growth—representing faster graphene growth kinetics achieved by increasing the CH$_4$ precursor partial pressure by using lower H$_2$ gas flow into the CVD reactor as well as reduced etching of defective cluster attaching to the rapidly growing graphene crystal/nuclei edge during CVD [58, 59]; and (iii) low-temperature growth [31, 32](Low T)—represents a combination of low CVD temperature (lower desorption kinetics) and lower H$_2$ gas flow into the CVD reactor that together allow for increased supersaturation of the catalyst surface resulting in higher nucleation density as well as rapid film growth by a higher propensity of defective cluster attachment at the edges and a significantly higher number of nuclei on the catalyst surface (FIG. 34) [32, 60]. Indeed, the nucleation density of the low T graphene ~8.9×10$^3$ mm$^2$, is significantly higher than the fast (~1.4×10$^3$ mm$^{-2}$) and slow growth (~3.8×10$^2$ mm$^{-2}$) as shown in FIG. 34 [61-63].

The influence of the kinetic extremities in graphene CVD processes can be observed via the graphene nucleation density (FIG. 34) as well as the graphene coverage on the Cu catalyst as a function of time and the shape of the graphene domains (FIG. 32), while defect densities can be evaluated via Raman spectroscopy (FIG. 33), electrochemical etch tests (FIG. 35), and acid etch tests (FIG. 71-FIG. 75). An analysis of SEM images of graphene coverage on Cu (FIG. 32, FIG. 76-FIG. 81, Table 4) after ~5 min of growth shows ~30% (slow), ~100% (fast), and ~53% (low T) coverage, while complete monolayer films are obtained after >45 min (slow), ~5 min (fast), and >15 min (lines are a guide for the eye). The differences in graphene growth rates are attributed to differences in H$_2$ partial pressure and corresponding etching rates as well as differences in nucleation densities (FIG. 34). Lower H$_2$ partial pressures typically resulted in faster graphene growth [59], as seen from the measured pressure~12-13 Torr (slow), ~1-2 Torr (fast), ~1-2 Torr (low T) during CVD. The nucleation, etching, and/or the formation rates at lower temperatures [32, 59, 60, 63, 64] can also be distinctly different than higher temperatures (due to lower precursor dissociation, lower mobility of clusters, etc.), resulting in the growth rate for the low T graphene being slower than the fast growth graphene [61,62]. It is emphasized that whether H$_2$ or impurities in H$_2$ etches graphene on Cu remains unresolved in the literature [65], but for the purposes of this study, H$_2$ gas (99.999% purity) from the same gas cylinder was used for all experiments to ensure consistency in the experiments.

Figure 32:
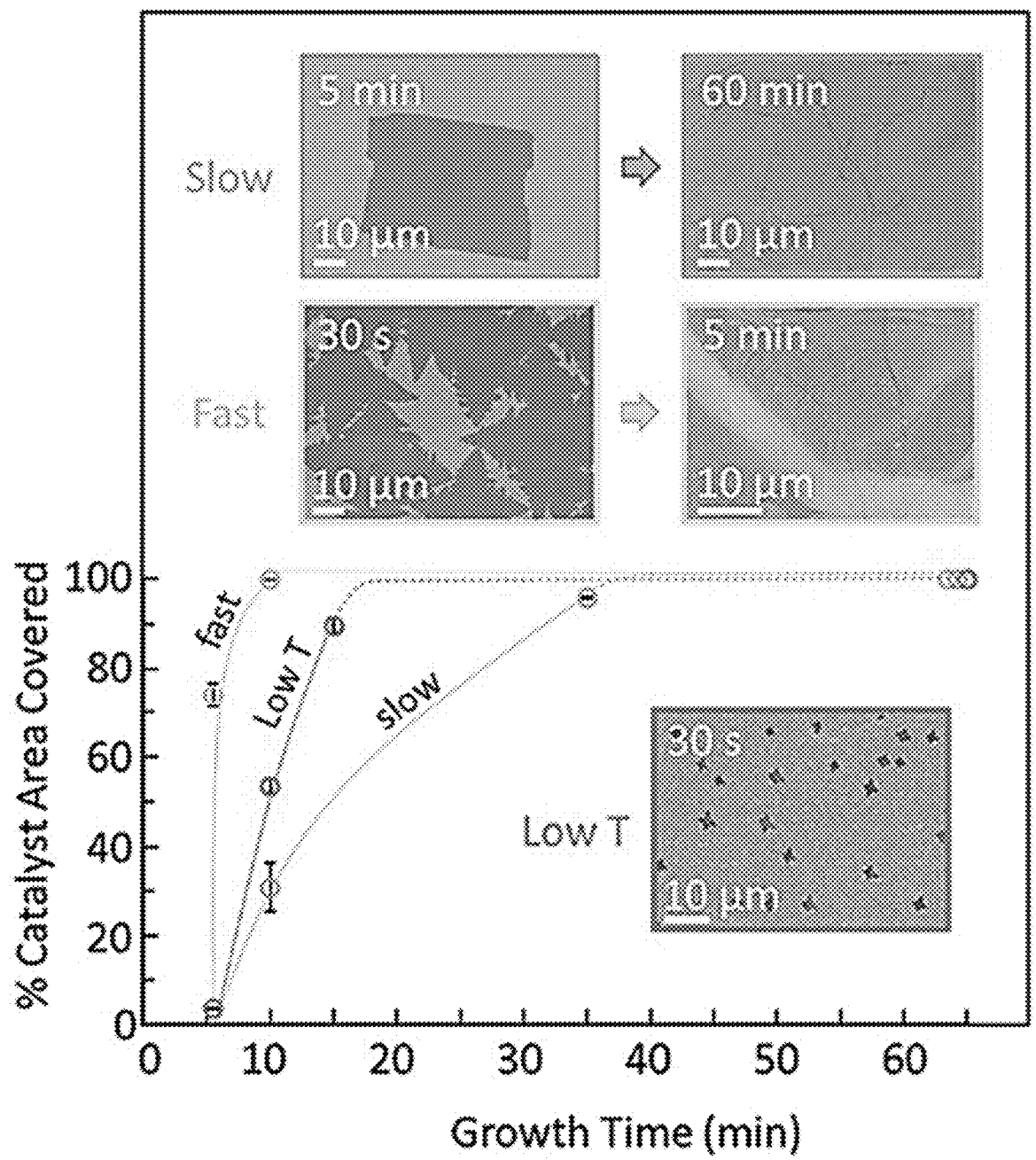
FIG. 32. Graphene coverage of Cu catalyst foil as a function of time for slow (green), fast (yellow) and low T (blue) graphene representing extremities of the kinetic regime for CVD growth. Note the dotted lines are just a guide for the eye. Inset SEM images show differences in graphene domain shape as well as time required for attaining continuous films (identified via the presence of wrinkles in SEM images). All error bars represent one standard deviation.
Figure 33:
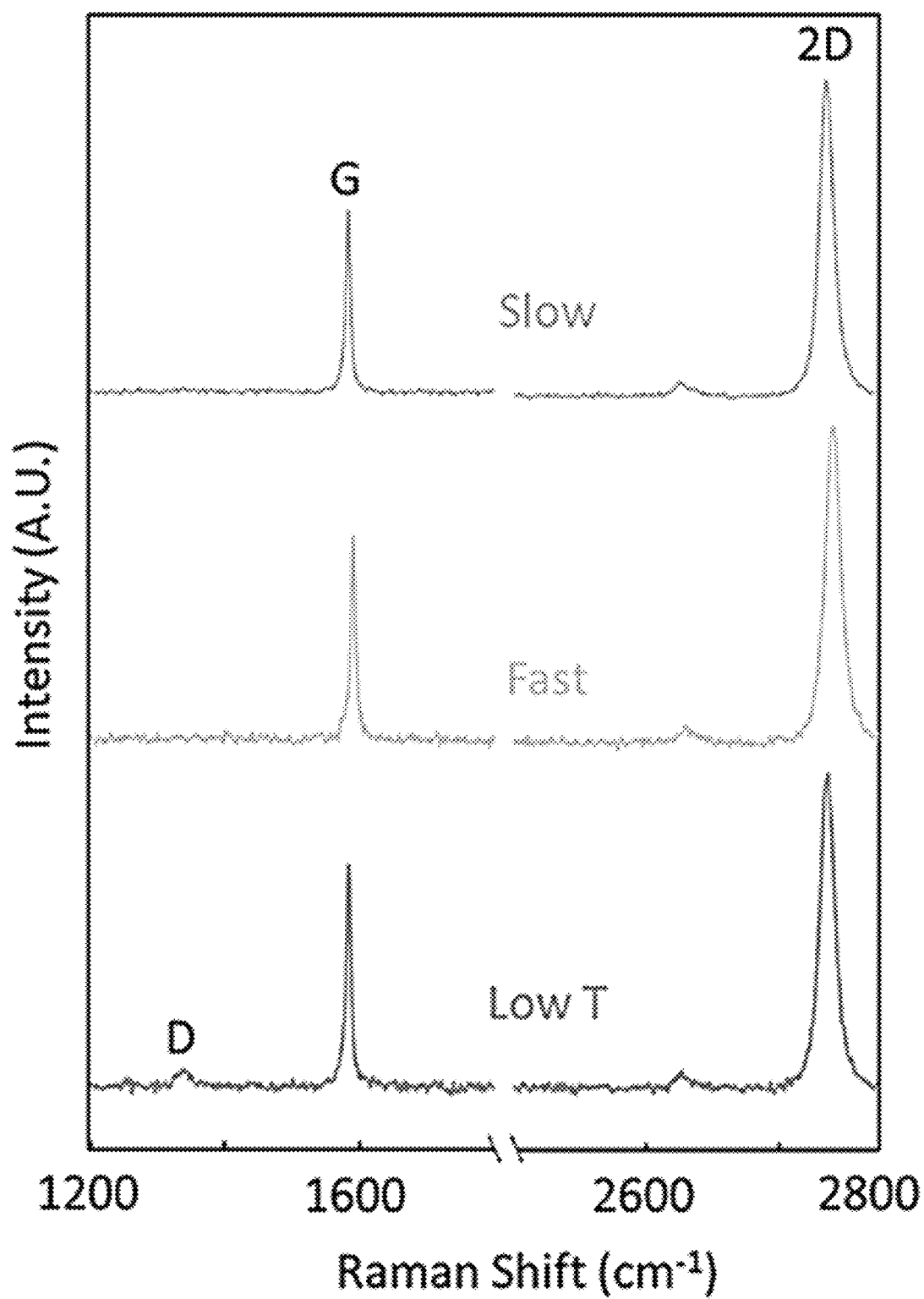
FIG. 33. Raman spectra for slow, fast, and low T graphene after transfer to 300 nm SiO$_2$/Si wafer. Only the low T graphene shows a noticeable D peak at ~1350 cm$^{-1}$.

In addition to differences in the growth rates, the graphene domain shapes also provide insights into the growth kinetics (FIG. 32, FIG. 34). The slow growth domains have smooth edges indicative of enhanced etching at the graphene domain edges [59, 64, 66], while the fast growth graphene shows four-lobed graphene domains with dendritic edges due to the lower etching as well as faster attachment/propagation of adatom clusters along the crystallographic directions of the lobes [67, 68].

Oxidation of the graphene domains on Cu serves as a qualitative indicator of differences in graphene quality since the oxidation of the Cu is only expected to occur underneath regions not covered by graphene (i.e., underneath defects in graphene) [69]. The fast growth graphene shows oxidation in the center of the domain which then expands outward in the direction of the domain lobes (FIG. 34, optical images). Such oxidation is not observed on the slow growth domains indicating higher quality within the domains. Raman spectra of the synthesized CVD graphene (FIG. 33) confirms monolayer films (2D ~2700 cm$^{-1}$, G ~1600 cm$^{-1}$ and D ~1350 cm$^{-1}$ and I$_{2D}$/I$_G$>1). Only the low T graphene showed a noticeable D peak indicative of defects and is consistent with prior work [31, 32]. Quantitative analysis (I$_D$/I$_G$) shows the defect density of ~0.02 (slow)<~0.04 (fast)<~0.08 (low T), wherein the slow growth graphene showed the highest quality [31, 32, 34, 70]. However, Raman spectroscopy is limited to the spot size of the incident laser (~1 m) and mapping centimeter-scale areas relevant for proton exchange membrane and membrane applications is impractical.

Figure 35:
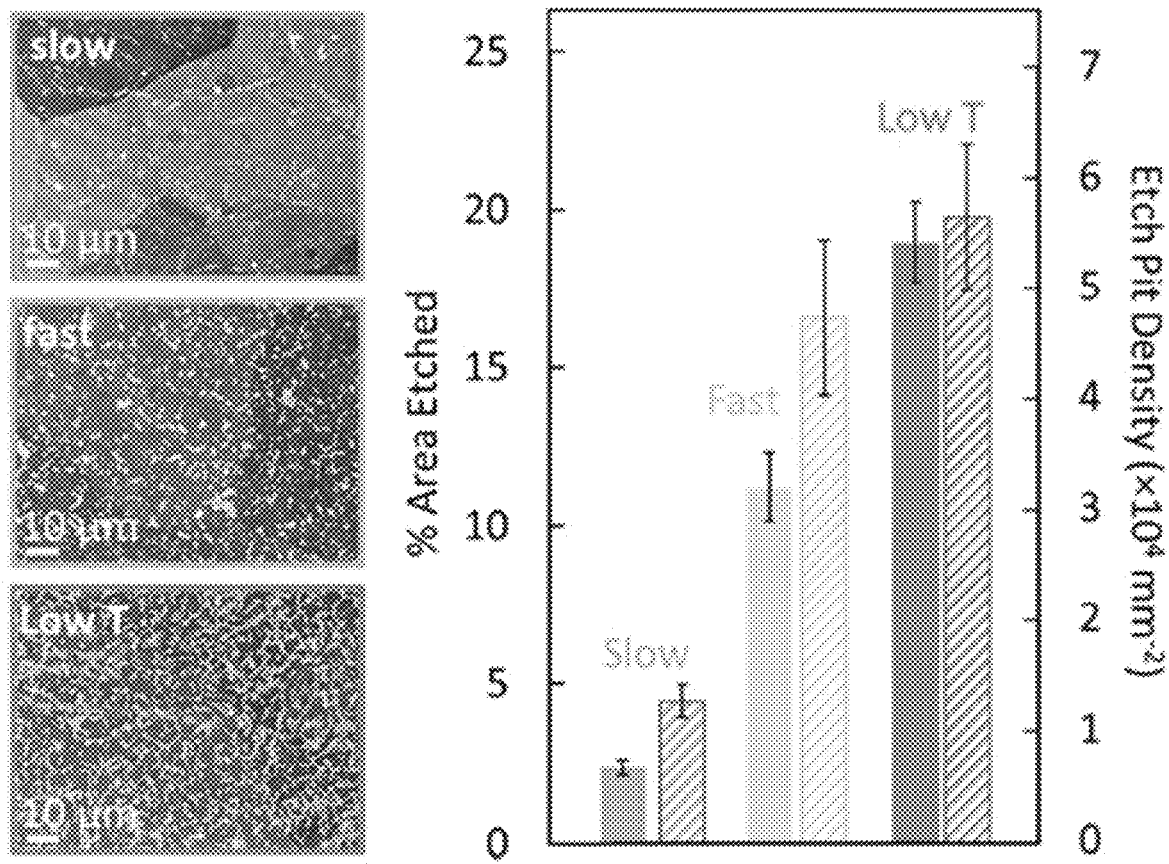
FIG. 35. Representative SEM images for fast, slow, and low T growth graphene on Cu foil after electrochemical etch test (0.5 M CuSO$_4$ solution at 1 V for 1 s) as well as percentage area etched (solid bar, left side Y-axis) and etch pit density (striped bar, right side Y-axis). Bright spots in the SEM images represent etch pits in the Cu formed underneath defects in the continuous monolayer graphene film. The slow growth graphene has the lowest density of etch pits, followed by the fast growth that shows a significant increase while the low T graphene has the highest density of etch pits. Darker regions in the top SEM image (green, slow) correspond to different grains in the polycrystalline Cu foil. All error bars represent one standard deviation.
Figure 36:
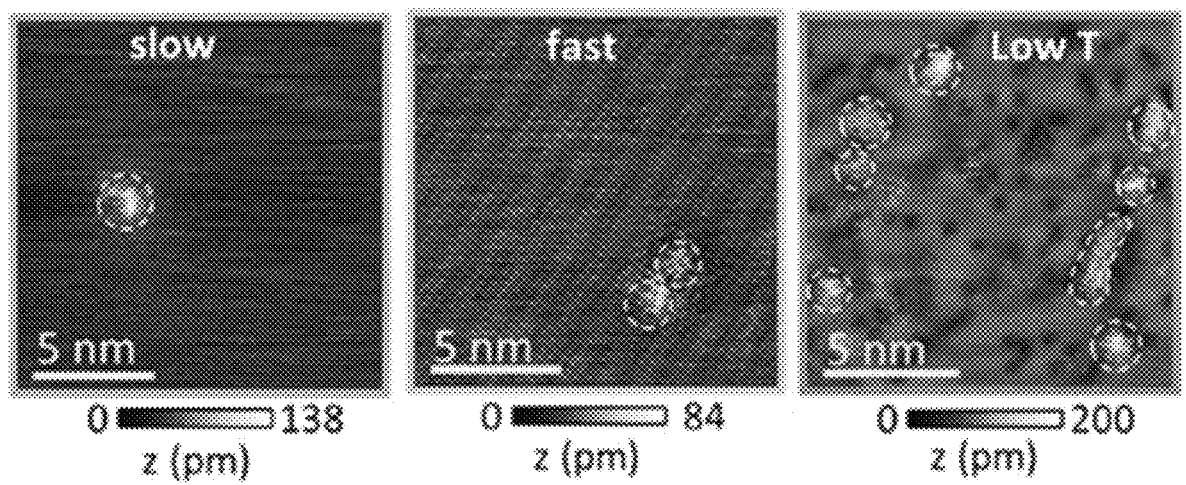
FIG. 36. STM images of nanopores (circled in white) within the lattice of slow (left panel), fast (middle panel), and low T (right panel) graphene, with respective z-scale bars below in pm. Imaging bias V=0.1 V for all images and set point current I=1 nA for slow and fast graphene, and I=0.5 nA for low T graphene. The additional periodic line-like pattern observed for the fast graphene STM image is a Moire pattern between Cu and the graphene lattice.

Hence, electrochemical etch test (see Experimental Methods and FIG. 35) and acid etch test (FIG. 71-FIG. 75) were performed to form etch pits in Cu underneath defects in graphene to obtain insights on graphene quality and defects density over large areas relevant for proton exchange membrane and membrane applications. Etch pits in Cu occurs where graphene defects are ~0.6-0.7 nm in size or larger (limited to the size of the hydrated $Cu^{2+}$ ions which must leave the Cu surface through the defects) [30] and the resulting etch pits appear as bright spots when characterized using SEM (FIG. 35). Assuming each bright spot corresponds to an etch pit that originated from a defect, a defect density (see Experimental Methods and FIG. 35) of ~$1.3 \times 10^4$ $mm^{-2}$ (slow growth, total etched area ~3.2%), ~$4.7 \times 10^4$ $mm^{-2}$ (fast growth, total etched area ~11.2%), and ~$5.6 \times 10^4$ $mm^{-2}$ (low T, total etched area ~18.9%) was calculated. Notably the defect density for the fast growth graphene is found to be in agreement with prior work with CVD graphene (~$3.36 \times 10^4$ $mm^{-2}$) for centimeter-scale atomically thin membranes [30, 39]. A similar trend for defect density i.e. slow<fast<low T is also seen for acid etch test [30] using 0.1 M $FeCl_3$ solution (FIG. 71-FIG. 75). Finally, scanning tunnelling microscopy (STM) is used to directly image and confirm the presence of defects within the lattice of slow, fast, and low T graphene (FIG. 36) that manifest as nanopores in an atomically thin membrane. The defects appear bright due to the increased local density of states by defect sites [71]. Having characterized the defect density qualitatively and quantitatively for each graphene type, transport was investigated next.

Figure 37:
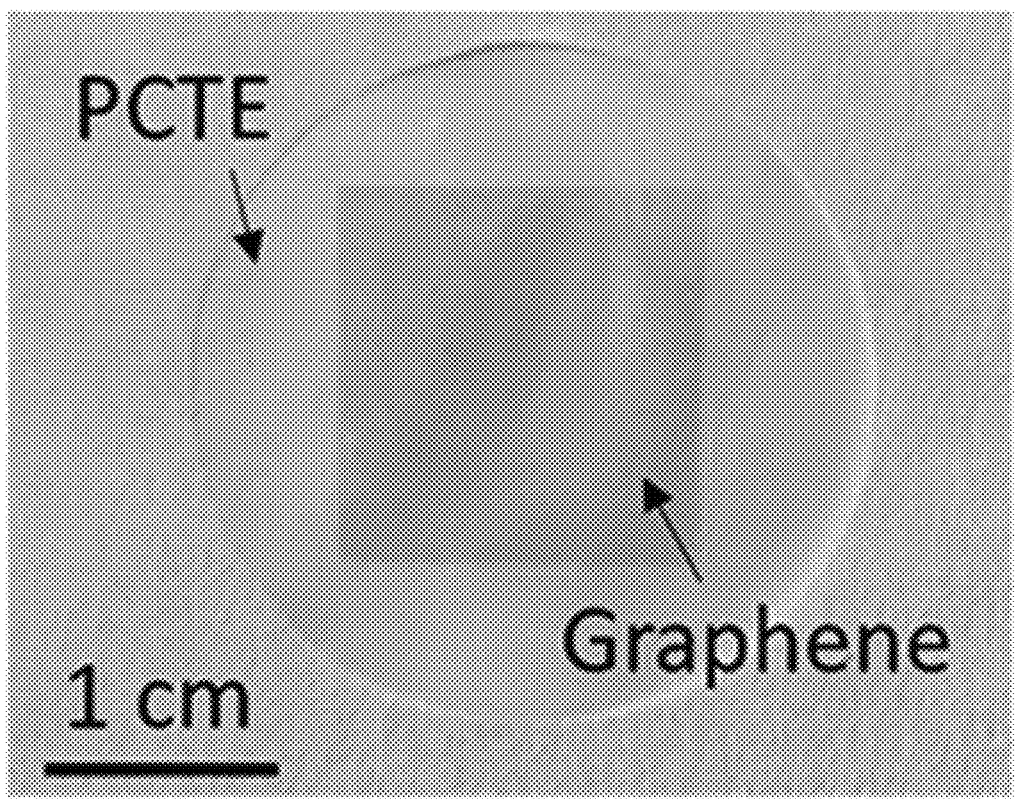
FIG. 37. Optical image of centimeter-scale graphene transferred to polycarbonate track etched (PCTE) supports with ~200 nm pores. Typical transfer yields are >95% (see FIG. 82-FIG. 83) [34].
Figure 38:
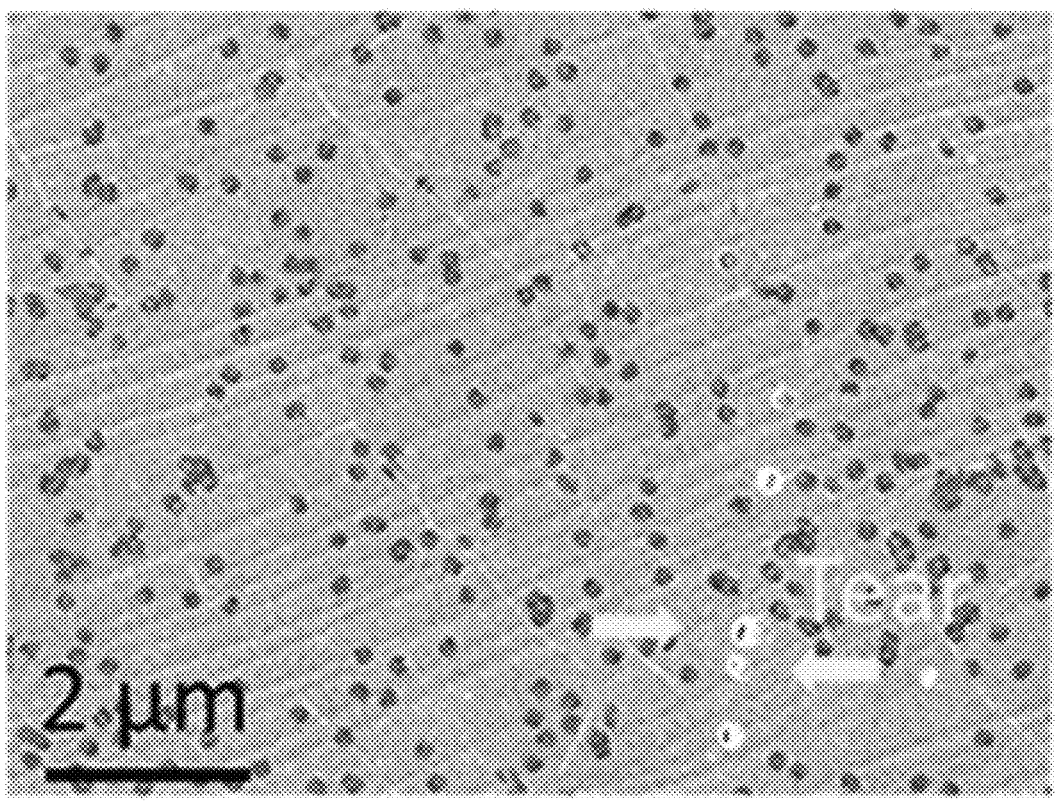
FIG. 38. SEM image of graphene on PCTE shows the majority of PCTE pores are covered by graphene (darker contrast). Tears in the graphene (yellow arrows) result in the uncovered PCTE regions which appear brighter due to polymer charging during SEM imaging.
Figure 39:
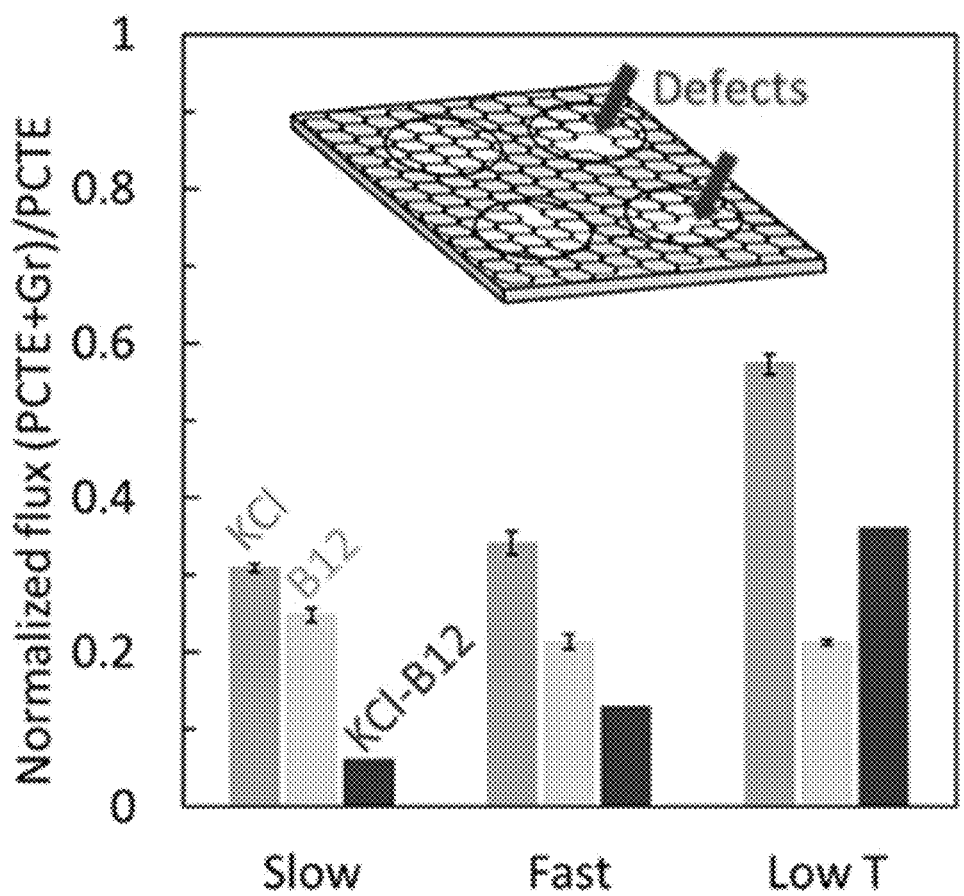
FIG. 39. Normalized diffusive flux for graphene membranes (PCTE+G)/PCTE for KCl (~0.66 nm, gray, left most bar in each section) and Vitamin B12 (~1-1.5 nm, light blue, middle bar in each section) [34]. Differences in normalized flux of KCl and B12 (dark blue, right most bar in each section) indicates the presence of intrinsic subnanometer defects ~0.66-1.5 nm in graphene. The fewest sub-nanometer defects were observed in slow graphene, followed by the fast and then the low T growth graphene. Error bars indicate one standard deviation.

Diffusion-Driven Ionic and Molecular Transport through Atomically Thin Graphene Membranes. Diffusion-driven ionic and molecular transport were utilized to obtain insights on the presence of sub-nanometer scale or angstrom-scale defects (FIG. 37-FIG. 39) over centimeter scale areas in each of the synthesized CVD graphene representing the extremes of the kinetic regime. The synthesized graphene is transferred on to polycarbonate track-etched (PCTE) support with well-defined cylindrical ~200 nm pores [30-34] and diffusion-driven transport of different species (KCl ~0.66 nm, and Vitamin B-12 ~1-1.5 nm) is measured (see Experimental Methods, FIG. 37). The graphene transfer process can introduce some macroscopic tears (SEM image in FIG. 38). Initially such large tears were quantified in graphene using pressure-driven-ethanol transport, that is, tear/defect >50 nm will present similar resistance to ethanol transport as that of a bare PCTE support pore ~200 nm (see Experimental Methods and FIG. 82-FIG. 83) [28, 30, 31]. Having confirmed <5% of tears (graphene coverage on PCTE>95%) for the slow, fast, and low T graphene (FIG. 82-FIG. 83), diffusion-driven transport using aqueous solutions of KCl and B12 were investigated [31,34].

A comparison of the normalized flux (transport through the graphene+PCTE/transport through bare PCTE support) shows normalized KCl flux ~30.8% (slow growth), ~34.1% (fast growth), and ~57.3% (low T) graphene (FIG. 39), indicating the low T graphene has the largest fraction of defects >0.66 nm [31-34]. The normalized B12 flux are ~24.7% (slow growth), ~21.3% (fast growth), and ~21.2% (low T) graphene (FIG. 39) [32]. The difference between the normalized flux of KCl and B12 for each CVD graphene provide insights on the presence of defects between ~0.66 to 1-1.5 nm, and this difference is lowest for slow growth graphene (~6.1%), followed by fast growth (~12.8%), and then low T growth (~36.1%). These observations suggest the slow growth graphene has the fewest number of defects between 0.66 to 1-1.5 nm, while the low T graphene has the most and is fully consistent with the insights on graphene quality via qualitative and quantitative analysis in FIG. 32-FIG. 36, indicating facile kinetic control of the CVD process can indeed allow for the introduction of varying levels of angstrom-scale pores in the graphene lattice. Notably, increased KCl leakage with increasing defect density suggest a relatively uniform distribution of defects within the graphene lattice (considering a uniform PCTE porosity ~10%, PCTE pore diameter~200 nm, and graphene domain sizes in the micron scale, the propensity of grain boundary overlap is minimal), representing an advantage over engineering grain boundaries [72] and is further corroborated via STM images and etch test images in FIG. 32-FIG. 36 and FIG. 71-FIG. 75 that show nanopores within a graphene domain.

Liquid-Phase Electrically Driven Transport through Centimeter-Scale Nafion|Graphene|Nafion Membranes. To investigate the role of angstrom-scale defects on $H^+$ transport and cation selectivity, the graphene was incorporated in proton exchange membranes and electrically driven transport through each of the synthesized CVD graphene in liquid electrolytes was measured. The rationale for sandwiching graphene in between Nafion was to facilitate facile device integration as well as to prevent physical damage to the graphene via abrasion while mounting the proton exchange membranes into the experimental setup. The use of Nafion also serves as effective controls/references to deconvolute transport characteristics of the embedded monolayer CVD graphene.

Figure 40:
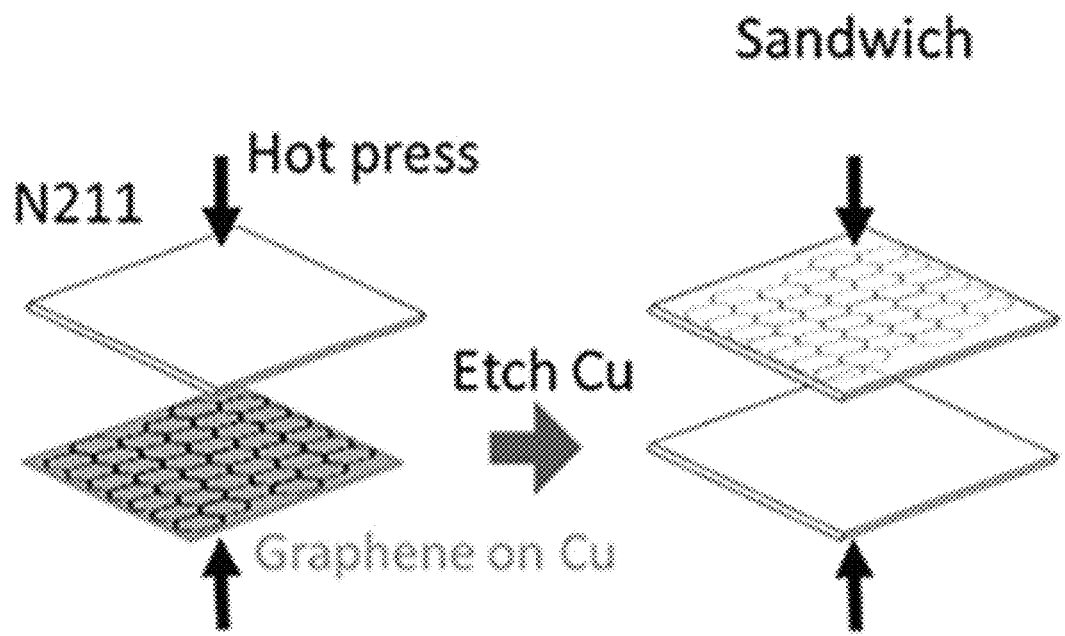
FIG. 40. Schematic of the fabrication process for centimeter-scale N211|Graphene|N211 membranes via hot pressing.
Figure 41:
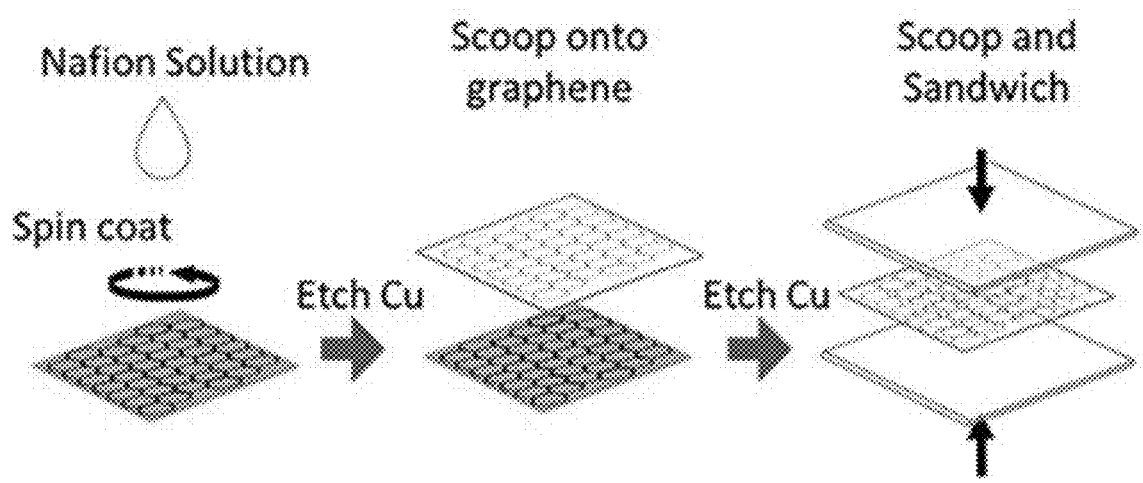
FIG. 41. Schematic of the fabrication process for centimeter-scale N211|Graphene|Graphene|N211 membranes via stacking.
Figure 42:
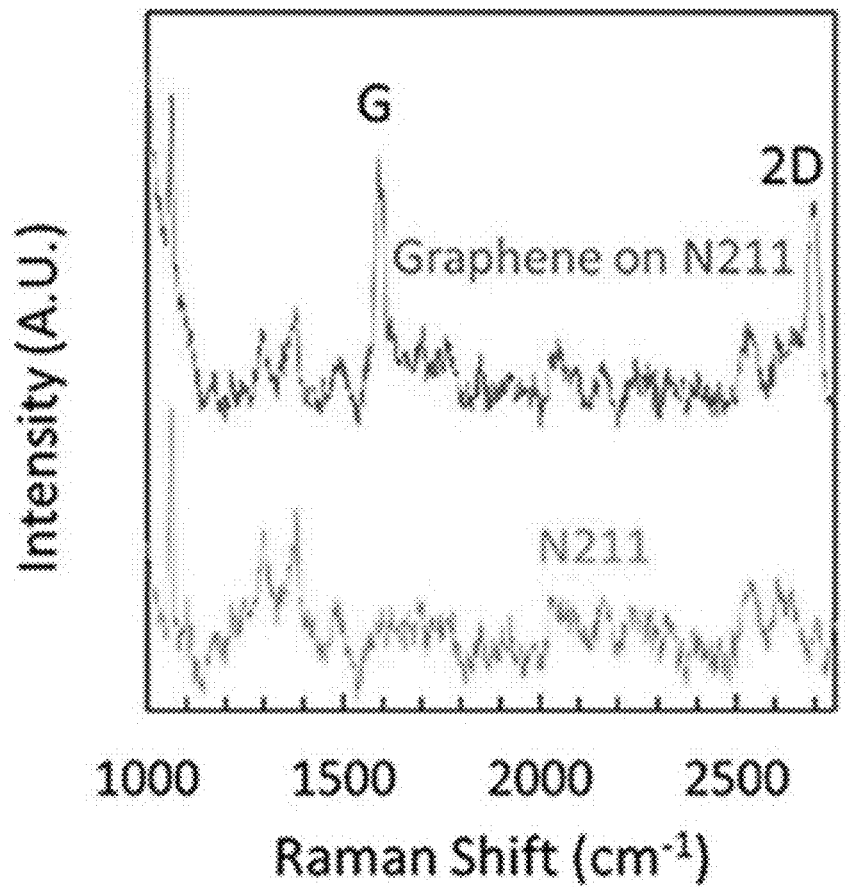
FIG. 42. Raman spectroscopy confirms successful graphene transfer to Nafion 211 via the presence of the characteristic G and 2D peaks.

Centimeter-scale graphene-based proton exchange membranes were fabricated from each of the synthesized CVD graphene by sandwiching them between Nafion 211 (N211, ~20 μm thickness) via hot-press followed by etching of the Cu foil (see Experimental Methods) [38, 39] and electrically driven transport of $K^+$ and $H^+$ was measured using liquid electrolytes (FIG. 40-FIG. 52). Additionally, a facile method was also introduced for stacking two graphene layers via spin coating a thin layer of Nafion and using it to transfer one layer of graphene on to another (see Experimental Methods and FIG. 41). Both methods (FIG. 40, FIG. 41) allow for direct transfer of CVD graphene to N211 without potential influence of contamination from sacrificial polymer transfer processes [35]. Successful large-area graphene transfer is confirmed via optical images that show a region of darker contrast compared to Nafion (see inset in FIG. 43) and graphene characteristic features such as wrinkles observed in SEM images of graphene transferred to Nafion (FIG. 84-FIG. 88). Raman spectroscopy also confirms graphene transfer to N211 with the characteristic 2D and G peaks for graphene (FIG. 42). However, the Raman spectrum for Nafion has several peaks in the region between 1100-1500 $cm^{-1}$ that overlap the region for the graphene D-peak (~1350 $cm^{-1}$) and make $I_D/I_G$ analysis after transfer nontrivial.

Figure 47:
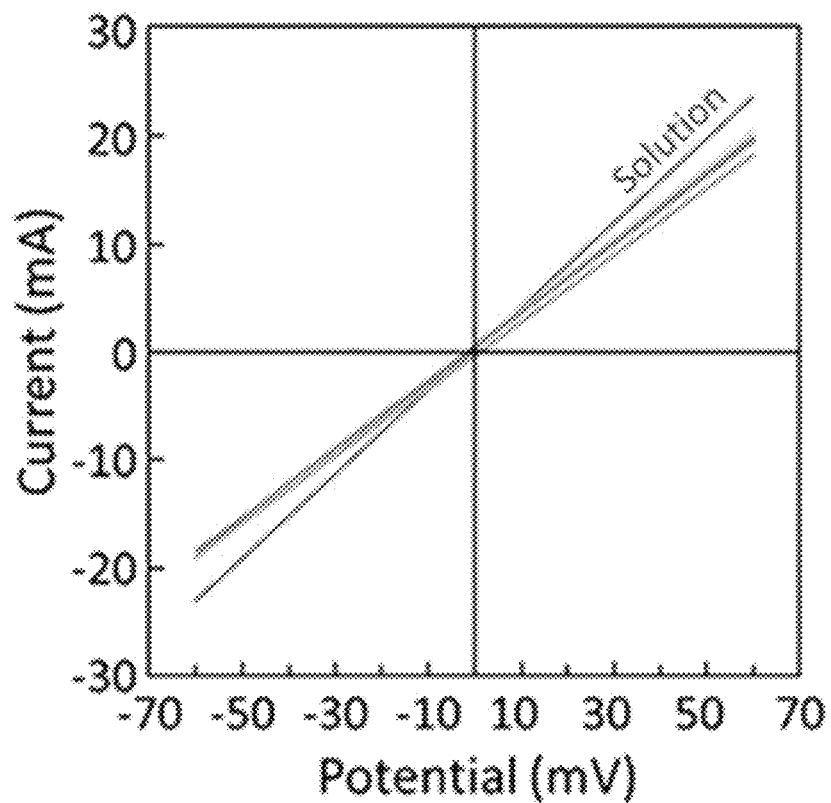
FIG. 47. I-V curves extracted from chronoamperometry measurements (see Experimental Methods and FIG. 90) for slow (green), fast (yellow) and low T (blue) growth graphene sandwich membranes measured in 0.1 M HCl. Note, the 0.1 M KCl measurements were performed using Nafion converted to $K^+$ form and subsequently converted to $H^+$ form for measurements in 0.1 M HCl (see Experimental Methods). Also shown is 2 layers of slow growth graphene (stacked, gray) sandwiched between Nafion 211.
Figure 89:
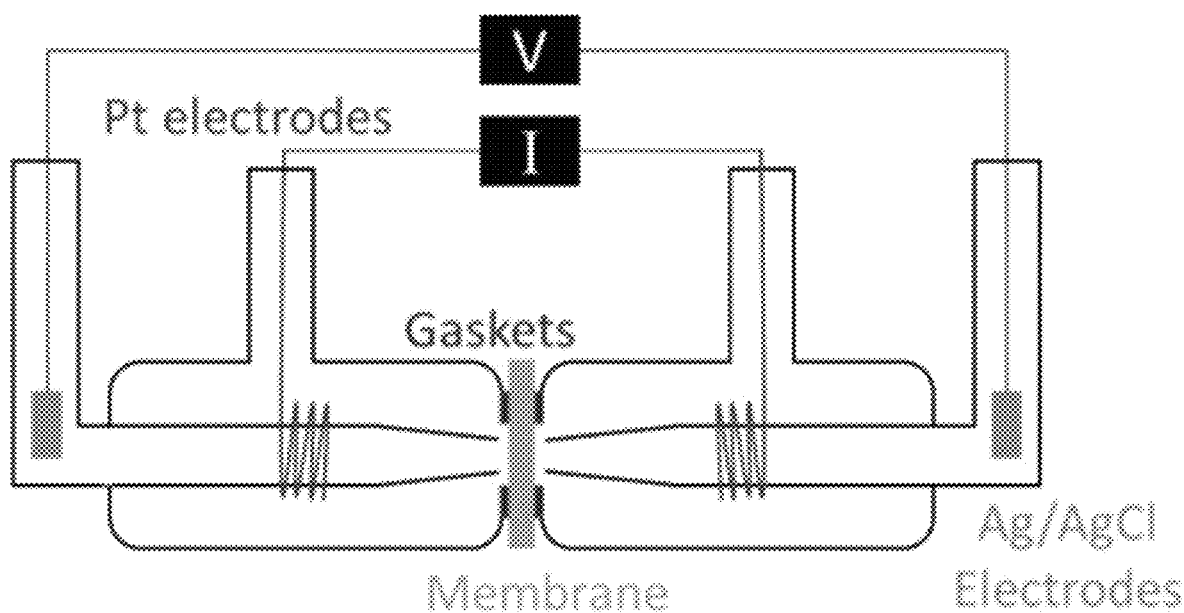
FIG. 89. Schematic of the H-Cell used for liquid phase ion transport measurements.

Having confirmed graphene transfer to N211 and successful fabrication of centimeter-scale graphene-based proton exchange membranes, liquid-phase electrically driven ion transport through the proton exchange membranes was measured in a custom-built H-cell (see Experimental Methods and FIG. 89). The rationale for measuring transport in KCl in addition to HCl is (i) the common anion $Cl^-$, (ii) $K^+$ and $Cl^-$ represents one of the smallest hydrated ions ~0.66 nm in diameter, and (iii) to allow for a comparison with the diffusion-driven flow experiments using KCl in FIG. 39. Current (I) is measured via multiple step chronoamperometry (see Experimental Methods and FIG. 90) and the current at each potential (V) is used to obtain I-V curves for each proton exchange membrane for both KCl (FIG. 43) and HCl (FIG. 47). Measuring $K^+$ and $H^+$ on the same membrane allows effective assessment of the influence of subnanometer scale defects in graphene on proton exchange membrane characteristics (i.e., $H^+$ conductivity and $H^+/K^+$ selectivity).

Figure 43:
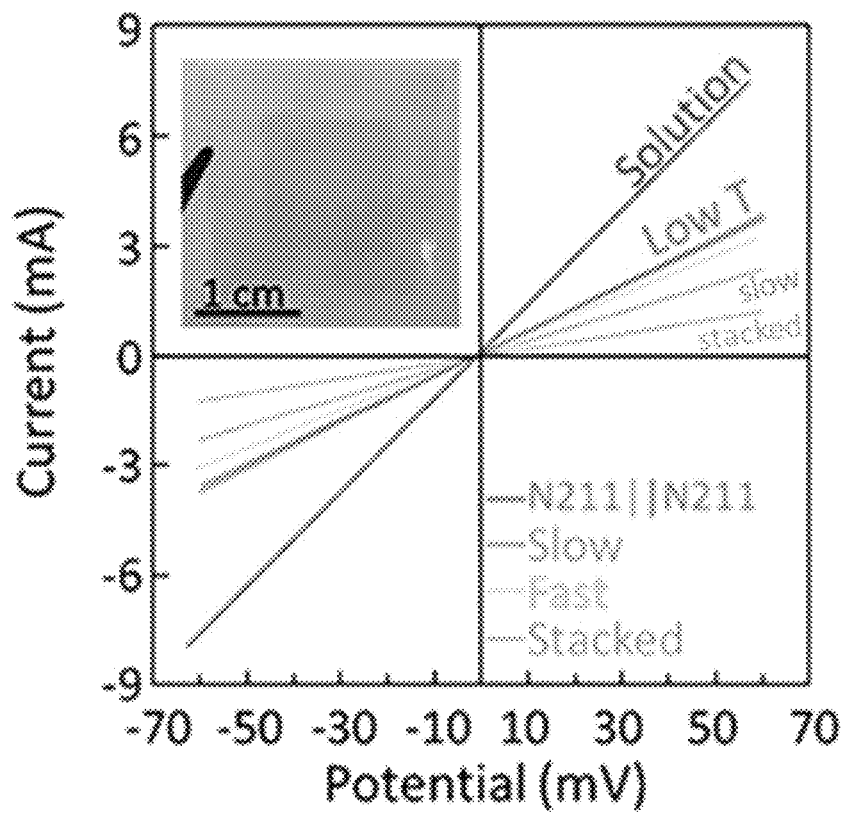
FIG. 43. I-V curves extracted from chronoamperometry measurements (see Experimental Methods and FIG. 90) for slow (green), fast (yellow), and low T (blue) growth graphene sandwich membranes measured in 0.1 M KCl. Note, the 0.1 M KCl measurements were performed using Nafion converted to $K^+$ form and subsequently converted to $H^+$ form for measurements in 0.1 M HCl (see Experimental Methods). Also shown is 2 layers of slow growth graphene (stacked, gray) sandwiched between Nafion 211. Inset shows an optical image of the N211|Graphene|N211 membrane (also see FIG. 84-FIG. 88).
Figure 44:
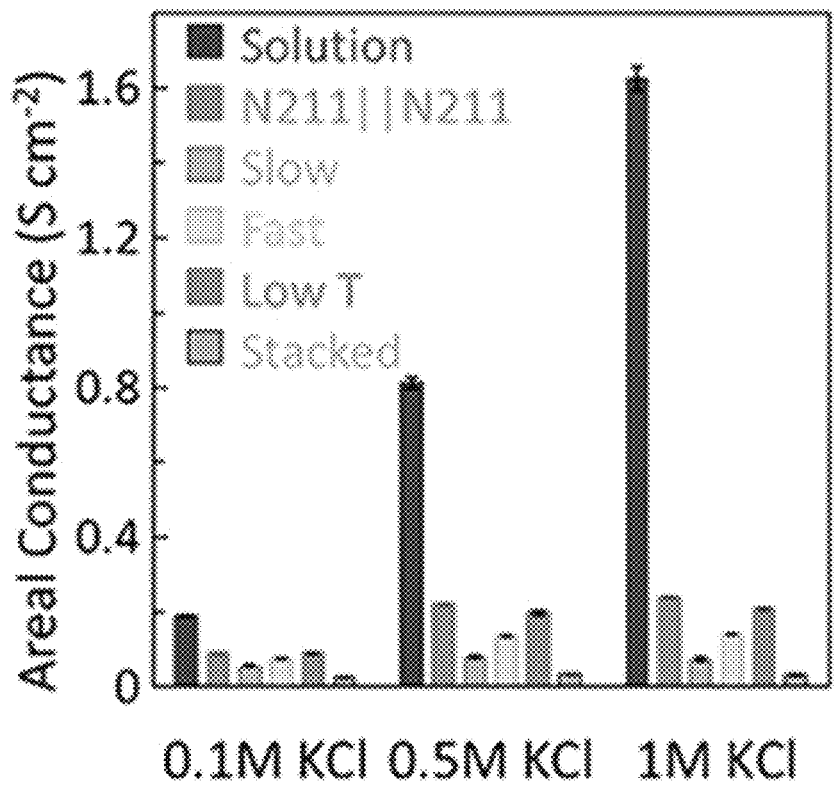
FIG. 44. Areal conductance (calculated from the slope of the I-V curves and dividing by the active area ~0.68 cm$^2$) measured using 0.1 M, 0.5 M, and 1 M of KCl. Error bars represent one standard deviation. Left to right at each concentration: Solution, N211|N211, Slow, Fast, Low T, Stacked.
Figure 48:
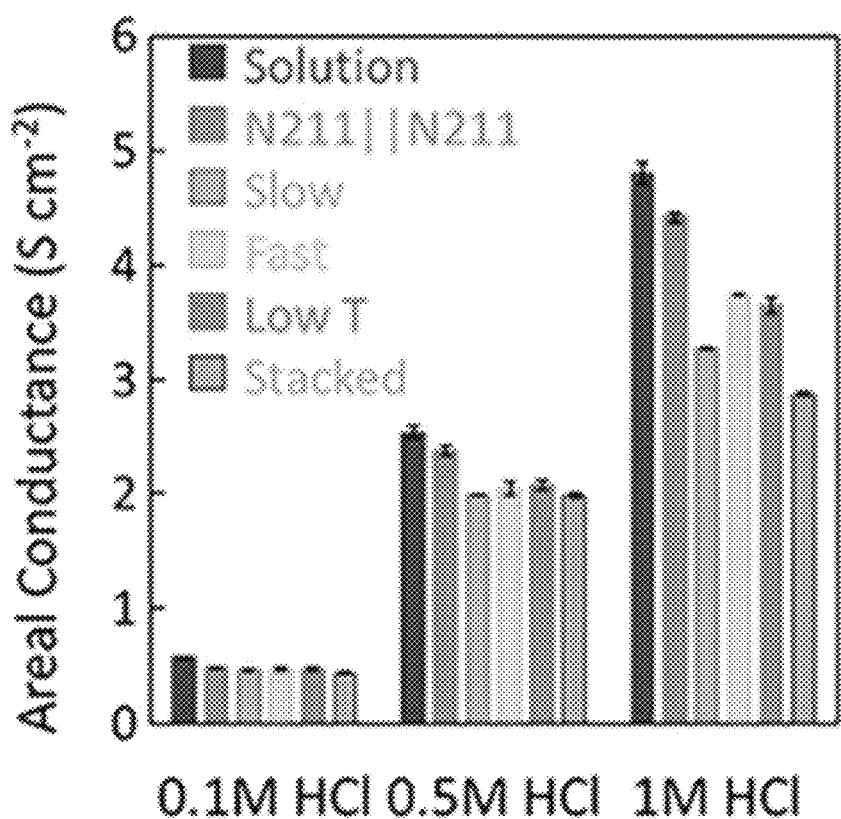
FIG. 48. Areal conductance (calculated from the slope of the I-V curves and dividing by the active area ~0.68 cm$^2$) measured using 0.1 M, 0.5 M, and 1 M of HCl. Error bars represent one standard deviation. Left to right at each concentration: Solution, N211|N211, Slow, Fast, Low T, Stacked.
Figure 49:
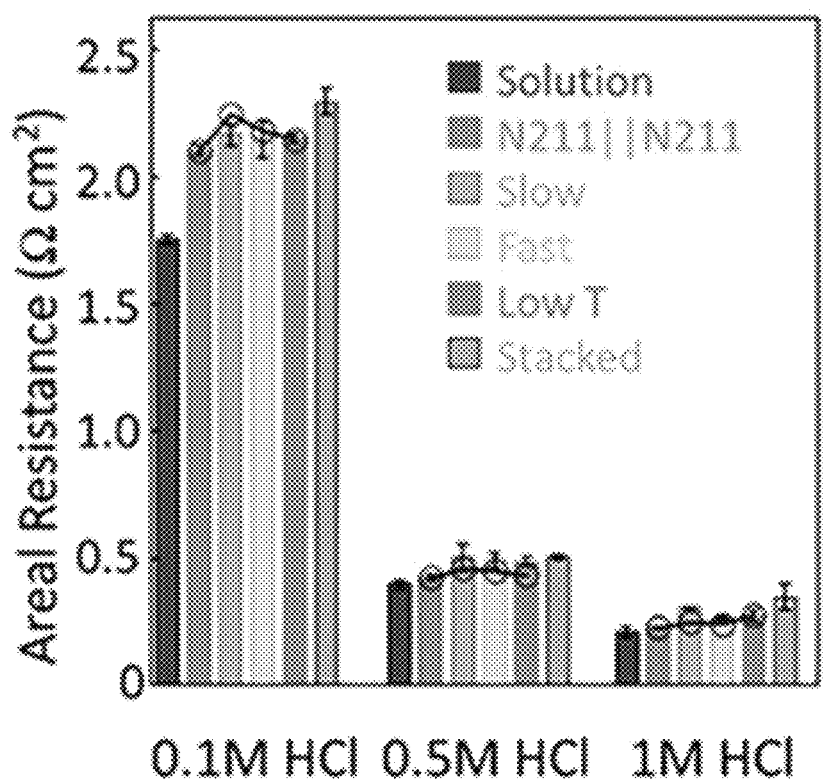
FIG. 49. Membrane areal resistances (calculated by taking the inverse of the areal conductance in FIG. 48) for 0.1 M, 0.5 M, and 1 M of HCl. Circles on the bar plots represent calculated values from resistance based transport model and show good agreement with experimental measurements. Error bars represent one standard deviation. Left to right at each concentration: Solution, N211|N211, Slow, Fast, Low T, Stacked.

The proton exchange membrane conductance is calculated from the slope of the I-V curves in FIG. 43 and FIG. 47 and normalized by dividing by the active area (~0.68 cm$^2$) to yield areal conductance for KCl (FIG. 44) and HCl (FIG. 48). The inverse of areal conductance (i.e., areal resistance) is used to isolate the contribution of the different CVD graphene types from the Nafion sandwich device via a series resistance analysis for KCl (FIG. 45) and HCl (FIG. 49). For each proton exchange membrane, KCl transport was first measured with increasing electrolyte concentration (0.1-1 M, FIG. 44, FIG. 45) since the Nafion was pre-exchanged to $K^+$-form (see Experimental Methods) and subsequently an $H^+$-form exchange was performed (see Experimental Methods and FIG. 91-FIG. 92) before measuring in increasing concentrations of HCl (FIG. 48, FIG. 49). It is emphasized that this approach effectively minimizes influence/variations from graphene transfer yield and membrane to membrane variation allowing for a clear interpretation of the influence of defects on transport. Complete exchange of the Nafion from acid form (as received) to $K^+$ salt form and vice versa was ensured to avoid contributions from mixed currents from $H^+$ and $K^+$ (see Experimental Methods and FIG. 91-FIG. 92).

Notably, the proton exchange membranes with slow growth graphene demonstrates the highest areal resistance to $K^+$ transport (~17.8 Ωcm$^2$ with 0.1 M KCl, FIG. 45) consistent with the lowest defect density (FIG. 32-FIG. 36 and FIG. 37-FIG. 39), followed by the fast growth (~13.2 Ωcm$^2$ with 0.1 M KCl) while the low T graphene (~11.1 Ωcm$^2$ with 0.1 M KCl) shows a marginal increase in areal resistance to $K^+$ transport compared to the Nafion sandwich control (~141.0 Ωcm$^2$) indicating a large number of defects >0.66 nm and is fully consistent with the diffusion-driven transport of KCl (FIG. 37-FIG. 39) and defect density (FIG. 32-FIG. 36). A similar trend is seen with increasing KCl concentrations to 0.5 and 1 M (FIG. 43, Table 5, Table 6), although the absolute values of resistance are lower. It is proposed that the observations at higher salt concentrations could arise from a combinatorial interplay of (i) lower solution resistance at higher concentrations [73], (ii) membrane hydration [74-76], and (iii) Donnan exclusion effects [74, 75, 77]. For example, at higher KCl concentrations, the solution resistance is not only lower but additionally, the Nafion channel characteristics can change and ion partitioning within the channels could occur, with higher concentrations of salt solution leading to channel dehydration and changes to porosity [74, 76, 77]. Further, the concentration of co-ions within the membrane can also reduce the effect of the negatively charged sulfonated groups, resulting in additional permeation of counterions via Donnan exclusion [74, 76, 77]. Regardless of the absolute resistance values at higher KCl concentrations (0.5 and 1 M), the trend in resistance holds (i.e., resistance to $K^+$ transport of slow growth graphene >fast growth graphene>low T graphene>Nafion control) (FIG. 43 and Table 5).

Assuming a series resistance model, the measured areal resistance is the sum of the individual resistances (i.e., $R_{total}$=system ($R_{system}$)+solution ($R_{solution}$)+Nafion ($R_{Nafion}$)+graphene ($R_{graphene}$)), allowing for the isolation of the resistance contribution from the graphene alone by subtracting the other components (see Table 5) [39]. Such an analysis yields $K^+$ areal resistance values at 0.1 M KCl of ~6.8 Ωcm$^2$ (slow growth), ~2.2 Ωcm$^2$ (fast growth), and ~1.5×10$^{-1}$ Ωcm$^2$ (low T) (Table 5) or areal conductance ~1.5×10$^{-1}$ S cm$^{-2}$ (slow growth), ~4.5×10$^{-1}$ S cm$^{-2}$ (fast growth) and ~6.6 S cm$^{-2}$ (low T) (Table 6). The normalized $K^+$ flux (conductance of Nafion|Graphene|Nafion/Nafion-||Nafion controls, FIG. 46) shows the addition of slow growth graphene results in the lowest $K^+$ flux (~6.2×10$^{-1}$ at 0.1 M) as compared to the control membrane, indicating it has the lowest density of defects >0.66 nm, followed by fast growth graphene (~8.3×10$^{-1}$) and low T graphene (~9.8×10$^{-1}$) and a similar trend is also seen at 0.5 and 1 M KCl.

Figure 50:
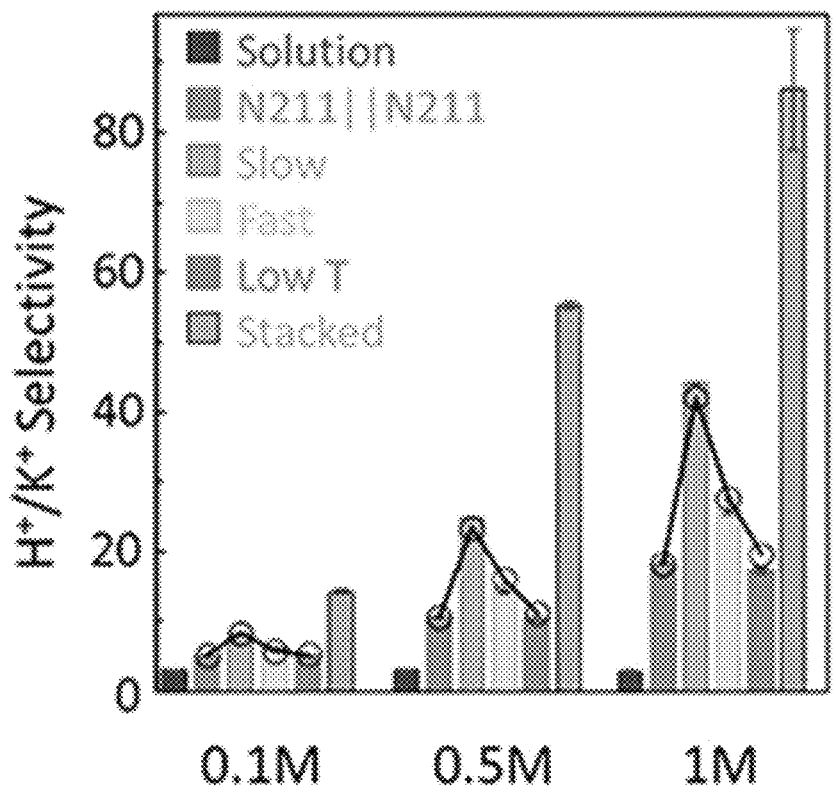
FIG. 50. $H^+/K^+$ selectivity for the fabricated membranes with different electrolyte concentrations. Circles on the bar plots represent calculated values from resistance based transport model and show good agreement with experimental measurements. Error bars represent one standard deviation. Left to right at each concentration: Solution, N211|N211, Slow, Fast, Low T, Stacked.

After measuring $K^+$ transport, the same membranes are converted into acid ($H^+$) form and measured in 0.1-1 M HCl (FIG. 47-FIG. 49) and analyzed via the resistance model (Table 5). Measuring $K^+$ transport and using the exact same membrane for $H^+$ transport allows for a direct comparison between defect density and $H^+$ transport rate as well as an accurate measure of $H^+/K^+$ selectivity. The measured areal proton conductance at 0.1 M HCl ~4.6×10$^{-1}$ S cm$^{-2}$ (slow growth), ~4.7×10$^{-1}$ S cm$^{-2}$ (fast growth) and ~4.7×10$^{-1}$ S cm$^{-2}$ (low T graphene), while the Nafion sandwich control is ~4.8×10$^{-1}$ S cm$^{-2}$ (also see Table 5 and Table 6 for 0.5 and 1 M), suggesting rapid $H^+$ transport through defects which allowed $K^+$ transport as well as other smaller defects and through the pristine lattice. Isolating the areal proton conductance of graphene by subtracting the resistance contribution from the solution and Nafion yields ~16.1 S cm$^{-2}$ (slow growth), ~23.4 S cm$^{-2}$ (fast growth), and ~22.0 S cm$^{-2}$ (low T graphene) with 0.1 M HCl. The ratio of $H^+$ areal conductance to $K^+$ areal conductance provides $H^+/K^+$ selectivity (FIG. 50 and Table 7). The selectivity of slow growth>fast growth>low T graphene for all electrolyte concentrations, and the selectivity increases with increasing electrolyte concentration from 0.1 to 1 M.

Figure 51:
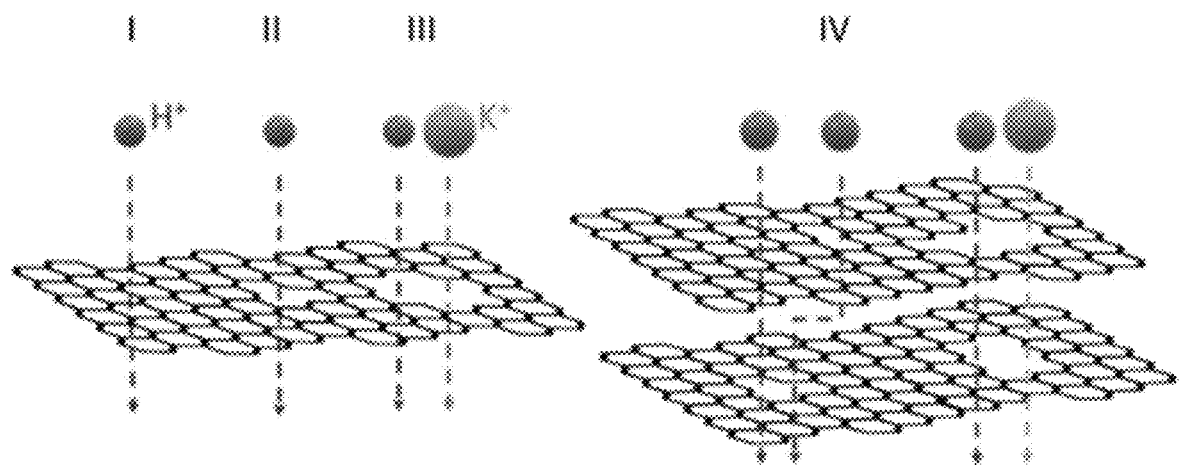
FIG. 51. Schematic illustration of graphene $H^+/K^+$ selectivity in the absence and presence of defects. Arrows indicate potential transport paths for $H^+$ (red) and $K^+$ (purple). The pristine graphene lattice can allow for $H^+$ transport (I), defects smaller <0.66 nm will allow for enhanced $H^+$ transport but hinder $K^+$ transport (II, selective transport), and defects >0.66 nm will allow both $H^+$ and $K^+$ transport (III, nonselective transport). Schematic of two layers of graphene stacked on top of each other illustrating interlayer transport in addition to transport through one layer (IV). $H^+$ transports through the pristine lattice as well as small and large defects, while $K^+$ transport remains limited to defects >0.66 nm (hydrated $K^+$ diameter).
Figure 52:
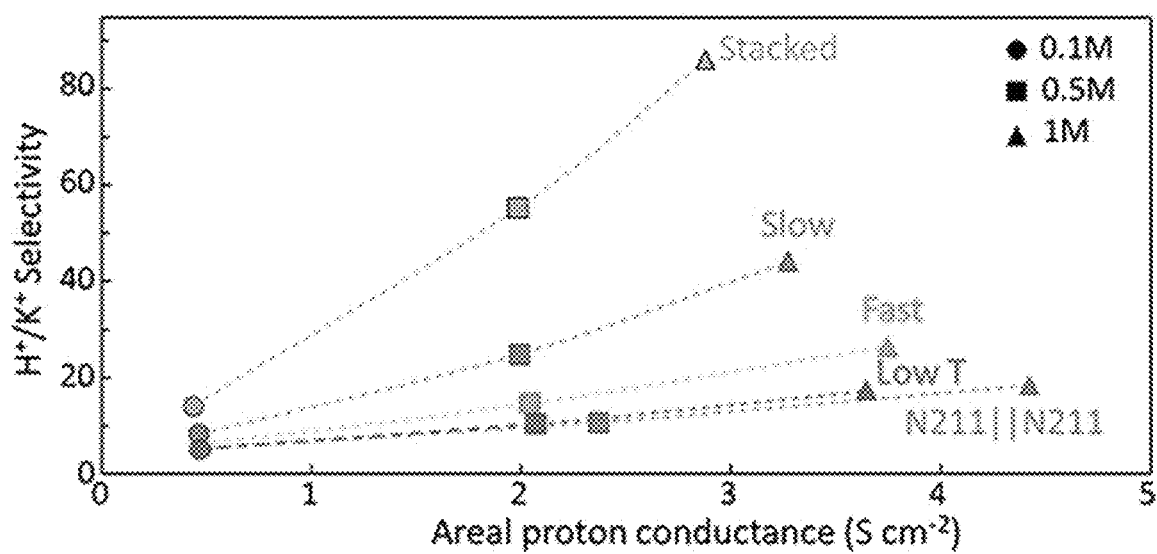
FIG. 52. $H^+/K^+$ selectivity for graphene membranes plotted as a function of liquid-phase proton conductance, demonstrating the improvement in selectivity with minimal decrease in areal proton conductance via facile stacking of slow growth graphene.
Figure 53:
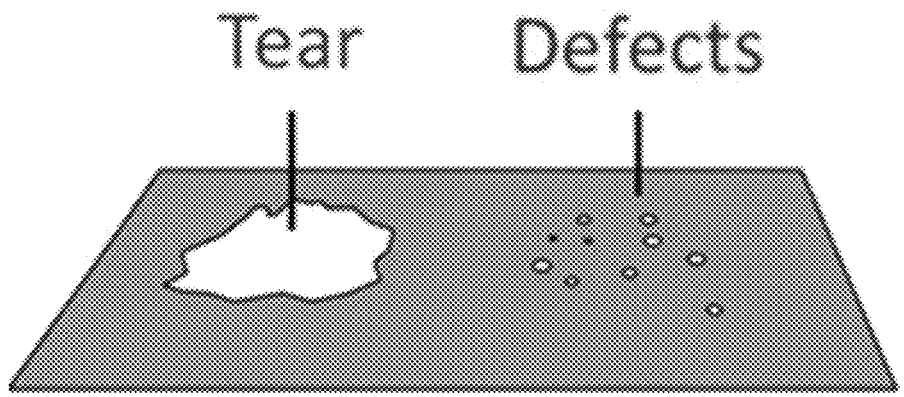
FIG. 53. Schematic of defects and tears in atomically thin graphene membranes.
Figure 54:
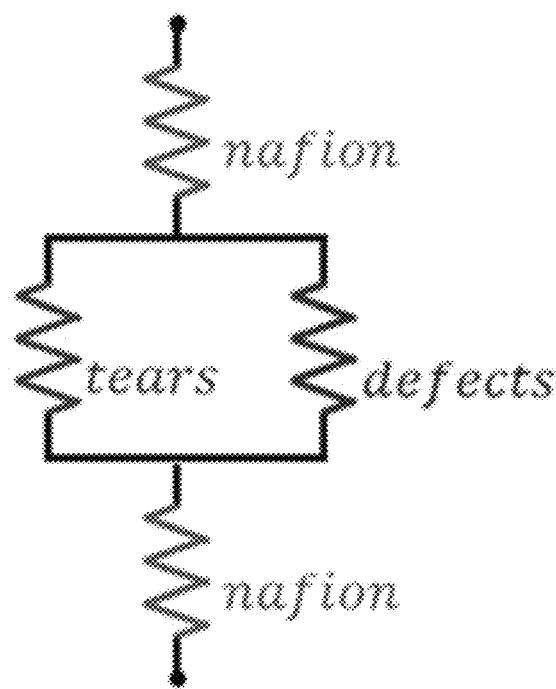
FIG. 54. Equivalent resistance network of defects and tears in atomically thin graphene membranes shown in FIG. 53.

To further increase $H^+/K^+$ selectivity without adversely affecting $H^+$ conductance, a graphene stacking approach was developed (FIG. 41) that allows for sealing of nonselective defects in one layer by the second layer [78], while still allowing for proton transport to occur via defects in both layers as well as the interlayer spacing [78-83]. Hence, the defect density in the graphene layers and the inter-defect distance emerge as important parameters. The slow growth graphene was specifically selected due to its lower density of defects while still exhibiting high $H^+$ conductance and two layers of the slow growth graphene were stacked, the embedded into a Nafion sandwich, and then evaluated liquid phase transport. Notably, a significant resistance to $K^+$ transport was observed (~32.6 Ωcm$^2$ at 0.1 M KCl, also see Table 5 and Table 6) but $H^+$ resistance only increases marginally (~2.3 Ωcm$^2$ at 0.1 M HCl) with the addition of the second layer (FIG. 45, FIG. 49, gray bar) when compared to only 1 layer of the slow growth graphene (~2.1 Ωcm$^2$ at 0.1 M HCl). It is hypothesized that this effect originates from (i) the higher interlayer transport of $H^+$ compared to $K^+$[82, 83], as well as (ii) the low number of defects large enough for $K^+$ to transport through upon stacking two layers of slow growth graphene, as $K^+$ will only transport through overlapping defects >0.66 nm in diameter (FIG. 51, FIG. 52) [78]. This increase in $K^+$ resistance but low $H^+$ resistance is seen in the high $H^+/K^+$ selectivity ~55.4 at 0.5 M and up to ~86.1 at 1 M for the stacked slow graphene (FIG. 52). Taken together, the combination of a low density of defects in slow growth graphene, sealing nonselective defects by stacking another layer and rapid interlayer proton transport between the stacked layers allow for enhanced $H^+/K^+$ selectivity without a significant loss in $H^+$ conductance compared to the Nafion sandwich control membranes.

Modeling Liquid-Phase $H^+$ and $K^+$ Transport through Nafion|Graphene|Nafion Membranes. A simple transport model was employed to further understand the measured $H^+$ and $K^+$ resistances. The measured transport of $K^+$ as well as the higher transport rates for $H^+$ (compared to the pristine graphene ~3 mS cm$^{-2}$) is attributed to pores in the graphene. Previous reports have divided these pores by size into larger tears (>50 nm) and smaller defects [78], both of which can conduct ions (FIG. 53-FIG. 59). To cross the graphene membrane, ions pass through the Nafion support, then through either tears or defects, and finally through the second layer of Nafion, as illustrated by the equivalent resistance network in FIG. 53. The total resistance to passing through a membrane consisting of a single layer of graphene between two Nafion layers is then $$R_{1-layer} = 2R_{Nafion} + \left(\frac{a}{R_{tears}} + \frac{1-a}{R_{defects}}\right)^{-1} \quad (14)$$

where $R_{Nafion}$, $R_{defects}$, and $R_{tears}$ are the resistances to passing through a single Nafion layer, defects in the graphene, and tears in the graphene, respectively, and a is the fraction of membrane area occupied by tears.

The measured resistance through Nafion for each concentration was used directly in the model. The resistances through single tears and defects were modeled as continuum transport with the access resistance to reaching the pore in series with the resistance to passing through the $$R_D = \frac{4t}{\pi\sigma(D-D_{ion})^2} + \frac{1}{\sigma(D-D_{ion})} \quad (15)$$

Here, $\sigma$ is the conductivity of the solution, D is the pore diameter, t is the pore thickness, and $D_{ion}$ is the effective ion diameter (taken as the hydrated diameter of ~0.66 nm for $K^+$, and 0 for $H^+$ since it can even pass through pristine graphene).

Tear sizes vary depending on the conditions of processing to fabricate the membranes and their distribution is not exactly known. Tears were approximated as all having the same diameter, $D_{tear}$, and producing an open area fraction of a. Tears are much larger than the ion diameter and membrane thickness, reducing Equation 15 to $$R_{tears}A = \frac{\pi D_{tear}}{4\sigma} \quad (16)$$

where A is the membrane area. The defect size in graphene commonly follows an approximately exponential distribution of the form [85]

$$p(D) = \frac{1}{\bar{D}}e^{-D/\bar{D}} \quad (17)$$

where p(D) is the probability density that a defect has diameter D and the parameter $\bar{D}$ determines the width of the distribution. Summing the resistance through each defect in parallel, the average overall membrane resistance due to defects becomes, $$(R_{defects}A)^{-1} = \int_{D_{ion}}^{\infty} \frac{n\sigma}{\frac{4t}{\pi(D-D_{ion})^2} + \frac{1}{D-D_{ion}}} p(D)dD \quad (18)$$

where n is the defect density (number of defects per unit area).

Figure 45:
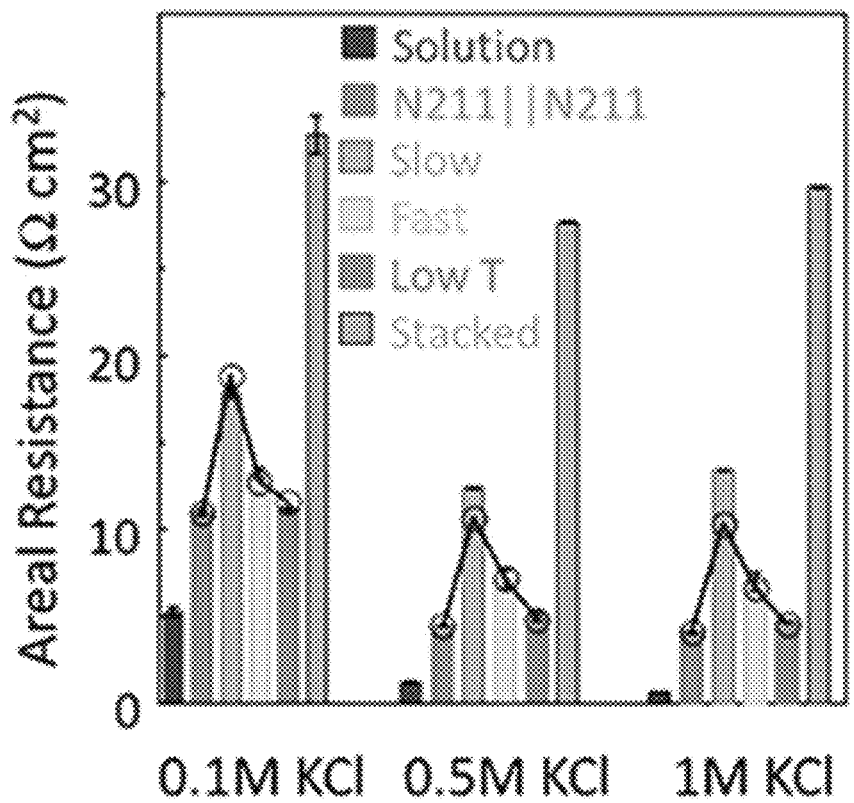
FIG. 45. Membrane areal resistances (calculated by taking the inverse of the areal conductance in FIG. 44) for 0.1 M, 0.5 M, and 1 M of. Circles on the bar plots represent calculated values from resistance based transport model and show good agreement with experimental measurements. Error bars represent one standard deviation. Left to right at each concentration: Solution, N211|N211, Slow, Fast, Low T, Stacked.
Figure 46:
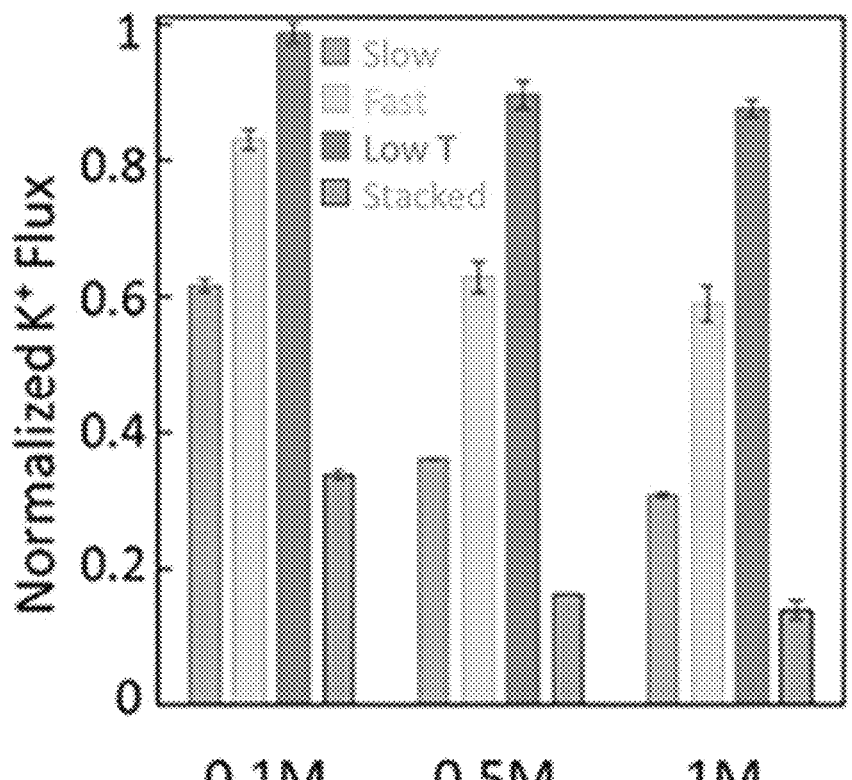
FIG. 46. Normalized $K^+$ flux is used to evaluate the reduction in $K^+$ conductance upon the addition of graphene as compared to a bare Nafion 211 sandwich control membrane and serves as a measure of graphene coverage as well as nanoscale defects that allow $K^+$ transport. Error bars represent one standard deviation. Left to right at each concentration: Slow, Fast, Low T, Stacked.

Although the model has several parameters that are unknown, prior studies provide an approximate range for these values. Here, reasonable values were selected for the various parameters to show that the measured resistances can be explained by the proposed transport pathways. Tears were modeled as having diameter $D_{tear}$=200 nm and covering 0.1% of the membrane area. Both the defect density and number of defects could differ between graphene prepared by the slow, fast, and low temperature recipes. However, the $H^+$ resistance is similar for all three (FIG. 49, open circles) even though the $K^+$ resistance varies (FIG. 45, open circles). Therefore, a greater difference is expected in $\bar{D}$ than n between the different types of graphene. To reduce the number of parameters being varied, n=1.1×10$^{12}$ cm$^{-2}$ was select and then $\bar{D}$ was adjusted for the different conditions. This value of n is a similar defect density used in prior reports [31] and is greater than the defect density obtained with the electrochemical etch test due to limitations on resolution in the defect size (>0.6-0.7 nm) it can probe.

Figure 57:
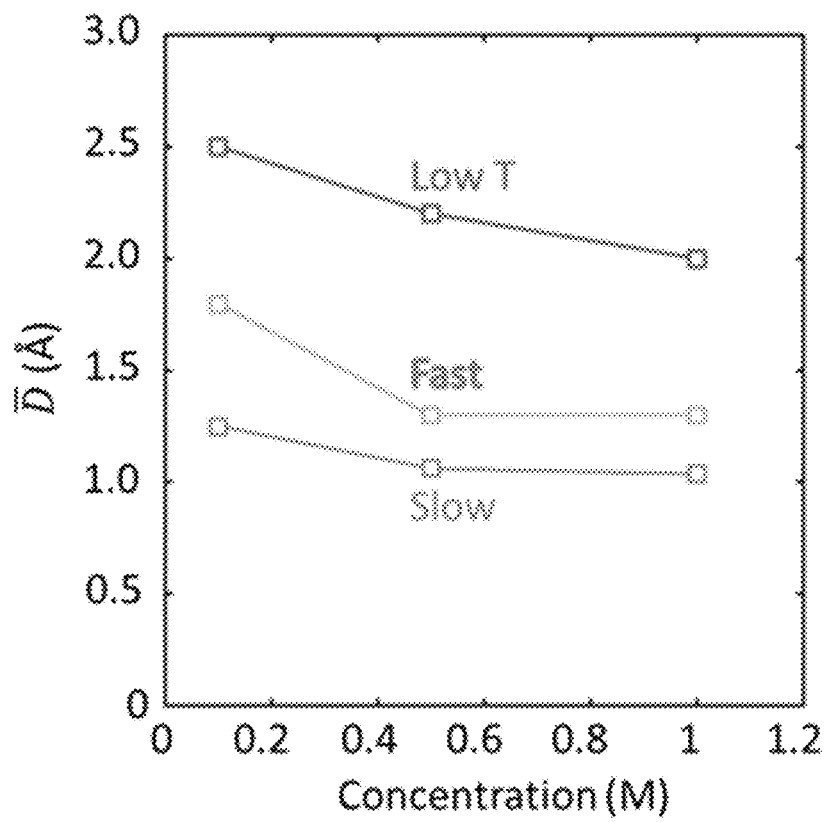
FIG. 57. Pore size distribution parameter, D, used in model and its variation with concentration.

The resulting model values are compared to experimental measurements in FIG. 58, FIG. 59, FIG. 45, FIG. 49, and FIG. 50 using the $\bar{D}$ values plotted in FIG. 57. The slow growth graphene provided the highest selectivity and so has the lowest value of $\bar{D}$. The value of $\bar{D}$ was allowed to change with concentration because prior studies of ion transport through graphene have suggested that pH affects protonation of the graphene pores, thereby altering the pore size distribution [86]. The value of $\bar{D}$ decreases slightly as ion concentration increases.

Figure 55:
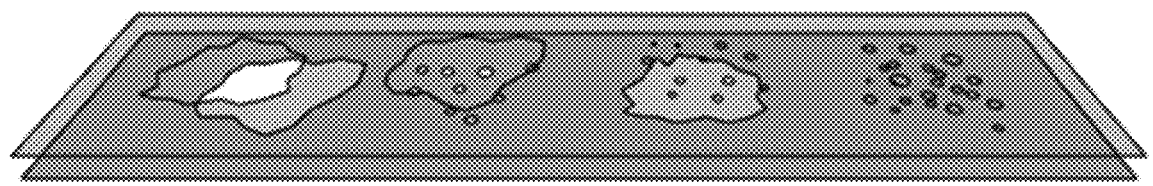
FIG. 55. Schematic of defects and tears for two layers of graphene stacked.
Figure 56:
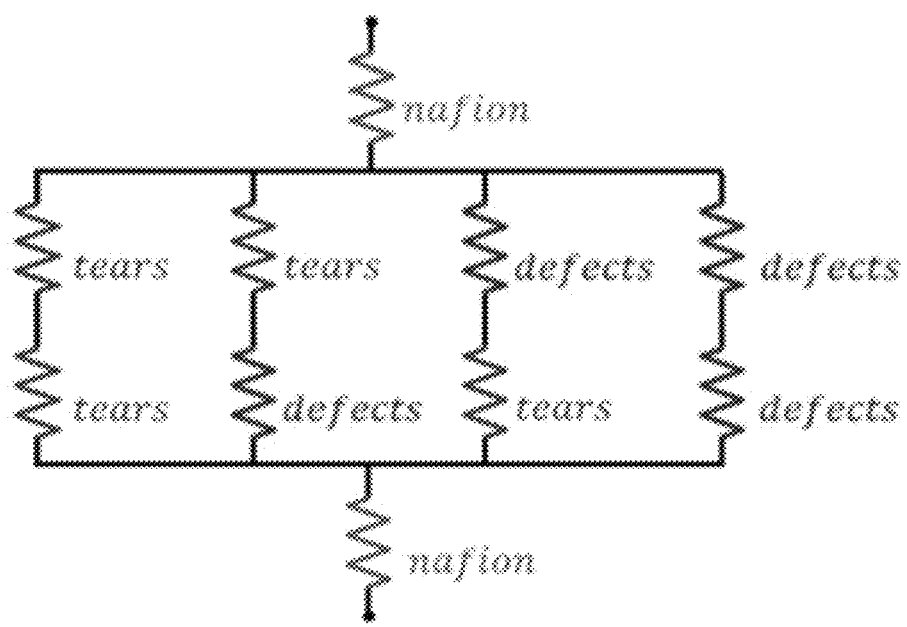
FIG. 56. Equivalent resistance network for two layers of graphene stacked with defects and tears as shown in FIG. 55.
Figure 58:
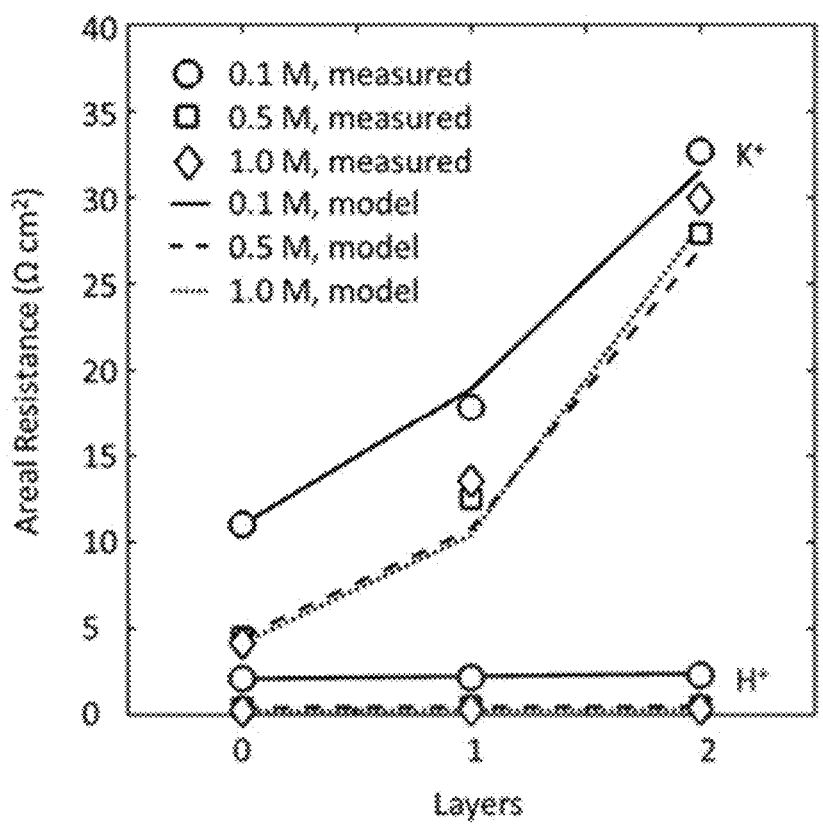
FIG. 58. Comparison of measured areal resistance for graphene (slow growth) with the model shows very good agreement. The measured values plotted are the average values for the N211||N211, slow, and stacked membranes at each concentration from FIG. 49.
Figure 59:
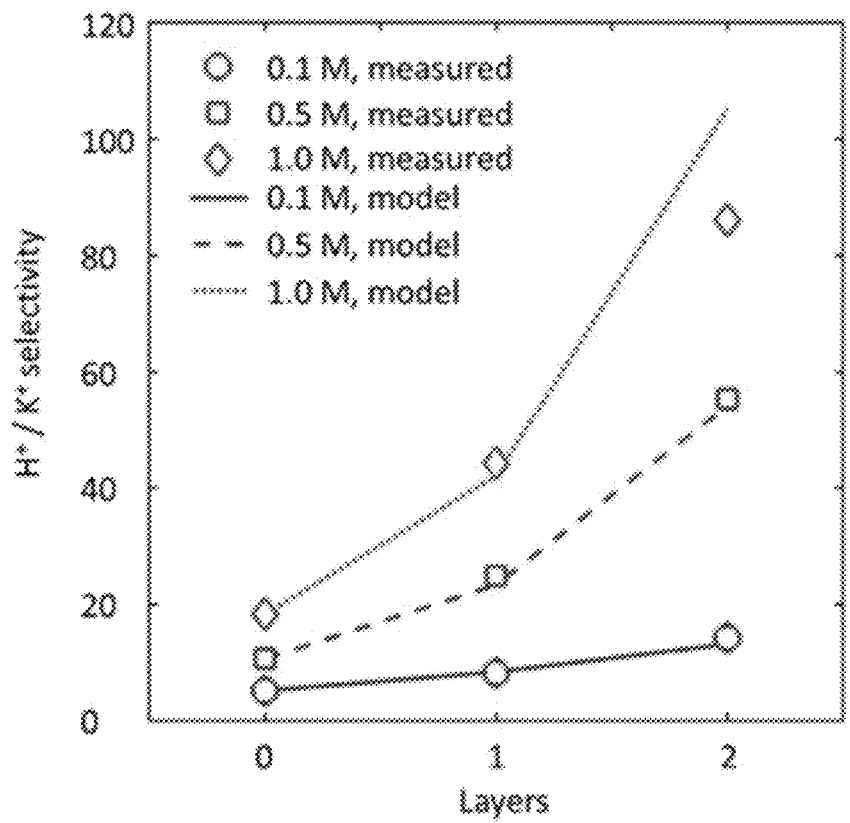
FIG. 59. Comparison of selectivity for graphene (slow growth) with the model shows very good agreement. The measured values plotted are the average values for the N211||N211, slow, and stacked membranes at each concentration from FIG. 50.

Interestingly, two layers of graphene have an ion resistance of approximately twice that of one layer of graphene (FIG. 58). In contrast, gas transport resistances increase exponentially with the number of layers on PCTE supports, as each additional layer of graphene seals openings in the other layers [78]. This suggests that unlike gases, ions permeate the interlayer region between graphene sheets embedded in Nafion with low resistance (FIG. 51). However, the resistance increases with the distance traveled in the interlayer regions, as indicated by the higher $H^+/K^+$ selectivity when a second layer of graphene is added. Therefore, it is proposed that ions can permeate the stacked graphene membrane by passing through tears or defects in one layer of graphene, then moving laterally a short distance to pass through the nearby tears or defects in the second layer of graphene (FIG. 55, FIG. 51). This gives four transport pathways contributing to the overall membrane resistance, as illustrated in FIG. 56 (also see FIG. 51). The total resistance to passing through a membrane consisting of two layers of graphene between two Nafion layers is then $$R_{2-layer} = 2R_{Nafion} + \left(\frac{a^2}{2R_{tears}} + \frac{2a(1-a)}{R_{tears}+R_{defects}} + \frac{(1-a)^2}{2R_{defects}}\right)^{-1} \quad (19)$$

where $a^2$ gives the fraction of the area where two tears overlap, $(1-a)^2$ gives the fraction of the area where defective regions overlap (i.e., overlapping areas without tears), and $2a(1-a)$ gives the fraction of the area where tears and defects overlap.

This model captures the rise in resistance (FIG. 58) and selectivity (FIG. 59) when a second layer of graphene is added. This effectively reduces the fraction of the area with nonselective tears while increasing the area with selective defects. Several approximations have been made in the modeling. Using single fixed values for tear size, density, and area coverage neglects the distribution of tear size and variation between types of graphene. However, since these pores are not selective and the values chosen are in the physically expected range, the modeling confirms that the proposed mechanisms can explain the measurements. Pore conductance was approximated with a continuum expression while the smaller subnanometer defects are expected to deviate from these predictions [84]. The relation is still expected to provide the correct order of magnitude and it was decided that further refinement was not warranted since the pore size distribution used in the model was approximate and scaled to match measurements. Interlayer transport resistance is neglected over distances comparable to the tear diameter while transport over longer distances is neglected. More likely, the transport resistance increases continuously with distance traveled in the interlayer region and may be higher for $K^+$ than $H^+$, contributing to the higher selectivity of the stacked graphene. Nevertheless, the model is able to quantitatively explain the magnitude and trends in measured resistance and indicates conductance of ions between graphene layers as well as the significant contribution of defects to ion transport through large area graphene.

Figure 60:
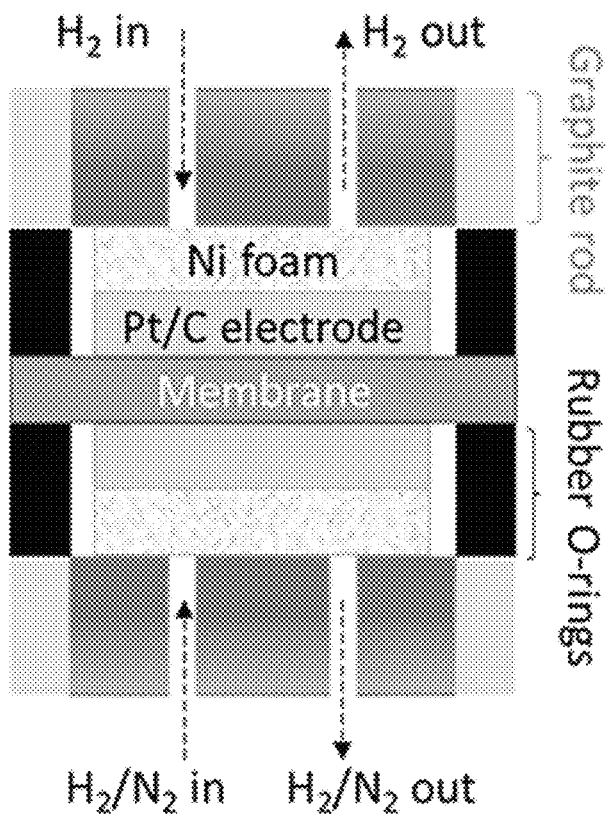
FIG. 60. Schematic of the setup used for measuring $H^+$ transport and $H_2$ crossover through N211|Graphene|N211 sandwich membranes with Pt/C cloth electrodes [38].
Figure 61:
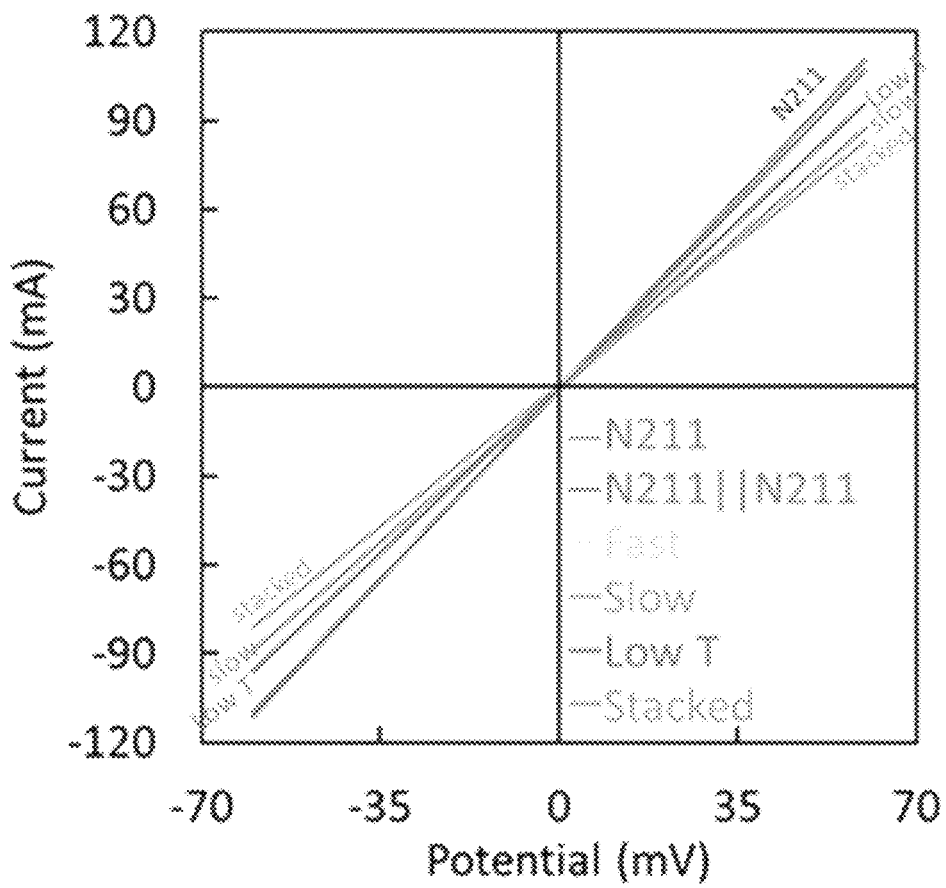
FIG. 61. I-V curves for slow, fast, low T, and stacked CVD graphene sandwiched between in N211 as well as N211 sandwich (control, N211||N211) measured by supplying $H_2$ gas to both sides of the membranes (symmetric mode, see Experimental Methods).
Figure 62:
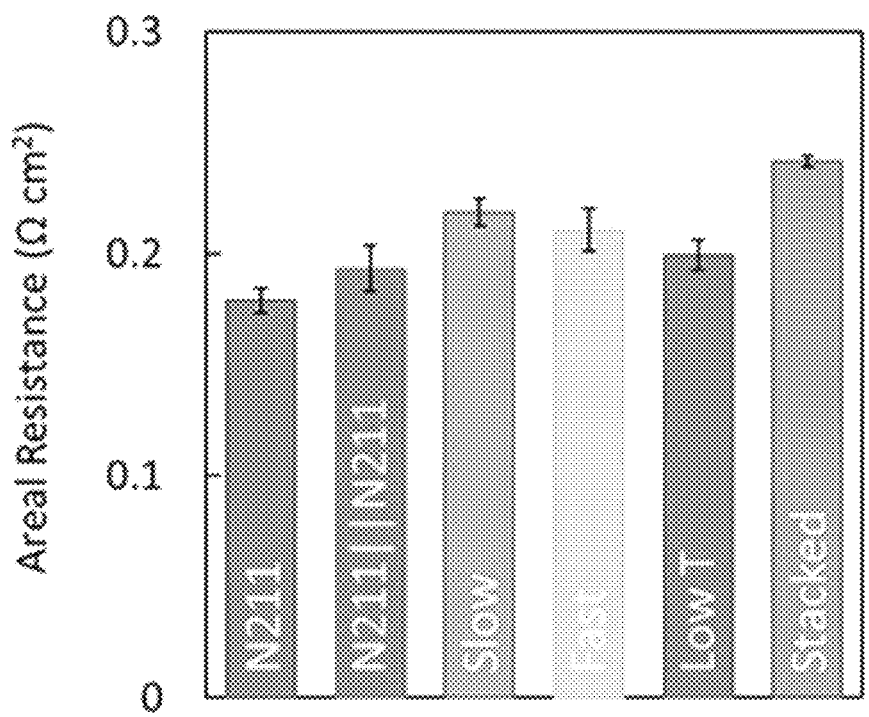
FIG. 62. Computed areal resistance to proton transport for each membrane measured in FIG. 61.

Proton Transport and $H_2$ Crossover through Centimeter-Scale Nafion|Graphene|Nafion Proton Exchange Membranes. Finally, $H^+$ transport and $H_2$ crossover through the fabricated graphene-based proton exchange membranes were measured to simulate the environment of a hydrogen fuel cell by using humidified $H_2$. Specifically, an aim was to understand the implications of angstrom-scale defects introduced via facile kinetic control of graphene CVD on $H^+$ transport and $H_2$ crossover (FIG. 60-FIG. 67). Hence, the exact same membranes measured in the liquid phase are measured in the gas phase after adding Pt/C electrodes (see Experimental Methods), and it was ensured that the same membrane area probed in the liquid phase is loaded into the gas-phase system (FIG. 60), albeit the active area of the electrodes is smaller (~0.31 $cm^2$). The membrane resistance to $H^+$ transport is measured while humidified $H_2$ gas is supplied on both sides of the membrane (see Experimental Methods), and the current (I) is measured while sweeping the applied potential (V), resulting in I-V curves (FIG. 61). The total membrane areal resistance upon adding a single layer of graphene increases by ~2.5×$10^{-2}$ $\Omega cm^2$, and when stacking an additional slow growth graphene layer, the total membrane areal resistance increases by ~4.8×$10^{-2}$ $\Omega cm^2$ as compared to the N211 sandwich control (FIG. 62 and Table 8). Using the series resistance model to isolate the resistance contribution of graphene from that of the other components (Table 8), the areal proton conductance in the gas phase was calculated to be ~39.9 S $cm^{-2}$ (slow growth), ~57.7 S $cm^{-2}$ (fast growth), and ~20.8 S $cm^{-2}$ (stacked—2 layers of slow growth graphene). Such high values of areal proton conductance for graphene after removing the contribution from Nafion and system resistance shows its adequacy for enabling practical applications in fuel cells, which typically require areal proton conductance values >1 S $cm^{-2}$ [40].

Figure 63:
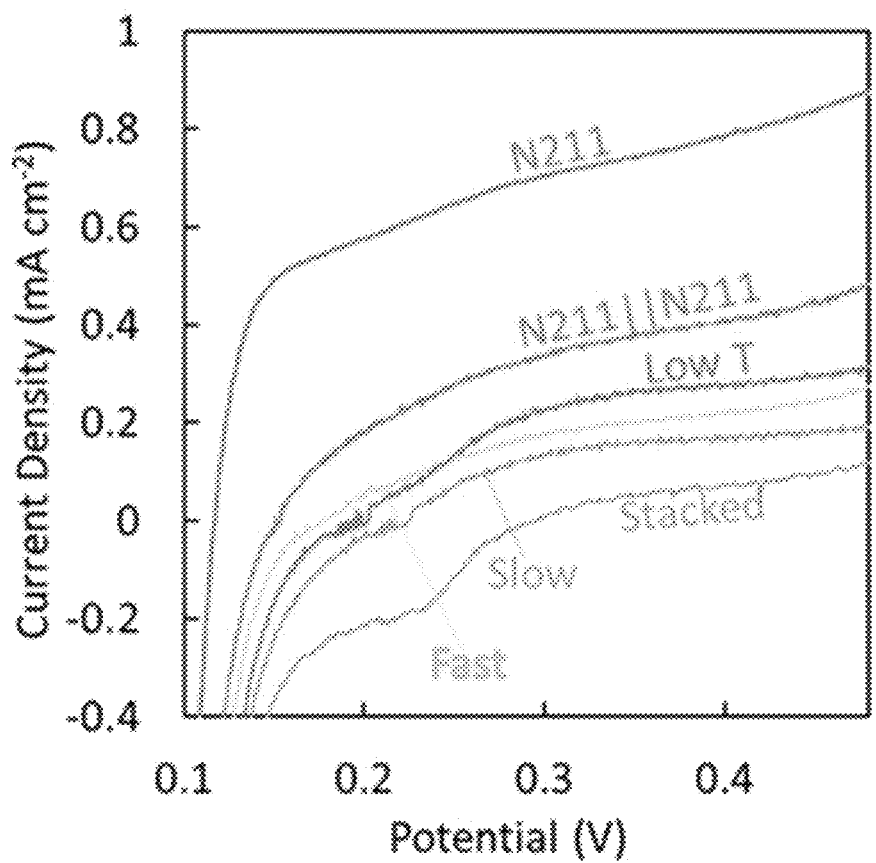
FIG. 63. Crossover of $H_2$ measured via linear sweep voltammetry (LSV) while supplying 40 sccm $H_2$ to one side and ~32 sccm $N_2$ to the other side of the membranes (asymmetric mode, see Experimental Methods). The limiting current region between 0.1 and 0.5 V illustrates differences in $H_2$ crossover between membranes. Higher current densities indicate more $H_2$ crossover since proton current will only occur when $H_2$ gas crosses through the membrane to dissociate at the Pt electrodes on the $N_2$ side.

Additionally, crossover of $H_2$ gas (~2.9 Å) was also measured, that is, leakage of $H_2$ gas through the membrane, which is a common problem affecting conventional proton exchange membrane and results in reduced fuel cell efficiencies exacerbated over the application life-cycle as well as safety concerns in confined environments [1, 9, 10]. The same experimental setup was used (FIG. 60) but $H_2$ was supplied to one side of the membrane and $N_2$ gas was supplied to the other side [9, 10]. At potential values below the open circuit potential, the hydrogen evolution reaction was observed (FIG. 93) and at positive overpotentials above the open circuit potential, current was measured from dissociated $H_2$ which diffused through the membrane (FIG. 63). These measurements of $H_2$ diffusion differ from the diffusion measurements of KCl and B12 in both support material (hydrated Nafion vs PCTE) and measurement method. There is a direct relationship between current density obtained in this limiting region and $H_2$ crossover which can be observed in the potential range from 0.1 to 0.5 V (FIG. 63). Here, a single layer of N211 was included to illustrate the relation between membrane thickness and crossover, i.e., higher crossover is seen for thinner Nafion membranes. For comparison between each of the synthesized CVD graphene types, the crossover current density at 0.4 V was selected (FIG. 65) in accordance with the standard methods suggested by U.S. Department of Energy (U.S. DOE) as well as to ensure minimal influence from $H^+$ adsorption/desorption from the Pt catalyst [9, 10]. The addition of graphene reduces the crossover current density from ~4.1×$10^{-1}$ mA $cm^{-2}$ (Nafion sandwich control) to ~1.7×$10^{-1}$ mA $cm^{-2}$ (slow growth), ~2.2×$10^{-1}$ mA $cm^{-2}$ (fast growth) and ~2.8×$10^{-1}$ mA $cm^{-2}$ (low T graphene). The crossover values obtained with graphene are lower than many literature values using other methods to reduce crossover, e.g. using Pt-layered double hydroxide particles dispersed in Nafion (~7.5×$10^{-1}$ mA $cm^{-2}$) [87], SPEEK-based nanocomposites (~7.7×$10^{-1}$ mA $cm^{-2}$) [88], integrated cellulose fibers (~0.7 mA $cm^{-2}$), among others (FIG. 67, Table 9) [89].

Notably, a substantial impact on $H_2$ crossover was seen with the stacked slow growth graphene membrane, it was reduced to record low values of ~2.5×$10^{-2}$ mA $cm^{-2}$ which corresponds to ~90% reduction in $H_2$ crossover compared to the Nafion sandwich (FIG. 63-FIG. 66). This large reduction in $H_2$ crossover comes at the expense of only ~20% reduction (FIG. 63-FIG. 66) in proton transport compared to Nafion controls. Hydrogen crossover through the membrane is initially measured using similar flow rates of $H_2$ and $N_2$ on either side of the membrane, but changing backpressure is a common strategy to mitigate $H_2$ crossover in an $H_2$ fuel cell [9, 10]. Therefore, the influence of different $N_2$ mass flow rates on the $H_2$ crossover was explored and it was observed that lower amounts of $N_2$ led to an increase in $H_2$ crossover for the N211||N211 (presumably due to the lack of a sufficient back-pressure to mitigate $H_2$ diffusion [9]). Interestingly, $H_2$ crossover for the stacked graphene membrane remained very low (FIG. 66 and FIG. 94-FIG. 96), i.e., the lowest value~2.5×$10^{-2}$ mA $cm^{-2}$ for ~40 sccm of $N_2$ and ~40 sccm $H_2$ while the highest value was ~3.5×$10^{-1}$ mA $cm^{-2}$ for ~16 sccm $N_2$ and ~40 sccm $H_2$ (Table 10). These observations indicate the use of stacked slow growth graphene sandwich membranes could mitigate the need for applied backpressure when used in an $H_2$ fuel cell [9, 10] as well as offer similar advantages for $O_2$ diffusion, thereby enhancing safety. These observations indicate that the Angstrom-scale defects in the graphene layers allow for selective $H^+$ transport while still blocking molecular $H_2$ (~2.9 Å) and still exhibit adequate $H^+$ conductance ~20.8 S $cm^{-2}$, i.e. the defect density of the stacked slow graphene is adequate to prevent diffusion of $H_2$ while electrically driven protons can continue to move at a rapid rate. Hence, the application potential of the facile method of stacking graphene layers is emphasized, which can be readily integrated into proton exchange membranes for enabling higher efficiency in fuel cell applications.

Conclusions. In conclusion, it was demonstrated that facile kinetic control of the scalable graphene CVD processes can be leveraged to introduce angstrom-scale pores that allow for enhanced proton transport while simultaneously presenting significant hindrance to even small, hydrated ions ($K^+$~6.6 Å) as well as gas molecules ($H_2$~2.9 Å). The influence of the introduced angstrom-scale defects were experimentally probed and centimeter-scale Nafion-|Graphene|Nafion membranes with proton conductance ~3.3-3.8 S $cm^{-2}$ (graphene only ~12.7-24.6 S $cm^{-2}$), $H^+/K^+$ selectivity ~6.2-44.2 in liquid electrolytes were demonstrated, and the same membranes showed proton conductance ~4.6-4.8 S $cm^{-2}$ (graphene only ~39.9-57.5 S $cm^{-2}$) with $H_2$ crossover ~0.17-0.22 mA $cm^{-2}$ (~0.4 V, ~25° C.) while using $H_2$ gas as the proton source. A resistance-based transport model was developed to explain the observed transport and introduce a graphene stacking approach for facile and scalable membrane fabrication. The stacking approach exploits the combinatorial effects of inter-defect distance and inter-layer transport to allow for Nafion|Graphene|Graphene|Nafion membranes with record low $H_2$ crossover current density (~$2.5 \times 10^{-2}$ mA $cm^{-2}$ and $H^+/K^+$ selectivity ~86.1 at 1 M), ~90% lower than state-of-the-art ionomer Nafion membranes (~$2.7 \times 10^{-1}$ mA $cm^{-2}$) under identical conditions, while still maintaining proton conductance (~4.2 S $cm^{-2}$, graphene stack only ~20.8 S $cm^{-2}$) comparable to Nafion (~5.2 S $cm^{-2}$). These insights on facile kinetic control of scalable CVD processes for direct formation of angstrom-scale proton-selective pores and facile stacking approaches for scalable membrane fabrication can enable functional atomically thin high flux proton exchange membranes with transformative advances for proton exchange membranes in energy conversion, energy storage, challenging separations among others to advance clean/green/decarbonized transportation, grid storage and other climate change mitigation efforts.

Experimental Methods

Figure 68:
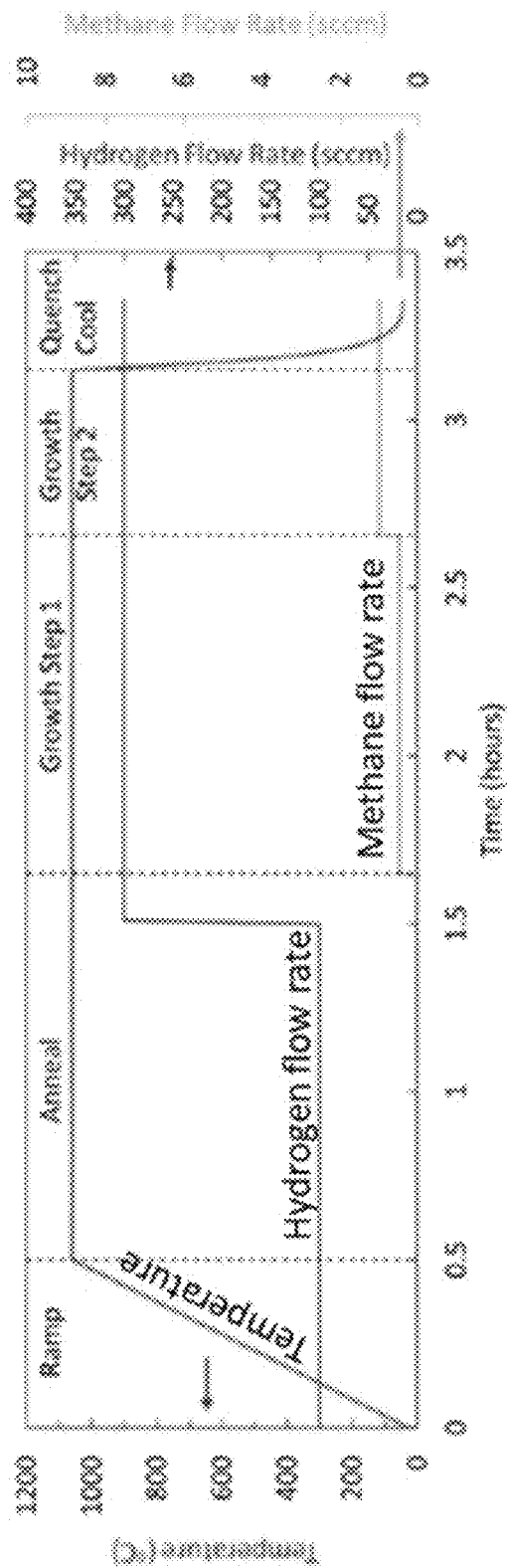
FIG. 68. Temperature profile (red) and hydrogen (violet) and methane (orange) mass flow rates throughout the CVD process for slow graphene grown on Cu foil (see methods section) with labeled segments.
Figure 69:
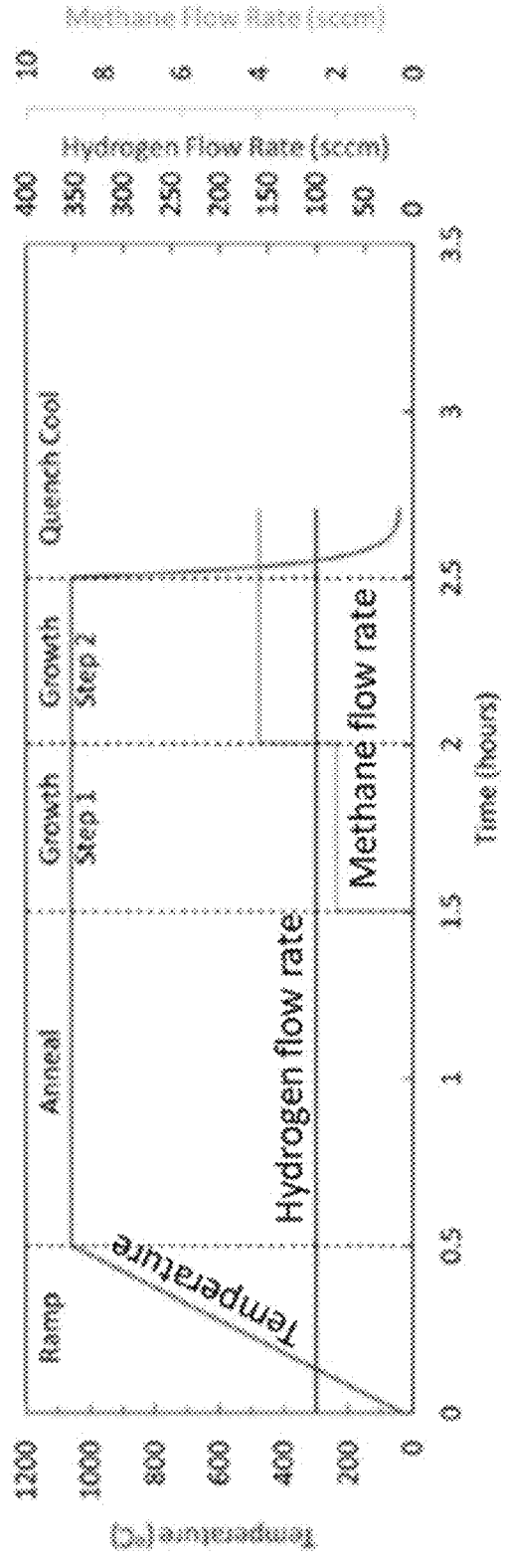
FIG. 69. Temperature profile (red) and hydrogen (violet) and methane (orange) mass flow rates throughout the CVD process for fast graphene grown on Cu foil (see methods section) with labeled segments.
Figure 70:
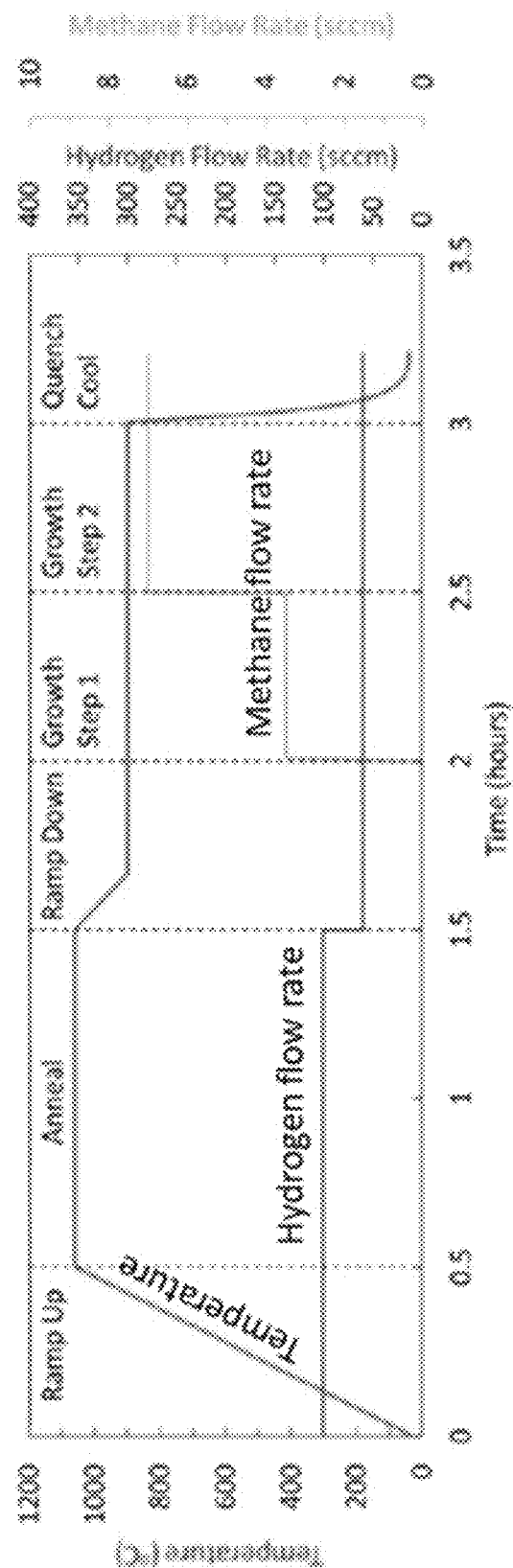
FIG. 70. Temperature profile (red) and hydrogen (violet) and methane (orange) mass flow rates throughout the CVD process for low T graphene grown on Cu foil (see methods section) with labeled segments.
Figure 71:
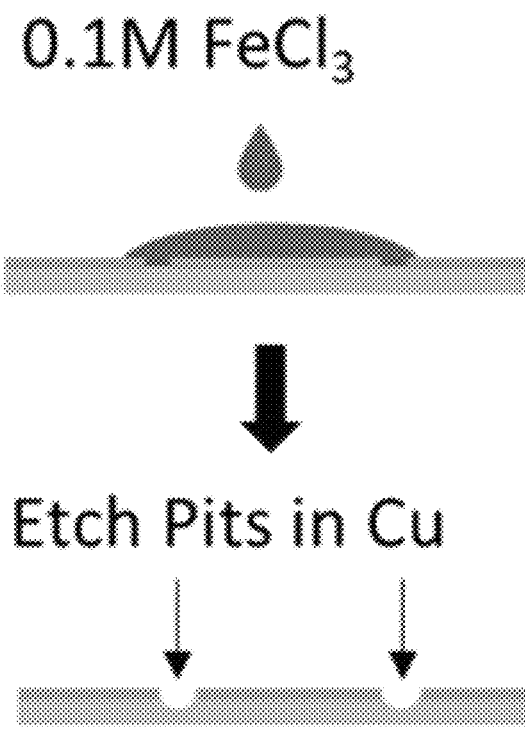
FIG. 71. Schematic of acid etch test wherein a ~5 μL droplet of 0.1 M $FeCl_3$ is placed on graphene on Cu foil, etches the Cu underneath defects in graphene.
Figure 72:
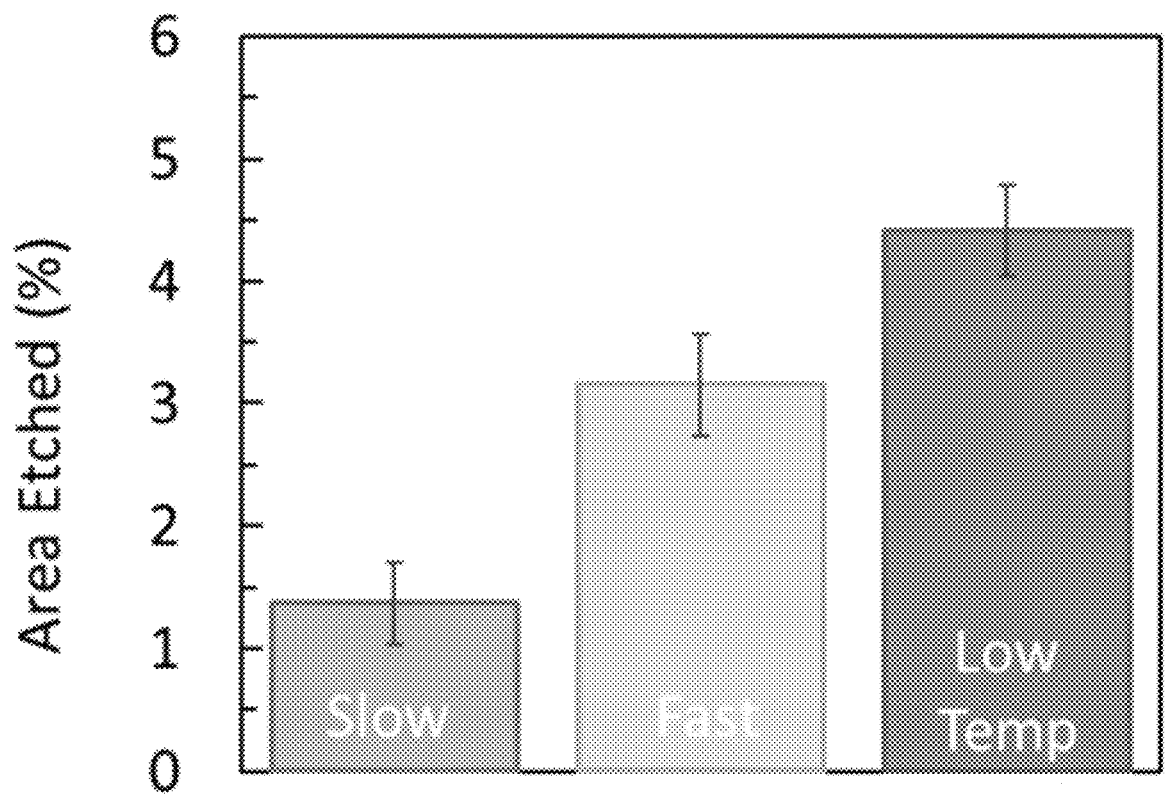
FIG. 72. Percentage area etched is calculated by analyzing scanning electron microscopy images using ImageJ for the slow, fast, and low T CVD graphene on Cu foil.
Figure 73:
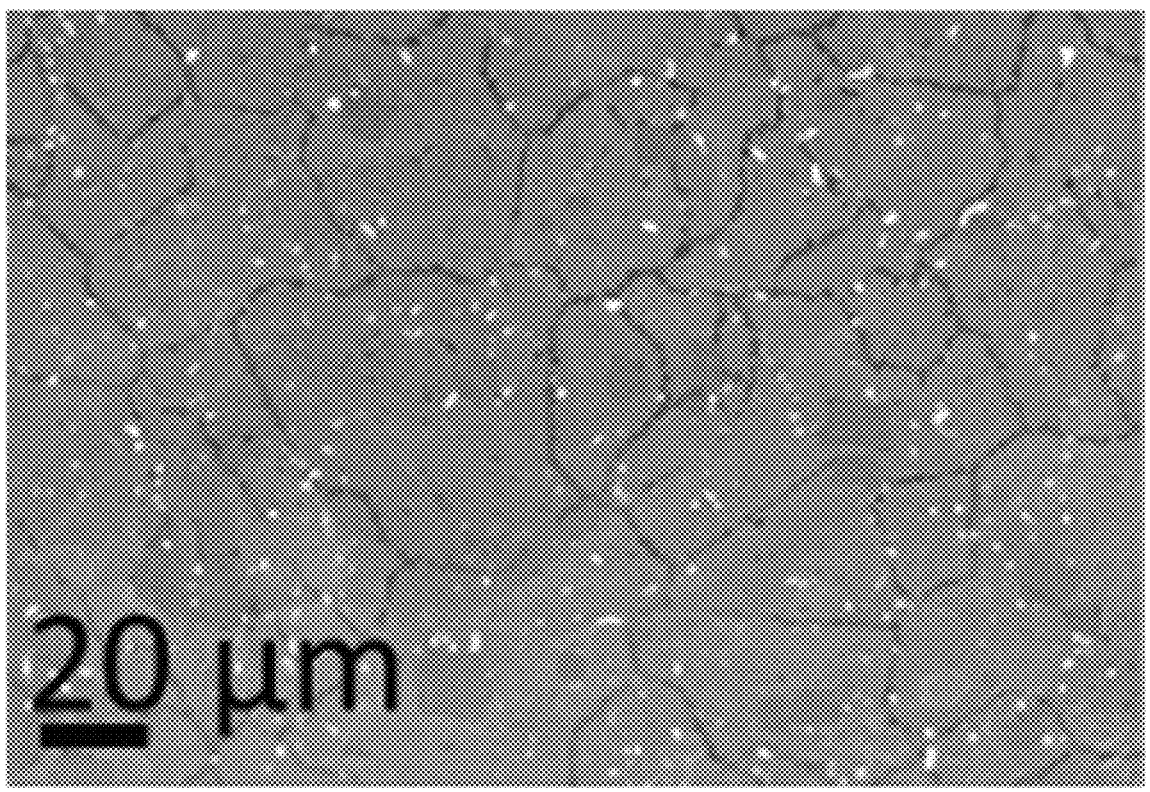
FIG. 73. Scanning electron microscopy image of the etched slow CVD graphene on Cu foil, where the etched regions of the Cu foil appear as bright spots in SEM image.
Figure 74:
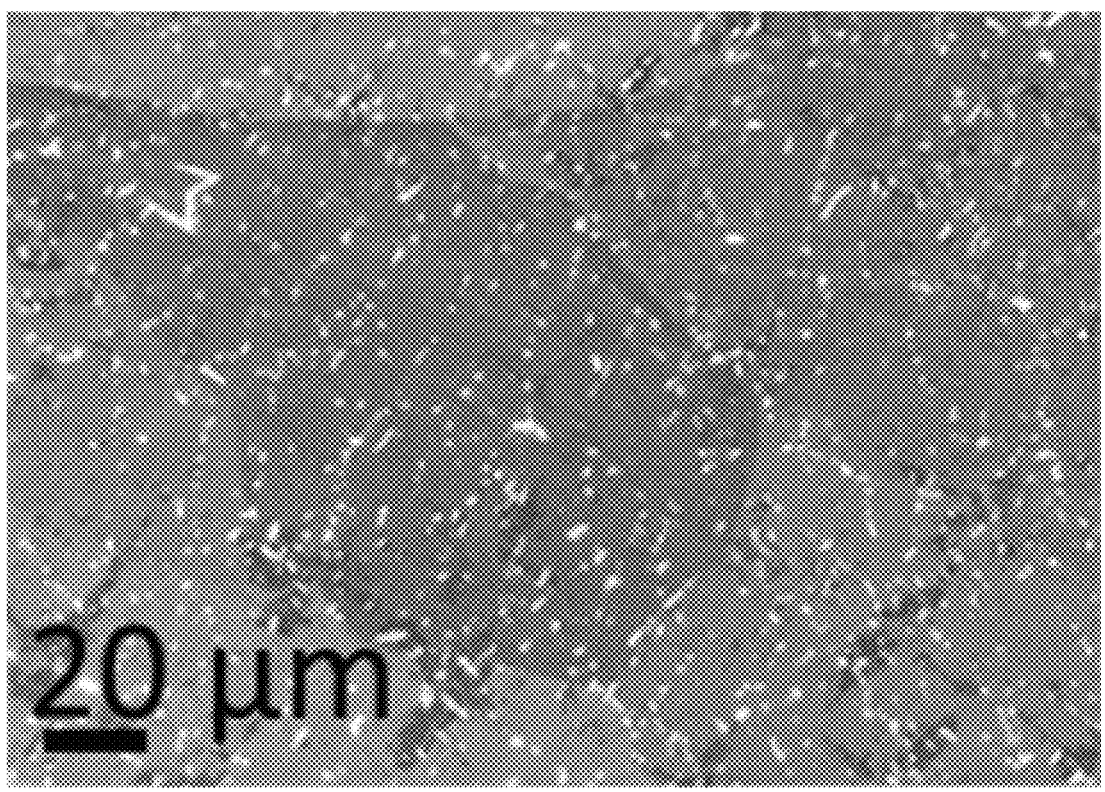
FIG. 74. Scanning electron microscopy image of the etched CVD graphene on Cu foil, where the etched regions of the Cu foil appear as bright spots in SEM image.
Figure 75:
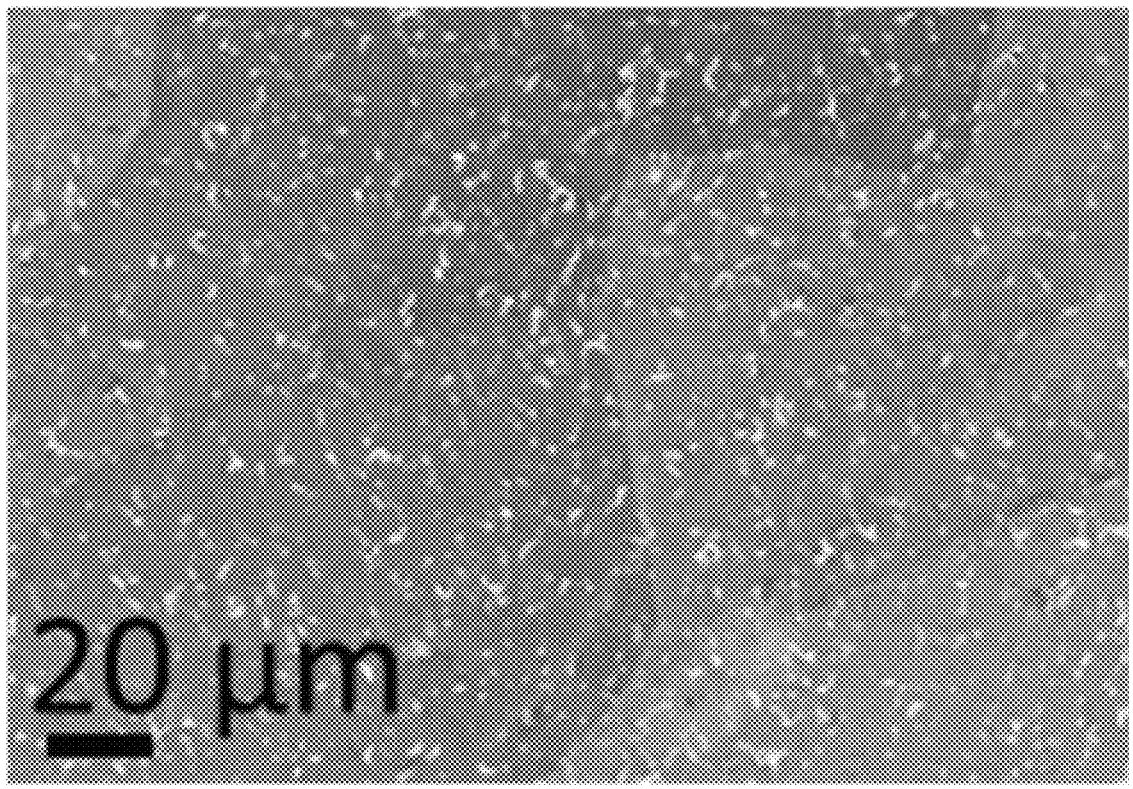
FIG. 75. Scanning electron microscopy image of the etched low T CVD graphene on Cu foil, where the etched regions of the Cu foil appear as bright spots in SEM image.

Graphene Growth. Graphene was synthesized using a custom-built hot-wall reactor with 1 in. quartz tube and furnace using procedures described elsewhere [28, 30-34, 49]. Details of temperature, $H_2$ mass flow rate, and $CH_4$ mass flow rate for each graphene type are shown in FIG. 68-FIG. 70. Briefly, ~2×7 $cm^2$ polycrystalline Cu foil (HA, 18 μm thickness, JX Holdings) was cleaned via sonication in 20 v/v % Nitric Acid for 4 min followed by thorough DI water rinse and air dried before loading into the reactor and pumping down to base pressure (~14 mTorr). $H_2$ (99.999%, AL Gas) and $CH_4$ (99.9%, AL Gas) gas mass flow rates are controlled with mass flow controllers. The growth process comprises heating (~35° C./min) to 1060° C. in ~100 sccm $H_2$ (system pressure~4 Torr) followed by annealing (1060° C.; 100 sccm $H_2$, 60 min) to reduce surface oxide and enlarge the Cu grain size. After annealing for 60 min with 100 sccm $H_2$ and before the introduction of methane, the temperature is reduced to 900° C. under 60 sccm $H_2$ and maintained for 30 min for the low T growth and for the slow growth the $H_2$ flow rate is increased to 300 sccm $H_2$ for 15 min. Methane is introduced in 2 steps: (i) slow growth graphene: 1060° C., 300 sccm $H_2$ (~14 Torr), growth step #1 with 0.5 sccm $CH_4$ for 60 min (~12 Torr), growth step #2 with 1 sccm $CH_4$ for 30 min (~12 Torr); (ii) fast growth graphene: 1060° C., 100 sccm $H_2$ (~4 Torr), growth step #1 with 2 sccm $CH_4$ for 30 min (~2 Torr), growth step #2 with 4 sccm $CH_4$ for 30 min (~2 Torr); (iii) Low T graphene: 900° C., 60 sccm $H_2$ (~1 Torr), growth step #1 with 3.5 sccm for 30 min $CH_4$ (~900 mTorr), growth step #2 with 7 sccm $CH_4$ for 30 min (~850 mTorr) [31, 32, 34] and then quench cooled to room temperature in the final growth atmosphere.

Graphene Coverage and Nucleation Density from Scanning Electron Microscopy Images. Using the step #1 flow rates, slow, fast, and low T graphene growth times were varied between 30 s to 60 min to stop the growth at various stages of domain convergence (FIG. 32-FIG. 36). Graphene coverage and nucleation density were estimated from SEM images (Zeiss Merlin, 2 kV) of graphene on Cu using ImageJ software to threshold the images by color or contrast, then "particle analysis" to count the graphene domains and calculate the total area covered (FIG. 71-FIG. 75). Nucleation density (FIG. 34) was calculated from SEM images of 30 s fast graphene, 30 s low T graphene, and 5 min slow graphene as the domains had not yet converged and could be counted.

Optical Images of Graphene on Cu Foil after Thermal Oxidation. Optical images of graphene domains were acquired at 10× and 50× magnification after thermal oxidation of graphene on Cu foil. Samples were heated for 15 min on a hot plate at 220° C. to oxidize exposed Cu, i.e., region between unmerged graphene domains and at graphene defects [25].

Electrochemical and Acid Etch Tests. Electrochemical etch and acid etch tests were used to estimate the defect density of slow, fast, and low T graphene as described in detail elsewhere [30]. Briefly, the electrochemical etch test (FIG. 35) was performed using a two-electrode geometry, with the working electrode connected to slow, fast, and low T graphene on Cu foil (~0.5×1 $cm^2$) and the reference/counter electrode connected to bare Cu foil (~1×5 $cm^2$). Both Cu foils with (smaller) and without graphene (larger) electrodes were submerged in 0.5 M $CuSO_4$, while 1 V was applied between the electrodes for 1 s [30]. The graphene on Cu foil was then rinsed thoroughly in DI water, dried and imaged with SEM [30]. For the acid etch tests, a droplet ~5 μL of 0.1 M Iron Chloride ($FeCl_3$) solution was placed on the surface of slow, fast, and low T graphene on Cu foil for 2 s (FIG. 76-FIG. 81, Table 4) then rinsed thoroughly with DI water to stop the etching, dried, and images with SEM [30]. Etched regions appear as bright, white spots in SEM images and ImageJ software was used to calculate the total area etched and defect density (FIG. 35) by thresholding and using particle analysis.

Raman Spectroscopy. Graphene was transferred to $SiO_2$/Si wafer (300 nm $SiO_2$) using a poly methyl methacrylate (PMMA) assisted method [33, 34, 49]. PMMA solution (MW 35000, 2 wt % in anisole) was drop cast on top of slow, fast, and low T graphene on Cu and dried at ambient conditions. The graphene is first pre-etched in ammonium persulfate solution (APS, 0.2 M) for 15 min and rinsed with DI water to remove the bottom layer of graphene before fully etching the Cu in APS solution (0.2 M). The graphene/PMMA stack is then rinsed in DI water and scooped onto the $SiO_2$/Si wafer. After baking at 60° C. for 10 min, the PMMA layer is removed by rinsing in acetone and IPA. Raman spectra (ThermoFisher DXR Confocal Raman Microscope, 532 nm laser) were then recorded for slow, fast, and low T graphene (Figure B) using 1 mW laser power.

Scanning Tunnelling Microscopy (STM). An Omicron LTNanoprobe scanning tunneling microscope at the Center for Nanophase Materials Sciences at Oak Ridge National Laboratory was used to acquire STM images at 4.6 K. In situ SEM that is attached to the STM chamber was utilized to position the STM tip over the graphene nuclei. The as-synthesized graphene on Cu was annealed under ultrahigh vacuum (<$3\times10^{-10}$ mbar) at 420° C. for 3 h before imaging.

Graphene Transfer onto PCTE. Graphene was transferred to polycarbonate track-etched (PCTE, Sterlitech) supports with ~200 nm pores and ~10% porosity via isopropanol assisted hot lamination [34]. As with the PMMA assisted transfer, the bottom layer of graphene was first removed by pre-etching in ammonium persulfate (APS, 0.2 M) solution for 15 min, followed by DI water rinse and dried in air [28, 30-32, 34]. Next, the PCTE support was placed against the graphene+Cu foil with the graphene side facing up. Subsequently, a small volume (~50 µL) of isopropanol was added to the PCTE+graphene interface. The PCTE+graphene+Cu stack was then sandwiched between two pieces of weighing paper and laminated with Teflon protective layers at 135° C. with an office laminator (TruLam TL-320E). After lamination, the Cu foil was completely etched by floating the PCTE+graphene+Cu stack on APS (0.2 M) solution. Finally, the PCTE+graphene stack was rinsed with DI water and ethanol, followed by drying in air.

Figure 82:
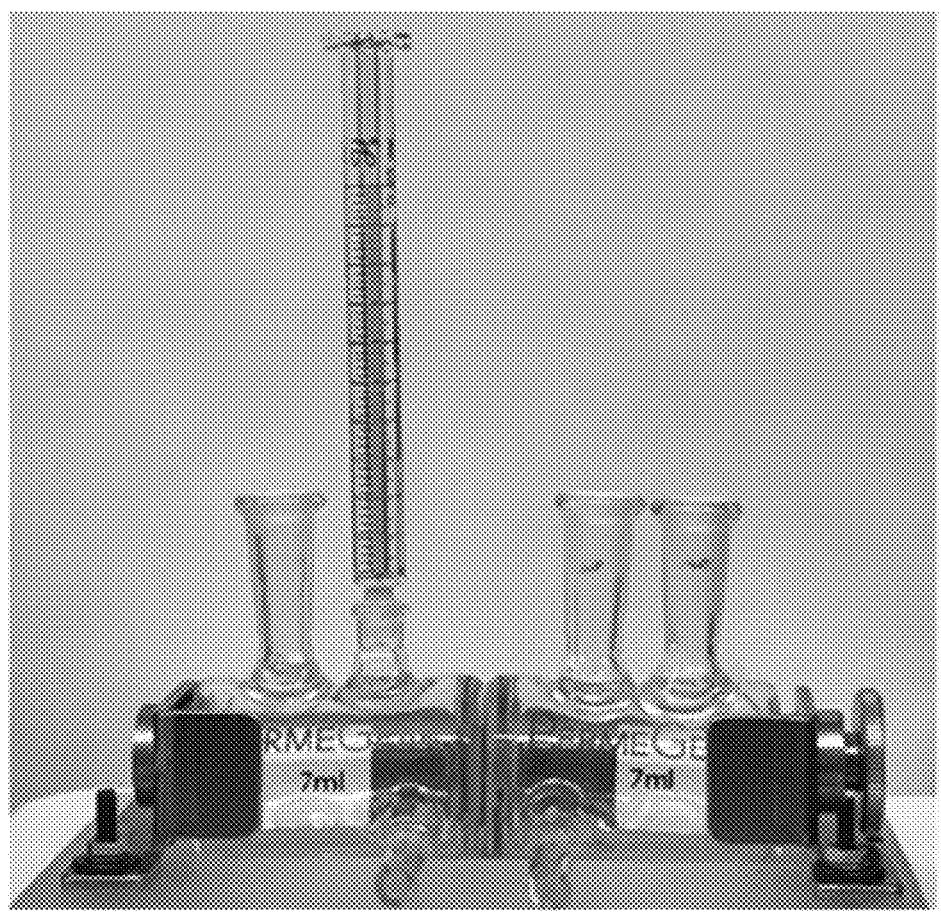
FIG. 82. Photograph of custom-built side-by-side glass diffusion cell (7 mL, 5 mm orifice, PermeGear, Inc.) with a syringe (~250 μL) stem used for pressure-driven and diffusive transport measurements. The PCTE+G membrane is installed between the two diffusion cells with the graphene side facing the column (left).

Pressure- and Diffusion-Driven Solute Transport Measurements. Pressure-driven ethanol and diffusion-driven solute transport measurements across the fabricated PCTE+graphene membranes were performed as reported previously [28, 30-34, 42, 85]. A custom-made side-by-side glass diffusion cell (7 mL, 5 mm orifice, PermeGear, Inc.) with a gas-tight syringe (250 µL, Hamilton 1725 Luer Tip) installed onto the open port of the left cell (feed side, sealed with epoxy for leak-free connection) as shown in FIG. 82 was used for both pressure-driven and diffusion-driven transport measurements. The PCTE+graphene membrane was installed between two diffusion cells with the graphene side facing left. To minimize the concentration polarization, two Teflon coated stir bars stirred vigorously in both cells.

For pressure-driven ethanol transport measurement (FIG. 83) [30, 31, 33, 34], pure ethanol was used to wash the system three times before filling both cells with pure ethanol. The left cell (feed side) was sealed by a rubber plug to raise the ethanol level in the syringe, thereby creating a hydrostatic pressure difference across the membrane. A digital camera was used to record the ethanol meniscus level change along the syringe every 1 min. The ethanol permeance was calculated by permeance=$(\Delta V/\Delta P)/(\Delta t \times A_{effective})$, where $\Delta V$ is the ethanol volume change, $\Delta P$ is the hydrostatic pressure difference across the membrane, $\Delta t$ is the time interval (1 min), and $A_{effective}$ is the effective membrane area (~0.196 cm$^2$). The ethanol coverage was computed by coverage=[1−(PCTE)+graphene ethanol permeance)/(PCTE ethanol permeance)]×100 [30, 33, 34, 85].

After pressure-driven ethanol transport measurement, the system was washed with DI water five times to completely replace ethanol. KCl (Fisher Chemical, 7447-40-7, salt, hydrated diameter of K$^+$~0.66 nm and Cl$^-$ ~0.66 nm) [25], and Vitamin B12 (B12, Sigma-Aldrich, 68-19-9, vitamin, ~1-1.5 nm) [30] were used for measuring diffusion-driven transport. For KCl transport measurements [28, 30-34, 42, 85], 7 mL of KCl solution (0.5 M in DI water) was filled into the feed side and 7 mL of DI water was filled into the permeate side. A conductivity probe (Mettler Toledo SevenCompact S230 conductivity meter) was immersed in the permeate side to collect the conductivity every 15 s for 15 min. For B12 transport measurement [28, 30-34, 42, 85], 7 mL of B12 solution (1 mM in 0.5 M KCl) was filled into the feed side and 7 mL of KCl solution (0.5 M) was filled into the permeate side. A fiber optic dip probe attached to an Agilent Cary 60 UV-vis Spectrophotometer was immersed in the permeate side to record the absorbance spectra in the range of 190 to 1100 nm every 15 s for 40 min. Different UV-vis peak positions were used for measuring the intensity differences of corresponding species: 710 nm for DI water (reference wavelength) [28, 30-34, 42, 85], and 360 nm for B12 [28, 30-34, 42, 85]. The flow rate of each solute was computed via the slope of concentration change in the permeate side (right cell), while the normalized flux was computed by dividing the slope of the PCTE+graphene membrane by that of the PCTE support [28, 30-34, 42, 85]. All the measurements were replicated three times to obtain average values and standard deviations [28, 30-34, 42, 85].

Nafion|Graphene|Nafion Membrane Fabrication. Graphene is transferred to Nafion using similar methods to others developed previously [37-40]. Nafion 211 (N211, ~25 µm thickness, Fuel Cell Store) is first converted from the acid form (as received) to salt form (K$^+$) by soaking in KCl (0.1 M) solution at room temperature. After 1 h the pH of the KCl solution is checked and solution exchanged with fresh KCl (0.1 M) until the pH is no longer acidic. After ~3 exchanges, the N211 is heated to 80° C. for 1 h in KCl solution (0.1 M) then kept in KCl solution for 48 h to ensure complete exchange of the N211 membranes to salt form (N211-K$^+$). Finally, the N211 is rinsed with DI water and dried.

Graphene on Cu is cut to ~2.25 cm$^2$ pieces and N211-K$^+$ is placed on top. A thin layer of Nafion solution (1100 MW, 1 wt %) is applied to a PTFE-coated fiberglass mat (15 mil thickness) and placed on the N211-K$^+$ [90]. An additional fiberglass mat is placed on the bottom, below the graphene on Cu and the whole stack is hot pressed at 145° C. for 3 min at ~1000 psi. The bottom fiberglass mat is removed and the remaining Cu|Graphene|N211-K$^+$|fiberglass stack is pre-etched in APS solution (0.2 M) for 15 min and rinsed in DI water to remove the bottom layer of graphene from the Cu. The stack is returned to APS (0.2 M) solution to fully etch away the Cu then rinsed with DI water for 10 min, dried in air at ambient conditions, then dried at 60° C. for 12 h. Finally, a second N211-K$^+$ layer is hot-pressed on top of the graphene (145° C., 3 min, ~1000 psi) to form a Nafion|Graphene|Nafion sandwich membrane.

The stacked graphene membrane is prepared using a similar procedure. Here, a thin layer of Nafion is spin coted on the graphene on Cu foil. The thin Nafion film is formed by spin coating three layers of Nafion solution (1×5 wt %, 2×1 wt %, 1000 rpm, 60 s) then drying at 60° C. for 10 min between layers and 30 min after the third layer. The bottom layer of graphene on Cu is removed using the same pre-etching conditions and the Cu fully etched in APS (0.2 M) solution. Once etched, the Graphene|Nafion stack is transferred to a DI water bath for 10 min, then to a fresh DI water bath before scooping it onto another piece of graphene on Cu foil, making a Cu|Graphene|Graphene|Nafion stack. The stack is dried at 60° C. for 12 h before pre-etching and fully etching the Cu as previously described. Finally, the Graphene|Graphene|Nafion stack is rinsed in DI water before scooping onto N211-K$^+$. After drying at 80° C. for 12 h, an additional N211 layer is added to the stack and hot pressed to form a Nafion|Graphene|Graphene|Nafion (stacked) sandwich membrane.

Electrically Driven Ion Transport Measurements with Liquid Electrolytes in H-Cell. Electrically driven ion transport in the liquid phase is measured using a custom-built H-Cell (FIG. 89) with the membrane placed between two electrolyte reservoirs. Luggin capillaries are positioned ~0.6 mm from the membrane on either side. Ag/AgCl pellet electrodes (A-M systems) at the far end of the Luggin capillaries are used to measure potential while current is driven by Pt wire (Alfa Aesar, 0.23 in. D) coiled around the capillaries. The open orifice area (membrane area probed) is ~0.68 cm$^2$. Approximately, 6 mL of solution (KCl or HCl) is added to either reservoir for measurements.

Figure 90:
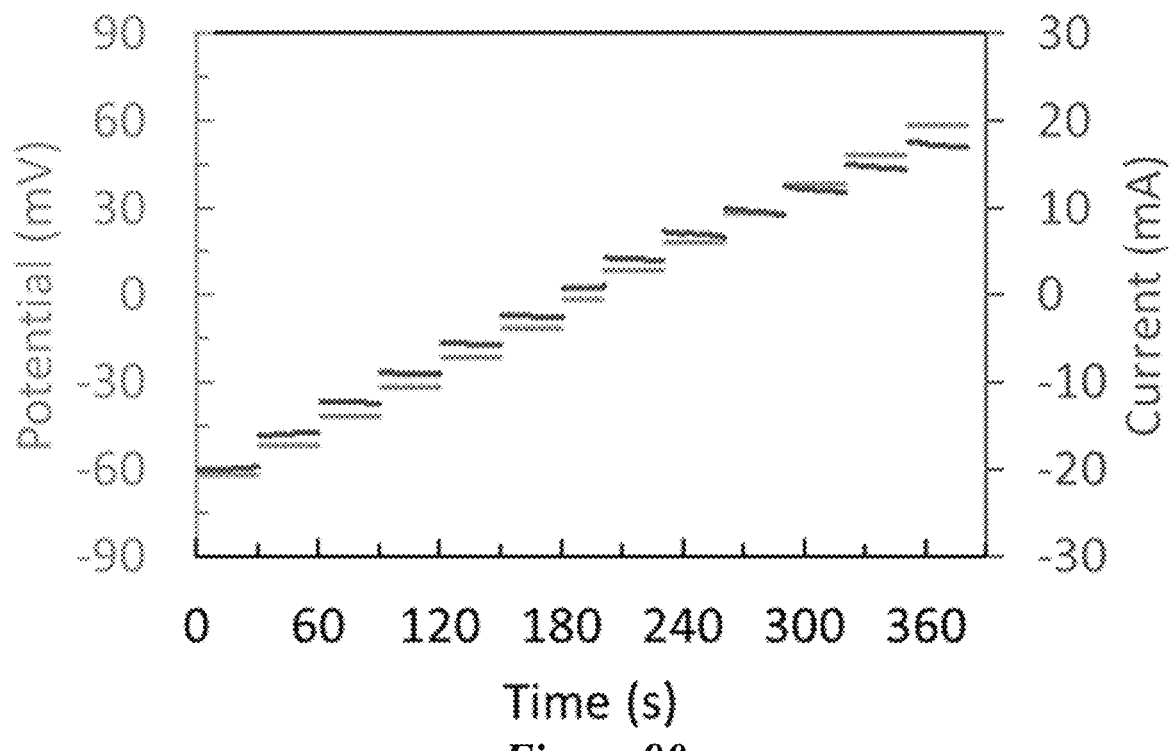
FIG. 90. Example chronoamperometry plot for a Nafion 211 sandwich in 0.1 M HCl. Here, the potential is held for 30 seconds at each step (orange) while the current is measured (blue). The last data point at each potential step is taken as the current at that potential (since the current stabilizes after ~15 seconds) thereby removing contribution from capacitance or other transient effects. The current and voltage values are used to create the IV curves plotted in FIG. 43 and FIG. 47.

Current/Voltage (IV) curves are obtained using a potentiostat (Gamry, Interface 1010B) in a four-probe geometry (working and counter electrodes on Pt wires, working sense and reference electrodes on the Ag/AgCl pellets). Multiple-step chronoamperometry is used to set and hold the cell potential (from ±60 mV, step size 10 mV) for 30 s to allow for steady-state measurements of current at the applied potential (FIG. 90). The measured current (taken as the last measurement at each potential step) is plotted versus voltage to obtain a linear IV curve. The conductance of the membrane was estimated from the slope of the IV curve. The conductance is related to membrane resistance by $\sigma=1/R$.

Figure 91:
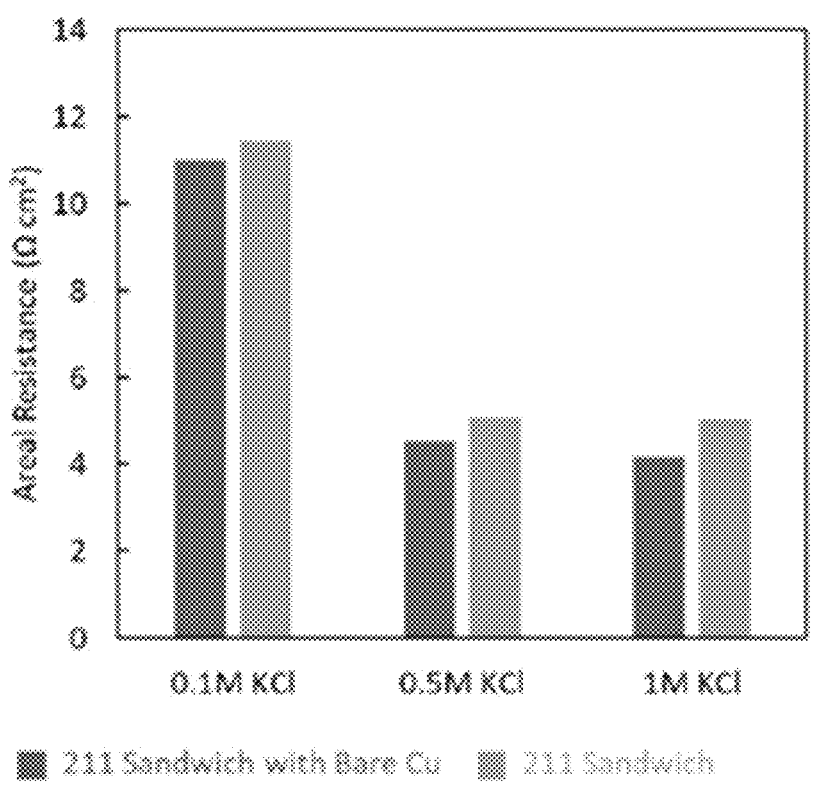
FIG. 91. Two control membranes were tested to ensure pressing against Cu foil and etching in 0.2 M ammonium persulfate solution does not affect $K^+$ exchange. Starting with $K^+$ form Nafion 211, one membrane was prepared by pressing against bare Cu using the same conditions as when transferring graphene (dark blue) while the other was just sandwiched together without pressing on Cu (gray). Membrane resistance in 0.1 M, 0.5 M, and 1 M KCl is measured in the H-cell then multiplied by the open orifice area (~0.68 $cm^2$) to obtain areal resistance. Less than 0.68 $\Omega cm^2$ variation in areal resistance is observed at any concentration.
Figure 92:
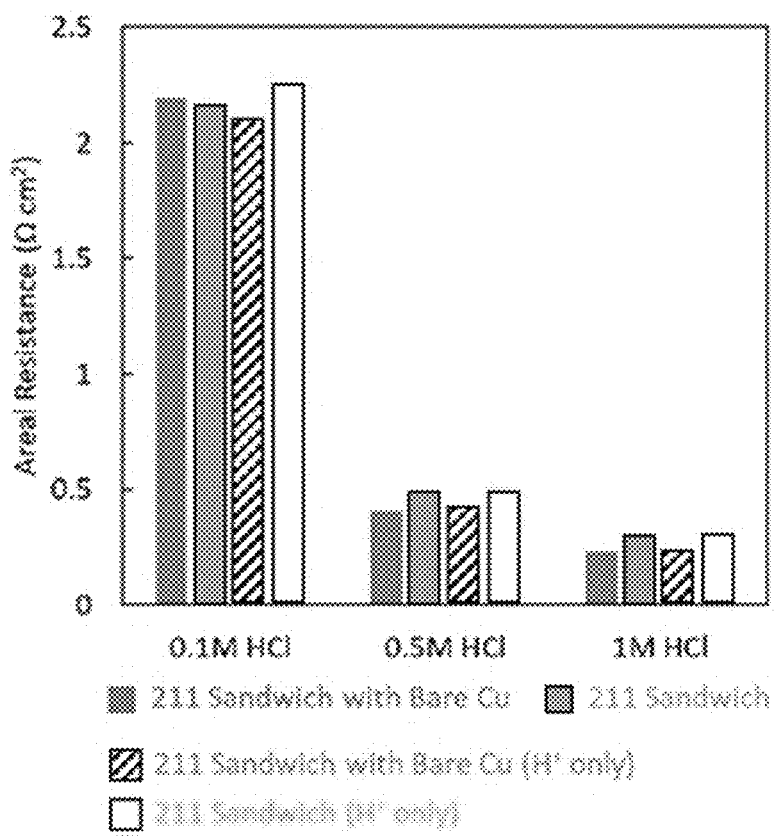
FIG. 92. The same membranes from FIG. 91 were then exchanged to $H^+$ form by soaking in 0.1 M HCl for 1 day and measured in 0.1 M, 0.5 M, and 1 M HCl in the H-cell. Additionally, two membranes were made which began in $H^+$ form, one of which was pressed against bare Cu using the same conditions as with graphene transfer (light blue) and the other was simply sandwiching two layers of $H^+$ form N211 (yellow). The <0.34 $\Omega cm^2$ variation in areal resistance is observed at any concentration, indicating that $K^+$ can be fully exchanged out of the Nafion membrane for $H^+$ and $H^+$ transport is not affected.

K$^+$ transport using KCl (0.1 M, 0.5 M, and 1 M) is measured first before exchanging the membrane to acid form by soaking in HCl (0.1 M) for 1 h, exchanging with fresh HCl (0.1 M) for another hour, then exchanging with fresh HCl (0.1 M) again and leaving for 48 h (FIG. 91-FIG. 92). The same multistep-chronoamperometry method is used to obtain IV curves with HCl (0.1, 0.5, and 1 M) for H$^+$ transport. Areal conductance is obtained by dividing the conductance by the open membrane area. Normalized K$^+$ flux is calculated as normalized K$^+$ flux=(average Nafion-|Graphene|Nafion K$^+$ conductance)/(average Nafion‖Nafion K$^+$ conductance). Membrane H$^+$/K$^+$ selectivity is calculated as the ratio of average areal H$^+$ conductance through the membrane divided by the average areal K$^+$ conductance through the membrane. Error bars represent one standard deviation and account for error propagation.

Gas-Phase Proton Transport Measurements. After measuring K$^+$ and H$^+$ transport in the liquid phase in the H-cell, areal proton conductance through the membrane is measured using H$_2$ gas as the proton source. The membranes are rinsed in deionized water and dried for 24 h in ambient conditions before adding platinum carbon electrodes (Pt/C, ¼ in. diameter, ~0.38 cm$^2$, 0.2 mg Pt cm$^{-2}$ loading). Pt/C electrodes are positioned in the center of the region which was tested in the liquid phase and hot-pressed on either side of the membrane, so the same region is probed in the gas phase as the liquid phase measurements. The membrane is loaded into a custom-built gas cell similar in design to previous reports [36-38]. The gas cell comprises of a PTFE compression fitting, graphite rod current collectors with channels for gas inlet and outlet, rubber gaskets to seal the membranes and porous Ni foam electrical contacts (FIG. 60).

For measuring H$^+$ transport, humidified H$_2$ gas (99.999%, ~40 sccm bubbling through DI water before entering the cell) is supplied to either side of the membrane. This configuration is referred to as symmetric mode. The potentiostat leads are connected to the graphite rod current collectors in a two-probe geometry (working and working sense electrodes on one side, while the counter and reference electrodes are on the other side). Linear sweep voltammetry (LSV) is used, sweeping the applied potential from ±60 mV at a scan rate of 2 mV/s. The membrane areal H$^+$ conductance and areal resistance are calculated from the resulting linear IV curve. The percent H$^+$ transport reduction is calculated as percent reduction=[(Nafion‖Nafion conductance−Nafion|Graphene|Nafion conductance)/(Nafion‖Nafion conductance)]×100. Error bars represent one standard deviation and account for error propagation.

H$_2$ Crossover Current Density Measurements. H$_2$ crossover is also measured in the gas phase cell at room temperature with 40 sccm humidified H$_2$ gas supplied to one side of the membrane and varying flow rates~16-40 sccm of humidified N$_2$ gas (99.9%) supplied to the other. This configuration is referred to as asymmetric mode. Initially all membranes, that is, N211, N211‖N211, fast, slow, low T, and stacked were measured under identical flow conditions~40 sccm H$_2$ and ~32 sccm N$_2$. To test the H$_2$ crossover of the N211‖N211 and stack membrane, the H$_2$ flow rate was kept at ~40 sccm while the N$_2$ flow rate was systematically varied between ~16-40 sccm. LSV is measured from 0.5-0 V with a two-probe geometry (working and working sense electrodes on the N$_2$ side; the counter and reference electrodes on the H$_2$ side). In this configuration, H$_2$ which diffused through the membrane (crossover) is oxidized at the anode (N$_2$ side) into protons and driven back through the membrane via the applied potential. The recombination of these H$^+$ on the H$_2$ side (cathode) is measured as current, generally referred to as the limiting current (I$_{lim}$) and used as a measure of H$_2$ crossover [9, 10]. The limiting current for each membrane is taken at 0.4 V (DOE standard method) [9, 10] as this region is free from influence of H$^+$ adsorption/desorption to the Pt. Crossover current density is obtained by dividing the limiting current at 0.4 V by the active area (~0.318 cm$^2$). The percent H$_2$ crossover reduction for each graphene membrane is calculated as percent reduction={[I$_{lim}$(Nafion|Nafion)−I$_{lim}$(Nafion|Graphene|Nafion)]/I$_{lim}$(Nafion‖Nafion)}×100. Error bars represent one standard deviation and account for error propagation.

Supporting Information

FIG. 68-FIG. 70 shows the temperature profile (red) and hydrogen (violet) and methane (orange) mass flow rates throughout the CVD process for each graphene type grown on Cu foil (see methods section) with labeled segments. Complete films of slow (FIG. 68), fast (FIG. 69), and low T (FIG. 70) graphene are grown via CVD on Cu foil. Two growth steps are used to ensure complete coverage of graphene on Cu by increasing the methane flow rate after the first step.

FIG. 71-FIG. 75 shows the evaluation of defects in the three graphene types using iron chloride acid etch test. The slow growth graphene shows the lowest percentage etched area, indicating the fewest defects. The observed trend in percentage area etched (slow<fast<low T) is the same for the iron chloride etch and electrochemical etch tests (FIG. 35).

FIG. 76-FIG. 81 show the calculations of graphene film coverage and nucleation density on Cu foil using ImageJ software. SEM images of graphene on Cu foil (FIG. 76, FIG. 78, FIG. 80) are thresholded using ImageJ software to create a black and white image (FIG. 77, FIG. 79, FIG. 81, where graphene is black in color and Cu foil is white in color). The threshold area is equal to the total graphene area and coverage is calculated from the ratio of covered area to total image area. This analysis is performed on six different images for each graphene type at multiple growth times to obtain data for the plot of graphene film coverage on Cu as a function of time shown in FIG. 32. "Analyze particles" function in ImageJ is used to count the number of nucleation sites which is divided by the total sample area to calculate nucleation density. An average of this analysis over six different images is used to compute the data for FIG. 34.

Figure 76:
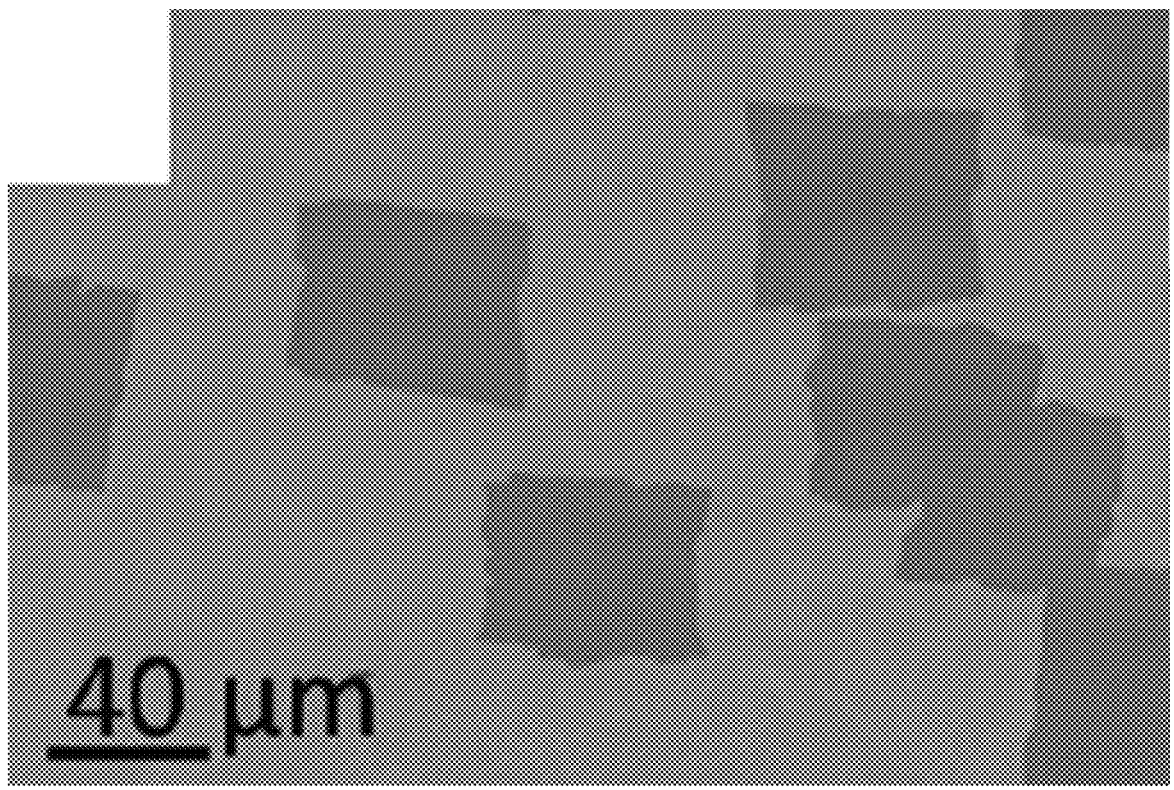
FIG. 76. SEM image of slow graphene on Cu foil.
Figure 77:
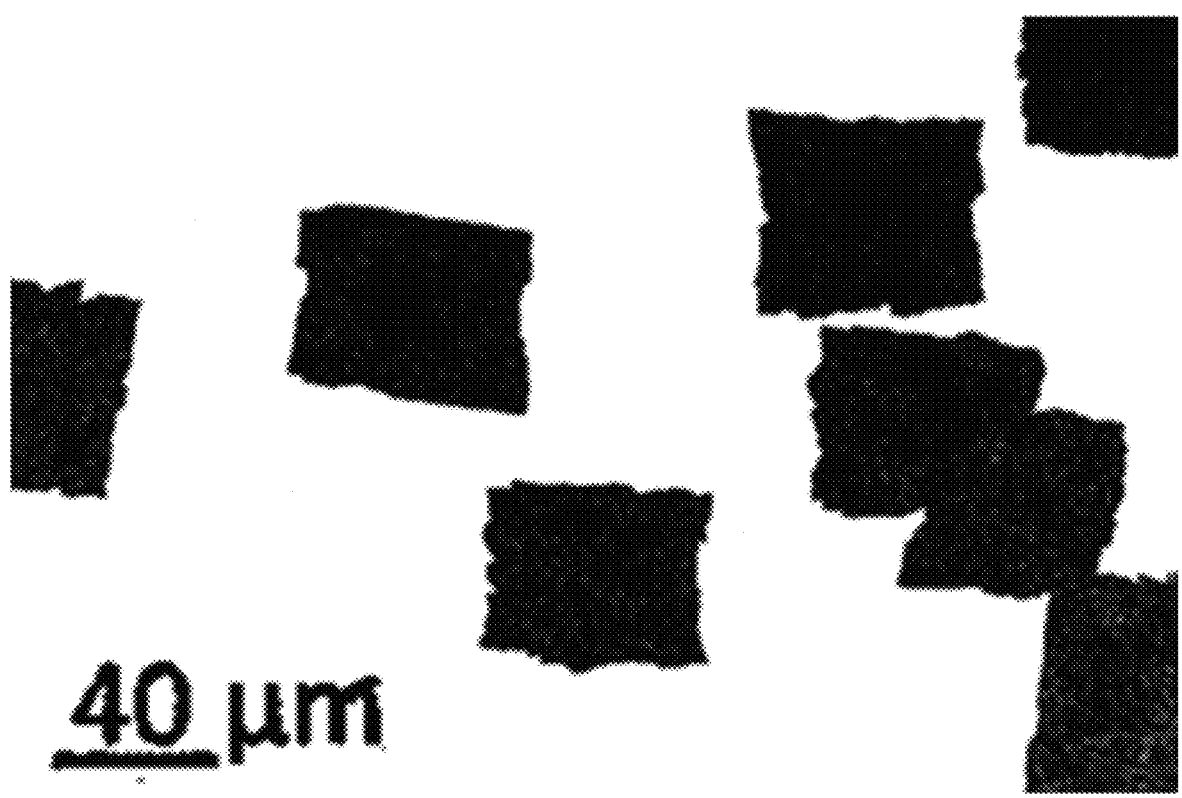
FIG. 77. SEM image of slow graphene on Cu foil from FIG. 76 thresholded using ImageJ software to create a black and white image (where graphene is black in color and Cu foil is white in color).
Figure 78:
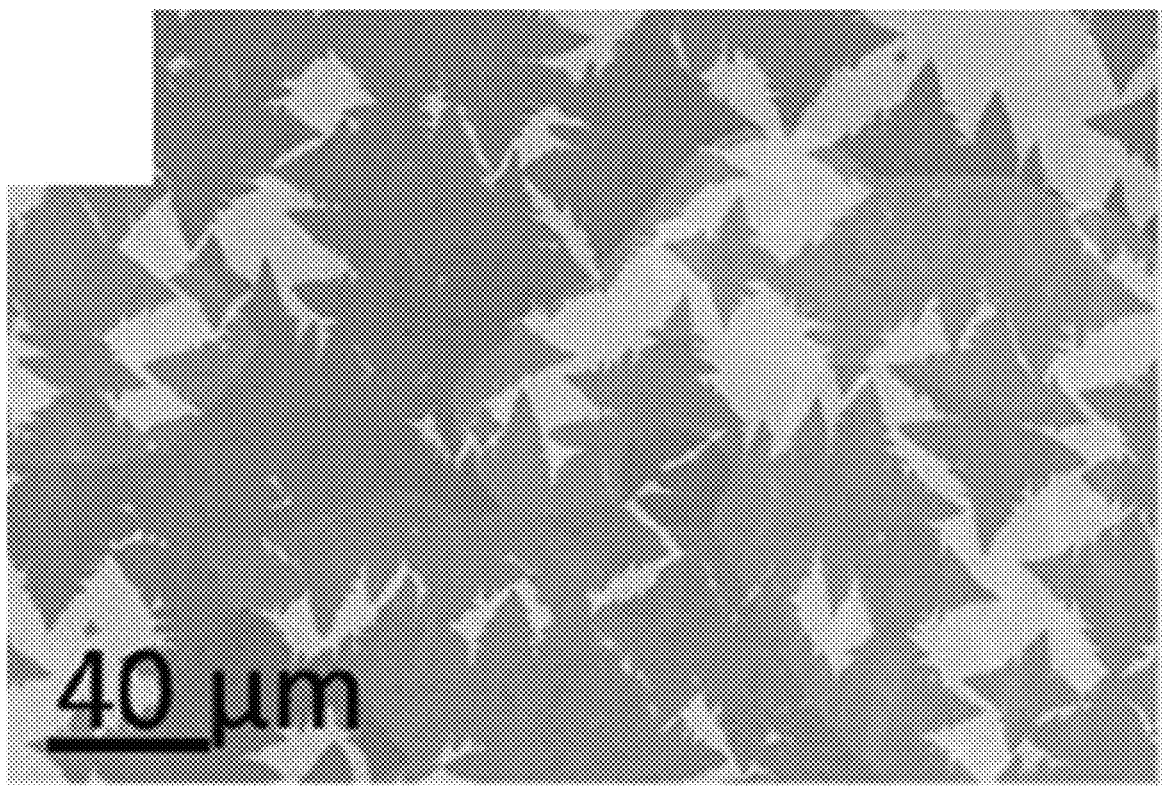
FIG. 78. SEM image of fast graphene on Cu foil.
Figure 79:
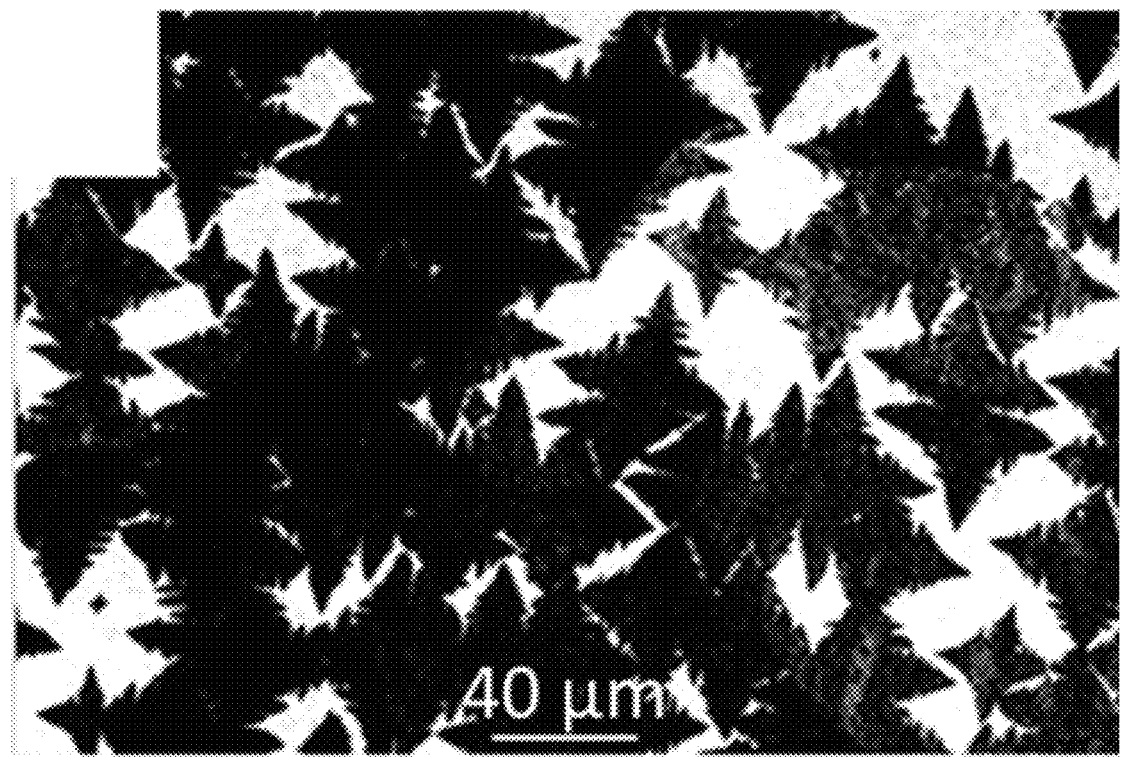
FIG. 79. SEM image of fast graphene on Cu foil from FIG. 78 thresholded using ImageJ software to create a black and white image (where graphene is black in color and Cu foil is white in color).
Figure 80:
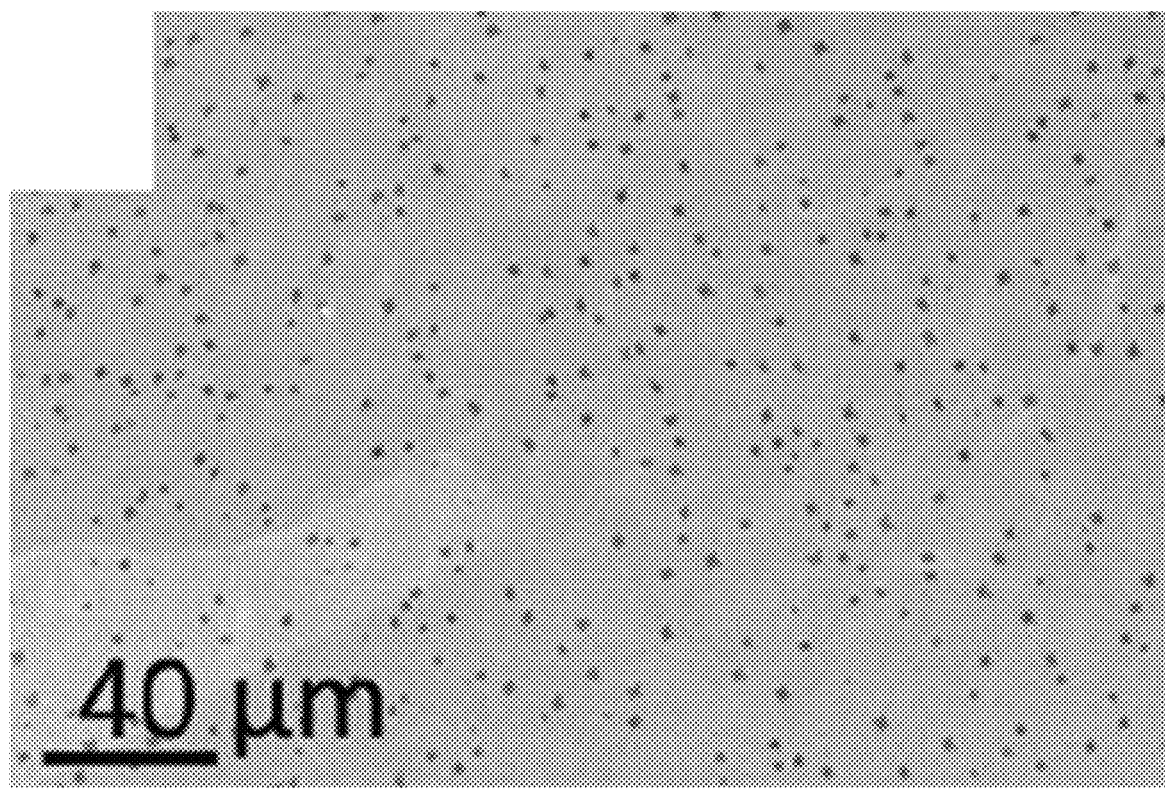
FIG. 80. SEM image of low T graphene on Cu foil.
Figure 81:
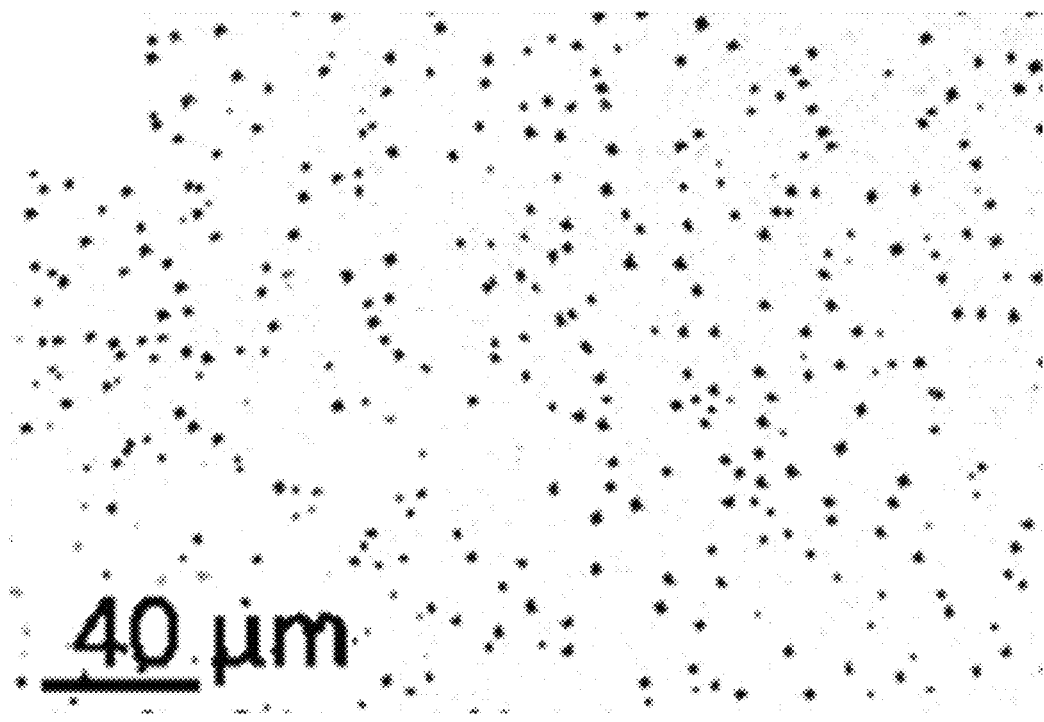
FIG. 81. SEM image of low T graphene on Cu foil from FIG. 80 thresholded using ImageJ software to create a black and white image (where graphene is black in color and Cu foil is white in color).

Values obtained for the images shown in FIG. 76, FIG. 78, and FIG. 80 using the described processes are listed in Table 4. Note that values of coverage plotted in FIG. 32 and nucleation density plotted in FIG. 34 are an average of all images analyzed using the method described above.

TABLE 4

Values obtained for the images shown in FIG. 76, FIG. 78, and FIG. 80 using the described processes.

|  | Slow (5 min) | Fast (30 s) | Low T (30 s) |
|---|---|---|---|
| Total sample area ($\mu m^2$) | 51388 | 48399 | 48861 |
| Total graphene area ($\mu m^2$) | 14608 | 34126 | 162.7 |
| Coverage (%) | 28.4 | 70.5 | 3.33 |
| Nucleation sites | 8 | 65 | 4.9 |
| Nucleation density ($\mu m^{-2}$) | $1.556 \times 10^{-4}$ | $1.343 \times 10^{-3}$ | $8.371 \times 10^{-3}$ |
| Nucleation density ($mm^{-2}$) | 155.6 | 1342 | 8371 |

Figure 83:
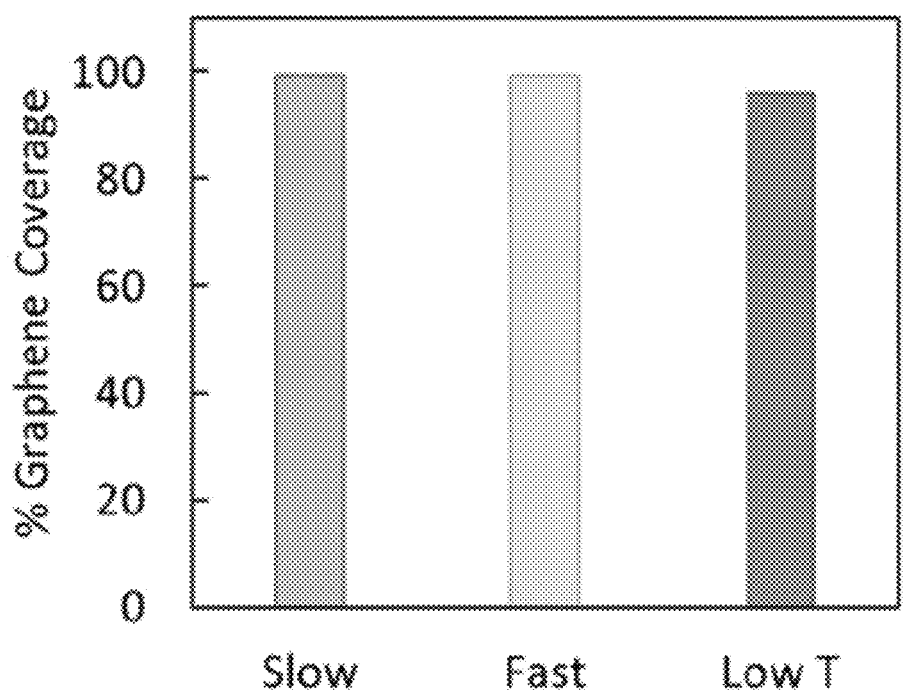
FIG. 83. Graphene coverage (%) measured using pressure-driven transport of ethanol.
Figure 84:
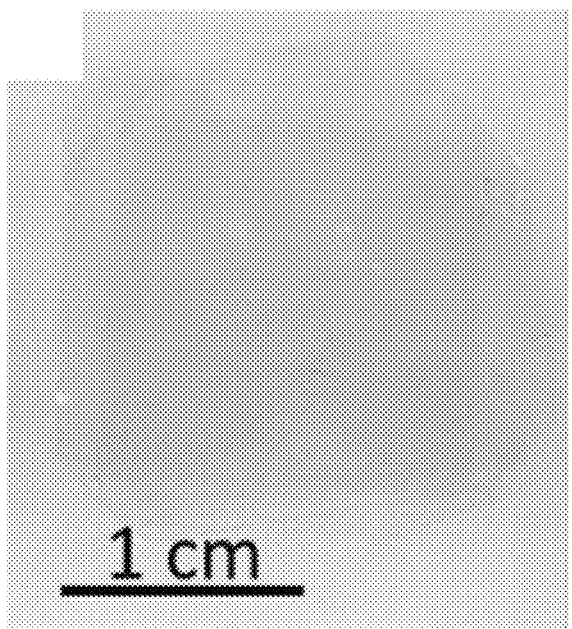
FIG. 84. Optical image of slow CVD graphene transferred to Nafion 211 using hot press. The region of darker contrast is graphene.
Figure 85:
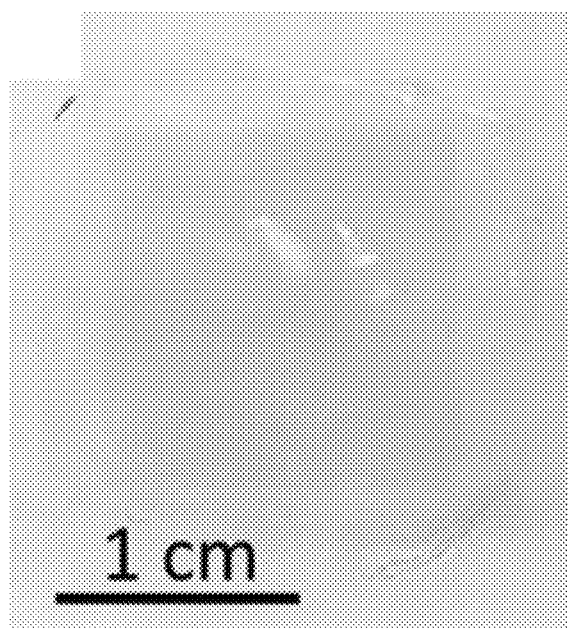
FIG. 85. Optical image of fast CVD graphene transferred to Nafion 211 using hot press. The region of darker contrast is graphene.
Figure 86:
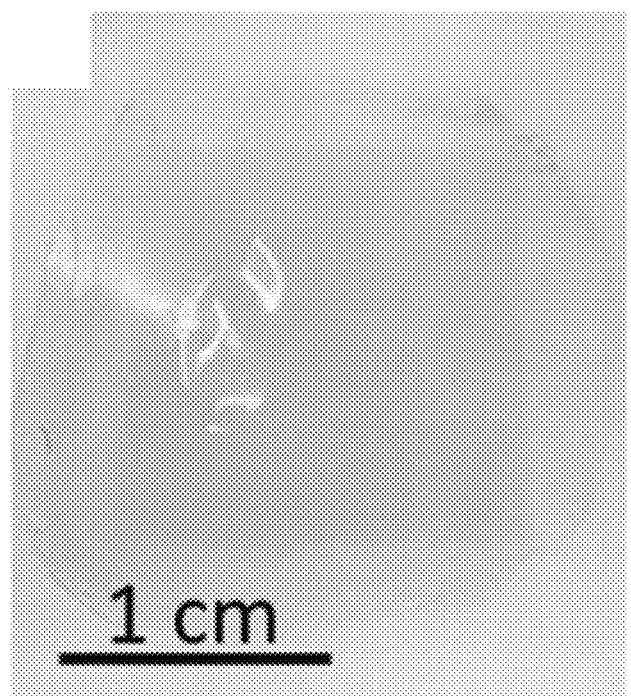
FIG. 86. Optical image of low T CVD graphene transferred to Nafion 211 using hot press. The region of darker contrast is graphene.
Figure 87:
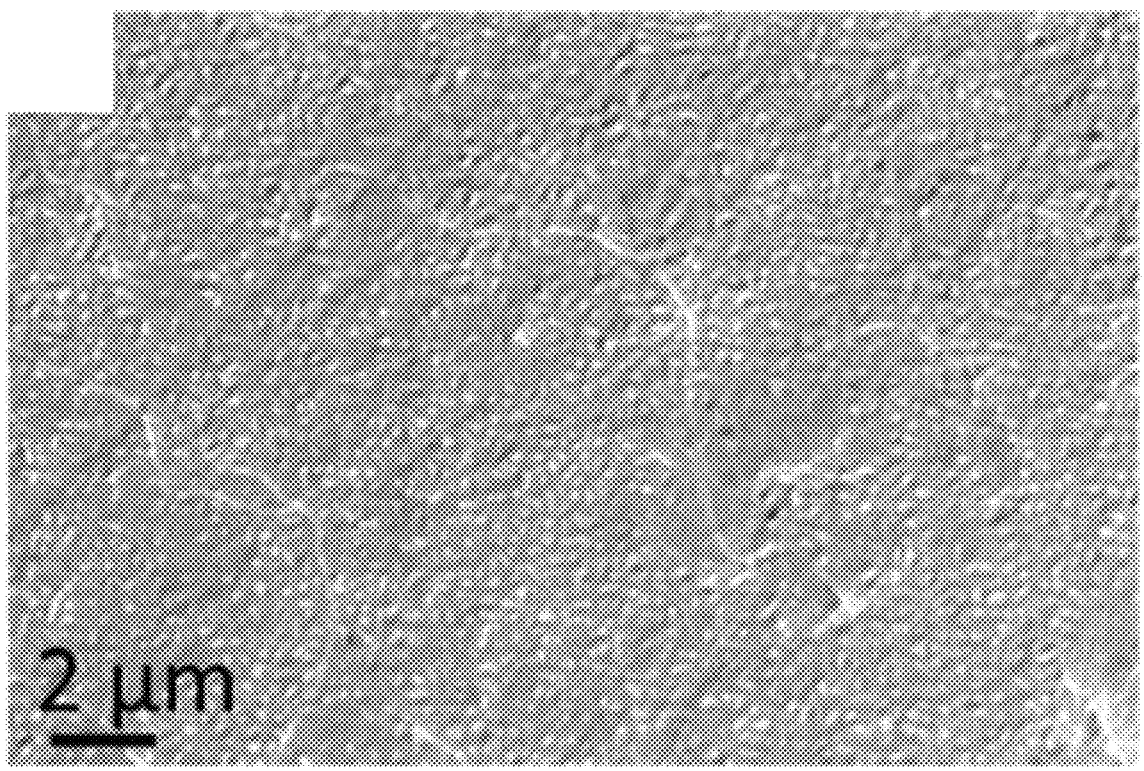
FIG. 87. SEM image of bare N211 hot pressed using the same conditions as for graphene transfer.
Figure 88:
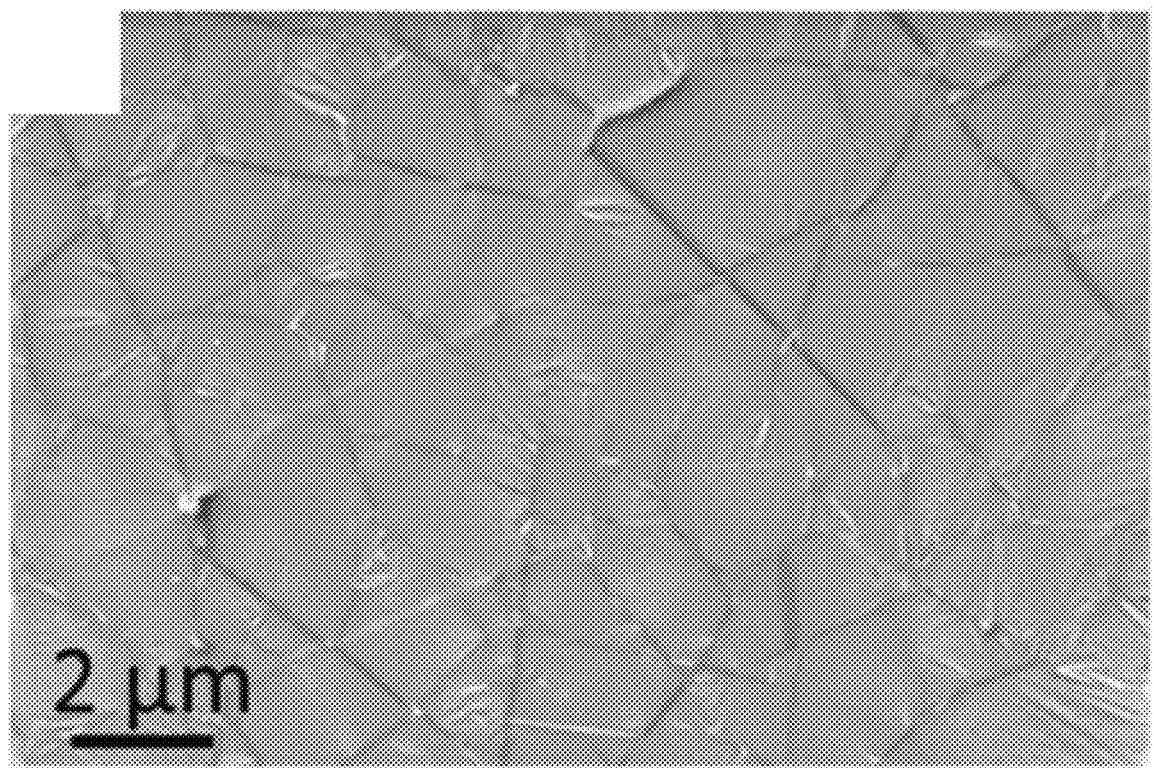
FIG. 88. SEM image of graphene transferred to N211. Regions of darker contrast are attributed to graphene wrinkles. The absence of large cracks/tears suggests successful graphene transfer to Nafion with high transfer yields.

FIG. 83 shows the graphene transfer yield or coverage on PCTE supports measured using pressure driven transport of ethanol. FIG. 82 is a photograph of the custom-built side-by-side glass diffusion cell (7 mL, 5 mm orifice, PermeGear, Inc.) with a syringe (~250 μL) stem used for pressure-driven and diffusive transport measurements. The PCTE+G membrane is installed between the two diffusion cells with the graphene side facing the column (left). FIG. 83 shows the graphene coverage (%) measured using pressure-driven transport of ethanol. Both sides of the cell are initially filled with pure ethanol. Subsequently, the left side of the cell was sealed with a rubber plug and the height in the syringe stem is used as a hydrostatic pressure head across the graphene/PCTE membrane.

The ethanol permeance was calculated using:

$$\text{permeance} = (\Delta V/\Delta P)/(\Delta t \times A_{effective})$$

where $\Delta V$ is the ethanol volume change, $\Delta P$ is the hydrostatic pressure difference across the membrane, $\Delta t$ is the time interval (~1 min), and $A_{effective}$ is the effective membrane area (~5 mm diameter orifice of the cell).

The coverage was calculated using:

$$\text{coverage} = [1-(\text{PCTE}+G \text{ ethanol permeance})/(\text{PCTE ethanol permeance})] \times 100$$

Graphene transfer to Nafion after hot press was evaluated (FIG. 84-FIG. 88). The absence of large cracks/tears suggests successful graphene transfer to Nafion with high transfer yields.

FIG. 89-FIG. 90 shows $K^+$ and $H^+$ transport through Nafion|Graphene|Nafion membranes using liquid electrolytes. FIG. 89 is a schematic of the H-Cell used for liquid phase ion transport measurements. The membrane is loaded between two symmetric cells and held in place with a clamp. Pt wires are used as the working and counter electrode for driving current while Ag/AgCl electrodes are used to measure the potential. The Ag/AgCl electrodes are within Luggin capillaries to i) remove electrode polarization effects from current running through the reference electrodes and ii) to get the relative position as close to the membrane surface as possible (~0.6 mm from capillary opening to membrane surface) which allows for minimization of solution resistance contribution. FIG. 90 shows an example chronoamperometry plot for a Nafion 211 sandwich in 0.1M HCl. Here, the potential is held for 30 seconds at each step (orange) while the current is measured (blue). The last data point at each potential step is taken as the current at that potential (since the current stabilizes after ~15 seconds) thereby removing contribution from capacitance or other transient effects. The current and voltage values are used to create the IV curves plotted in FIG. 43 and FIG. 47.

FIG. 91-FIG. 92 shows the influence of pre-treatment conditions on Nafion sandwich control membrane areal resistances. Two control membranes were tested to ensure pressing against Cu foil and etching in 0.2 M ammonium persulfate solution does not affect $K^+$ exchange (FIG. 91). Starting with $K^+$ form Nafion 211, one membrane was prepared by pressing against bare Cu using the same conditions as when transferring graphene (dark blue) while the other was just sandwiched together without pressing on Cu (gray). Membrane resistance in 0.1 M, 0.5 M, and 1 M KCl is measured in the H-cell then multiplied by the open orifice area (~0.68 $cm^2$) to obtain areal resistance. Less than 0.68 $\Omega cm^2$ variation in areal resistance is observed at any concentration. The same membranes from FIG. 91 were then exchanged to $H^+$ form by soaking in 0.1 M HCl for 1 day and measured in 0.1 M, 0.5 M, and 1 M HCl in the H-cell (FIG. 92). Additionally, two membranes were made which began in $H^+$ form, one of which was pressed against bare Cu using the same conditions as with graphene transfer (light blue) and the other was simply sandwiching two layers of $H^+$ form N211 (yellow). The <0.34 $\Omega cm^2$ variation in areal resistance is observed at any concentration, indicating that $K^+$ can be fully exchanged out of the Nafion membrane for $H^+$ and $H^+$ transport is not affected. Overall, these experiments ensure the validity of the membrane preparation process and ensure the controls used for reference/calculations of graphene resistance are adequate/appropriate.

Figure 64:
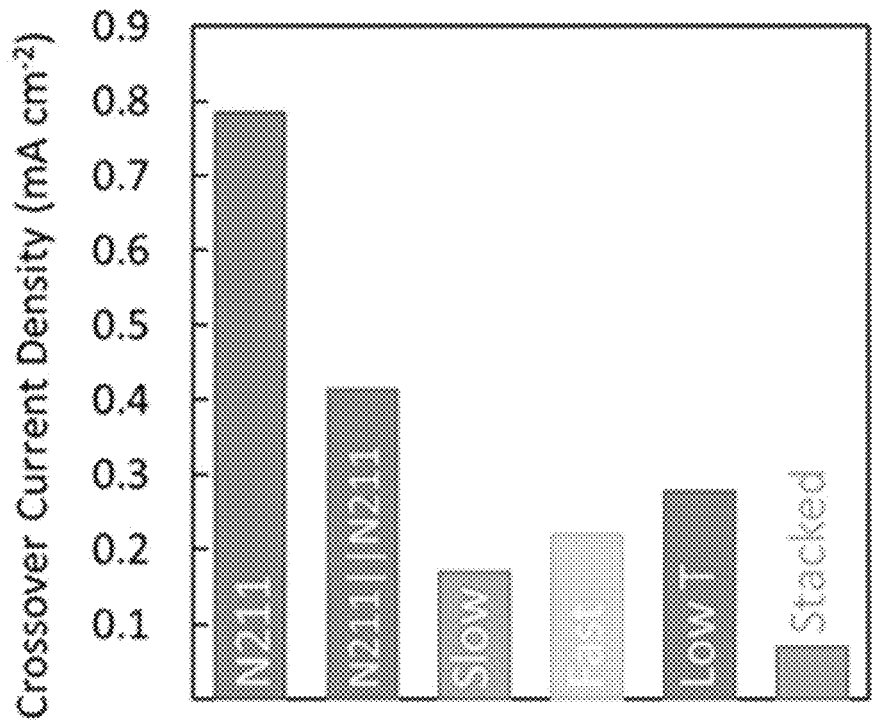
FIG. 64. Crossover current density at 0.4 V and 25° C. from D is used to compare $H_2$ crossover across the different membranes [10, 17].
Figure 65:
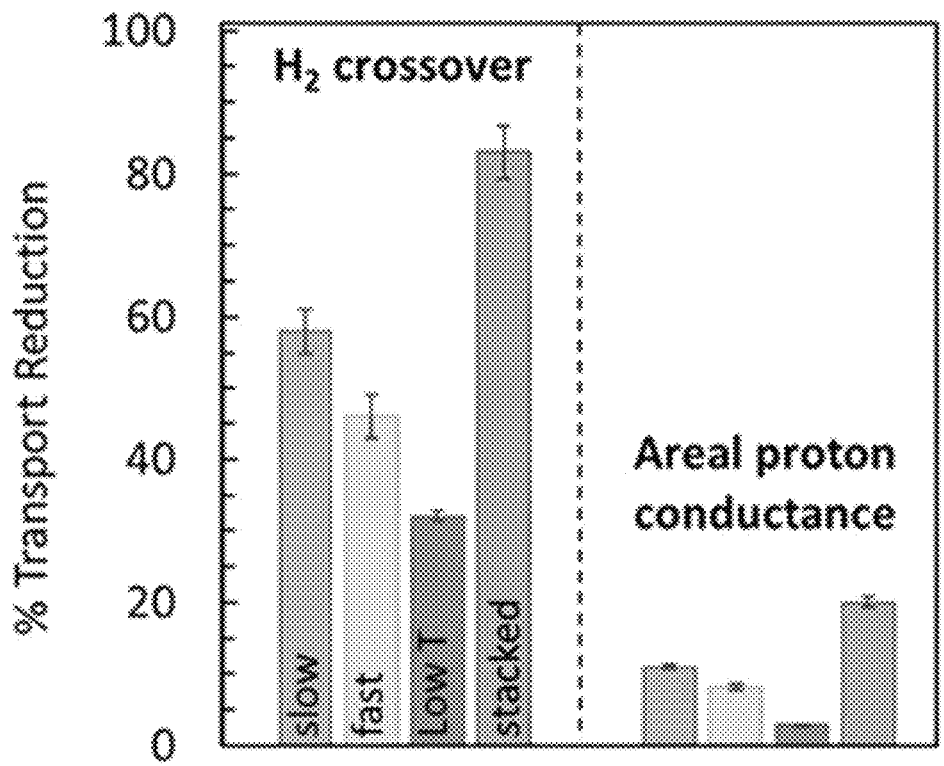
FIG. 65. Reduction in $H_2$ crossover compared with the reduction in $H^+$ transport through the membranes, calculated from the average $H_2$ crossover and $H^+$ transport values for each graphene membrane compared to the average of the N211||N211 sandwich. The slow growth graphene allows for ~58% (~$1.7×10^{-1}$ mA $cm^{-2}$) reduction in $H_2$ crossover with marginal decrease ~11% in areal proton conductance. Interestingly, when two layers of the slow growth graphene are stacked, $H_2$ crossover is reduced to record low values~$6.9×10^{-2}$ mA $cm^{-2}$ (~83% reduction), while the proton transport only reduces by ~20%. Error bars represent one standard deviation. Left to right at each section: Slow, fast, low T, stacked.
Figure 66:
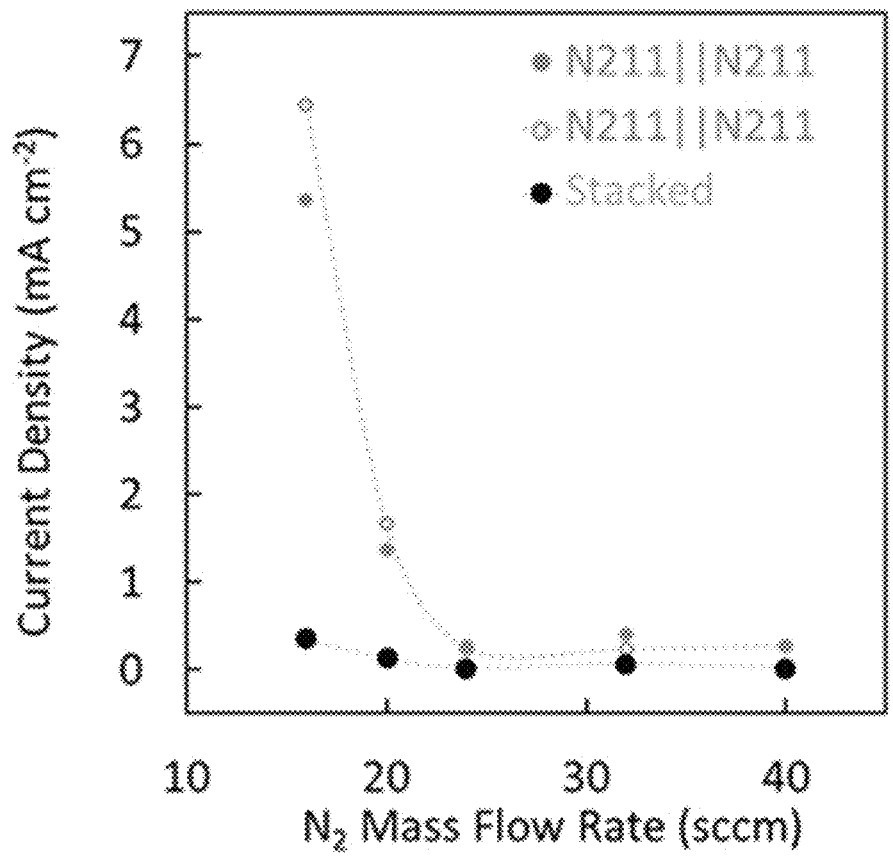
FIG. 66. Crossover current density for two N211||N211 membranes and stacked graphene membrane (N211|Graphene|Graphene|N211) with varying flow rates of $N_2$~16-40 sccm. A reduction in $N_2$ flow rate causes crossover in the control membranes to increase significantly but the effect is marginal for the N211|Graphene|Graphene|N211 membrane.
Figure 67:
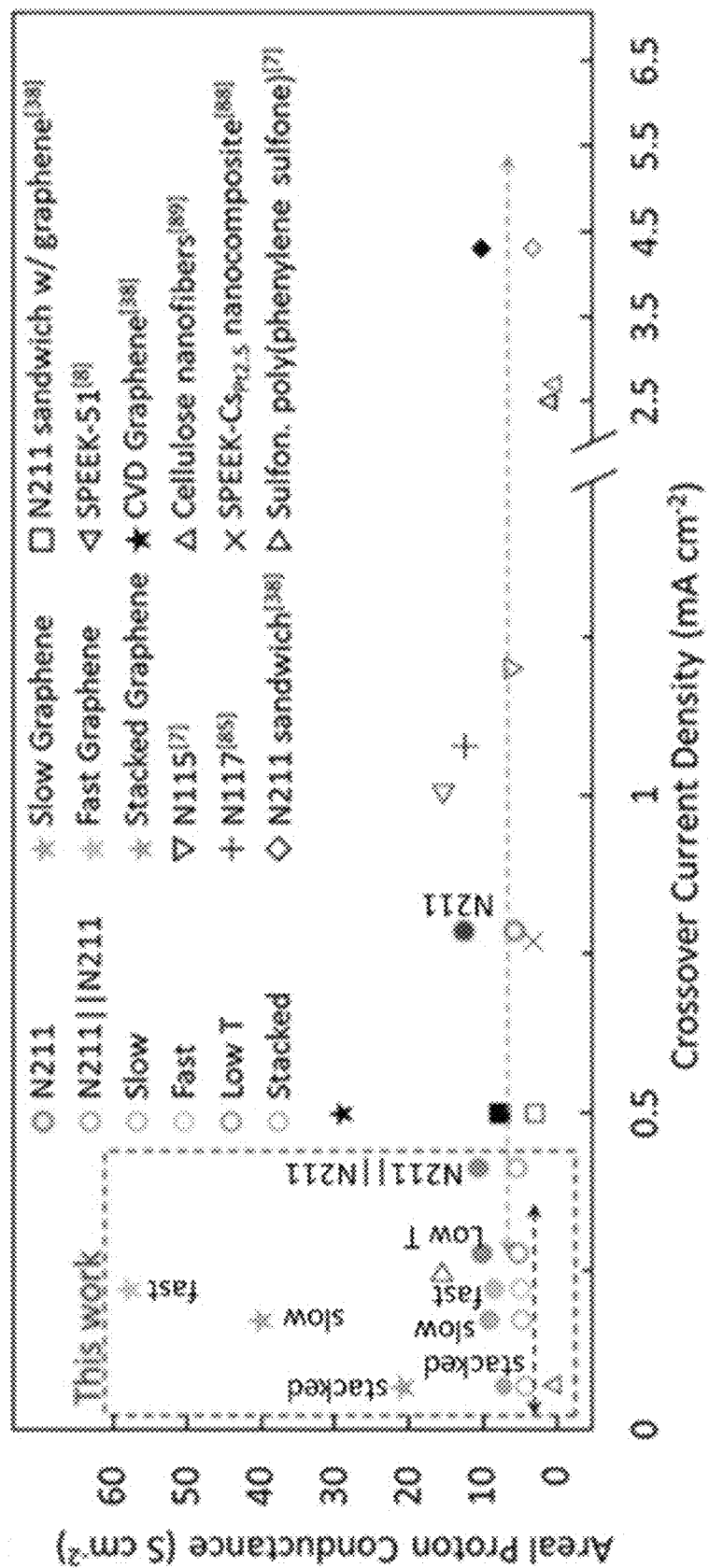
FIG. 67. $H_2$ crossover current density (at 0.4 V) as a function of areal proton conductance for the centimeter-scale graphene membranes as well as other reports in literature (see Table 9). Open symbols represent as-measured values in this study (colored open symbols) as well as reports in literature (black open symbols). Filled colored symbols represent calculated areal proton conductance after subtraction of system resistance contribution, and filled stars represent the calculated areal proton conductance of graphene after subtraction of control membrane (N211||N211) resistance subtraction. The gray (stacked) and orange (N211||N211) horizontal dotted lines with arrow heads represent the range of crossover current densities measured using different flow rates of $N_2$ as shown in FIG. 66 (minimum crossover value~$2.5×10^{-2}$ mA $cm^{-2}$ for stacked graphene). The graphene membranes exhibit significantly lower $H_2$ crossover while maintaining comparable proton transport to other materials such as Nafion [2, 3, 6, 38], SPEEK [1-3], cellulose nanofibers [89] and SPEEK-PtCs$_{2.5}$ [88] nanocomposites. Subtraction of the system and N211||N211 resistance (see Experimental Methods and Table 8) indicates that the graphene is not the limiting resistance in the membranes, indicating kinetic control of angstrom scale defects and facile stacking approaches could enable practical advances toward the development of high flux proton exchange membranes with record low $H_2$ crossover.
Figure 93:
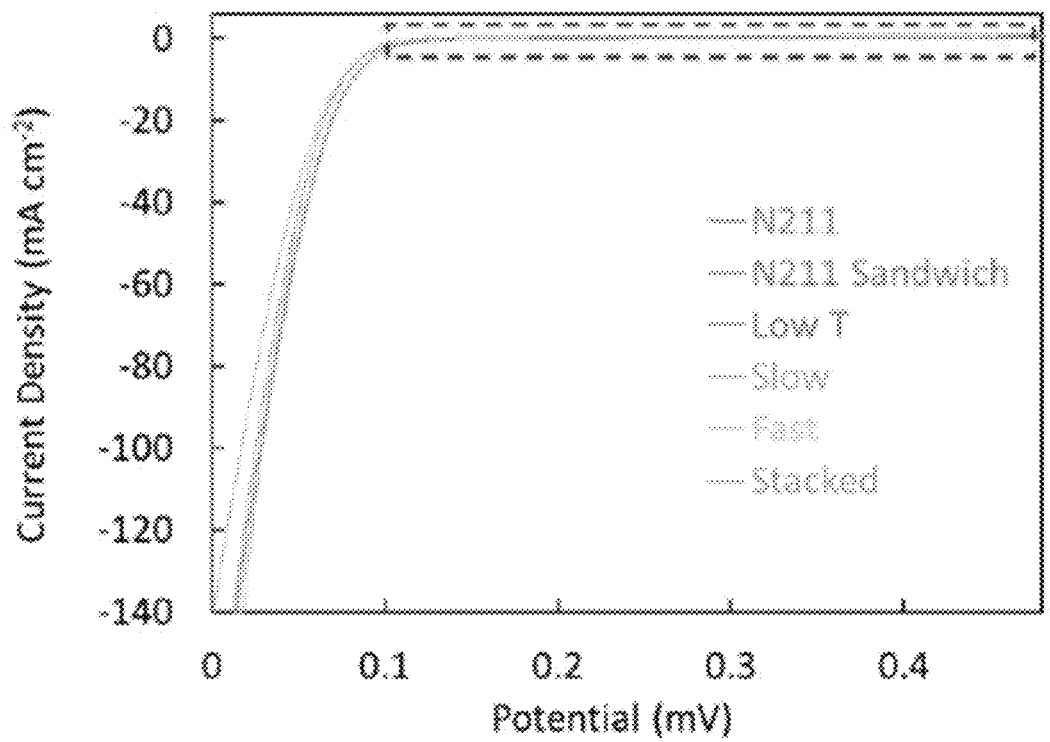
FIG. 93. $H_2$ crossover current density.

FIG. 93 shows $H_2$ crossover current density. Linear sweep voltammetry with extended potential range shown for each graphene type sandwiched between N211 using the asymmetric geometry. 40 sccm $H_2$ is supplied to one electrode while ~32 sccm $N_2$ is supplied to the other electrode and LSV from 0.5 to 0 V is measured at a scan rate of 2 mV $s^{-1}$. The scan range from 0 to 0.5 V shows both the hydrogen evolution reaction (potentials below ~0.12 V) and the limiting current region where crossover current density is obtained (FIG. 63, FIG. 64).

Figure 94:
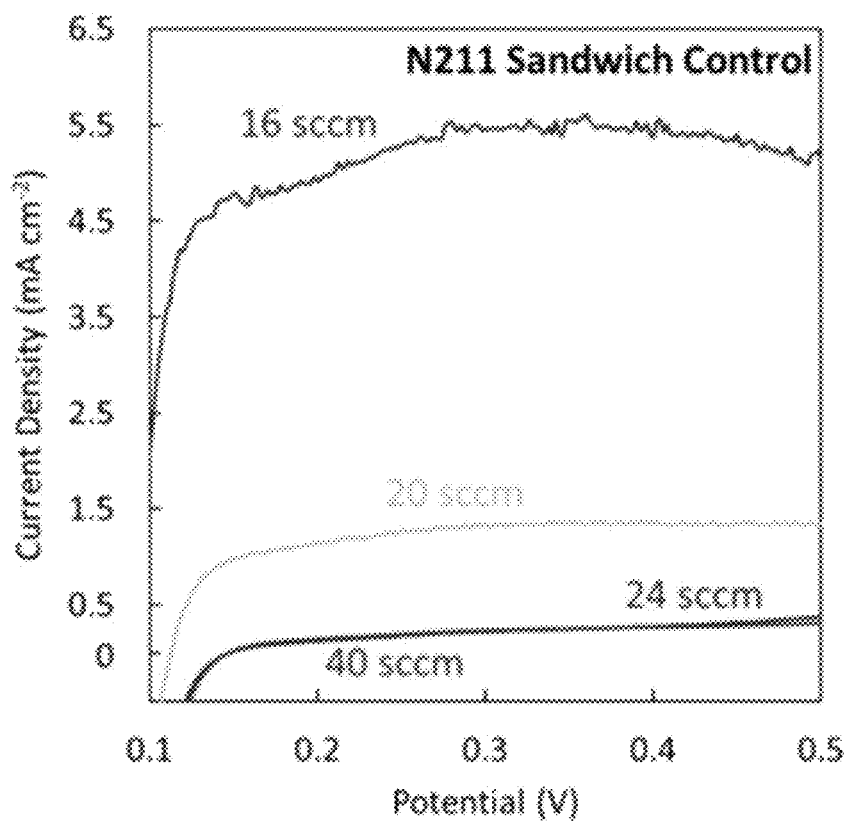
FIG. 94. Limiting current ranges of LSV for N211 sandwich (control) membrane while the $H_2$ mass flow rate is held steady at 40 sccm and the $N_2$ mass flow rate is varied.
Figure 95:
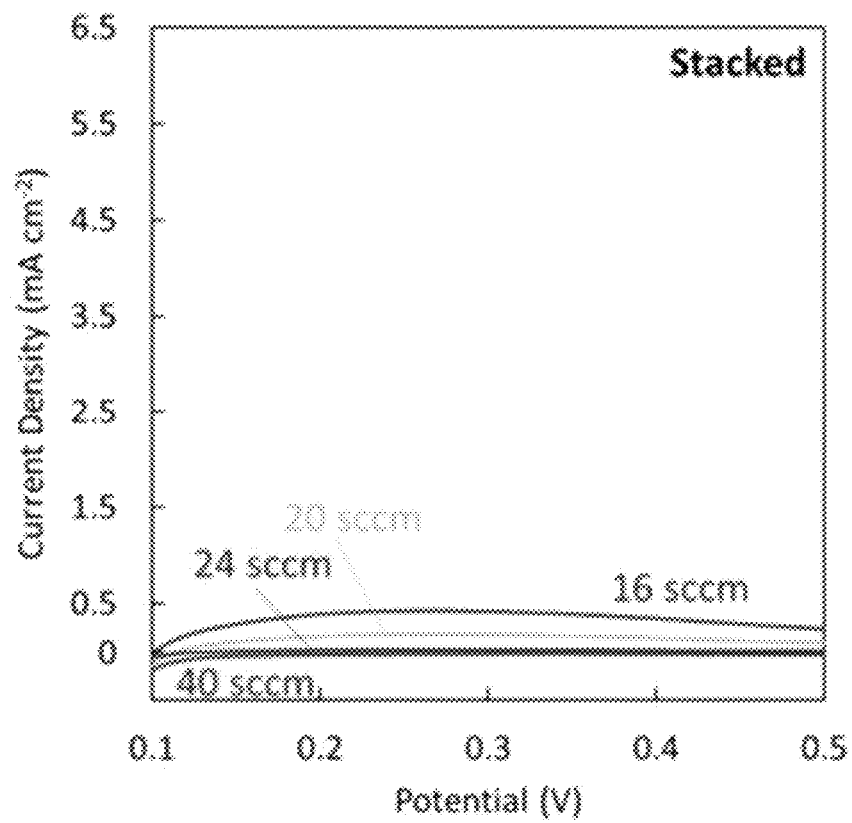
FIG. 95. Limiting current ranges of LSV for stacked graphene membrane while the $H_2$ mass flow rate is held steady at 40 sccm and the $N_2$ mass flow rate is varied.
Figure 96:
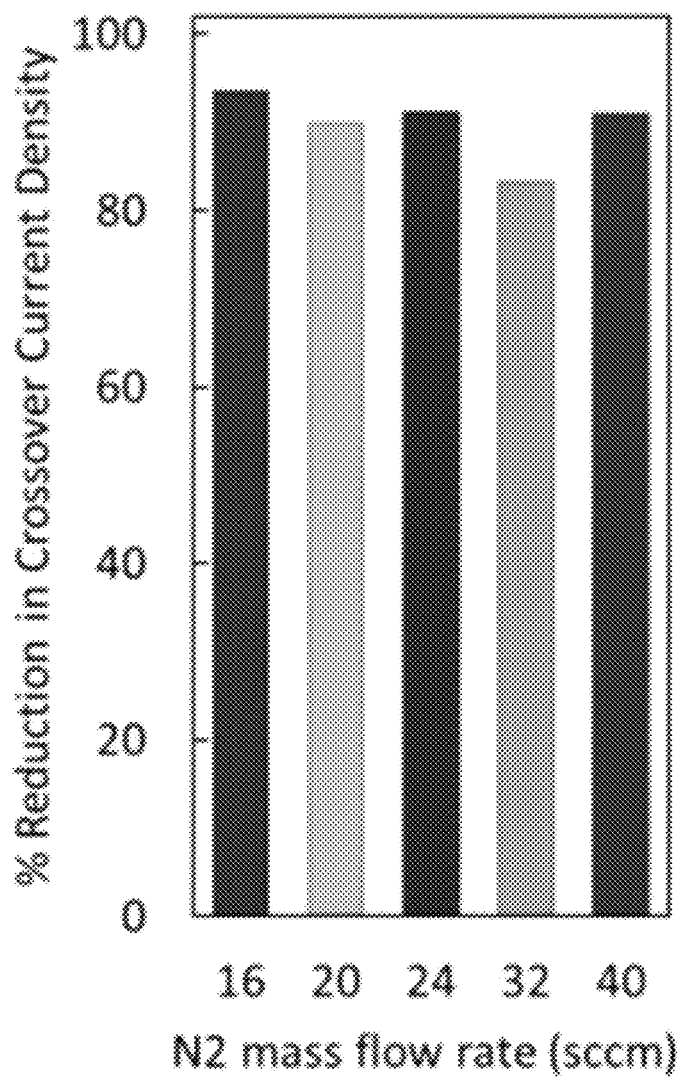
FIG. 96. Percent reduction in crossover current density due to stacked graphene at each of the $N_2$ flow rates shows the reduction in crossover is greater than ~83%, with a maximum reduction of ~93% reached with 16 sccm $N_2$.

FIG. 94-FIG. 96 shows the effect of different mass flow rates of $N_2$ on $H_2$ crossover current density. Limiting current ranges of LSV are shown for N211 sandwich (control) membrane (FIG. 94) and stacked graphene membrane (FIG. 95) while the $H_2$ mass flow rate is held steady at 40 sccm and the $N_2$ mass flow rate is varied. With decreasing $N_2$ flow rates, the crossover current density at 0.4 V for the N211 sandwich control increases from ~0.27 mA $cm^{-2}$ (40 sccm $N_2$) to ~5.4 mA $cm^{-2}$ (16 sccm $N_2$) while the crossover current density for the stacked graphene membranes only increases from ~0.025 mA/$cm^2$ (40 sccm $N_2$) to ~0.35 mA $cm^{-2}$ (16 sccm $N_2$) demonstrating that the magnitude of crossover remains low compared to Nafion alone (see Table 10). FIG. 96 shows the percent reduction in crossover current density due to stacked graphene at each of the $N_2$ flow rates shows the reduction in crossover is greater than ~83%, with a maximum reduction of ~93% reached with 16 sccm $N_2$. The improved rejection of $H_2$ diffusion through the membrane at low flow rates could provide possible avenues to using lower flow rates/back pressure during $H_2$ fuel cell operation.

Table 5 shows the values of liquid phase $K^+$ and $H^+$ areal resistance with and without subtraction of resistance contributions from solution and Nafion. The measured resistance is directly extracted from the IV curves during multistep chronoamperometry for all concentrations of KCl and HCl then multiplied by the open membrane area (~0.68 $cm^2$) to obtain areal resistance. To isolate the areal resistance of just the membrane (i.e., Nafion+graphene), the solution areal resistance (solution column) is subtracted from the membrane areal resistance at each respective concentration. The graphene areal resistance is isolated by subtracting the Nafion areal resistance (i.e., solution areal resistance+Nafion, control column) from the measured graphene membrane.

TABLE 5

Values of liquid phase K$^+$ and H$^+$ areal resistance with and without subtraction of resistance contributions from solution and Nafion.

|  |  | Solution | Control | Fast | Slow | Low T | Stacked (Slow) |
|---|---|---|---|---|---|---|---|
| Measured resistance (Ω cm$^2$) | 0.1M KCl | 5.28 | 11.00 | 13.25 | 0.06 | 0.09 | 0.03 |
| | 0.5M KCl | 1.23 | 4.50 | 7.17 | 0.08 | 0.20 | 0.03 |
| | 1M KCl | 0.62 | 4.15 | 7.05 | 0.07 | 0.21 | 0.03 |
| | 0.1M HCl | 1.75 | 2.10 | 2.15 | 0.46 | 0.47 | 0.44 |
| | 0.5M HCl | 0.40 | 0.42 | 0.49 | 1.20 | 2.07 | 1.99 |
| | 1M HCl | 0.21 | 0.23 | 0.27 | 3.28 | 3.65 | 2.89 |
| Resistance after solution resistance subtraction (Ω cm$^2$) | 0.1M KCl | — | 5.72 | 7.97 | 0.08 | 0.17 | 0.04 |
| | 0.5M KCl | — | 3.27 | 5.94 | 0.09 | 0.26 | 0.04 |
| | 1M KCl | — | 3.53 | 6.43 | 0.08 | 0.24 | 0.03 |
| | 0.1M HCl | — | 0.35 | 0.39 | 2.44 | 2.54 | 1.85 |
| | 0.5M HCl | — | 0.02 | 0.09 | 9.40 | 11.33 | 9.25 |
| | 1M HCl | — | 0.02 | 0.06 | 10.34 | 15.22 | 7.22 |
| Resistance after solution and Nafion resistance subtraction (Ω cm$^2$) | 0.1M KCl | — | — | 2.25 | 0.15 | 6.55 | 0.04 |
| | 0.5M KCl | — | — | 2.67 | 0.13 | 1.91 | 0.04 |
| | 1M KCl | — | — | 2.90 | 0.11 | 1.69 | 0.04 |
| | 0.1M HCl | — | — | 0.04 | 16.08 | 21.97 | 5.20 |
| | 0.5M HCl | — | — | 0.07 | 12.49 | 16.15 | 12.24 |
| | 1M HCl | — | — | 0.04 | 12.66 | 20.84 | 8.28 |

Table 6 shows the areal conductance values of liquid phase K$^+$ and H$^+$ measurements with and without subtraction of resistance contributions from solution and Nafion. Conductance measurements are extracted from the IV curves during multistep chronoamperometry for all concentrations of KCl and HCl using the ohmic relationship S=I/V, where S is conductance, I is current, and V is voltage. To determine conductance of just the membrane (i.e., Nafion+graphene) and just the graphene, the resistance of the solution (purple column) and the Nafion (i.e., solution+Nafion resistance, orange column), respectively, are subtracted from the total resistance measured. Resistance and conductance are related as: R=1/S. Finally, areal conductance is calculated by dividing the conductance by the measured membrane area (open orifice, ~0.68 cm$^2$).

TABLE 6

Areal conductance values of liquid phase K$^+$ and H$^+$ measurements with and without subtraction of resistance contributions from solution and Nafion.

|  |  | Solution | Control | Fast | Slow | Low T | Stacked (Slow) |
|---|---|---|---|---|---|---|---|
| Areal Conductance (S cm$^{-2}$) | 0.1M KCl | 0.19 | 0.091 | 0.08 | 0.06 | 0.09 | 0.03 |
| | 0.5M KCl | 0.81 | 0.22 | 0.14 | 0.08 | 0.20 | 0.03 |
| | 1M KCl | 1.63 | 0.24 | 0.14 | 0.07 | 0.21 | 0.03 |
| | 0.1M HCl | 0.57 | 0.48 | 0.48 | 0.46 | 0.47 | 0.44 |
| | 0.5M HCl | 2.53 | 2.38 | 2.04 | 1.20 | 2.07 | 1.99 |
| | 1M HCl | 4.80 | 4.43 | 3.75 | 3.28 | 3.65 | 2.89 |
| Areal Conductance after solution resistance subtraction (S cm$^{-2}$) | 0.1M KCl | — | 0.18 | 0.13 | 0.08 | 0.17 | 0.04 |
| | 0.5M KCl | — | 0.3 | 0.17 | 0.09 | 0.26 | 0.04 |
| | 1M KCl | — | 0.28 | 0.16 | 0.08 | 0.24 | 0.03 |
| | 0.1M HCl | — | 2.88 | 2.56 | 2.44 | 2.54 | 1.85 |
| | 0.5M HCl | — | 37.97 | 10.57 | 9.40 | 11.33 | 9.25 |
| | 1M HCl | — | 56.49 | 17.14 | 10.34 | 15.22 | 7.22 |
| Areal Conductance after solution and Nafion resistance subtraction (S cm$^{-2}$) | 0.1M KCl | — | — | 0.45 | 0.15 | 6.55 | 0.04 |
| | 0.5M KCl | — | — | 0.36 | 0.13 | 1.91 | 0.04 |
| | 1M KCl | — | — | 0.35 | 0.11 | 1.69 | 0.04 |
| | 0.1M HCl | — | — | 23.39 | 16.08 | 21.97 | 5.20 |
| | 0.5M HCl | — | — | 14.64 | 12.49 | 16.15 | 12.24 |
| | 1M HCl | — | — | 24.60 | 12.66 | 20.84 | 8.28 |

Table 7 shows the H$^+$/K$^+$ selectivity for membranes at each concentration. Selectivity is calculated by $$\text{selectivity} = H^+\text{areal conductance}/K^+\text{areal conductance}$$

where H$^+$ and K$^+$ areal conductance is measured in the liquid phase with 0.1 M, 0.5 M and 1 M HCl and KCl. The H$^+$/K$^+$ selectivity observed for the solution is ~3 at all concentrations is due to differences in mobility between H$^+$ and K$^+$ in solution. Selectivity for N211|Graphene|N211 membranes follows the same trend observed for resistance/conductance i.e. stacked>slow>fast>low T. The low T graphene demonstrates similar selectivity to the control membrane, likely due to the high density of nanopores in the graphene. The stacked membrane dramatically improves the H$^+$/K$^+$ selectivity.

TABLE 7

H$^+$/K$^+$ selectivity for membranes at each concentration

| | Solution | Control | Fast | Slow | Low T | Stacked (Slow) |
|---|---|---|---|---|---|---|
| 0.1M | 3.01 | 5.23 | 6.18 | 8.24 | 5.19 | 14.24 |
| 0.5M | 3.11 | 10.67 | 14.61 | 24.91 | 10.39 | 55.36 |
| 1M | 2.95 | 18.34 | 26.37 | 44.24 | 17.28 | 86.10 |

Table 8 shows the values of the gas phase areal proton conductance for slow, fast, low T, and stacked graphene using the series resistance model. Membrane resistance values are obtained from the inverse of the IV curve slope collected with LSV while hydrogen is supplied to both sides of the membrane (FIG. 61, FIG. 62, see methods). The measured resistance values for the Nafion membranes with and without graphene are converted to areal proton conductance by taking the inverse of the resistance and normalizing to the active area (~0.318 cm$^2$, Pt loaded carbon cloth electrode overlap area) and are plotted in FIG. 66 (open circles—purple, orange, green, yellow, gray, and blue). To measure the system resistance (resistance of the system components/contact resistance), an IV curve is collected without a membrane loaded. The system resistance (~0.307Ω) is subtracted from the measured values for each membrane, then normalized by multiplying by the active area to obtain "MEA area resistance". These values are also plotted in FIG. 66 (closed circles—purple, orange, green, yellow, blue, and gray). To isolate the resistance contribution from graphene (graphene areal resistance), the MEA areal resistance for N211 sandwich is subtracted from the graphene membrane. Finally, graphene areal proton conductance is obtained from the inverse of the graphene areal resistance and are also plotted in FIG. 66 (stars—green, yellow, gray). Note the low T graphene areal proton conductance is not plotted in FIG. 66 (166 S cm$^{-2}$) as it's high value is due to many non-selective defects in the lattice.

TABLE 8

Values of the gas phase areal proton conductance for slow, fast, low T, and stacked graphene using the series resistance model.

| | Measured resistance (Ω) | Measured Areal Conductance (S cm$^{-2}$) | System resistance subtracted (Ω) | Nafion areal resistance (Ω cm$^2$) | Graphene areal resistance (Nafion subtracted) (Ω cm$^2$) | Graphene areal proton conductance (S cm$^{-2}$) |
|---|---|---|---|---|---|---|
| System resistance | 0.307 | — | — | — | — | — |
| N211 | 0.562 | 5.615 | 0.255 | 0.0807 | — | — |
| N211 Sandwich | 0.608 | 5.188 | 0.301 | 0.0953 | — | — |
| Slow | 0.687 | 4.592 | 0.380 | — | 0.0250 | 39.9 |
| Fast | 0.663 | 4.760 | 0.356 | — | 0.0173 | 57.7 |
| Low T | 0.627 | 5.031 | 0.320 | — | 0.0060 | 166 |
| Stacked | 0.760 | 4.151 | 0.453 | — | 0.0481 | 20.8 |

Table 9 shows the values for areal proton conductance and hydrogen crossover reported in this study and literature using similar methods. Where values are available via experiments herein or in the literature, areal proton conductance is calculated before and after subtraction of the system resistance and the Nafion resistance contributions. Some values in literature are reported as conductivity (normalized to membrane thickness). To calculate areal proton conductance, the reported membrane conductivity is divided by the membrane thickness. The hydrogen crossover values in these experiments are determined as the current density at ~0.4 V (~40 sccm $H_2$ supplied to one side and ~32 sccm $N_2$ supplied to the other side (FIG. 64)). Differences in temperature and humidity during measurements are also reported as these can influence both areal proton conductance and crossover, with higher humidity and temperature generally having higher areal proton conductance and hydrogen crossover.

TABLE 9

Values for areal proton conductance and hydrogen crossover reported in this study and literature using similar methods.

| Material | Ref. | Membrane conductivity (S cm$^{-1}$) | Membrane thickness (cm) | Membrane areal conductance (S cm$^{-2}$) | Areal conductance after system resistance subtraction (S cm$^{-2}$) | Areal conductance after Nafion resistance subtraction (S cm$^{-2}$) | Hydrogen crossover current density (mA cm$^{-2}$) | Potential at which current density is taken (V) | Temp (° C.) | Humidity (%) |
|---|---|---|---|---|---|---|---|---|---|---|
| 211 | This study | — | 0.0025 | 5.62 | 12.40 | — | 0.785 | 0.4 | RT | 100 |
| 211 Sandwich | This study | — | 0.0055 | 5.19 | 10.49 | — | 0.413 | 0.4 | RT | 100 |
| Slow graphene | This study | — | 0.0055 | 4.59 | 8.31 | 57.68 | 0.171 | 0.4 | RT | 100 |
| Fast graphene | This study | — | 0.0055 | 4.76 | 8.88 | 39.93 | 0.22 | 0.4 | RT | 100 |
| Low T graphene | This study | — | 0.0055 | 5.03 | 9.87 | 166.0 | 0.277 | 0.4 | RT | 100 |
| Stacked slow graphene | This study | — | 0.0055 | 4.15 | 6.97 | 20.75 | 0.069 | 0.4 | RT | 100 |
| 211 sandwich | 1, 2 | — | — | 3.07 | 1.0 | — | 4.3 | 0.4 | 30 | 100 |
| 211 sandwich with graphene | 1, 2 | — | — | 2.78 | 7.46 | 29 | 0.5 | 0.25-0.35 | 30 | 100 |
| SPEEK-51 | 3 | 0.038 | 0.0025 | 15.20 | — | — | 0.85 | 0.25-0.35 | 80 | 100 |
| N115 | 4 | — | 0.0125 | 5.56 | — | — | 1.2 | 0.4 | 90 | 100 |
| Sulfonated poly(phenylene sulfone) | 4 | — | 0.0115 | 15.38 | — | — | 0.25 | 0.4 | 90 | 100 |
| Cellulose fibers - H-CNF-1550 | 5 | 0.0015 | 0.0014 | 1.07 | — | — | 2.5 | 0.4 | 30 | 95 |
| Cellulose fibers - H-CNF-1550 | 5 | 0.0012 | 0.0024 | 0.50 | — | — | 0.07 | 0.4 | 30 | 95 |
| Cellulose fibers - H-CNF-600 | 5 | 0.0014 | 0.0014 | 1.00 | — | — | 2.5 | 0.4 | 30 | 95 |
| Cellulose fibers - H-CNF-600 | 5 | 0.0012 | 0.0024 | 0.50 | — | — | 2.7 | 0.4 | 30 | 95 |
| N117 | 6 | 0.055 | 0.0045 | 12.2 | — | — | 1.08 | 0.4 | 60 | 100 |
| SPEEK/Pt-Cs2.5 | 6 | 0.058 | 0.0183 | 3.17 | — | — | 0.769 | 0.4 | 60 | 100 |

[1] Bukola S et al. *J. Am. Chem. Soc.* 2018, 140, 1743-1752.
[2] Bukola S et al. *ECS Trans.* 2019, 92, 439-444.
[3] Jiang R et al. *J. Power Sources.* 2005, 150, 120-128.
[4] Klose C et al. *Adv. Energy Mater.* 2020, 10, 1903995.
[5] Guccini V et al. *J. Mater. Chem. A* 2019, 7, 25032-25039.
[6] Sayadi P et al. *Energy.* 2016, 94, 292-303.

Table 10 shows crossover current density values at 0.4 V for two N211 sandwich (control) membranes and stacked graphene membranes measured with LSV in asymmetric mode and different mass flow rates of $N_2$. $H_2$ mass flow rate is held constant at 40 sccm while the $N_2$ flow rate is varied between 16-40 sccm. Two controls were measured to validate the observed trends. An order of magnitude reduction in crossover is observed for nearly all conditions with the stacked graphene compared to the N211 Sandwich controls, illustrating potential for flexible operating conditions in proton exchange membrane applications, such as hydrogen fuel cells, without compromising performance due to reactant crossover. Note that the flow rates of $N_2$ was calibrated by measuring volumetric flow.

TABLE 10

Crossover current density values at 0.4 V for two N211 sandwich (control) membranes and stacked graphene membranes measured with LSV in asymmetric mode and different mass flow rates of $N_2$.

| $N_2$ Flow Rate | N211 Sandwich 1 (mA cm$^{-2}$) | N211 Sandwich 2 (mA cm$^{-2}$) | Stacked (mA cm$^{-2}$) |
|---|---|---|---|
| 16 | 5.37 | 6.45 | 0.35 |
| 20 | 1.37 | 1.67 | 0.14 |
| 24 | 0.27 | 0.25 | 0.025 |
| 32 | 0.41 | 0.23 | 0.069 |
| 40 | 0.27 | 0.27 | 0.025 |

REFERENCES (1) Kidambi P R et al. Subatomic Species Transport through Atomically Thin Membranes: Present and Future Applications. *Science* 2021, 374 (6568), eabd7687.
(2) Wang Y et al. Materials, Technological Status, and Fundamentals of PEM Fuel Cells e A Review. *Mater. Today* 2020, 32, 178-203.
(3) Junoh H et al. Performance of Polymer Electrolyte Membrane for Direct Methanol Fuel Cell Application: Perspective on Morphological Structure. *Membranes (Basel)* 2020, 10 (3), 34.
(4) Tempelman C H L et al. Membranes for All Vanadium Redox Flow Batteries. *J. Energy Storage* 2020, 32, 101754.
(5) Satyapal S. *DOE Hydrogen and Fuel Cell Perspectives and Overview of the International Partnership for Hydrogen and Fuel Cells in the Economy (IPHE)*; Presented at Global America Business Institute (GABI) Virtual Workshop, Jul. 1, 2020 U.S. Department of Energy Hydrogen and Fuel Cells Program, 2020.
(6) Slade S et al. Ionic Conductivity of an Extruded Nafion 1100 EW Series of Membranes. *J. Electrochem. Soc.* 2002, 149 (12), A1556.
(7) Klose C et al. All-Hydrocarbon MEA for PEM Water Electrolysis Combining Low Hydrogen Crossover and High Efficiency. *Adv. Energy Mater.* 2020, 10 (14), 1903995.
(8) Jiang R et al. Investigation of Membrane Property and Fuel Cell Behavior with Sulfonated Poly(Ether Ether Ketone) Electrolyte: Temperature and Relative Humidity Effects. *J. Power Sources* 2005, 150 (1-2), 120-128.
(9) Inaba M et al. Gas Crossover and Membrane Degradation in Polymer Electrolyte Fuel Cells. *Electrochim. Acta* 2006, 51 (26), 5746-5753.
(10) Schoemaker M et al. Evaluation of Hydrogen Crossover through Fuel Cell Membranes. *Fuel Cells* 2014, 14 (3), 412-415.
(11) Hu S et al. Proton Transport through One-Atom-Thick Crystals. *Nature* 2014, 516(7530), 227-230.
(12) Bunch J S et al. Impermeable Atomic Membranes from Graphene Sheets. *Nano Lett.* 2008, 8 (8), 2458-2462
(13) Sun P Z et al. Limits on Gas Impermeability of Graphene. *Nature* 2020, 579 (7798), 229-232.
(14) Yan X H et al. A Monolayer Graphene—Nafion Sandwich Membrane for Direct Methanol Fuel Cells. *J. Power Sources* 2016, 311, 188-194.
(15) Bukola S et al. Graphene-Based Proton Transmission and Hydrogen Crossover Mitigation in Electrochemical Hydrogen Pump Cells. *ECS Trans.* 2019, 92 (8), 439-444.
(16) Bukola S et al. Single-Layer Graphene as a Highly Selective Barrier for Vanadium Crossover with High Proton Selectivity. *J. Energy Chem.* 2021, 59, 419-430.
(17) Yoon S I et al. AA'-Stacked Trilayer Hexagonal Boron Nitride Membrane for Proton Exchange Membrane Fuel Cells. *ACS Nano* 2018, 12 (11), 10764-10771.
(18) Holmes S M et al. 2D Crystals Significantly Enhance the Performance of a Working Fuel Cell. *Adv. Energy Mater.* 2017, 7 (5), 1601216.
(19) Lozada-Hidalgo M et al. Giant Photoeffect in Proton Transport through Graphene Membranes. *Nat. Nanotechnol.* 2018, 13 (4), 300-303.
(20) Lozada-Hidalgo M et al. Sieving Hydrogen Isotopes through Two-Dimensional Crystals. *Science* 2016, 351 (6268), 68-70.
(21) Mogg L et al. Perfect Proton Selectivity in Ion Transport through Two-Dimensional Crystals. *Nat. Commun.* 2019, 10 (1), 4243.
(22) Griffin E et al. Proton and Li-Ion Permeation through Graphene with Eight-Atom-Ring Defects. *ACS Nano* 2020, 14 (6), 7280-7286.
(23) Koenig S P et al. Ultrastrong Adhesion of Graphene Membranes. *Nat. Nanotechnol.* 2011, 6 (9), 543-546.
(24) Wang L et al. Single-Layer Graphene Membranes Withstand Ultrahigh Applied Pressure. *Nano Lett.* 2017, 17 (5), 3081-3088.
(25) Wang L et al. Fundamental Transport Mechanisms, Fabrication and Potential Applications of Nanoporous Atomically Thin Membranes. *Nat. Nanotechnol.* 2017, 12 (6), 509-522.
(26) Prozorovska L et al. State-of-the-Art and Future Prospects for Atomically Thin Membranes from 2D Materials. *Adv. Mater.* 2018, 30 (52), 1801179.
(27) Chaturvedi P et al. Ionic Conductance through Graphene: Assessing Its Applicability as a Proton Selective Membrane. *ACS Nano* 2019, 13 (10), 12109-12119.
(28) Kidambi P R et al. A Scalable Route to Nanoporous Large-Area Atomically Thin Graphene Membranes by Roll-to-Roll Chemical Vapor Deposition and Polymer Support Casting. *ACS Appl. Mater. Interfaces* 2018, 10 (12), 10369-10378.
(29) Kobayashi T et al. Production of a 100-m-Long High-Quality Graphene Transparent Conductive Film by Roll-to-Roll Chemical Vapor Deposition and Transfer Process. *Appl. Phys. Lett.* 2013, 102(2), 023112.
(30) Kidambi P R et al. Assessment and Control of the Impermeability of Graphene for Atomically Thin Membranes and Barriers. *Nanoscale* 2017, 9 (24), 8496-8507.
(31) Cheng P et al. Facile Size-Selective Defect Sealing in Large-Area Atomically Thin Graphene Membranes for Sub-Nanometer Scale Separations. *Nano Lett.* 2020, 20 (8), 5951-5959.

(32) Kidambi P R et al. Facile Fabrication of Large-Area Atomically Thin Membranes by Direct Synthesis of Graphene with Nanoscale Porosity. *Adv. Mater.* 2018, 30 (49), 1804977.

(33) Kidambi P R et al. Selective Nanoscale Mass Transport across Atomically Thin Single Crystalline Graphene Membranes. *Adv. Mater.* 2017, 29(19), 1605896.

(34) Cheng P et al. Scalable Synthesis of Nanoporous Atomically Thin Graphene Membranes for Dialysis and Molecular Separations via Facile Isopropanol-Assisted Hot Lamination. *Nanoscale* 2021, 13 (5), 2825-2837.

(35) Ullah S et al. Graphene Transfer Methods: A Review. *Nano Research* 2021, 14 (11), 3756-3772.

(36) Bukola S et al. A Charge-Transfer Resistance Model and Arrhenius Activation Analysis for Hydrogen Ion Transmission across Single-Layer Graphene. *Electrochim. Acta* 2019, 296, 1-7.

(37) Bukola S et al. Effects of Atomic-Layer-Deposition Alumina on Proton Transmission through Single-Layer Graphene in Electrochemical Hydrogen Pump Cells. *ACS Appl. Energy Mater.* 2020, 3 (2), 1364-1372.

(38) Bukola S et al. Selective Proton/Deuteron Transport through Nafion|Graphene|Nafion Sandwich Structures at High Current Density. *J. Am. Chem. Soc.* 2018, 140 (5), 1743-1752.

(39) Bukola S et al. Single-Layer Graphene Sandwiched between Proton-Exchange Membranes for Selective Proton Transmission. *ACS Appl. Nano Mater.* 2019, 2 (2), 964-974.

(40) Lozada-Hidalgo M et al. Scalable and Efficient Separation of Hydrogen Isotopes Using Graphene-Based Electrochemical Pumping. *Nature Comm* 2017, 8 (1), 15215.

(41) Chen Q et al. Graphene Enhances the Proton Selectivity of Porous Membrane in Vanadium Flow Batteries. *Materials and Design* 2017, 113, 149-156.

(42) O'Hern S C et al. Selective Ionic Transport through Tunable Subnanometer Pores in Single-Layer Graphene Membranes. *Nano Lett.* 2014, 14 (3), 1234-1241.

(43) Zhao J et al. Etching Gas-Sieving Nanopores in Single-Layer Graphene with an Angstrom Precision for High-Performance Gas Mixture Separation. *Sci. Adv.* 2019, 5 (1), No. eaav1851.

(44) Qi H et al. Fabrication of Sub-Nanometer Pores on Graphene Membrane for Ion Selective Transport. *Nanoscale* 2018, 10 (11), 5350-5357.

(45) Koenig S P et al. Selective Molecular Sieving through Porous Graphene. *Nature Nanotechnol* 2012, 7 (11), 728-732.

(46) Walker M I et al. Extrinsic Cation Selectivity of 2D Membranes. *ACS Nano* 2017, 11 (2), 1340-1346.

(47) Huang S et al. Single-Layer Graphene Membranes by Crack-Free Transfer for Gas Mixture Separation. *Nature Comm* 2018, 9 (1), 1-11.

(48) Kim S et al. Pore-Size-Tuned Graphene Oxide Frameworks as Ion-Selective and Protective Layers on Hydrocarbon Membranes for Vanadium Redox-Flow Batteries. *Nano Lett.* 2018, 18 (6), 3962-3968.

(49) Kidambi P R et al. The Parameter Space of Graphene Chemical Vapor Deposition on Polycrystalline Cu. *J. Phys. Chem. C* 2012, 116 (42), 22492-22501.

(50) Kidambi P R et al. Observing Graphene Grow: Catalyst-Graphene Interactions during Scalable Graphene Growth on Polycrystalline Copper. *Nano Lett.* 2013, 13 (10), 4769-4778.

(51) Xu X et al. Ultrafast Epitaxial Growth of Metre-Sized Single-Crystal Graphene on Industrial Cu Foil. *Science Bulletin* 2017, 62 (15), 1074-1080.

(52) Vlassiouk I V et al. Evolutionary Selection Growth of Two-Dimensional Materials on Polycrystalline Substrates. *Nat. Mater.* 2018, 17 (4), 318-322.

(53) Wu T et al. Fast Growth of Inch-Sized Single-Crystalline Graphene from a Controlled Single Nucleus on Cu—Ni Alloys. *Nat. Mater.* 2016, 15 (1), 43-47.

(54) Villalobos L F et al. Bottom-up Synthesis of Graphene Films Hosting Atom-Thick Molecular-Sieving Apertures. *Proc. Natl. Acad. Sci. U.S.A.* 2021, 118 (37), e2022201118.

(55) Zhao T et al. Ultrafast Growth of Nanocrystalline Graphene Films by Quenching and Grain-Size-Dependent Strength and Bandgap Opening. *Nat. Commun.* 2019, 10 (1), 4854.

(56) Toh C T et al. Synthesis and Properties of Free-Standing Monolayer Amorphous Carbon. *Nature* 2020, 577 (7789), 199-203.

(57) Zeng Z et al. Biomimetic N-Doped Graphene Membrane for Proton Exchange Membranes. *Nano Lett.* 2021, 21 (10), 4314.

(58) Dong J et al. Kinetics of Graphene and 2D Materials Growth. *Adv. Mater.* 2019, 31 (9), 1801583.

(59) Vlassiouk I et al. Role of Hydrogen in Chemical Vapor Deposition Growth of Large Single-Crystal Graphene. *ACS Nano* 2011, 5 (7), 6069-6076.

(60) Chaitoglou S et al. Effect of Temperature on Graphene Grown by Chemical Vapor Deposition. *J. Mater. Sci.* 2017, 52 (13), 8348-8356.

(61) Zhang Z et al. Atomistic Processes in the Early Stages of Thin-Film Growth. *Science* 1997, 276 (5311), 377-383.

(62) Vlassiouk I et al. Graphene Nucleation Density on Copper: Fundamental Role of Background Pressure. *J. Phys. Chem. C* 2013, 117 (37), 18919-18926.

(63) Kim H et al. Activation Energy Paths for Graphene Nucleation and Growth on Cu. *ACS Nano* 2012, 6 (4), 3614-3623.

(64) Zhang Y et al. Anisotropic Hydrogen Etching of Chemical Vapor Deposited Graphene. *ACS Nano* 2012, 6 (1), 126-132.

(65) Choubak S et al. No Graphene Etching in Purified Hydrogen. *J. Phys. Chem. Lett.* 2013, 4 (7), 1100-1103.

(66) Jacobberger R M et al. Graphene Growth Dynamics on Epitaxial Copper Thin Films. *Chem. Mater.* 2013, 25 (6), 871-877.

(67) Ma T et al. Edge-Controlled Growth and Kinetics of Single-Crystal Graphene Domains by Chemical Vapor Deposition. *Proc. Natl. Acad. Sci. U.S.A* 2013, 110 (51), 20386-20391.

(68) Li X et al. Large-Area Graphene Single Crystals Grown by Low-Pressure Chemical Vapor Deposition of Methane on Copper. *J. Am. Chem. Soc.* 2011, 133 (9), 2816-2819.

(69) Jia C et al. Direct Optical Characterization of Graphene Growth and Domains on Growth Substrates. *Sci. Rep.* 2012, 2 (1), 707.

(70) Ferrari A C. Raman Spectroscopy of Graphene and Graphite: Disorder, Electron-Phonon Coupling, Doping and Nonadiabatic Effects. *Solid State Commun.* 2007, 143 (1-2), 47-57.

(71) Ugeda M M et al. Point Defects on Graphene on Metals. *Phys. Rev. Lett.* 2011, 107 (11), 116803.

(72) Jung S H et al. Super-Nernstian PH Sensor Graphene. *Nano Lett.* 2021, 21 (1), 34-42.

(73) Shreiner R H et al. *Standard Reference Materials: Primary Standards and Standard Reference Materials for Electrolytic Conductivity*; NIST Special Publication 260-142, 2004 Ed.; National Institute of Standards and Technology: Gaithersburg, M D, 2004.

(74) Yeager H L et al. Transport Properties of Nafion. Membranes in Concentrated Solution Environments. *J. Electrochem. Soc.* 1982, 129 (1), 85-89.

(75) Geise G M et al. Sodium Chloride Diffusion in Sulfonated Polymers for Membrane Applications. *J. Membr. Sci.* 2013, 427, 186-196.

(76) Lehmani A et al. Ion Transport in Nafion. 117 Membrane. *J. Electroanal. Chem.* 1997, 428 (1-2), 81-89.

(77) Hsu W Y et al. Ion Transport and Clustering in Nafion Perfluorinated Membranes. *J. Membr. Sci.* 1983, 13 (3), 307-326.

(78) Boutilier M S H H et al. Implications of Permeation through Intrinsic Defects in Graphene on the Design of Defect-Tolerant Membranes for Gas Separation. *ACS Nano* 2014, 8 (1), 841-849.

(79) Mi B. Scaling up Nanoporous Graphene Membranes. *Science* 2019, 364 (6445), 1033-1034.

(80) Ying Z et al. Influence of Stacking on the Aqueous Proton Penetration Behaviour across Two-Dimensional Graphtetrayne. *Nanoscale* 2021, 13 (11), 5757-5764.

(81) Hu S et al. Transport of Hydrogen Isotopes through Interlayer Spacing in van Der Waals Crystals. *Nat. Nanotechnol.* 2018, 13 (6), 468-472.

(82) Zakertabrizi M et al. Hydrous Proton Transfer through Graphene Interlayer: An Extraordinary Mechanism under Magnifier. *Adv. Mater. Technol.* 2021, 6 (10), 2001049.

(83) Mouterde T et al. Molecular Streaming and Its Voltage Control in Ångström-Scale Channels. *Nature* 2019, 567 (7746), 87-90.

(84) Suk M E et al. Ion Transport in Sub-5-Nm Graphene Nanopores. *J. Chem. Phys.* 2014, 140 (8), 084707.

(85) O'hern S C et al. Selective Molecular Transport through Intrinsic Defects in a Single Layer of CVD Graphene. *ACS Nano* 2012, 6 (11), 10130-10138.

(86) Rollings R C et al. Ion Selectivity of Graphene Nanopores. *Nat. Commun.* 2016, 7 (1), 1-7.

(87) Wang R et al. Controlling Fuel Crossover and Hydration in Ultra-Thin Proton Exchange Membrane-Based Fuel Cells Using Pt-Nanosheet Catalysts. *J. Mater. Chem. A* 2014, 2 (39), 16416-16423.

(88) Sayadi P et al. Study of Hydrogen Crossover and Proton Conductivity of Self-Humidifying Nanocomposite Proton Exchange Membrane Based on Sulfonated Poly(Ether Ether Ketone). *Energy* 2016, 94, 292-303.

(89) Guccini V et al. Highly Proton Conductive Membranes Based on Carboxylated Cellulose Nanofibres and Their Performance in Proton Exchange Membrane Fuel Cells. *J. Mater. Chem. A* 2019, 7(43), 25032-25039.

(90) Chaturvedi P et al. Deconstructing Proton Transport Through Atomically Thin Monolayer CVD Graphene Membranes. *J. Mater. Chem. A* 2022, DOI: 10.1039/D2TA01737G.

Example 6

Figure 97:
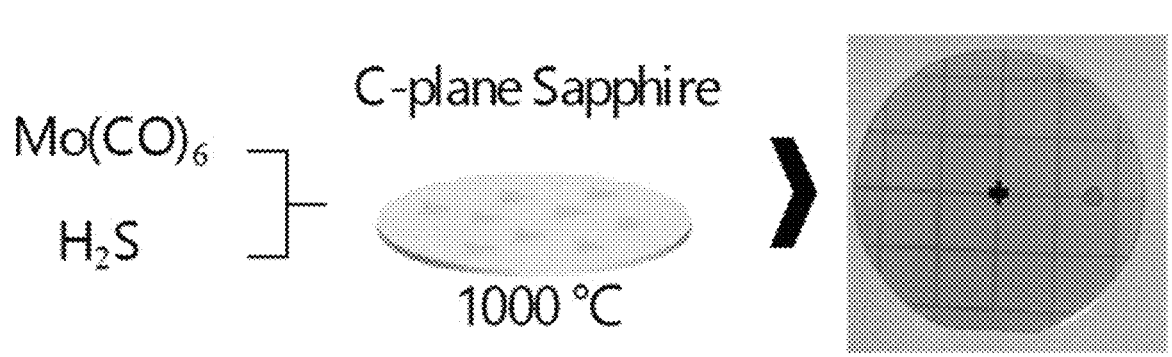
FIG. 97. $MoS_2$ is grown via MOCVD from $Mo(CO)_6$ and $H_2S$ precursors on 2" c-plane sapphire at 1000° C.

FIG. 97-FIG. 101 show the optical and structural characterization of $MoS_2$. FIG. 97 shows $MoS_2$ is grown via MOCVD from $Mo(CO)_6$ and $H_2S$ precursors on 2" c-plane sapphire at 1000° C.

Figure 98:
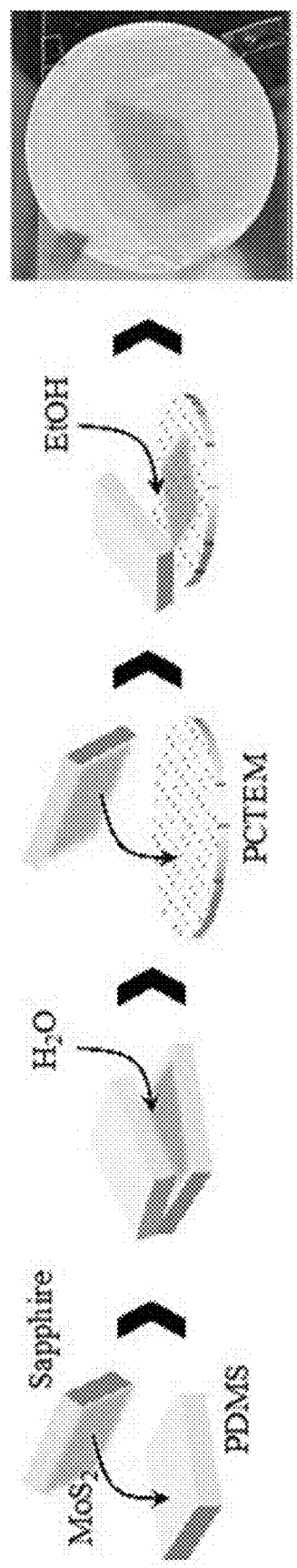
FIG. 98. $MoS_2$ transfer procedure.
Figure 99:
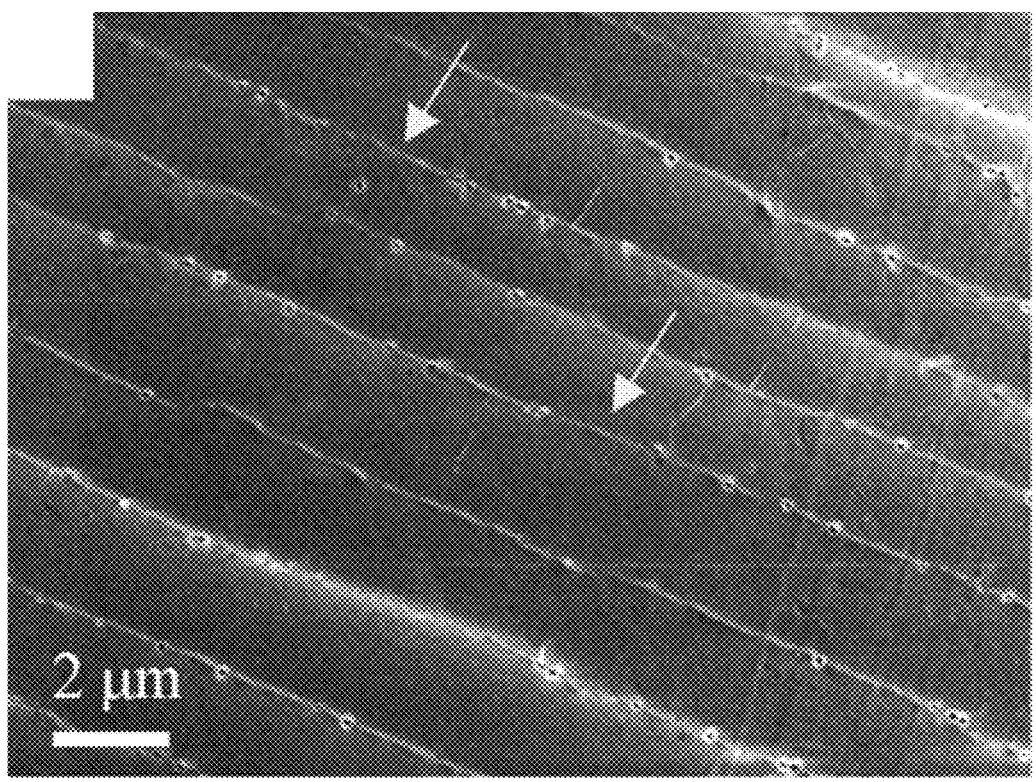
FIG. 99. SEM of $MoS_2$ transferred to PCTEM.
Figure 100:
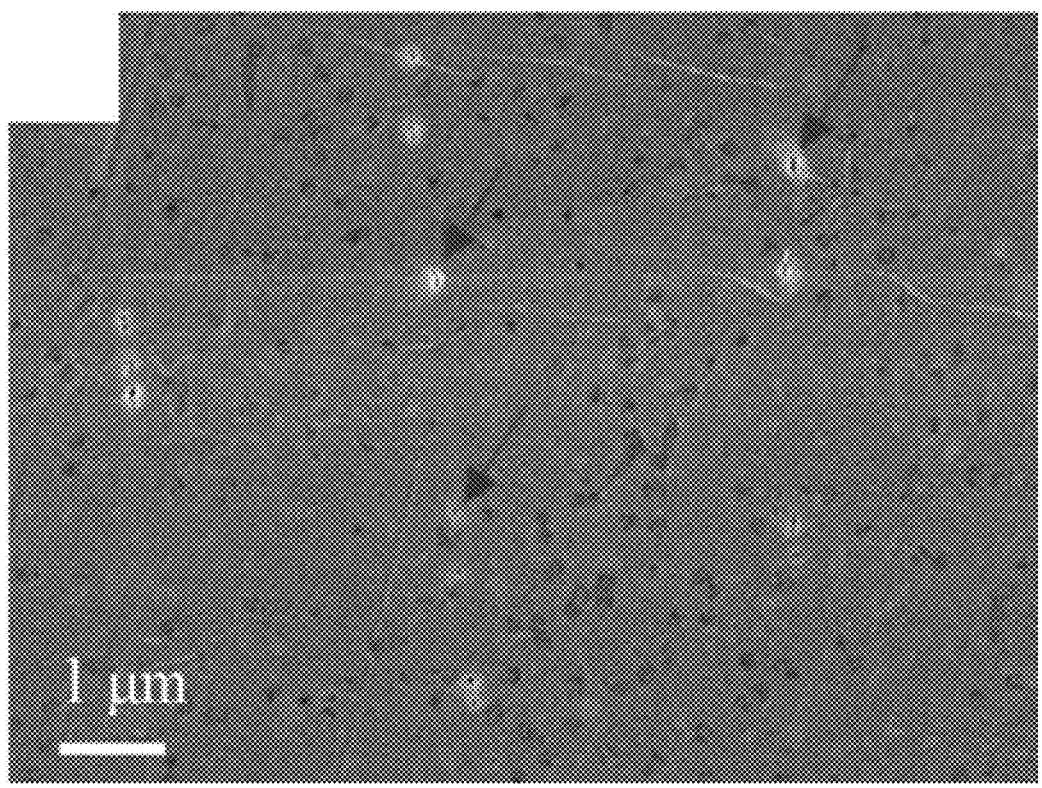
FIG. 100. SEM of $MoS_2$ on PCTEM.
Figure 101:
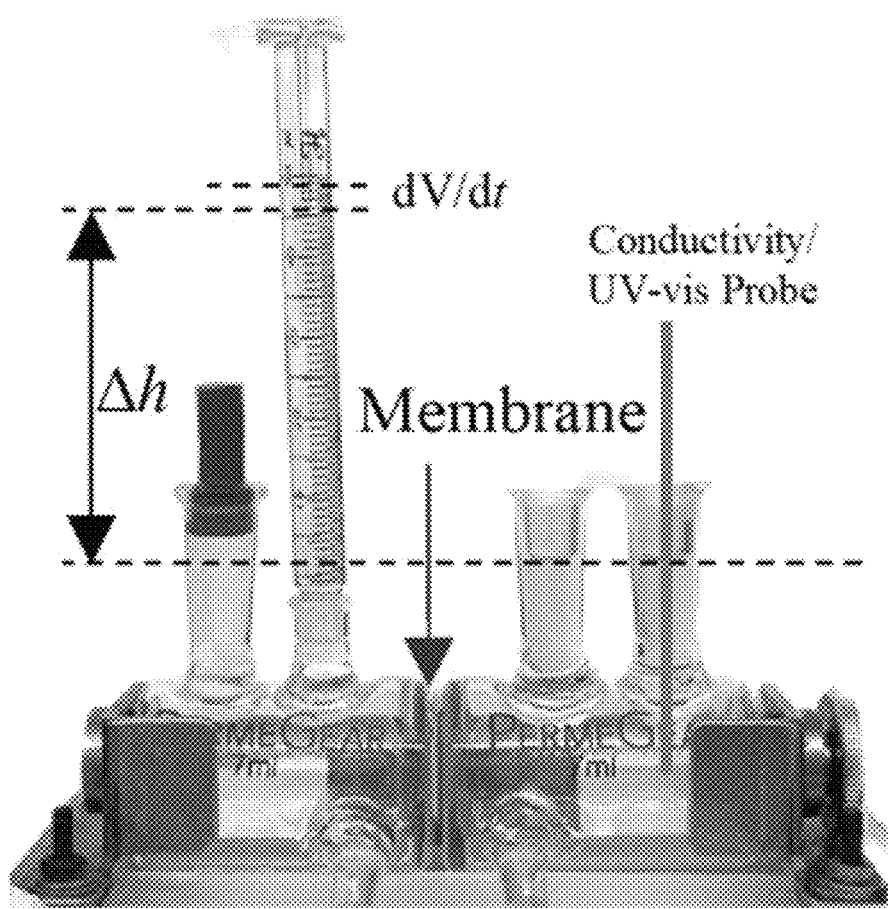
FIG. 101. Membrane measurement schematic.
Figure 102:
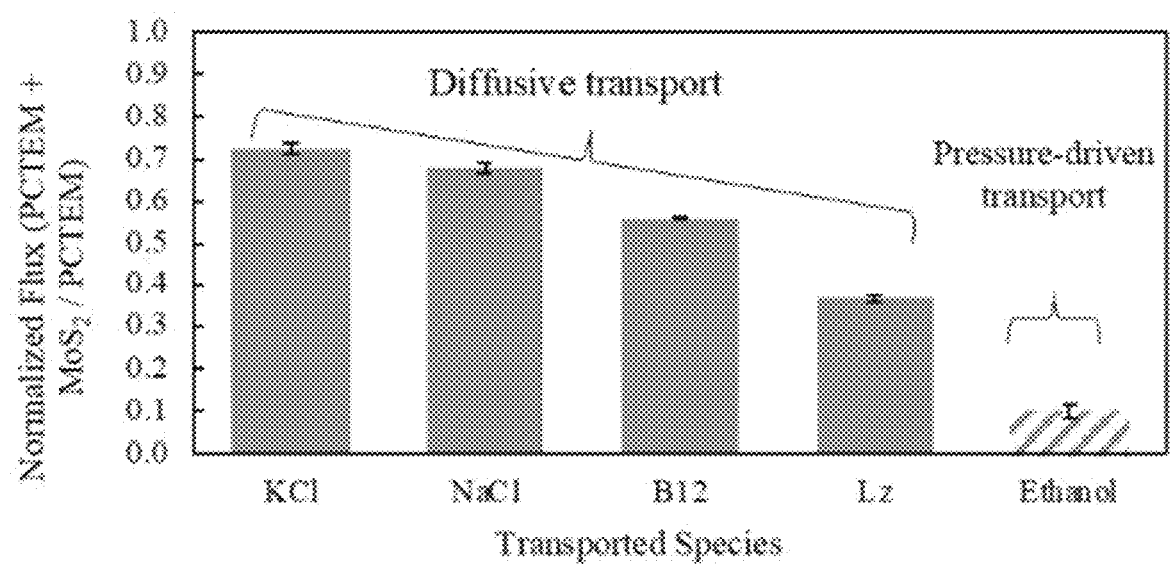
FIG. 102. Transport results in the form of solute flux normalized to the bare PCTEM support (solute flux of $MoS_2$+PCTEM/solute flux of PCTEM) of KCl, NaCl, vitamin B12, egg-white lysozyme, and ethanol.
Figure 103:
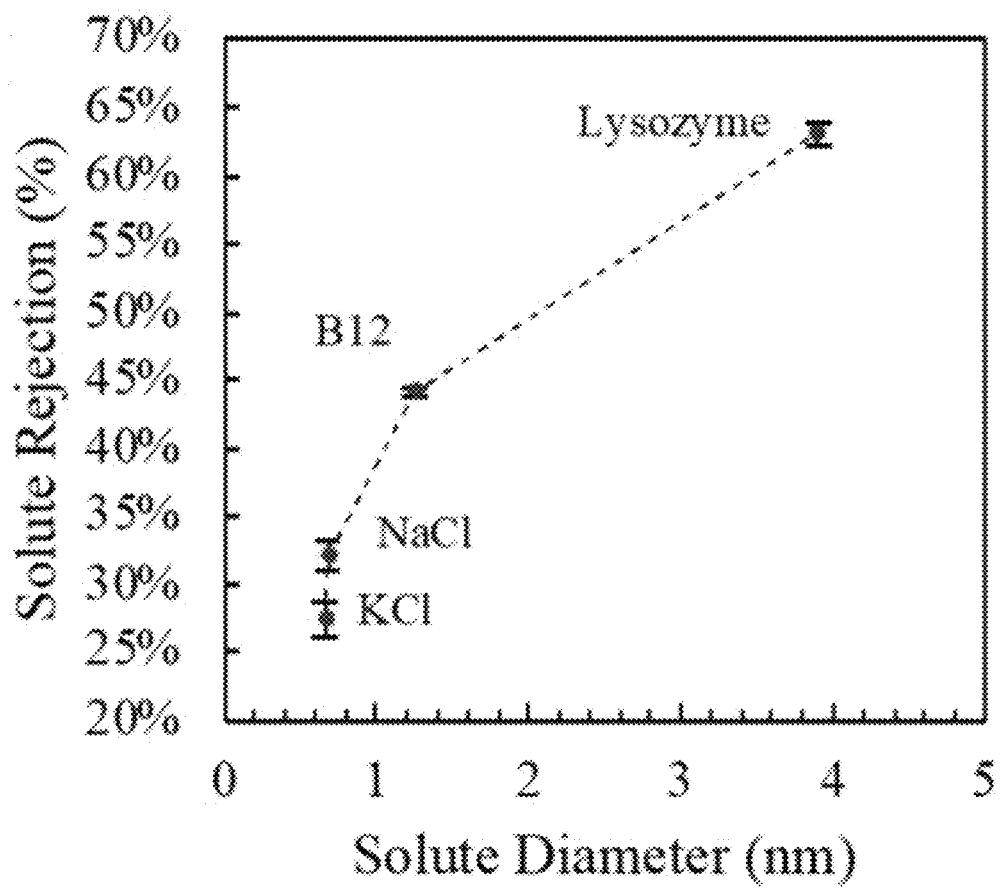
FIG. 103. Solute rejection as a function of solute diameter across the $MoS_2$ membrane for diffusive transport driven species.

FIG. 98-FIG. 103 show through-plane molecular transport characteristics across the $MoS_2$ film. FIG. 98 shows the transfer procedure. $MoS_2$ on sapphire is first stamped onto PDMS followed by sonication in $H_2O$ to separate $MoS_2$ and sapphire leaving $MoS_2$ transferred to PDMS. The PDMS/$MoS_2$ is then stamped onto isoporous 200 nm track-etched polycarbonate membranes (PCTEM). $MoS_2$ is then separated from PDMS via wetting in ethanol and peeling off the PDMS stamp, leaving $MoS_2$ transferred to PCTEM. Adhesion of the $MoS_2$ to the PCTEM is further improved by annealing at 45° C. under vacuum. FIG. 99 shows a SEM of $MoS_2$ transferred to PCTEM. Parallel line features (marked by yellow arrows) are ascribed to steps in the sapphire wafer imprinting on the PCTEM or wrinkling of the of the $MoS_2$ along these step features. FIG. 100 shows a SEM of $MoS_2$ on PCTEM. Tears in the $MoS_2$ (marked by red arrows) are observed over some pores in the PCTEM. These appear predominantly in parallel lines of similar spacing to the features observed in FIG. 99, indicating that these tears are predominantly located along steps on the sapphire growth substrate. FIG. 101 shows a membrane measurement schematic. Transport measurements are taken in a side-by-side liquid cell modified with a tall stem on one side such that a transmembrane pressure can be applied via a hydrostatic head and pressure-driven flow of ethanol across the membrane can be measured. Diffusive transport is measured in an absence of a hydrostatic head and the concentration of solute in the permeate side is measured via solution conductivity (in the case of salts) or by UV-vis absorption (in the case of organic solutes). FIG. 102 shows transport results in the form of solute flux normalized to the bare PCTEM support (solute flux of $MoS_2$+PCTEM/solute flux of PCTEM) of KCl, NaCl, vitamin B12, egg-white lysozyme, and ethanol. Note that ethanol transport is measured via assessing the volumetric flow of solution across the membrane as a function of hydrostatic pressure. While diffusion scales as a function of $D^2/L$, pressure-driven flow scales as a function of $D^4/L$ (where D is pore diameter and L is membrane thickness) hence ethanol transport is dominated by flux through large tears in the $MoS_2$ film. FIG. 103 shows solute rejection as a function of solute diameter across the $MoS_2$ membrane for diffusive transport driven species.

Methods

Synthesis. $MoS_2$ is grown by metal-organic chemical vapor deposition (MOCVD). The deposition is performed at low pressure (50 Torr) under 400 sccm of $H_2S$ and 20 sccm of $Mo(CO)_6$ evaporated at 25° C. and a pressure of 625 Torr. The deposition is performed at 1000° C. for 12 min on a 2" pre-scored c-plane sapphire wafer.

Characterization. Atomic force microscopy (AFM), photoluminescence (PL) spectroscopy and Raman spectroscopy are all performed directly on the as-grown $MoS_2$ on sapphire. PL is performed with a 4 mW 532 nm laser using a 5 s acquisition time and 2 samplings under a 100× objective with 300 gr/mm grating. Raman spectroscopy is performed with a 4 mW 532 nm laser using a 30 s acquisition time and 3 samplings under a 100× objective with 1800 gr/mm grating.

Transfer. Transfer of $MoS_2$ is performed using a polydimethylsiloxane (PDMS) stamp-based method. PDMS stamps are fabricated by first mixing and degassing elastomer base and curing agent (Slygard 184, 1:10 weight ratio) before pouring into a petri dish and curing at 50° C. overnight under vacuum. The PDMS stamps are approximately 1-2 mm thick. $MoS_2$/sapphire is gently pressed onto the PDMS stamp, $MoS_2$ being in contact with the PDMS. The PDMS/$MoS_2$/sapphire stack is then submerged in water at room temperature and sonicated for <30 sec to separate the $MoS_2$/sapphire interface. It is suspected that this method works due to the hydrophilicity of the sapphire, and hydrophobicity of PDMS and $MoS_2$ causing water to preferentially wet the sapphire interface, rather than the $MoS_2$/PDMS interface. After the $MoS_2$/PDMS dries under ambient conditions, it is gently pressed against isoporous (200 nm pores) polycarbonate track-etched membranes (PCTEM)

(Sterlitech). The PDMS/MoS$_2$/PCTEM is then briefly submerged in ethanol (10 sec) to wet the system. PDMS is then easily removed without peeling, leaving MoS$_2$ attached to the PCTEM. The MoS$_2$/PCTEM is then air dried before annealing at 45° C. under vacuum to ensure full removal of ethanol from the MoS$_2$/PCTEM interface.

Transport Measurements. Transport measurements are performed in a side-by-side liquid cell (Permegear) as reported elsewhere with a 5 mm orifice, 7 ml volume on each side, magnetic stir bars vigorously mixing the solutions on each side, and a volumetric syringe sealed to the feed side for pressure-driven transport measurements.

For pressure-driven transport measurements, the membrane is first rinsed thoroughly with ethanol to ensure the pores of the PCTEM support are fully wetted. Pressure-driven ethanol transport measurements are performed by filling both sides of the cell with ethanol (ThermoFisher HistoPrep 100% reagent alcohol), and then adding additional ethanol to the feed side such that the liquid fills the syringe to a height higher than that of the permeate side, creating a hydrostatic head that acts as the driving force for pressure-driven flow across the membrane. By measuring the solution height difference between the feed and permeate sides of the membrane and measuring the change in volume as ethanol is driven across the membrane, a value for ethanol flux per unit of transmembrane pressure can be extracted. In detail, the ethanol meniscus in a 250 µL syringe on the feed side is recorded via camera every 60 seconds. Ethanol permeance is then calculated using Equation 20 where ΔV is the change in ethanol volume over each 60 s interval, ΔP is the pressure across the membrane calculated from the average hydrostatic head over the same 60 s interval, Δt is the time interval (60 s), and A$_{effective}$ is the effective membrane area based on the cell orifice size and the porosity of the PCTEM.

$$\text{Permance} = \frac{\Delta V/\Delta P}{\Delta t \times A_{\textit{effective}}} \tag{20}$$

Ethanol permeance values are calculated by taking a simple average of each time interval over ~15 min. Average ethanol permeance and standard deviation for each membrane are computed by repeating ethanol transport measurements 3 times and taking the average and standard deviation of those three computed ethanol permeance values. Normalized flux is computed by calculating the ratio of the permeance of MoS$_2$+PCTEM membranes divided by the permeance of bare PCTEM.

Prior to diffusion-driven transport measurements, the cell is washed 5 times with water to ensure the removal of ethanol residues from the cell. Diffusive measurements are performed with KCl (Fisher Chemical) and NaCl (Fisher Chemical) salts, vitamin B12 (Sigma-Aldrich), and egg-white lysozyme (VWR) solutes introduced on the feed side, ensuring that the liquid level is equal on both sides of the membrane such that no transmembrane hydrostatic pressure is applied.

For KCl and NaCl, 0.5M salt is added to the feed side, while DI water is added to the permeate side. The concentration of KCl and NaCl in the permeate is determined by measuring the solution conductivity (Mettler Toledo Seven-Compact S230) every 15 s for 15 min. To calculate the salt concentration from conductivity, a linear calibration curve was constructed to correlate solution conductivity to salt concentration using calibration solutions of known salt concentrations in the measured range.

For B12 and Lz measurements, 1 mM of B12 or Lz in 0.5M KCl is added on the feed side, while 0.5M KCl is added to the permeate side, again ensure no hydrostatic pressure is applied across the membrane. B12 and Lz concentration in the permeate is determined by UV-vis spectroscopy (Agilent Cary 60) where a fiber optic probe is used to collect absorbance spectra of the permeate in the range of 190 to 1100 nm every 15 s for 40 min. A quadratic calibration curve was defined by measuring the ratio of intensities of known absorbance peaks against a reference absorbance for a different known concentrations of organic species within the measured range. For B12, the ratio of spectra intensity at 360 nm (B12) against 710 nm (water) is used, while for Lz the ratio of spectra intensity at 282 nm (Lz) against 710 nm (water) is used.

Solute permeances of KCl, NaCl, B12, and Lz are calculated by Equation 21 where V is the volume of the permeate side of the cell (7 mL), dC/dt is the change in concentration over time in the permeance side, ΔC is the concentration difference of solute across the membrane, and A$_{effective}$ is the effective membrane area calculated from the 5 mm orifice and porosity of the PCTEM (~10%).

$$\text{Permeance} = \frac{V \times dC/dt}{\Delta C \times A_{\textit{effective}}} \tag{21}$$

Solute permeance averages and standard deviations are computed from 3 measurement replicates. Normalized flux is computed by calculating the ratio of MoS$_2$+PCTEM permeance divided by the permeance cross bare PCTEM.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method for characterizing pore(s) and/or defect(s) in a two-dimensional (2D) material, the method comprising:
performing electrically driven ionic transport measurements on a K$^+$-form membrane using a first liquid electrolyte comprising KCl to determine the $K^+$ conductance of the $K^+$-form membrane;

wherein the $K^+$-form membrane comprises a two-dimensional material sandwiched between a first ionomer and a second ionomer, wherein the first ionomer and the second ionomer are each in a $K^+$-form;

after performing the electrically driven ionic transport measurements on the $K^+$-form membrane, converting the $K^+$-form membrane to a $H^+$-form membrane, the $H^+$-form membrane comprising the two-dimensional material sandwiched between the first ionomer and the second ionomer, wherein the first ionomer and the second ionomer are each in a $H^+$-form; and performing electrically driven ionic transport measurements on the $H^+$-form membrane using a second liquid electrolyte comprising HCl to determine the $H^+$ conductance of the $H^+$-form membrane; and analyzing the $K^+$ conductance of the $K^+$-form membrane and the $H^+$ conductance of the $H^+$-form membrane to determine a property of the two-dimensional material, wherein the property relates to a characteristic of the pore(s) and/or defect(s) in the two-dimensional material.

2. The method of claim 1, wherein analyzing the $K^+$ conductance of the $K^+$-form membrane comprises determining the $K^+$ conductance of the two-dimensional material, and the $K^+$ conductance of the two-dimensional material is from 0.01 mS cm$^{-2}$ to $2\times10^4$ mS cm$^{-2}$.

3. The method of claim 1, wherein analyzing the $H^+$ conductance of the $H^+$-form membrane comprises determining the $H^+$ conductance of the two-dimensional material, and the $H^+$ conductance of the two-dimensional material is from 1 mS cm$^{-2}$ to $5\times10^5$ mS cm$^{-2}$.

4. The method of claim 1, wherein analyzing the $K^+$ conductance of the $K^+$-form membrane and the $H^+$ conductance of the $H^+$-form membrane comprises determining the $H^+/K^+$ selectivity of the two-dimensional material, and the $H^+/K^+$ selectivity of the two-dimensional material is from 1 to 1000.

5. The method of claim 1, wherein after performing the electrically driven ionic transport measurements on the $H^+$-form membrane using the second liquid electrolyte, the method further comprises performing $H_2$ crossover measurements on the $H^+$-form membrane to determine the $H_2$ crossover current density of the $H^+$-form membrane.

6. The method of claim 5, further comprising analyzing the $H_2$ crossover current density of the $H^+$-form membrane to determine the $H_2$ crossover current density of the two-dimensional material, and wherein the $H_2$ crossover current density of the two-dimensional material is from $1\times10^{-6}$ mA cm$^{-2}$ to 1 mA cm$^{-2}$.

7. The method of claim 1, wherein the 2D material is supported by a substrate, such that the two-dimensional material and the substrate are sandwiched by the first ionomer and the second ionomer.

8. The method of claim 1, wherein the membrane comprises one or more layers of the two-dimensional material.

9. The method of claim 1, wherein the membrane comprises two layers of the two-dimensional material stacked together.

10. The method of claim 1, wherein the two-dimensional material comprises graphene, hexagonal boron nitride (h-BN), a transition metal dichalcogenide, or a combination thereof.

11. The method of claim 1, wherein the two-dimensional material comprises a semiconductor.

12. The method of claim 1, wherein the 2D material comprises a first set of pores and/or defects having a first characteristic dimension, and a second set of pores and/or defects having a second characteristic dimension, the second characteristic dimension being greater than the first characteristic dimension, and the method further comprises blocking the second set of pores and/or defects via interfacial polymerization before sandwiching the 2D material between the first and second ionomer.

13. The method of claim 1, wherein the first ionomer and/or the second ionomer each independently comprises a proton conducting polymer.

14. The method of claim 1, wherein the first ionomer, the second ionomer, or a combination thereof comprise(s) a copolymer of tetrafluoroethylene and perfluoro-3,6-dioxa-4-methyl-7-octene-sulfonic acid (Nafion), poly(tetrafluoroethylene-co-2,2,4-trifluoro-5-trifluoromethoxy-1,3-dioxole) (Hyflon), polybenzimidazole (PBI), derivatives thereof, or combinations thereof.

15. The method of claim 1, wherein the method comprises characterizing the presence of pore(s) and/or defect(s), the concentration (e.g., density) of pore(s) and/or defect(s), the average characteristic dimension(s) of pore(s) and/or defect(s), or a combination thereof.

* * * * *